US006975666B2

(12) United States Patent
Affes et al.

(10) Patent No.: US 6,975,666 B2
(45) Date of Patent: Dec. 13, 2005

(54) INTERFERENCE SUPPRESSION IN CDMA SYSTEMS

(75) Inventors: Sofiène Affes, Montreal (CA); Henrik Hansen, Copenhagen (DK); Paul Mermelstein, Côte Saint-Luc (CA)

(73) Assignee: Institut National de la Recherche Scientifique, Sainte-Foy (CA)

( * ) Notice: Subject to any disclaimer, the term of this patent is extended or adjusted under 35 U.S.C. 154(b) by 1018 days.

(21) Appl. No.: 09/742,421

(22) Filed: Dec. 22, 2000

(65) Prior Publication Data

US 2002/0051433 A1 May 2, 2002

Related U.S. Application Data

(60) Provisional application No. 60/171,604, filed on Dec. 23, 1999, and provisional application No. 60/243,727, filed on Oct. 30, 2000.

(30) Foreign Application Priority Data

Sep. 12, 2000 (CA) .............................................. 2318658

(51) Int. Cl.[7] .............................................. H04B 1/69
(52) U.S. Cl. ...................................................... 375/130
(58) Field of Search ................................. 375/130, 141, 375/144, 146, 147, 148, 285, 346, 296; 370/335, 342, 441

(56) References Cited

U.S. PATENT DOCUMENTS

| | | | |
|---|---|---|---|
| 5,341,395 A | 8/1994 | Bi | |
| 5,363,403 A | 11/1994 | Schilling et al. | |
| 5,467,368 A | 11/1995 | Takeuchi et al. | |
| 5,553,062 A | 9/1996 | Schilling et al. | |
| 5,563,610 A | 10/1996 | Reudink | |
| 5,621,752 A | 4/1997 | Antonio et al. | |
| 5,648,968 A | 7/1997 | Reudink | |
| 5,719,852 A | 2/1998 | Schilling et al. | |
| 5,734,647 A | 3/1998 | Yoshida et al. | |
| 5,761,237 A | 6/1998 | Petersen et al. | |
| 5,799,004 A | 8/1998 | Keskitalo et al. | |
| 5,845,208 A | * 12/1998 | Hottinen et al. | ............ 455/436 |
| 5,859,879 A | 1/1999 | Belgiano et al. | |
| 5,862,124 A | 1/1999 | Hottinen et al. | |
| 5,867,411 A | * 2/1999 | Kumar | ...................... 708/300 |
| 5,872,776 A | 2/1999 | Yang | |
| 5,887,034 A | 3/1999 | Suzuki | |
| 6,006,110 A | 12/1999 | Raleigh | |
| 6,067,290 A | 5/2000 | Paulraj et al. | |
| 6,097,771 A | 8/2000 | Foschini | |
| 6,240,098 B1 | * 5/2001 | Thibault et al. | ............ 370/431 |

OTHER PUBLICATIONS

Bensley et al., "Maximum–Likelihood Synchronization of a Single User for Cod–Division Multiple Access Communicatin Systems," IEEE Transaction on Comm., vol. 46, No. 3, Mar. 1998, pp. 392–399.*

* cited by examiner

Primary Examiner—Tesfaldet Bocure
(74) Attorney, Agent, or Firm—Thomas Adams

(57) ABSTRACT

A receiver of the present invention addresses the need for improved interference suppression without the number of transmissions by the power control system being increased, and, to this end, provides a receiver for a CDMA communications system which employs interference subspace rejection to tune a substantially null response to interference components from selected signals of other user stations. Preferably, the receiver also tunes a substantially unity response for a propagation channel via which a corresponding user's signal was received. The receiver may be used in a base station or in a user/mobile station.

71 Claims, 42 Drawing Sheets

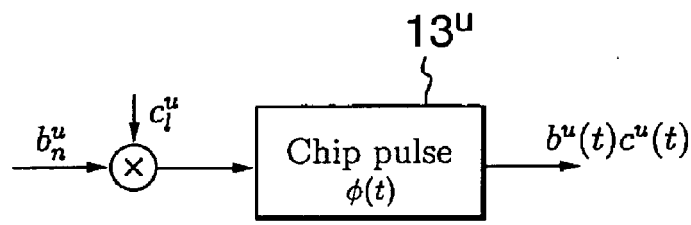
FIG. 3
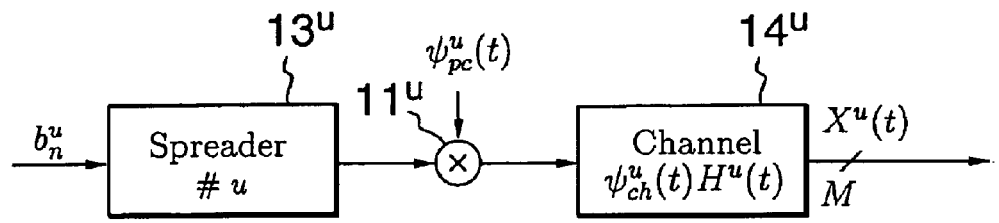
FIG. 4(a) ≡
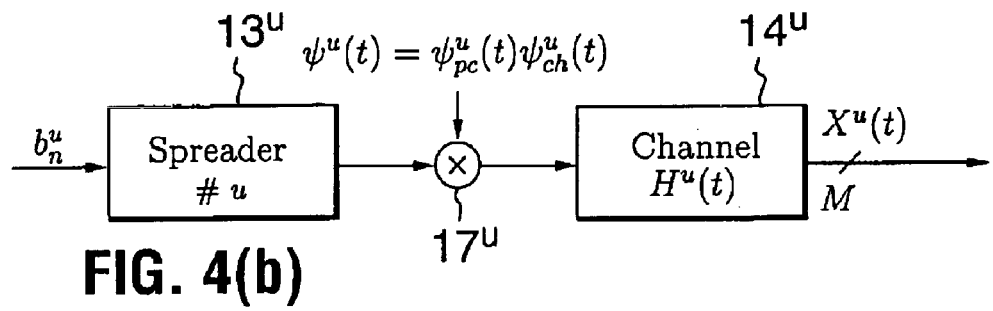
FIG. 4(b)

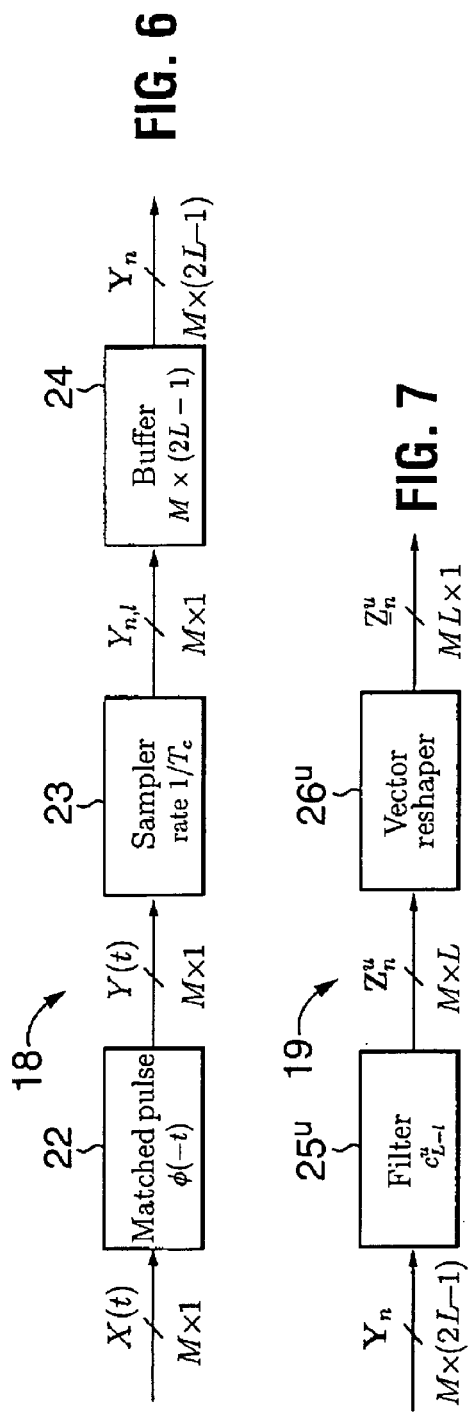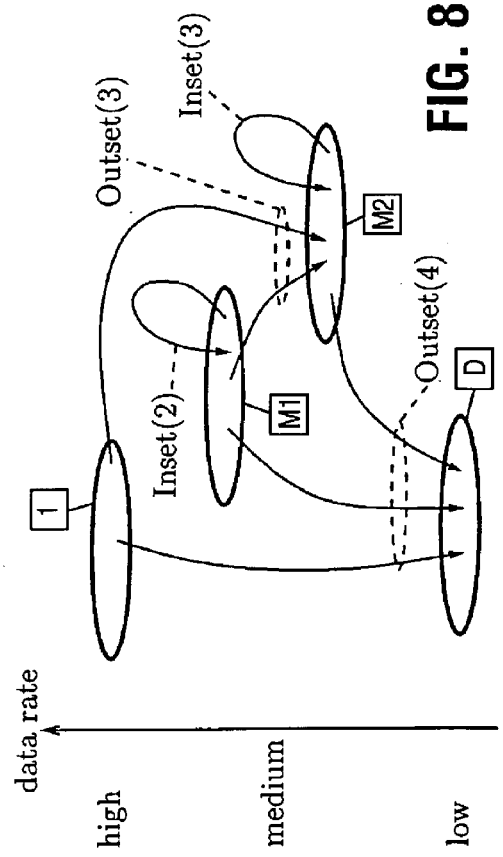

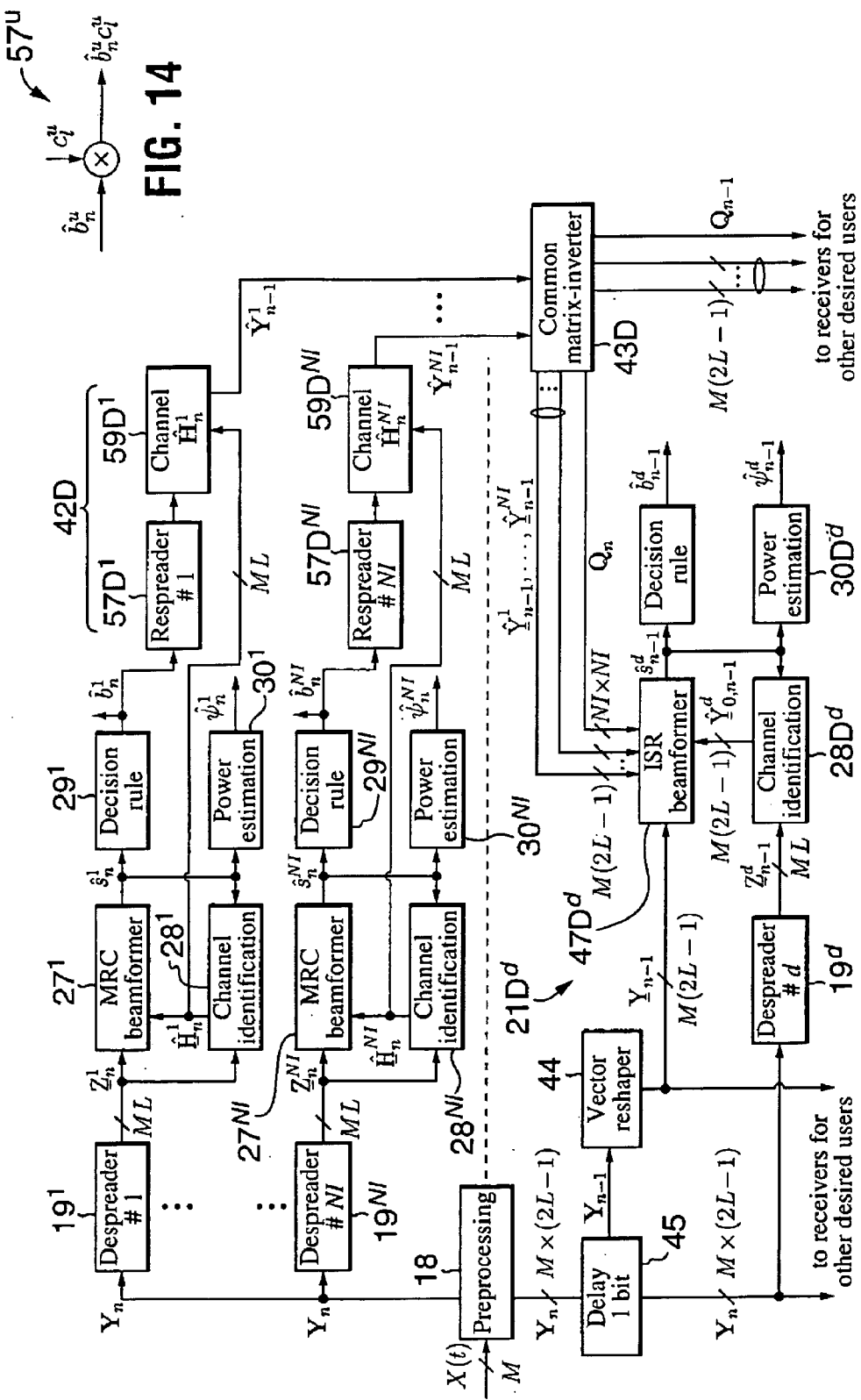

INTERFERENCE SUPPRESSION IN CDMA SYSTEMS

This application claims benefit of provisional appln 60/171,604 Dec. 23, 1999 and provisional appln 60/243,727 Oct. 30, 2000.

TECHNICAL FIELD

The invention relates to Code-Division Multiple Access (CDMA) communications systems, which may be terrestrial or satellite systems, and in particular to interference suppression in CDMA communications systems.

BACKGROUND ART

Code-Division Multiple Access communications systems are well known. For a general discussion of such systems, the reader is directed to a paper entitled "Multiuser Detection for CDMA Systems" by Duel-Hallen, Holtzman and Zvonar, *IEEE Personal Communications*, pp. 46–58, April 1995.

In CDMA systems, the signals from different users all use the same bandwidth, so each user's signal constitutes noise or interference for the other users. On the uplink (transmissions from the mobiles) the interference is mainly that from other transmitting mobiles. Power control attempts to maintain the received powers at values that balance the interference observed by the various mobiles, but, in many cases, cannot deal satisfactorily with excessive interference. Where mobiles with different transmission rates are supported within the same cells, the high-rate mobiles manifest strong interference to the low-rate mobiles. On the downlink (transmission towards the mobiles) transmissions from base-stations of other cells as well as strong interference from the same base-station to other mobiles may result in strong interference to the intended signal. Downlink power control may be imprecise or absent altogether. In all these so called near-far problem cases, the transmission quality can be improved, or the transmitted power reduced, by reducing the interference. In turn, for the same transmission quality, the number of calls supported within the cell may be increased, resulting in improved spectrum utilization.

Power control is presently used to minimize the near-far problem, but with limited success. It requires a large number of power control updates, typically 800 times per second, to reduce the power mismatch between the lower-rate and higher-rate users. It is desirable to reduce the number of communications involved in such power control systems, since they constitute overhead and reduce overall transmission efficiencies. Nevertheless, it is expected that future CDMA applications will require even tighter power control with twice the number of updates, yet the near-far problem will not be completely eliminated. It is preferable to improve the interference suppression without increasing the number of transmissions by the power control system.

Multiuser detectors achieve interference suppression to provide potential benefits to CDMA systems such as improvement in capacity and reduced precision requirements for power control. However, none of these detectors is cost-effective to build with significant enough performance advantage over present day systems. For example, the complexity of the optimal maximum likelihood sequence detector (MLSD) is exponential in the number of interfering signals to be cancelled, which makes its implementation excessively complex. Alternative suboptimal detectors fall into two groups: linear and subtractive. The linear detectors include decorrelators, as disclosed by K. S. Schneider, "Optimum detection of code division multiplexed signals", *IEEE Trans. on Aerospace and Electronic Systems*, vol. 15, pp. 181–185, January 1979 and R. Kohno, M. Hatori, and H. Imai, "Cancellation techniques of co-channel interference in asynchronous spread spectrum multiple access systems", *Electronics and Communications in Japan*, vol. 66-A, no. 5, pp. 20–29, 1983. A disadvantage of such decorrelators is that they cause noise enhancement.

Z. Xie, R. T. Short, and C. K. Rushforth, "A family of suboptimum detectors for coherent multiuser communications", *IEEE Journal on Selected Areas in Communications*, vol. 8, no. 4, pp. 683–690, May 1990, disclosed the minimum mean square error linear (MMSE) detector, but such detectors are sensitive to channel and power estimation errors. In both cases, the processing burden still appears to present implementation difficulties.

Subtractive interference cancellation detectors take the form of successive interference cancellers (SIC), as disclosed by R. Kohno et al., "Combination of an adaptive array antenna and a canceller of interference for direct-sequence spread-spectrum multiple-access system", *IEEE Journal on Selected Areas in Communications*, vol. 8, no. 4, pp. 675–682, May 1990, and parallel interference cancellers (PIC) as disclosed by M. K. Varanasi and B. Aazhang, "Multistage detection in asynchronous code-division multiple-access communications", *IEEE Trans. on Communications*, vol. 38, no. 4, pp. 509–519, April 1990, and R. Kohno et al., "Combination of an adaptive array antenna and a canceller of interference for direct-sequence spread-spectrum multiple-access system", *IEEE Journal on Selected Areas in Communications*, vol. 8, no. 4, pp. 675–682, May 1990. Both SIC detectors and PIC detectors require multi-stage processing and the interference cancellation achieved is limited by the amount of delay or complexity tolerated. These detectors are also very sensitive to channel, power and data estimation errors.

One particular subtractive technique was disclosed by Shimon Moshavi in a paper entitled "Multi-User Detection for DS-CDMA Communications", *IEEE Communications Magazine*, pp. 124–136, October 1996. FIG. 5 of Moshavi's paper shows a subtractive interference cancellation (SIC) scheme in which the signal for a particular user is extracted in the usual way using a matched filter and then spread again using the same spreading code for that particular user, i.e., the spreading code used to encode the signal at the remote transmitter. The spread-gain signal then is subtracted from the signal received from the antenna and the resulting signal is applied to the next user's despreader. This process is repeated for each successive despreader. Moshavi discloses a parallel version that uses similar principles.

A disadvantage of this approach is its sensitivity to the data and power estimates, i.e., their accuracy and the sign of the data. A wrong decision will result in the interference component being added rather than subtracted, which will have totally the wrong effect.

For more information about these techniques, the reader is directed to a paper by P. Patel and J. Holtzman entitled "Analysis of a Simple Successive Interference Cancellation Scheme in a DS/CDMA System", *IEEE Journal on Selected Areas in Communications*, Vol. 12, No. 5, pp. 796–807, June 1994.

In a paper entitled "A New Receiver Structure for Asynchronous CDMA: STAR—The Spatio-Temporal Array-Receiver", *IEEE Transaction on Selected Areas in Communications*, Vol. 16, No. 8, October 1998, S. Affes and P. Mermelstein (two of the present inventors), disclosed a technique for improving reception despite near/far effects and multi-user interference. In contrast to known systems in which the spread-again signal is supplied to the input of the despreader of the channel to be corrected, Affes' and Mermelstein's proposed system treated all of the users signals together and processed them as a combined noise signal. If the components of the received signal from the different users were uncorrelated and all had equal power, or substantially equal power, this process would be optimal. In practice, however, there will be significant differences between the power levels at which the different users signals are received at the base station antenna. The same applies to the downlink. For example, a data user may generate much more power than a voice user simply because of the more dense information content of the data signal. Also, imperfect power control will result in power differences, i.e., channel variations may result in received powers different from their intended values, despite the best effort of the power-control process to equalize them.

DISCLOSURE OF INVENTION

The present invention addresses the need for improved interference suppression without the number of transmissions by the power control system being increased, and, to this end, provides a receiver for a CDMA communications system which employs interference subspace rejection to obtain a substantially null response to interference components from selected user stations. Preferably, the receiver also provides a substantially unity response for a propagation channel via which a corresponding user's "desired" signal was received.

According to one aspect of the invention, there is provided a receiver suitable for a base station of a CDMA communications system comprising at least one base station (11) having a transmitter and a said receiver and a multiplicity (U) of user stations ($10^1, \ldots, 10^U$) including a plurality (U') of user stations served by said at least one base station, each user station having a transmitter and a receiver for communicating with said at least one base station via a corresponding one of a plurality of channels ($14^1, \ldots, 14^U$), the base station receiver for receiving a signal (X(t)) comprising components corresponding to spread signals transmitted by the transmitters of the plurality of user stations, each of said spread signals comprising a series of symbols spread using a spreading code unique to the corresponding user station, said base station receiver comprising:

a plurality (U') of receiver modules ($20^1, \ldots, 20^{NI}, 20^d$) each for deriving from successive frames of the received signal (X(t)) estimates of said series of symbols of a corresponding one of the user stations, preprocessing means (18) for deriving from the received signal (X(t)) a series of observation matrices ($Y_n$) each for use by each of the receiver modules (20) in a said frame to derive an estimate of a symbol of a respective one of said series of symbols, and means (19,44;44/1,44/2) for deriving from each observation matrix a plurality of observation vectors ($\underline{Y}_n; \underline{Y}_{n-1}; \underline{Z}_n^1 \ldots \underline{Z}_n^{NI}; \underline{Z}_n^d$) and applying each of the observation vectors to a respective one of the plurality of receiver modules ($20^1, \ldots, 20^{NI}, 20^d$); each receiver module comprising;

channel identification means (28) for deriving from one of the observation vectors a channel vector estimate ($\underline{\hat{H}}_n^1, \ldots, \underline{\hat{H}}_n^{NI}; \underline{\hat{Y}}_{0,n}^d; \underline{\hat{Y}}_{0,n-1}^i$) based upon parameter estimates of the channel between the base station receiver and the corresponding user station transmitter;

beamformer means ($27^1, \ldots, 27^{NI}, 27^d; 47^d$) having coefficient tuning means (50) for producing a set of weighting coefficients in dependence upon the channel vector estimate, and combining means (51,52) for using the weighting coefficients to weight respective ones of the elements of a respective one of the observation vectors and combining the weighted elements to provide a signal component estimate ($\hat{s}_n^1, \ldots, \hat{s}_n^U$); and symbol estimating means ($29^1, \ldots, 29^U, 30^1, \ldots, 30^U$) for deriving from the signal component estimate an estimate ($\hat{b}_n^1, \ldots, \hat{b}_n^U$) of a symbol ($b_n^1, \ldots, b_n^U$) transmitted by a corresponding one of the user stations ($10^1, \ldots, 10^U$), wherein said receiver further comprises means (42,43) responsive to symbol estimates $$\left( \hat{b}_n^1, \ldots, \hat{b}_n^{NI}; g^1, g^2, g^3; g^{l+1_n} \right)$$

and to channel estimates ($\hat{b}_n^1 \ldots \hat{b}_n^{NI}; \hat{b}_{n-1}^i$) comprising at least said channel vector estimates ($\underline{\hat{H}}_n^1, \ldots, \underline{\hat{H}}_n^{NI}$) for channels ($14^1, \ldots, 14^{NI}$) of a first group (I) of said plurality of user stations ($10^1, \ldots, 10^{NI}$) to provide at least one constraint matrix ($\hat{C}_n$) representing interference subspace of components of the received signal corresponding to said predetermined group, and in each of one or more receiver modules ($20A^d$) of a second group (D) of said plurality of receiver modules, the coefficient tuning means ($50A^d$) produces said set of weighting coefficients in dependence upon both the constraint matrix ($\hat{C}_n$) and the channel vector estimates ($\underline{\hat{H}}_n^d$) so as to tune said one or more receiver modules ($20A^d$) each towards a substantially null response to that portion of the received signal (X(t)) corresponding to said interference subspace.

Embodiments of the invention may employ one of several alternative modes of implementing interference subspace rejection (ISR), i.e. characterizing the interference and building the constraint matrix. In a first embodiment, using a first mode conveniently designated ISR-TR, each receiver module in the first group generates its re-spread signal taking into account the amplitude and sign of the symbol and the channel characteristics. The re-spread signals from all of the receiver modules of the first group are summed to produce a total realization which is supplied to all of the receiver modules in the second group.

Where each receiver module of the second set uses decision feedback, it further comprises delay means for delaying each frame/block of the observation vector before its application to the beamformer.

Whereas, in ISR-TR embodiments, just one null constraint is dedicated to the sum, in a second embodiment, which uses a second mode conveniently designated ISR-R, estimated realisations of all the interferers are used, and a null constraint is dedicated to each interference vector. In this second embodiment, in each receiver module of the first set, the symbols spread by the spreader comprise estimated realisations of the symbols of the output signal. Also, the constraint waveforms are not summed before forming the constraint matrix. Thus, the receiver module estimates separately the contribution to the interference from each unwanted (interfering) user and cancels it by a dedicated null-constraint in the multi-source spatio-temporal beamformer. In most cases, estimation of the interference requires estimates of the past, present and future data symbols transmitted from the interferers, in which case the receiver requires a maximum delay of one symbol and one processing cycle for the lower-rate or low-power users and, at most a single null constraint per interferer.

In a third embodiment of the invention which uses a third mode conveniently designated ISR-D, i.e. the observation vector/matrix is decomposed over sub-channels/fingers of propagation path and the beamformer nulls interference in each of the sub-channels, one at a time. In most cases, the maximum number of constraints per interferer is equal to the number of sub-channels, i.e. the number of antenna elements M multiplied by the number of paths P.

In a fourth embodiment using a fourth mode conveniently designated ISR-H because it implements null-responses in beamforming using hypothetical realisations of the interference, without any delay, each receiver module of the first group further comprises means for supplying to the spreader possible values of the instant symbols of the output signal and the spreader supplies a corresponding plurality of re-spread signals to each of the receiver modules of the second group. In each receiver module of the second group, the despreader despreads the plurality of re-spread signals and supplies corresponding despread vectors to the beamformer. This embodiment suppresses any sensitivity to data estimation errors and, in most cases, requires a maximum of 3 null constraints per interferer.

In a fifth embodiment using a fifth mode conveniently designated ISR-RH because it uses the past and present interference symbol estimates, in each receiver module of the first group, the spreader spreads the symbols of the output signal itself and, in each receiver module of the second group, the beamformer then implements null-responses over reduced possibilities/hypotheses of the interference realization. Conveniently, application of the output of the first despreader to the beamformer will take into account the time required for estimation of the interferer's symbol. In most cases, the beamformer will provide a maximum of 2 null constraints per interferer.

In any of the foregoing embodiments of the invention, the channel identification unit may generate the set of channel vector estimates in dependence upon the extracted despread data vectors and the user signal component estimate.

For each of the above-identified modes, the receiver modules may employ either of two procedures. On the one hand, the receiver module may apply the post-correlation observation vector to the channel identification unit but supply the observation matrix itself directly to the beamformer, i.e. without despreading it. The constraint matrix then would be supplied to the beamformer without despreading.

Alternatively, each receiver module could supply the post-correlation observation vector to both the channel identification unit and the beamformer. In this case, the receiver module would also despread the constraint matrix before applying it to the beamformer.

Where the reception antenna comprises a plurality of antenna elements, the beamformer unit may comprise a spatio-temporal processor, such as a filter which has coefficients tuned by the estimated interference signals.

The receiver modules may comprise a first set that are capable of contributing a constraint waveform to the constraint matrix and a second set that have a beamformer capable of using the constraint matrix to tune the specified null response and unity response. In preferred embodiments, at least some of the plurality of receiver modules are members of both the first set and the second set, i.e. they each have means for contributing a constraint waveform and a beamformer capable of using the constraint matrix.

In practice, the receiver modules assigned to the stronger user signals will usually contribute a constraint waveform and the beamformer units of the receiver modules assigned to other user signals will be capable of using it.

The receiver module may comprise an MRC beamformer and an ISR beamformer and be adapted to operate in multi-stage, i.e., for each symbol period of frame, it will carry out a plurality of iterations. In the first iteration, the constraints set generator will receive the "past" and "future" estimates from the MRC beamformer and the "past" symbol estimate, i.e., from the previous frame, and process them to produce a new symbol estimate for the first iteration. In subsequent iterations of the current symbol period or frame, the constraints-set generator will use the "future" estimate from the MRC beamformer, the previous estimate from the ISR beamformer and the symbol estimate generated in the previous iteration. The cycle will repeat until the total number of iterations have been performed, whereupon the output from the receiver module is the desired estimated symbol for the current frame which then is used in the similar iterations of the next frame.

The ISR receiver module comprising both an MRC beamformer and an ISR beamformer may comprise means $\{101Q^d\}$ for extracting from the ISR beamformer ($47Q^d$) an interference-reduced observation vector and reshaping the latter to produce an interference-reduced observation matrix for despreading by the despreader. The channel identification unit then uses the despread interference-reduced observation vector to form interference-reduced channel vector estimates and supplies them to the residual MRC beamformer for use in adapting the coefficients thereof.

The ISR beamformer may process blocks or frames of the observation vector that are extended by concatenating a current set of data with one or more previous frames or blocks of data.

The different receiver modules may use different sizes of frame.

In order to receive signals from a user transmitting multicode signals, the ISR receiver module may comprise a plurality of ISR beamformers and despreaders, each for operating upon a corresponding one of the multiple codes. The channel identification unit then will produce a channel vector estimate common to all of the multicodes, spread that channel vector estimate with each of the different multicodes and supply the resulting plurality of spread channel vector estimates to respective ones of the plurality of ISR beamformers.

The channel identification unit of the multicode ISR receiver module may receive its post-correlation observation vector from a despreader ($19^{d,\delta}$) which uses a compound code comprising each of the multicodes weighted by the corresponding symbol estimate from a respective one of a corresponding plurality of decision-rule units. The despreader will use the compound code to despread the observation matrix and supply the corresponding compound post-correlation observation vector to the channel identification unit. The channel identification unit will use that vector to produce the channel vector estimate and spread it using the different ones of the multicodes to produce the spread channel vector estimates.

The ISR receiver module may comprise a despreader $19S^{d,1}, \ldots, 19S^{d,F}$ using a plurality of codes which comprise segments of a main code specified for that user. Each segment corresponds to a symbol, and to a symbol duration in a large block of data, the number of segments being determined by the data rate, i.e., number of symbols within a block, of that user. Each receiver module may have a different number of segments assigned thereto according to the data rate of the corresponding user.

Embodiments of the invention may be adapted for use in a user/mobile station capable of receiving user-bound signals transmitted by a plurality of base stations each to a corresponding plurality of users, the receiver then comprising a selection of receiver modules each corresponding to a different base station and configured to extract a preselected number of said user-bound signals. Where the particular user/mobile station is included in the preselected number, the receiver module may comprise a similar structure to the above-mentioned multicode receiver, the plurality of despreaders being adapted to despread the observation matrix using respective ones of a set of codes determined as follows: (1) a pre-selected number NB of base stations from which the mobile receives signals and which have been selected for cancellation—represented by index v' which ranges from 1 to NB; (2) a preselected number (1 to NI) of interferers per base station preselected for cancellation; (3) the data rates of the selected interferers.

Thus, according to a second aspect of the invention, there is provided a user station receiver for a CDMA communications system comprising a plurality (NB) of base stations (11) and a multiplicity (U) of user stations ($10^1, \ldots, 10^U$), at least a plurality (U') of the user stations being in a cell associated with one of said base stations and served thereby, said one base station having a plurality of transmitter modules for spreading user signals for transmission to the plurality (U') of user stations, respectively, and a receiver for receiving spread user signals transmitted by the plurality (U') of user stations, the user stations each having a receiver for receiving the corresponding spread user signal transmitted by the base station, said plurality (U') of user stations each having a unique spreading code assigned thereto for use by the user station and the corresponding one of the base station transmitter modules to spread the user signals of that user for transmission, the spread user signals transmitted from the base station transmitter modules to a particular one of the plurality (U') of user stations propagating via a plurality of channels ($14^1, \ldots, 14^U$), respectively, the receiver of a particular one of said plurality (U') of user stations receiving a signal (X(t)) comprising components corresponding to spread user signals for said particular user station and spread user signals transmitted by other transmitter modules of said plurality (NB) of base stations for other users, each of said spread user signals comprising a series of symbols spread using the spreading code associated with the corresponding one of the user stations, said user station receiver comprising:
  a plurality (NB) of receiver modules ($20^{v'}$) each for deriving from successive frames of the received signal (X(t)) estimates of sets of said series of symbols from a corresponding one of the base stations,
  preprocessing means (18) for deriving from the received signal (X(t)) a series of observation matrices ($Y_n$) each for use by each of the receiver modules ($20^{v'}$) in a said frame to derive estimates of sets of said symbols, and
  means (19,44) for deriving from each observation matrix a plurality of sets of observation vectors ($\underline{Y}_n^{v',1,1}, \ldots, \underline{Y}_n^{v',NI,F_{NI}}; \underline{Z}_n^{v',1,1}, \ldots, \underline{Z}_n^{v',NI,F_{NI}}$) and applying each of the sets of observation vectors to a respective one of the plurality of receiver modules ($20^{v'}$);
  each receiver modules comprising;
  channel identification means ($28T^{v'}$) for deriving from the respective one of the sets of observation vectors a set of spread channel vector estimates ($\underline{\hat{Y}}_{0,n}^{v',1,1}, \ldots, \underline{\hat{Y}}_{0,n}^{v',NI,F_{NI}}$) based upon parameter estimates of the channel between the corresponding one of the base stations and said user station;
  beamformer means ($47T^{v',1,1}, \ldots, 47T^{v',NI,F_{NI}}$) having coefficient tuning means for producing sets of weighting coefficients in dependence upon the sets of channel vector estimates, respectively, and combining means for using each of the sets of weighting coefficients to weight respective ones of the elements of a respective one of the observation vectors and combining the weighted elements to provide a corresponding set of signal component estimates ($\hat{s}_n^{v',1,1}, \ldots, \hat{s}_n^{v',NI,F_{NI}}$) and
  symbol estimating means ($29T^{v',1,1}, \ldots, 29T^{v',NI,F_{NI}}$) for deriving from the set of signal component estimates a set of estimates ($\hat{b}_n^{v',1,1}, \ldots, \hat{b}_n^{v',NI,F_{NI}}$) of symbols spread by the corresponding one of the transmitter modules and transmitted by the base station;

said user station receiver further comprising means (42, 43) responsive to said symbol estimates ($\hat{b}_n^{v',1,1}, \ldots, \hat{b}_n^{v',NI,F_{NI}}; g_n^1, g_n^2, g_n^3$) and channel estimates ($\hat{b}_n^{v'}$) from each of said plurality (NB) of receiver modules, said channel estimates comprising at least channel vector estimates ($\underline{\hat{H}}_n^{v'}$) for channels ($14^{v'}$) between the user station receiver and said base stations, for providing at least one constraint matrix ($\hat{C}_n$) representing interference subspace of components of the received signal corresponding to said spread signals, and in each of said receiver modules ($20^{v'}$), the coefficient tuning means produces said sets of weighting coefficients in dependence upon both the constraint matrix ($\hat{C}_n$) and the channel vector estimates so as to tune said receiver module ($20^{v'}$) towards a substantially null response to that portion of the received signal (X(t)) corresponding to said interference subspace.

Where the signal destined for the particular user/mobile station is not one of the preselected number of signals from the corresponding base station, the receiver may further comprise an ISR receiver module which has means for updating the ISR beamformer coefficients using the channel vector estimates from at least some of the receiver modules that have generated such channel vector estimates for the preselected signals for the same base station.

Where the rates of the different users are not known to the instant mobile station, the codes may comprise a fixed number of segments $N_m$ which is predetermined as a maximum data rate to be received. Any slower rates will effectively be oversampled for processing at the higher rate.

The complexity of the multicode embodiments may be reduced by reducing the number of codes that are used by the despreaders. In particular, the bank of despreaders may use a set of codes that represent summation of the codes of the different NI interferers, to form a compound code which reduces the total number of codes being used in the despreaders.

According to another aspect of the invention, there is provided a STAR receiver comprising an MRC beamformer which operates upon an observation vector which has not been despread.

Of course, that does not preclude having all channels feed their interference components to all other channels.

Receivers embodying the present invention can operate in a multiple-input, multiple-output (MIMO) system, i.e. with multiple transmit antennas and multiple receive antennas.

The foregoing and other objects, features, aspects and advantages of the present invention will become more apparent from the following detailed description, in conjunction with the accompanying drawings, of preferred embodiments of the invention.

BRIEF DESCRIPTION OF THE DRAWINGS

FIG. 3 is a detail block diagram of a spreader portion of one of the user stations;

FIGS. 4(a) and 4(b) illustrate the relationship between channel characteristics, power control and signal power;

FIG. 6 is a detail block diagram of a preprocessing unit of the receiver;

FIG. 7 is a detail block diagram of a despreader of the receiver;

FIG. 8 illustrates several sets of users in a CDMA system ranked according to data rate;

FIG. 14 illustrates a respreader of one of the receiver modules of FIG. 13;

FIG. 15 is a detail block schematic diagram of a receiver using individual realisations of the interference (ISR-R) and without despreading of the data processed by the beamformer;

BEST MODE(S) FOR CARRYING OUT THE INVENTION

Figure 1:
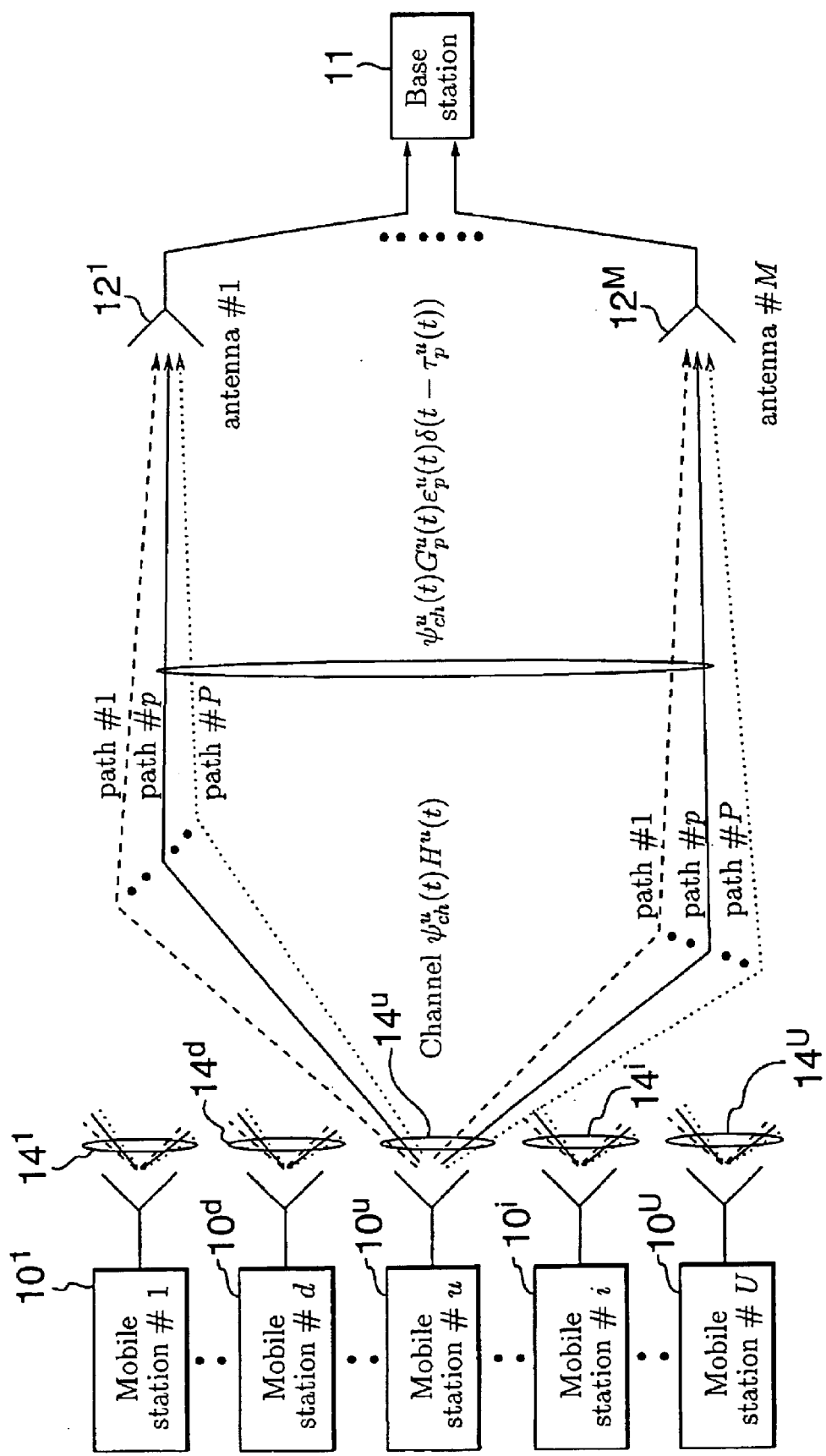
FIG. 1 is a schematic diagram illustrating a portion of a CDMA communications system comprising a plurality of user stations, typically mobile, and a base station having a reception antenna comprising an array of antenna elements, and illustrating multipath communication between one of the user stations and the array of antennas.

In the following description, identical or similar items in the different Figures have the same reference numerals, in some cases with a suffix.

The description refers to several published articles. For convenience, the articles are cited in full in a numbered list at the end of the description and cited by that number in the description itself. The contents of these articles are incorporated herein by reference and the reader is directed to them for reference.

Figure 2:
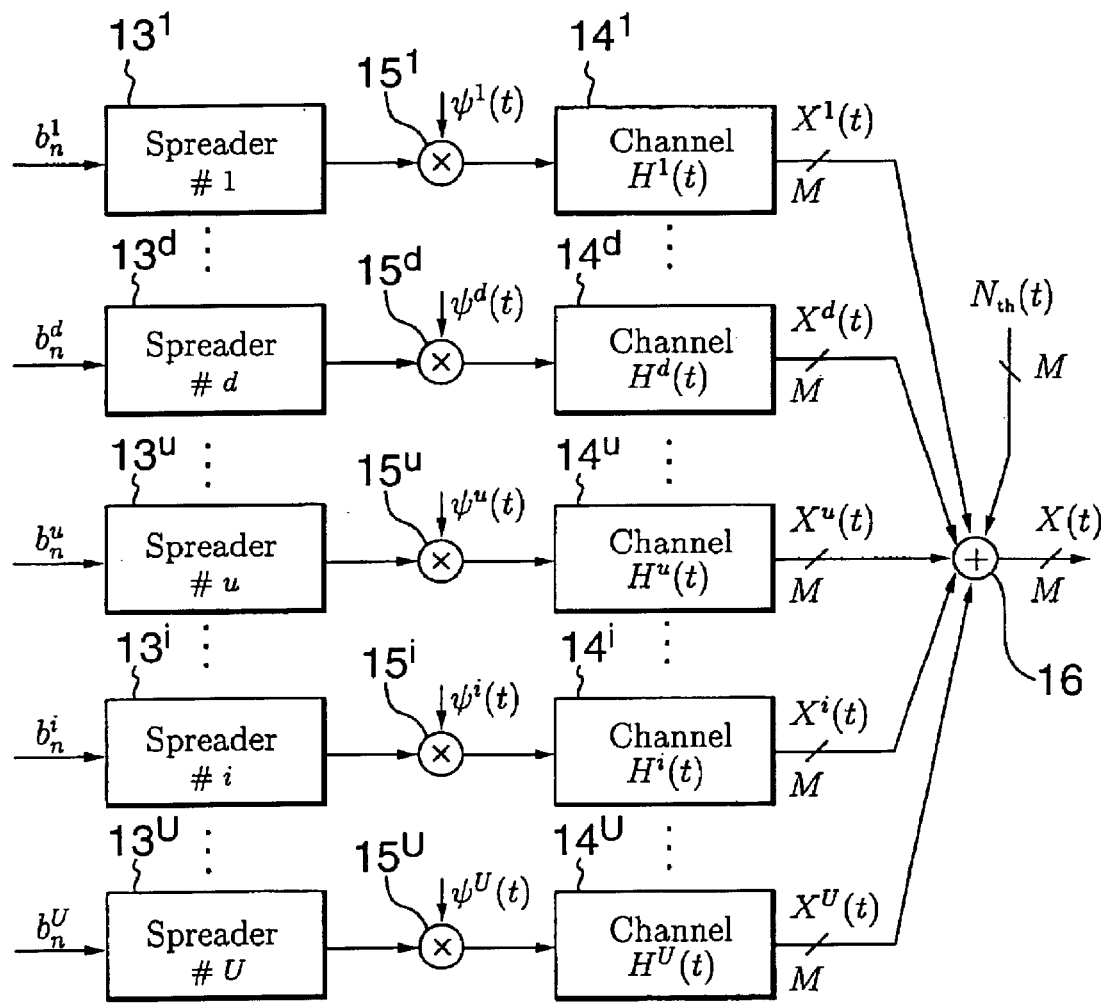
FIG. 2 is a simplified schematic diagram representing a model of the part of the system illustrated in FIG. 1.

FIGS. 1 and 2 illustrate the uplink of a typical asynchronous cellular CDMA system wherein a plurality of mobile stations $10^1 \ldots 10^U$ communicate with a base-station 11 equipped with a receiving antenna comprising an array of several antenna elements $12^1 \ldots 12^M$. For clarity of depiction, and to facilitate the following detailed description, FIGS. 1 and 2 illustrate only five of a large number (U) of mobile stations and corresponding propagation channels of the typical CDMA system, one for each of a corresponding plurality of users. It will be appreciated that the mobile stations $10^1 \ldots 10^U$ will each comprise other circuitry for processing the user input signals, but, for clarity of depiction, only the spreaders are shown in FIG. 2. The other circuitry will be known to those skilled in the art and need not be described here. Referring to FIG. 2, the mobile stations $10^1 \ldots 10^U$ comprise spreaders $13^1 \ldots 13^U$, respectively, which spread a plurality of digital signals $b_n^1 \ldots b_n^U$ of a corresponding plurality of users, respectively, all to the same bandwidth, using spreading codes $c^1(t) \ldots c^U(t)$, respectively. The mobile stations $10^1 \ldots 10^U$ transmit the resulting user signals to the base station 11 via channels $14^1 \ldots 14^U$, respectively, using a suitable modulation scheme, such as differential binary phase shift keying (DBPSK). Each of the mobile stations $10^1 \ldots 10^U$ receives commands from the base station 11 which monitors the total received power, i.e. the product of transmitted power and that users code and attenuation for the associated channel and uses the information to apply power control to the corresponding signals to compensate for the attenuation of the channel. This is represented in FIG. 2 by multipliers $15^1 \ldots 15^U$ which multiply the spread signals by adjustment factors $\psi^1(t) \ldots \psi^U(t)$, respectively. The array of M omni-directional antenna elements $12^1 \ldots 12^M$ at the base station 11 each receive all of the spread signals in common. The channels $14^1 \ldots 14^U$ have different response characteristics $H^1(t) \ldots H^U(t)$, respectively, as illustrated in more detail in FIG. 1, for only one of the channels, designated channel $14^u$. Hence, channel $14^u$ represents communication via as many as P paths between the single antenna of the associated mobile station $10^U$ and each of the base station antenna elements $12^1 \ldots 12^M$. The other channels are similarly multipath.

As before, it is presumed that the base station knows the spreading codes of all of the mobile stations with which it communicates. The mobile stations will have similar configurations so only one will be described. Thus, the mobile station $10^u$ first differentially encodes its user's binary phase shift keyed (BPSK) bit sequence at the rate 1/T, where T is the bit duration, using circuitry (not shown) that is well-known to persons skilled in this art. As illustrated in FIG. 3, its spreader $13^u$ then spreads the resulting differential binary phase shift keyed (DBPSK) sequence $b_n^u$ (or $b^u(t)$ in the continuous time domain as represented in FIG. 3) by a periodic personal code sequence $c_l^u$ (or $c^u(t)$ in the continuous time domain) at a rate $1/T_c$, where $T_c$ is the chip pulse duration. The processing gain is given by $L=T/T_c$. For convenience, it is assumed that short codes are used, with the period of $c^u(t)$ equal to the bit duration T, though the system could employ long codes, as will be discussed later, with other applications and assumptions. Over one period T, the spreading code can be written as:

$$c^u(t) = \sum_{l=0}^{L-1} c_l^u \phi(t - lT_c), \quad (1)$$

where $c_l^u = \pm 1$ for $l=0, \ldots, L-1$, is a random sequence of length L and $\phi(t)$ is the chip pulse as illustrated in FIG. 3. Also, with a multipath fading environment with P resolvable paths, the delay spread $\Delta\tau$ is small compared to the bit duration (i.e. $\Delta\tau \ll T$).

As illustrated in FIGS. 4(a) and 4(b), following signal weighting by the power control factor $\psi_{pc}^u(t)^2$, the spread signal is transmitted to the base station 11 via channel $14^u$. FIG. 4(a) shows the "real" situation where the channel characteristics comprise a normalized value $H^u(T)$ and a normalization factor $\psi_{ch}^u(T)$ which relates to the "amplitude" or attenuation of the channel, i.e. its square would be proportional to the power divided by the transmitted power. In FIG. 4(a), power control is represented by a multiplier $17^u$, and the subscript "pc". FIG. 4(b) shows that, for convenience, the channel characteristics can be represented (theoretically) by the normalized value $H^u(t)$ and the normalization factor $\psi_{ch}^u(t)$ included in a single power factor $\psi^u(t)$ which is equal to $\psi_{pc}^u(t)\psi_{ch}^u(t)$. $\psi_{pc}^u(t)$ is the factor by which the transmitted signal is amplified or attenuated to compensate for channel power gain in $\psi_{ch}^u(t)$ and to maintain the received power $(\psi^u(t))^2$ at the required level.

In such a CDMA system, the signal of each of the mobile stations $10^1 \ldots 10^U$ constitutes interference for the signals of the other mobile stations. For various reasons, some of the mobile stations will generate more interference than others. The components of one of these "strongly interfering" user stations and its associated channel are identified in FIGS. 1 and 2 by the index "i". The components of one of the other "low-power" user stations and its associated channel also are illustrated, and identified by the index "d". The significance of this grouping of "interfering" and "low-power" user stations will be explained later.

Figure 5:
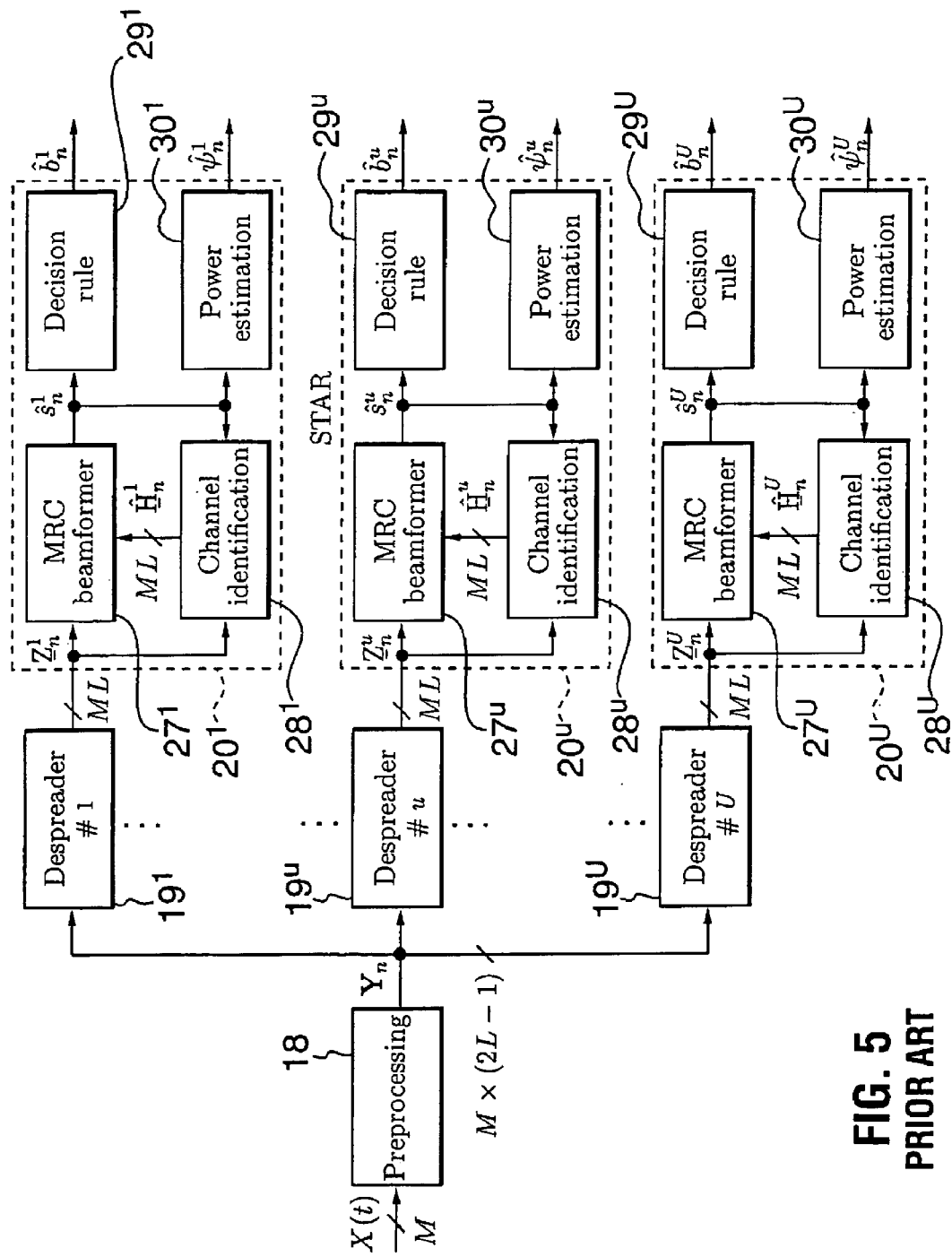
FIG. 5 is a simplified block schematic diagram of a base station receiver according to the prior art.

At the base station 11, the spread data vector signals $X^1(t) \ldots X^U(t)$ from the base station antenna elements $12^1 \ldots 12^M$, respectively, are received simultaneously, as indicated by the adder 16 (FIG. 2), and the resulting observation vector X(t) is supplied to the receiver (see FIG. 5). The sum of the spread data vectors (signals) $X^1(t) \ldots X^U(t)$ will be subject to thermal noise. This is illustrated by the addition of a noise signal component $N_{th}(t)$ by adder 16. The noise signal $N_{th}(t)$ comprises a vector, elements of which correspond to the noise received by the different antenna elements.

FIG. 5 illustrates a spatio-temporal array receiver (STAR) for receiving the signal X(t) at the base station 11. Such a receiver was described generally by two of the present inventors in reference [13]. The receiver comprises means, namely a preprocessing unit 18 and a plurality of despreaders $19^1 \ldots 19^U$, for deriving observation vectors from the observation matrix, and a plurality of spatio-temporal receiver (STAR) modules $20^1 \ldots 20^U$, each having its input connected to the output of a respective one of the despreaders $19^1 \ldots 19^U$. As shown in FIG. 6, the preprocessing unit 18 comprises a matched filter 22, a sampler 23 and a buffer 24. Matched filter 22 convolves the antenna array signal vector X(t), which is an M×1 vector, with a matched pulse $\phi(T_c-t)$ to produce the matched filtered signal vector Y(t) which then is sampled by sampler 23 at the chip rate $1/T_c$, element by element. The sampler 23 supplies the resulting M×1 vectors $Y_{n,l}$, at the chip rate, to buffer 24 which buffers them to produce an observation matrix $Y_n$ of dimension M×(2L-1). It should be noted that, although the present inventors' Canadian patent application No. 2,293,097 and U.S. Provisional application No. 60/171,604 had a duplicate of this preprocessing unit 18 in each of the despreaders $19^1 \ldots 19^U$, it is preferable to avoid such duplication and use a single preprocessor 18 to preprocess the received antenna array signal vector X(t).

The despreaders $19^1 \ldots 19^U$ each have the same structure, so only one will be described in detail with reference to FIG. 7 which illustrates despreader $19^u$. Thus, despreader $19^u$ comprises a filter $25^u$ and a vector reshaper $26^u$. The observation matrix $Y_n$ is filtered by filter $21^u$ using the pseudo-random number sequence $c_{L-1}{}^u$ corresponding to that used in the spreader $13^u$ of the transmitter, i.e. $c_l{}^u$, to produce the postcorrelation observation matrix $Z_n{}^u$ for user u. Vector reshaper $26^u$ concatenates the columns of the M×L matrix $Z_n{}^u$ to form a post-correlation observation vector $\underline{Z}_n{}^u$ of dimension ML×1. It should be noted that the vector reshaper $26^u$ need not be a distinct physical element but is depicted as such to represent a mathematical function. In practice, the function will likely be determined merely by allocation of resources, such as memory.

Referring again to FIG. 5, the post-correlation observation vectors $\underline{Z}_n{}^1 \ldots \underline{Z}_n{}^U$ from despreaders $19^1 \ldots 19^U$ are processed by the STAR modules $20^1 \ldots 20^U$, respectively, to produce symbol estimates $\hat{b}_n{}^1 \ldots \hat{b}_n{}^U$ corresponding to the transmitted symbols $b_n{}^1 \ldots b_n{}^U$ (see FIG. 2) and power estimates $$(\hat{\psi}_n^l)^2 \ldots (\hat{\psi}_n^U)^2$$

which are supplied to subsequent stages (not shown) of the receiver for processing in known manner.

The STAR modules $20^1 \ldots 20^U$ each comprise the same elements, so the construction and operation of only one of them, STAR module $20^u$, will now be described.

The STAR module $20^u$ comprises a beamformer $27^u$, a channel identification unit $28^u$, a decision rule unit $29^u$ and a power estimation unit $30^u$. The channel identification unit $28^u$ is connected to the input and output, respectively, of the beamformer $27^u$ to receive the post-correlation observation vector $\underline{Z}_n{}^u$ and the signal component estimate $\hat{s}_n{}^u$, respectively. The channel identification unit $28^u$ replicates, for each frame M×L the characteristics $H^u(t)$, in space and time, of the associated user's transmission channel $14^u$. More specifically, it uses the post-correlation observation vector $\underline{Z}_n{}^u$ and signal component estimate $\hat{s}_n{}^u$ to derive a set of parameter estimates $\underline{\hat{H}}_n{}^u$, which it uses to update the weighting coefficients $\underline{W}_n{}^u$ of the beamformer $27^u$ in succeeding symbol periods. The symbol period corresponds to the data frame of M×L elements.

The beamformer $27^u$ comprises a spatio-temporal maximum ratio combining (MRC) filter which filters the space-time vector $\underline{Z}_n{}^u$ to produce the despread signal component estimate $\hat{s}_n{}^u$, which it supplies to both the decision rule unit $29^u$ and the power estimation unit $30^u$. The decision-rule unit $29^u$ outputs a binary symbol $\hat{b}_n{}^u$ according to the sign of the signal component estimate $\hat{s}_n{}^u$. The binary output signal constitutes the output of the decision rule unit $30^u$ and is an estimate of the corresponding user signal $b_n{}^u$ spread by spreader $13^u$ of the corresponding user station $10^u$ (FIGS. 1 and 2).

The signal component estimate $\hat{s}_n{}^u$ is processed in subsequent parts of the receiver. For example, it may be differentially decoded and, possibly, deinterleaved and then data decoded—if the corresponding inverse operations were done before transmission.

The power estimation unit $30^u$ uses the raw signal component estimate $\hat{s}_n{}^u$ to derive an estimate $$(\hat{\psi}_n^u)^2$$

of the power in that user's signal component $\hat{s}_n{}^u$ of the antenna array signal vector X(t) and supplies the power estimate $$(\hat{\psi}_n^u)^2$$

to the subsequent stages (not shown) of the receiver for derivation of power level adjustment signals in known manner.

The receiver shown in FIG. 5 will perform satisfactorily if there are no strong interferers, i.e., if it can be assumed that all users transmit with the same modulation and at the same rate, and that the base-station knows all the spreading codes of the terminals with which it is communicating. On that basis, operation of the receiver will be described with reference to the user channel identified by index u.

At time t, the antenna array signal vector X(t) received by the elements $12^1 \ldots 12^M$ of the antenna array of the one particular cell shown in FIGS. 1 and 2 can be written as follows:

$$X(t) = \sum_{u=1}^{U} X^u(t) + N^{th}(t) \qquad (2)$$

where U is the total number of mobile stations whose signals are received at the base-station 11 from inside or outside the cell, $X^u(t)$ is the received signal vector from the mobile station $10^u$, i.e., of index u, and $N^{th}(t)$ is the thermal noise received at the M antenna elements. The contribution $X^u(t)$ of the u-th mobile station $10^u$ to the antenna-array signal vector X(t) is given by:

$$X^u(t) = \psi^u(t)H^u(t) \otimes c^u(t)b^u(t) \qquad (2a)$$
$$= \psi^u(t)\sum_{p=1}^{P} G_p^u(t)\varepsilon_p^u(t)c^u(t-\tau_p^u(t))b^u(t-\tau_p^u(t))$$

where $H^u(t)$ is the channel response vector of the channel $14^u$ between the u-th mobile station $10^u$ and the array of antenna elements and $\otimes$ denotes time-convolution. In the right-hand term of the above equation, the propagation time-delays $\tau_p^u(t) \in [0,T]$ along the P paths, p=1, ..., P, (see FIG. 1), are chip-asynchronous, $G_p^u(t)$ are the propagation vectors and $\epsilon_p^u(t)^2$ are the power fractions along each path $$\left(\text{i.e., } \sum_{p=1}^{P} \varepsilon_p^u(t)^2 = 1\right)$$

of the total power $\psi^u(t)^2$ received from the u-th mobile station $10^u$. The received power is affected by path-loss, Rayleigh fading and shadowing. It is assumed that $G_p^u(t)$, $\epsilon_p^u(t)^2$ and $\psi^u(t)^2$ vary slowly and are constant over the bit duration T.

In the preprocessing unit 18 (see FIG. 6), the antenna array signal vector X(t) is filtered with the matched pulse to provide the matched-filtering signal vector $Y_n(t)$ for frame n as follows:

$$Y_n(t) = \frac{1}{T_c} \int_{D_\phi} X(aT/2 + nT + t + t')\phi(t')dt' \quad (3)$$

where $D_\phi$ denotes the temporal support of $\phi(t)$ and a $\in\{0,1\}$ stands for a possible time-shift by T/2 to avoid, if necessary, the frame edges lying in the middle of the delay spread (see reference [13]). For the sake of simplicity, it is assumed in the following that a=0. Note that for a rectangular pulse $D_\phi$ is $[0,T_c]$. In practice, it is the temporal support of a truncated square-root raised- cosine.

It should be noted that the above description is baseband, without loss of generality. Both the carrier frequency modulation and demodulation steps can be embedded in the chip pulse-shaping and matched-filtering operations of Equations (1) and (3), respectively.

Thus, after sampling at the chip rate $1/T_c$ and framing over 2L-1 chip samples at the bit rate to form a frame, the preprocessing unit 18 derives the M×(2L-1) matched-filtering observation matrix:

$$Y_n = [Y_{n,0}, Y_{n,1}, \ldots, Y_{n,2L-2}], \quad (4)$$

where $Y_{n,l} = Y_n(lT_c)$.

In the despreader $19^u$ (see FIG. 7), the post-correlation vector for frame number n for user number u is obtained as:

$$Z_{n,l}^u = \frac{1}{L}\sum_{k=0}^{L-1} Y_{n,l+k} c_k^u. \quad (5)$$

Framing this vector over L chip samples at the bit rate forms the post-correlation observation matrix:

$$Z_n^u = [Z_{n,0}^u, Z_{n,1}^u, \ldots, Z_{n,L-1}^u]. \quad (6)$$

The post-correlation data model (PCM) (see reference [13]) details the structure of this matrix as follows:

$$Z_n^u = H_n^u s_n^u + N_{PCM,n}^u, \quad (7)$$

where $Z_n^u$ is the spatio-temporal observation matrix, $H_n^u$ is the spatio-temporal propagation matrix, $s_n^u = b_n^u \psi_n^u$ is the signal component and $N_{PCM,n}^u$ is the spatio-temporal noise matrix. Equation 7 provides an instantaneous mixture model at the bit rate where the signal subspace is one-dimensional in the M×L matrix space. For convenience, the vector reshaper $26^u$ of despreader $19^u$ transforms the matrices $Z_n^u$, $H_n^u$ and $N_{PCM,n}^u$ into (M×L)-dimensional vectors $\underline{Z}_n^u$, $\underline{H}_n^u$ and $\underline{Z}_{PCM,n}^u$ respectively, by concatenating their columns into one spatio-temporal column vector to yield the following narrowband form of the PCM model (see reference [13]):

$$\underline{Z}_n^u = \underline{H}_n^u s_n^u + \underline{N}_{PCM,n}^u \quad (8)$$

To avoid the ambiguity due to a multiplicative factor between $\underline{H}_n^u$ and $s_n^u$, the norm of $\underline{H}_n^u$ is fixed to $$\sqrt{M}.$$

The PCM model significantly reduces inter-symbol interference. It represents an instantaneous mixture model of a narrowband source in a one-dimensional signal subspace and enables exploitation of low complexity narrowband processing methods after despreading. Processing after despreading exploits the processing gain to reduce the interference and to ease its cancellation in subsequent steps by facilitating estimation of channel parameters.

As discussed in reference [13], the spatio-temporal array-receiver (STAR) can be used to detect each user separately at the base-station 11. In addition to exploiting the processing gain to reduce interference, the STAR allows accurate synchronization and tracking of the multipath delays and components and shows inherent robustness to interference. The STAR also allows coherent combining of the data. This receiver is found to provide fast and accurate time-varying multipath acquisition and tracking. Moreover, it significantly improves call capacity by spatio-temporal maximum ratio combining (MRC) in a coherent detection scheme implemented without a pilot signal. For the sake of clarity, the steps of STAR that are relevant to the implementation of the present invention will be reviewed briefly below, with reference to receiver module $20^u$ of FIG. 5.

As shown in FIG. 5, the despreader $19^u$ supplies the post-correlation observation vector $\underline{Z}_n^u$, to both the channel identification unit $28^u$ and the MRC beamformer $27^u$ of STAR module $20^u$. Using spatio-temporal matched filtering $(\underline{W}_n^u = \underline{H}_n^u/M)$ (i.e. spatio-temporal maximum ratio combining, $\underline{W}_n^{uH}\underline{H}_n^u = 1$), the STAR module $20^u$ provides estimates of signal component $s_n^u$, its DBPSK bit sequence $b_n^u$ and its total received power $$(\hat{\psi}_n^u)^2$$

as follows:

$$\hat{s}_n^u = \text{Real}\{\underline{W}_n^{uH} \underline{Z}_n^u\} = \text{Real}\left\{\frac{\hat{\underline{H}}_n^{uH} \underline{Z}_n^u}{M}\right\}, \quad (9)$$

$$\hat{b}_n^u = \text{Sign}\{\hat{s}_n^u\}, \quad (10)$$

$$(\hat{\psi}_n^u)^2 = (1-\alpha)(\hat{\psi}_{n-1}^u)^2 + \alpha|\hat{s}_n^u|^2, \quad (11)$$

where $\alpha$ is a smoothing factor. It should be noted that with ad hoc modifications, differential modulation and quasi-coherent differential decoding still apply with DMPSK. Orthogonal modulation can even be detected coherently by STAR without a pilot (references [17] and [18]). Using the post-correlation observation vector $\underline{Z}_n^u$ and the new signal component estimate $\hat{s}_n^u$ from the beamformer $27^u$, the channel identification unit $28^u$ provides an estimate $\hat{\underline{H}}_n^u$ of the channel $14^u$ for user station $10^u$. The channel identification unit $28^u$ updates the channel vector estimate $\hat{\underline{H}}_n^u$ by means of a decision feedback identification (DFI) scheme whereby the signal component estimate $\hat{s}_n^u$ is fed back as a reference signal in the following eigen-subspace tracking procedure:

$$\hat{\underline{H}}_{n+1}^u = \hat{\underline{H}}_n^u + \mu(\underline{Z}_n^u - \hat{\underline{H}}_n^u \hat{s}_n^u)\hat{s}_n^u, \quad (12)$$

where $\mu$ is an adaptation step-size. Alternatively, the product $\hat{\psi}_n^u \hat{b}_n^u$ could be fed back instead of the signal component estimate $\hat{s}_n^u$. It should be noted that, if the modulation is complex, the second occurrence of signal component estimate $\hat{S}_n^u$ should be replaced by its conjugate $(\hat{S}_n^u)^*$. This DFI scheme allows a 3 dB coherent detection gain in noise reduction by recovering the channel phase offsets within a sign ambiguity without a pilot. Note that a reduced-power pilot can be used to avoid differential coding and decoding (reference [21]). The procedure that further enhances the channel vector estimate $\hat{\underline{H}}_{n+1}^u$ to obtain $\hat{\underline{H}}_{n+1}^u$ from the knowledge of its spatio-temporal structure (i.e. manifold) allows a fast and accurate estimation of the multipath time-delays $\hat{\tau}_{1,n}^u, \ldots, \hat{\tau}_{P,n}^u$ in both the acquisition and the tracking modes (both versions of this procedure can be found in reference [13]). This improved estimation accuracy achieves robustness to channel estimation errors, and reduces sensitivity to timing errors, when STAR is used in multiuser operation.

For further information about STAR, the reader is directed to the articles by Affes and Mermelstein identified as references [13] and [17] to [21].

If, as was assumed in reference [13], the spatio-temporal noise vector $\underline{N}_{PCM,n}^u$ is partially uncorrelated, power control on the uplink is generally able to equalize the received signal powers. However, the assumption that noise is uncorrelated becomes untenable on the downlink due to path-loss and shadowing and when the power of particular users (e.g., "priority links", acquisition, higher-order modulations or higher data-rates in mixed-rate traffic) is increased intentionally. Within a particular cell, there may be users having many different strengths, perhaps because of different data rates. FIG. 8 illustrates, as an example, a cell in which there are four different sets of users arranged hierarchically according to data rate. The first set I comprises users which have relatively high data rates, the second set M1 and third set M2 both comprise users which have intermediate data rates, and the fourth set D comprises users which have relatively low data rates. In practice, the receivers of the high data rate users of set I will not need to cancel any outset interference from the users in sets M1, M2 and D, but their transmissions will contribute to interference for the receiver modules in those sets. Intermediate data rate users in sets M1 and M2 will need to cancel "outset" interference from the high data rate users of the set I but not from the users in set D. They will themselves be contributors of "outset" interference to the users in set D. The receivers of users in set D must cancel "outset" interference from sets I, M1 and M2.

It is also possible for a receiver of a user within a particular set to cancel "inset" interference from one or more users within the same set; and itself be a contributor to such "inset" interference. Embodiments of the invention applicable to these "outset" and "inset" situations will be described hereinafter. In the description, where a particular user's signal is treated as interference and cancelled, it will be deemed to be a "contributor" and, where a particular user's receiver module receives information to enable it to cancel another user's interference, it will be deemed to be a "recipient". To simplify the description of the preferred embodiments described herein, it will be assumed that all users employ the same modulation at the same rate. For the purpose of developing the theory of operation, initially it will be assumed that, among the mobile stations in the cell, there will be a first set I of "strong" contributor users, one of which is identified in FIGS. 1 and 2 by index "i", whose received signal powers are relatively high and hence likely to cause more interference, and a second set D of "low-power" recipient users, one of which is identified in FIGS. 1 and 2 by index "d", whose received signal powers are relatively low and whose reception may be degraded by interference from the signals from the strong users. In order to receive the low-power users adequately, it usually is desirable to substantially eliminate the interference produced by the high-power users. For simplicity, most of the preferred embodiments of the invention will be described on the basis that the high-power users can be received adequately without interference suppression. It should be appreciated, however, that the "strong" user stations could interfere with each other, in which case one could also apply to any interfering mobile the coloured noise model below and the near-far resistant solution proposed for the low-power user, as will be described later.

Assuming the presence of NI interfering users assigned the indices i=1 to NI, then the spatio-temporal observation vector of any interfering user ($u=i\in\{1,\ldots,NI\}$) is given from Equation 8 by:

$$\underline{Z}_n^i = \underline{H}_n^i s_n^i + \underline{N}_{PCM,n}^i, \quad (13)$$

where $\underline{N}_{PCM,n}^i$ can still be assumed to be an uncorrelated white noise vector if the processing gain of this user is not very low. On the other hand, from the point of view of any low-power user ($u=d\notin\{1,\ldots,NI\}$), the spatio-temporal observation vector is:

$$\begin{aligned}\underline{Z}_n^d &= \underline{H}_n^d s_n^d + \underline{I}_{PCM,n}^d + \underline{N}_{PCM,n}^d \\ &= \underline{H}_n^d s_n^d + \sum_{i=1}^{NI} \underline{I}_{PCM,n}^{d,i} + \underline{N}_{PCM,n}^d,\end{aligned} \quad (14)$$

where, in addition to the uncorrelated white noise vector $\underline{N}_{PCM,n}^d$, there is included a total interference vector $\underline{I}_{PCM,n}^d$ which sums a random coloured spatio-temporal interference vector from each interfering mobile denoted by $\underline{I}_{PCM,n}^{d,i}$ for i=1,..., NI. At frame number n, the realization of the vector $\underline{I}_{PCM,n}^{d,i}$ results from matched-pulse filtering, chip-rate sampling, despreading with $c_i^d$, bit-rate framing, and matrix/vector reshaping of the received signal vector $X^i(t)$ from the i-th interfering mobile using Equations (3) to (6).

The receiver shown in FIG. 5 would receive the signals from all of the user stations independently of each other. It should be noted that there is no cross-connection between the receiver modules $20^1, \ldots, 20^U$, specifically between their STAR modules $20^1 \ldots 20^u \ldots 20^U$, for suppression of interference from the signals of mobile stations which constitute strong interferers. While the matched beamformer of Equation (9) is optimal in uncorrelated white noise, it is suboptimal when receiving the low-power users due to spatial-temporal correlation of the interference terms. To allow the accommodation of additional users in the presence of much stronger interfering mobiles in the target cell, in embodiments of the present invention the receiver of FIG. 5 is upgraded to obtain much stronger near-far resistance, specifically by adapting the beamformer of Equation (9) to reject the interference contributions from the interfering strong users.

In the general case, the total interference $\underline{I}_{PCM,n}^d$ experienced by a user d in set D is an unknown random vector which lies at any moment in an interference subspace spanned by a matrix, say $C_{PCM,n}^d$ (i.e., $\underline{I}_{PCM,n}^d \in \text{Vec}\{\hat{C}_{PCM,n}^d\}$) with dimension depending on the number of interference parameters (i.e., power, data, multipath components and delays) assumed unknown or estimated a priori. As will become apparent from the following descriptions of preferred embodiments, in practice, the matrix $C_{PCM,n}^d$, which will be referred to as the constraint matrix, can be derived and estimated in different ways. To achieve near-far resistance, the beamformer must conform to the following theoretical constraints:

$$\begin{cases} \underline{W}_n^{d^H} \underline{H}_n^d = 1, \\ \underline{W}_n^{d^H} C_{PCM,n}^d = 0, \end{cases} \Rightarrow \begin{cases} \underline{W}_n^{d^H} \underline{H}_n^d = 1, \\ \underline{W}_n^{d^H} I_{PCM,n}^d = 0. \end{cases} \quad (15)$$

The first constraint provides a substantially distortionless response to the low-power user while the second instantaneously rejects the interference subspace and thereby substantially cancels the total interference. This modification of the beamforming step of STAR will be referred to as interference subspace rejection (ISR).

With an estimate of the constraint matrix $\hat{C}_{PCM,n}^d$ available (as described later), the ISR combiner (i.e., the constrained spatio-temporal beamformer) $\underline{W}_n^d$ after despreading is obtained by:

$$Q_{PCM,n}^d = \left( \hat{C}_{PCM,n}^{d^H} \hat{C}_{PCM,n}^d \right)^{-1}, \quad (16)$$

$$\Pi_{PCM,n} = I_{M*L} - \hat{C}_{PCM,n}^d Q_{PCM,n}^d \hat{C}_{PCM,n}^{d^H}, \quad (17)$$

$$\underline{W}_n^d = \frac{\Pi_{PCM,n}^d \hat{\underline{H}}_n^d}{\hat{\underline{H}}_n^{d^H} \Pi_{PCM,n}^d \hat{\underline{H}}_n^d}, \quad (18)$$

where $I_{M*L}$ denotes a $M*L \times M*L$ identity matrix. First, the projector $\Pi_{PCM,n}$ orthogonal to the constraint matrix $\hat{C}_{PCM,n}$ is formed. It should be noted from Equations (16) and (17) that the inverse matrix $Q_{PCM,n}^d$ is not the direct inverse of constraint matrix $C_{PCM,n}^d$ but part of the pseudo-inverse of $C_{PCM,n}^d$. For convenience, however, it will be referred to as the inverse matrix hereafter. Second, the estimate of the low-power response vector $\hat{\underline{Y}}_n^d$ is projected and normalized.

Whereas, using the above constraints, the ISR beamformer may process the low-power user's data vector after it has been despread, it is possible, and preferable, to process the data vector without first despreading it. In either case, however, the data vector will still be despread for use by the channel identification unit. Although it is computationally more advantageous to do so without despreading, embodiments of both alternatives will be described. First, however, the spread data model of Equation (2) will be reformulated and developed and then used to derive various modes that implement ISR combining of the data, without despreading, suitable for different complementary situations.

Data Model Without Despreading

The observation matrix $Y_n$ of Equation (4) which provides the post-correlation matrix $Z_n$ of Equation (7) by despreading and framing at the bit rate, can be expressed as:

$$Y_n = \sum_{u=1}^{U} Y_n^u + N_n^{pth}, \quad (19)$$

where each user u contributes its user-observation matrix $Y_n^u$, obtained by Equations (3) and (4) with X(t) replaced by $X^u(t)$ in Equation (3), and where the preprocessed thermal noise contributes:

$$N_n^{pth} = [N^{pth}(nT), N^{pth}(nT+T_c), \ldots, N^{pth}(nT+(2L-2)T_c)]. \quad (20)$$

Figure 25:
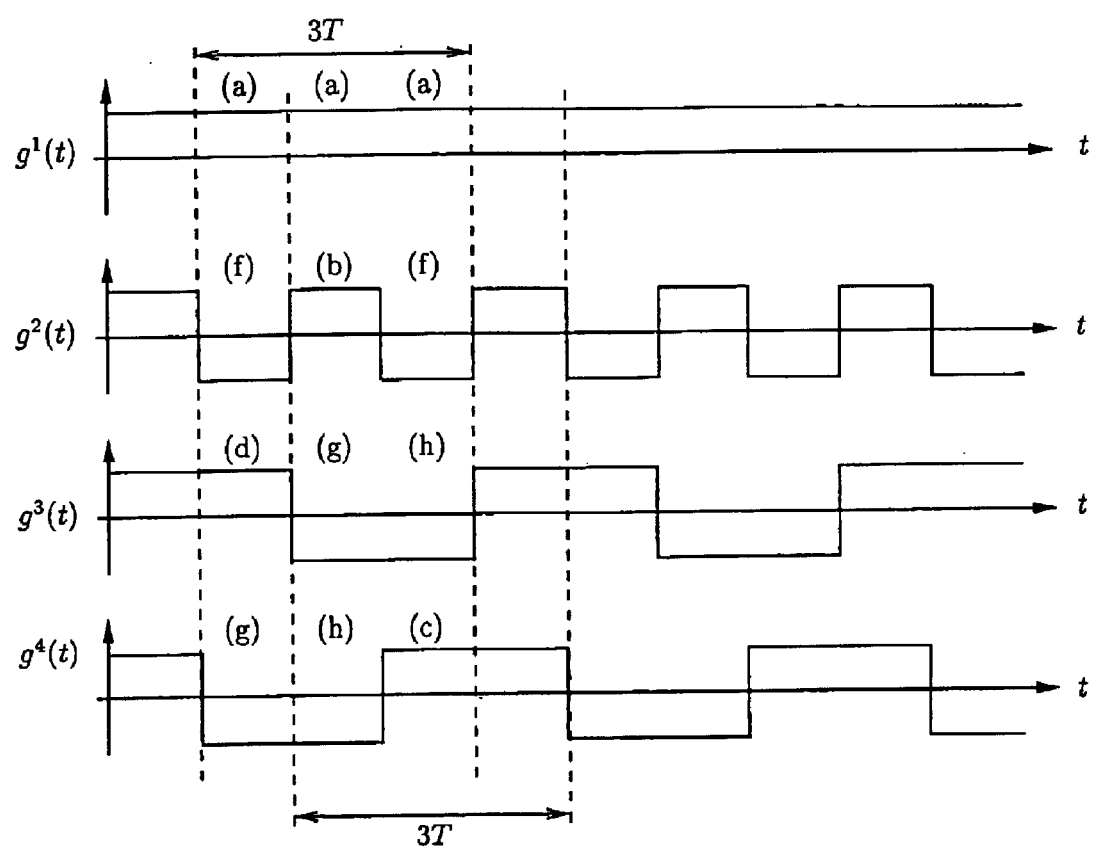
FIG. 25 illustrates bit sequences generated in the receiver of FIG. 24.

Using the fact that any bit-triplet $[b_{n-1}^u, b_n^u, b_{n+1}^u]$ contributing to channel convolution (see Equation (2a) in $Y_n^u$ can be composed as:

$$[b_{n-1}^u, b_n^u, b_{n+1}^u] = b_{n-1}^u[1, 0, 0] + b_n^u[0, 1, 0] + b_{n+1}^u[0,0,1], \quad (21)$$

the sequence $b^u(t)$ can be locally approximated over the n-th block by means of the canonic generating sequences $g^1(t)$, $g^2(t)$ and $g^3(t)$ in FIG. 25 as:

$$b^u(t) = b_n^u g^{l_{0,n}}(t) + b_{n-1}^u g^{l_{-1,n}}(t) + b_{n+1}^u g^{l_{+1,n}}(t), \quad (22)$$

where the indices $l_{0,n}, l_{-1,n}, l_{+1,n} \in \{1, 2, 3\}$ are permuted at each block so that the corresponding canonic generating sequences locally coincide with [0, 1, 0], [1, 0, 0] and [0, 0, 1], respectively. Assuming slow time-variations of $\psi(t)$ and H(t) compared to the symbol duration:

$$Y_n^u = s_n^u Y_{0,n}^u + s_{n-1}^u Y_{-1,n}^u + s_{n+1}^u Y_{+1,n}^u, \quad (23)$$

where the canonic user-observation matrices $Y_{k,n}^u$ are obtained by Equations (3) and (4) with X(t) in Equation (3) replaced, respectively for k=-1, 0, +1, by:

$$X_k^u(t) = H^u(t) \otimes g^{lcm}(t) c^u(t). \quad (24)$$

Good approximations of $Y_{-1,n_u}$ and $Y_{+1,n_u}$ can be actually obtained at each iteration by L simple backward/forward shifts of the columns of $Y_{0,n}^u$ with zero column inputs.

It should be noted that the canonic generating sequences allow more accurate reconstruction (e.g., overlap-add) of time-varying channels. Also, the resulting decomposition in Equation (23) holds for long PN codes.

It should be noted that this decomposition also holds for any complex-valued symbol-triplet $[b_{n-1}^u, b_n^u, b_{n+1}^u]$. With ad hoc modifications, therefore, the ISR approach according to this invention applies to any complex modulation (e.g., MPSK, MQAM, even analog). This new signal decomposition is used to derive the different implementations of ISR which will be described later.

With respect to the low-power user assigned the index d and the NI strong interfering mobiles assigned the indices i=1, ..., NI, the observation vector obtained by reshaping the observation matrix, before despreading, can now be rewritten as:

$$\underline{Y}_n = \underline{Y}_{0,n}^d s_n^d + \underline{I}_{ISI,n}^d + \underline{I}_n + \underline{N}_n, \quad (25)$$

where the first canonic observation vector $\underline{Y}_{0,n}^d$ appears as the "channel" vector of the low-power user d. The total interference vector before despreading:

$$\underline{I}_n = \sum_{i=1}^{NI} \underline{Y}_n^i = \sum_{i=1}^{NI} \{s_n^i \underline{Y}_{0,n}^i + s_{n-1}^i \underline{Y}_{-1,n}^i + s_{n+1}^i \underline{Y}_{+1,n}^i\} \quad (26)$$

$$= \sum_{i=1}^{NI} \{s_n^i \underline{Y}_{0,n}^i + \underline{I}_{ISI,n}^i\},$$

is the sum of the interfering signal vectors $\underline{Y}_n^i$ and:

$$\underline{I}_{ISI,n}^u = s_{n-1}^u \underline{Y}_{-1,n}^u + s_{n+1}^u \underline{Y}_{+1,n}^u, \quad (27)$$

is the intersymbol interference (ISI) vector of user u. In large processing gain situations, the self ISI vector $\underline{I}_{ISI,n}^d$ can be combined with the uncorrelated spatio-temporal noise vector $\underline{N}_n$, leading to the following data vector model before despreading:

$$\underline{Y}_n = \underline{Y}_{0,n}^d s_n^d + \underline{I}_n + \underline{N}_n, \qquad (28)$$

Despreading the observation vector in the above equation with the spreading sequence of the low-power user d provides the data vector model after despreading in Equation (14). It is possible to derive a finer decomposition of the data model to allow implementation of one or more of the ISR modes over diversities.

Finer Decomposition of the Data Model Over Diversities

Thus, Equation (2a) can be further decomposed over the $N_f = MP$ diversity branches or fingers in such a way that the observation signal contribution $X^{u,f}(t)$ received by the m-th antenna along the p-th path for $f = (p-1)M + m = 1, \ldots, N_f$ can be separated as follows:

$$X^u(t) = \sum_{f=1}^{N_f} X^{u,f}(t). \qquad (29)$$

The observation signal contribution from the f-th finger is defined as:

$$\begin{aligned}X^{u,f}(t) &= \psi^u(t) H^{u,f}(t) \otimes c^u(t) b^u(t) \\ &= \psi^u(t) G_p^{u,f}(t) \varepsilon_p^u(t) b^u(t - \tau_p^u(t)) c^u(t - \tau_p^u(l)),\end{aligned} \qquad (30)$$

where the propagation vector from the f-th finger is:

$$G_p^{u,f}(t) = \gamma_f^u(t) R_m. \qquad (31)$$

In the above equation, the scalar $\gamma_f^u(t)$ is the channel coefficient over the f-th finger and $R_m = [0, \ldots, 0, 1, 0, \ldots, 0]^T$ is a M×1 vector with null components except for the m-th one. With the above definitions, one can easily check the following decompositions of the channel and the propagation vectors:

$$H^u(t) = \sum_{f=1}^{N_f} H^{u,f}(t), \qquad (32)$$

$$G_p^u(t) = \sum_{m=1}^{M} G_p^{u,(p-1)M+m}(t). \qquad (33)$$

Accordingly, after preprocessing, the matched-filtering observation matrix can be decomposed as follows:

$$Y_n = \sum_{u=1}^{U} Y_n^u + N_n^{pth} = \sum_{u=1}^{U} \sum_{f=1}^{N_f} \psi_n^u \zeta_{f,n}^u Y_n^{u,f} + N_n^{pth}, \qquad (34)$$

where each user u contributes its user-observation matrices $Y_n^{u,f}$ from fingers $f = 1, \ldots, N_f$, obtained by Equations (3) and (4) with X(t) replaced by $X^{u,f}(t)$ in Equation (3). Note that the complex channel coefficient $\zeta_f^u(nT) = \gamma_f^u(nT) \epsilon_p^u(nT)$ is separated from the matrix[1] $Y_n^{u,f}$ which contains a purely-delayed replica of the spread-data without attenuation or phase offset from finger f. This matrix, which is obtained by Equations (3) and (4) with X(t) in Equation (3) replaced by:

$$X^{u,f}(t) = R_m \delta(t - \tau_p(t)) \otimes b^u(t) c^u(t), \qquad (35)$$

can be further decomposed over the canonic generating sequences as follows:

$$Y_n^{u,f} = b_n^u Y_{0,n}^{u,f} + b_{n-1}^u Y_{-1,n}^{u,f} + b_{n+1}^u Y_{+1,n}^{u,f}, \qquad (36)$$

where the canonic user-observation matrices $Y_{k,n}^{u,f}$ from finger f are obtained by Equations (3) and (4) with X(t) in Equation (3) replaced, respectively for k = −1, 0, +1, by:

$$X_k^{u,f}(t) = R_m \delta(t - \tau_p(t)) \otimes g^{1,n}(t) c^u(t), \qquad (37)$$

where $\delta(t)$ denotes the Dirac impulse. Therefore one obtains:

$$Y_n = \sum_{u=1}^{U} \sum_{f=1}^{N_f} \sum_{k=-1}^{+1} s_{n+k}^u \zeta_{f,n}^{\gamma u} Y_{k,n}^{u,f} + N_n^{pth}. \qquad (38)$$

A coarser decomposition over fingers of the total interference vector before despreading defined in Equation (26) gives:

$$\underline{I}_n = \sum_{i=1}^{NI} \underline{Y}_n^i = \sum_{i=1}^{NI} \sum_{f=1}^{N_f} \psi_n^i \zeta_{f,n}^i \underline{Y}_n^{i,f}. \qquad (39)$$

After despreading with the spreading sequence of the low-power user d, it gives:

$$I_{PCM,n}^d = \sum_{i=1}^{NI} I_{PCM,n}^{d,i} = \sum_{i=1}^{NI} \sum_{f=1}^{N_f} \psi_n^i \zeta_{f,n}^i I_{PCM,n}^{d,i,f}. \qquad (40)$$

Embodiments of the invention which use the above decompositions of interference, denoted as ISR-D implementations before and after despreading, will be described later with reference to FIGS. 16 and 23.

[1]This matrix is real-valued in the case of a binary modulation.

ISR Combining Before Despreading

As described hereinbefore, the combining step of STAR is implemented without despreading by replacing Equation (9) for the low-power user with:

$$\hat{s}_n^d = \text{Real}\{\underline{W}_n^{d^H} \underline{Y}_n\}, \qquad (41)$$

where the spatio-temporal beamformer $\underline{W}_n^d$ now implements ISR without despreading to reject $\underline{I}_n$ by complying with the following constraints (see Equation (15)):

$$\begin{cases} \underline{W}_n^{d^H} \underline{Y}_{0,n}^d = 1, \\ \underline{W}_n^{d^H} \underline{C}_n = 0, \end{cases} \Rightarrow \begin{cases} \underline{W}_n^{d^H} \underline{Y}_{0,n}^d = 1, \\ \underline{W}_n^{d^H} \underline{I}_n = 0, \end{cases} \qquad (42)$$

and $\underline{C}_n$ is the constraint matrix without despreading that spans the interference subspace of the total interference vector $\underline{I}_n$ (i.e., $\underline{I}_n \in \text{Vec}\{\underline{C}_n\}$).

The constraint matrix without despreading, $\underline{C}_n$, is common to all low-power users. Thus, it characterizes the interference subspace regardless of the low-power user. In contrast, each constraint matrix after despreading $C_{PCM,n}^d$ in Equation (15) is obtained by despreading $\underline{C}_n$ with the spreading sequence of the corresponding low-power user. Therefore ISR combining before despreading, although equivalent to beamforming after despreading, is computationally much more advantageous.

In contrast to the "after despreading" case described earlier, when the data vector is not despread before processing by the ISR combiner (i.e., the constrained spatio-temporal beamformer) $\underline{W}_n^d$ the estimate of the constraint matrix $\hat{C}_n$ is obtained by:

$$Q_n = \left(\hat{C}_n^H \hat{C}_n\right)^{-1}, \quad (43)$$

$$\Pi_n = I_{M*(2L-1)} - \hat{C}_n Q_n \hat{C}_n^H, \quad (44)$$

$$\underline{W}_n^d = \frac{\Pi_n \hat{\underline{Y}}_{0,n}^d}{\hat{\underline{Y}}_{0,n}^{dH} \Pi_n \hat{\underline{Y}}_{0,n}^d}, \quad (45)$$

where $I_{M*(2L-1)}$ denotes a M*(2L-1)×M*(2L-1) identity matrix. As before, it can be seen from Equations (43) and (44) that the inverse matrix $Q_n$ is not the direct inverse of constraint matrix $\hat{C}_n$ but part of the pseudo-inverse of $\hat{C}_n$. It should also be noted that the above operations are actually implemented in a much simpler way that exploits redundant or straightforward computations in the data projection and the normalization. As before, the projector $\Pi_n$ orthogonal to the constraint matrix $\hat{C}_n$ is formed once for all low-power users. This would have not been possible with ISR after despreading. Second, the estimate of the low-power response vector $\hat{\underline{Y}}_{0,n}^d$ is projected and normalized. The estimate $\hat{\underline{Y}}_{0,n}^d$ is reconstructed by reshaping the following matrix:

$$\hat{Y}_{0,n}^d = \hat{H}_n^d \otimes g_n^{l_{0,n}} c_l^d, \quad (46)$$

the fast convolution with the channel matrix estimate being implemented row-wise with the spread sequence. The symbol $\otimes$ denotes overlap—add over the past, current and future blocks of the spread sequence to be convolved with a finite-size channel-matrix; hence $g_n^{l_{0,n}}$ is introduced in Equation 46 to isolate the net contribution from the current sequence block. The channel vector estimate $\underline{\hat{H}}_n^d$, i.e. $\hat{H}_n^d$, is provided by STAR as explained earlier and includes the total contribution of the shaping pulse $\phi(t)$ matched with itself [13]. If the channel time-variations are slow, the channel coefficients can be assumed constant over several symbol durations [20], thereby reducing the number of computationally expensive despreading operations required (see FIG. 9).

It should be noted that, although these ISR modes have formulations that are analogous whether ISR is implemented with or without first despreading the data vector, ISR combining of the data without it first being despread reduces complexity significantly.

Receivers which implement these different ISR modes will now be described, using the same reference numerals for components which are identical or closely similar to those of the receiver of FIG. 5, with a suffix indicating a difference. A generic ISR receiver which does so without despreading of the data will be described first, followed by one which does so after despreading of the data. Thereafter, specific implementations of different ISR modes will be described.

Figure 9:
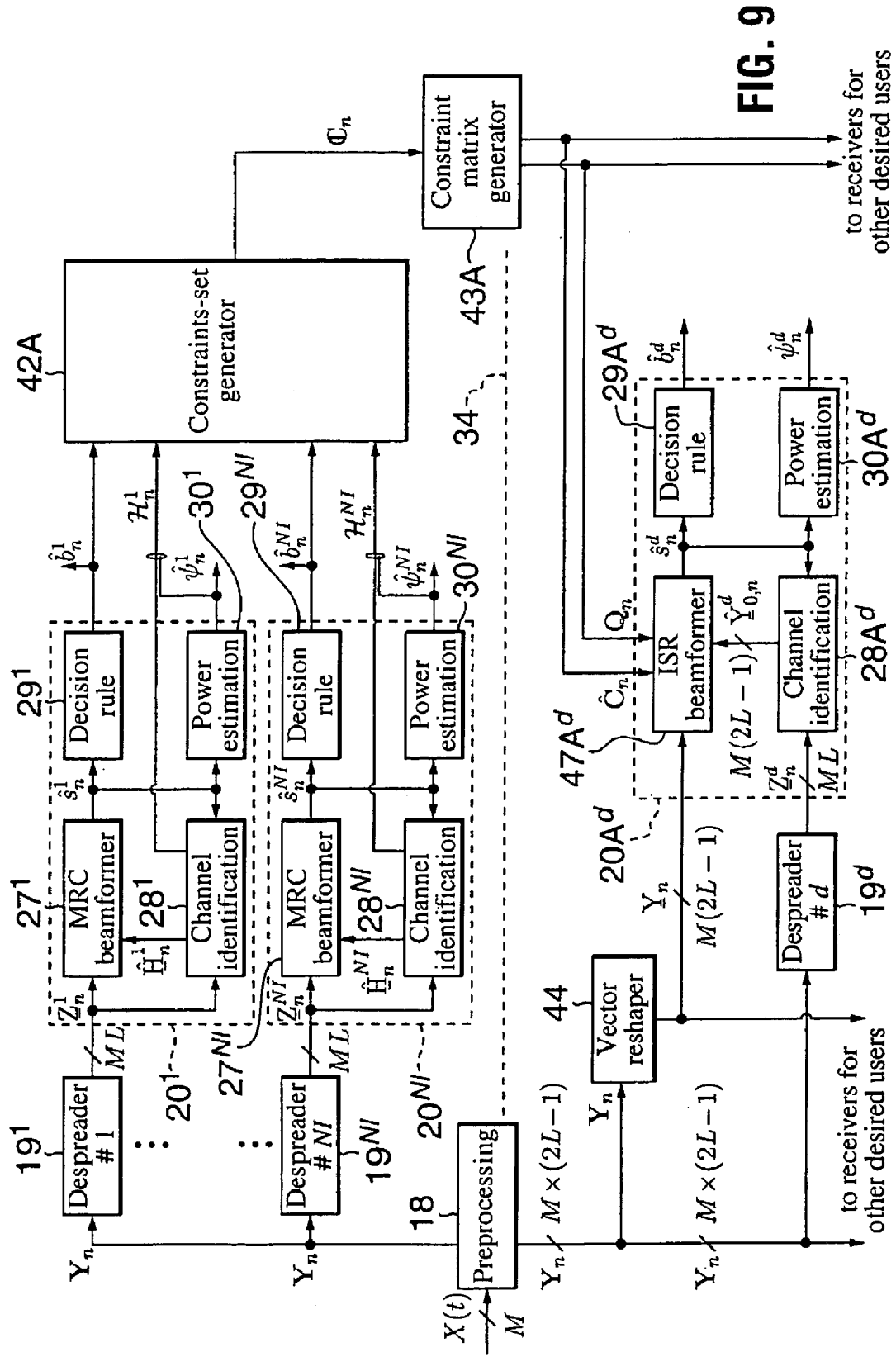
FIG. 9 is a detail block diagram showing several modules of a receiver embodying the present invention, including one having a beamformer operating on data that has not been despread.

Thus, FIG. 9 illustrates a receiver according to a first embodiment of the invention which comprises a first set I of "strong user" receiver modules $20^1 \ldots 20^{NI}$ which are similar to those in the receiver of FIG. 5, and, separated by a broken line 34, a second set D of "low-power" user receiver modules which differ from the receiver modules of set I but are identical to each other so, for convenience, only one, STAR module $20A^d$ having a modified beamformer $47A^d$, is shown. The outputs of the decision rule units $29^1, \ldots, 29^{NI}$ and of the channel identification units $28^1, \ldots, 28^{NI}$ from the set I modules are shown coupled to a constraints-set generator 42A which processes the corresponding symbol estimates and channel vector estimates to produce a set of $N_c$ constraints $\mathbb{C}_n = \{\mathbb{C}_n^1, \ldots, \mathbb{C}_n^{N_c}\}$. The constraints-set generator 42A may, however, use hypothetical symbol values instead, or a combination of symbol estimates and hypothetical values, as will be described later. Each individual constraint lies in the same observation space as the observation matrix $Y_n$ from preprocessor 18. The constraints-set generator 42A supplies the set of constraints $\mathbb{C}_n$ to a constraint matrix generator 43A which uses them to form a constraint matrix $\hat{C}_n$ and an inverse matrix $Q_n$ which supplies it to the beamformer $47^d$ and each of the corresponding beamformers in the other receiver modules of set D. The actual content of the set of constraints $\mathbb{C}_n$ and the constraint matrix $\hat{C}_n$ will depend upon the particular ISR mode being implemented, as will be described later.

The observation vector deriving means in the receiver of FIG. 9 also comprises a vector reshaper 44 which reshapes the observation matrix $Y_n$ from the preprocessing unit 18 to form an observation vector $\underline{Y}_n$, having dimension M(2L-1) and supplies it to the beamformer $47A^d$ and to each of the other beamformers in the other receiver modules in set D.

The STAR module $40A^d$ comprises a channel identification unit $28A^d$, a decision rule unit $27A^d$ and a power estimation unit $30A^d$ which are similar to those of the STAR modules $20^1 \ldots 20^U$ described hereinbefore. The STAR module $20A^d$ is associated with a despreader $19^d$ which also is part of the observation vector deriving means. The despreader $19^d$ despreads the observation matrix $Y_n$ using the spreading code for user d and supplies the resulting post-correlation observation vector $\underline{Z}_n$ to the channel identification unit $28A^d$ only. The decision rule unit $27A^d$ and power estimation unit $30A^d$ produce output symbol estimates $\hat{b}_n^d$ and power estimates $$(\hat{\psi}_n^d)^2,$$

respectively. The ISR beamformer $47A^d$ of STAR module $20A^d$ produces corresponding signal component estimates $\hat{s}_n^d$ but differs from the MRC beamformers $27^1 \ldots 27^{NI}$ because it operates upon the observation vector $\underline{Y}_n$, which has not been despread. In a manner similar to that described with respect to FIG. 5, the channel identification unit $28A^d$ receives the post-correlation observation vector $\underline{Z}_n^d$ and the signal component estimate $\hat{s}_n^d$ and uses them to derive the spread channel vector estimates $\hat{\underline{Y}}_{0,n}^d$, which it uses to update the weighting coefficients $W_n^d$ of the beamformer $47A^d$ in succeeding symbol periods. The symbol period corresponds to the spread data frame of M(2L-1) elements. The coefficients of the ISR beamformer $47A^d$ also are updated in response to the constraint matrix $\hat{C}_n$ and its inverse $Q_n$, as will be described later. As shown in FIG. 9, the same matrices $\hat{C}_n$ and $Q_n$ are supplied to all of the receiver modules in set D, specifically to their beamformers.

Figure 10:
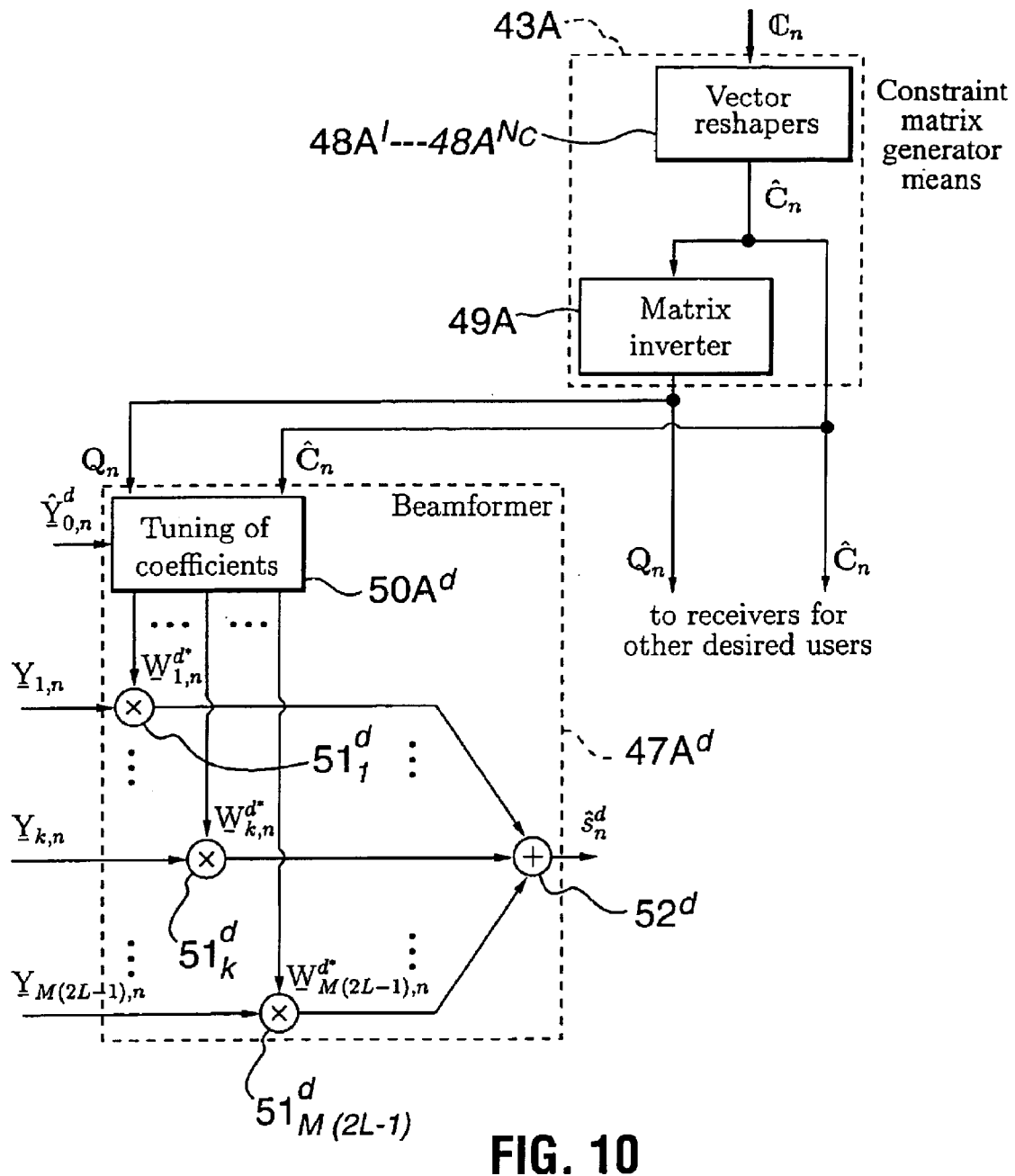
FIG. 10 is a detail schematic diagram showing a common matrix generator and one of a plurality of beamformers coupled in common thereto.

As shown in FIG. 10, the constraint matrix generator means 43A comprises a bank of vector reshapers $48A^1, \ldots, 48A^{N_c}$ and a matrix inverter 49A. Each of the vector reshapers $48A^1, \ldots, 48A^{N_c}$ reshapes the corresponding one of the set of constraints-set matrices $\mathbb{C}_n^1, \ldots, \mathbb{C}_n^{N_c}$ to form one column of the constraint matrix $\hat{C}_n$, which is processed by matrix inverter 49A to form inverse matrix $Q_n$. For simplicity of description, it is implicitly assumed that each of the columns of $\hat{C}_n$ is normalized to unity when collecting it from the set of constraints $\mathbb{C}_n$.

As also illustrated in FIG. 10, beamformer $47A^d$ can be considered to comprise a coefficient tuning unit $50A^d$ and a set of M(2L−1) multipliers $51_1^d \ldots 51_{M(2L-1)}^d$. The coefficient tuning unit $50A^d$ uses the constraint matrix $\hat{C}_n$, the inverse matrix $Q_n$ and the channel vector estimates $\underline{Y}_{0,n}^d$ to adjust weighting coefficients $\underline{W}_{1,n}^{d*} \ldots \underline{W}_{M(2L-1),n}^{d*}$ according to Equation (45) supra. The multipliers $51_1^d \ldots 51_{M(2L-1)}^d$ use the coefficients to weight the individual elements $\underline{Y}_{1,n} \ldots \underline{Y}_{M(2L-1),n}$, respectively, of the observation vector $\underline{Y}_n$. The weighted elements are summed by an adder $52^d$ to form the raw filtered symbol estimate $\hat{s}_n^d$ for output from the beamformer $47A^d$.

Figure 11:
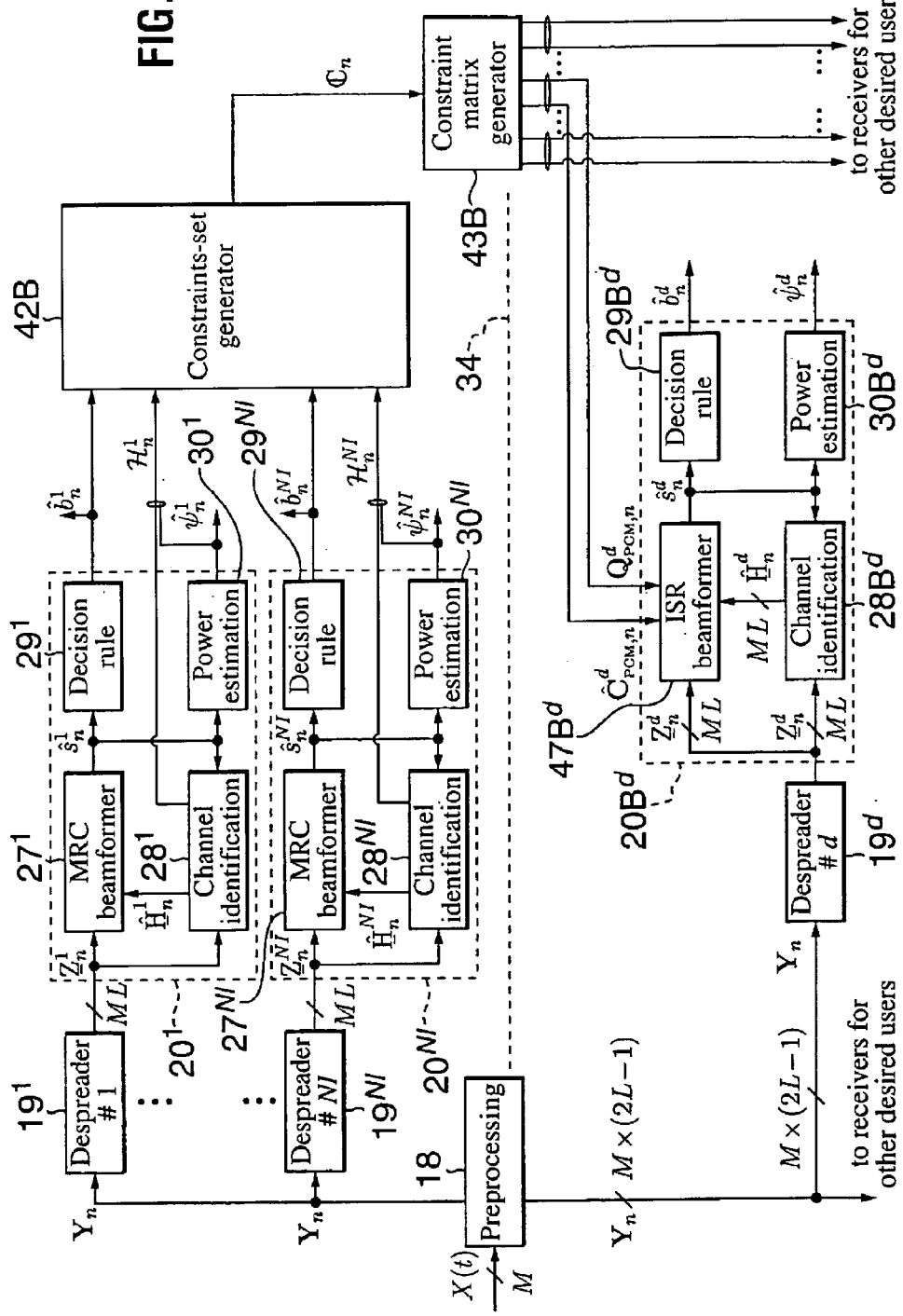
FIG. 11 is a block diagram corresponding to FIG. 9 but including a module having a beamformer operating upon data which has first been despread.

An alternative configuration of receiver in which the low-power STAR modules of set D implement ISR beamforming after despreading of the observation matrix $Y_n$ from preprocessor 18 will now be described with reference to FIGS. 11 and 12, which correspond to FIGS. 9 and 10. The receiver shown in FIG. 11 is similar to that shown in FIG. 9 in that it comprises a preprocessing unit 18 which supplies the observation matrix $Y_n$ to the set I receiver modules $20^1, \ldots, 20^{NI}$, a constraints-set generator 42B and a constraint matrix generator means 43B. It does not, however, include the vector reshaper 44 of FIG. 9 and each of the low-power user STAR modules in set D has a modified beamformer. Thus, modified beamformer $47B^d$ operates upon the post-correlation observation vector $\underline{Z}_n^d$ from the output of the despreader $19^d$ which is supplied to both the channel identification unit $28B^d$ and the beamformer $47B^d$. The channel identification unit $28B^d$ generates channel vector estimates $\underline{\hat{H}}_n^d$ and supplies them to the beamformer $47B^d$ which updates its coefficients in dependence upon both them and a user-specific constraint matrix $\hat{C}_{PCM,n}^d$ and user-specific inverse matrix $Q_{PCM,n}^d$. It should be noted that the constraint matrix generator means 43B supplies user-specific constraint and inverse matrices to the other receiver modules in set D.

Figure 12:
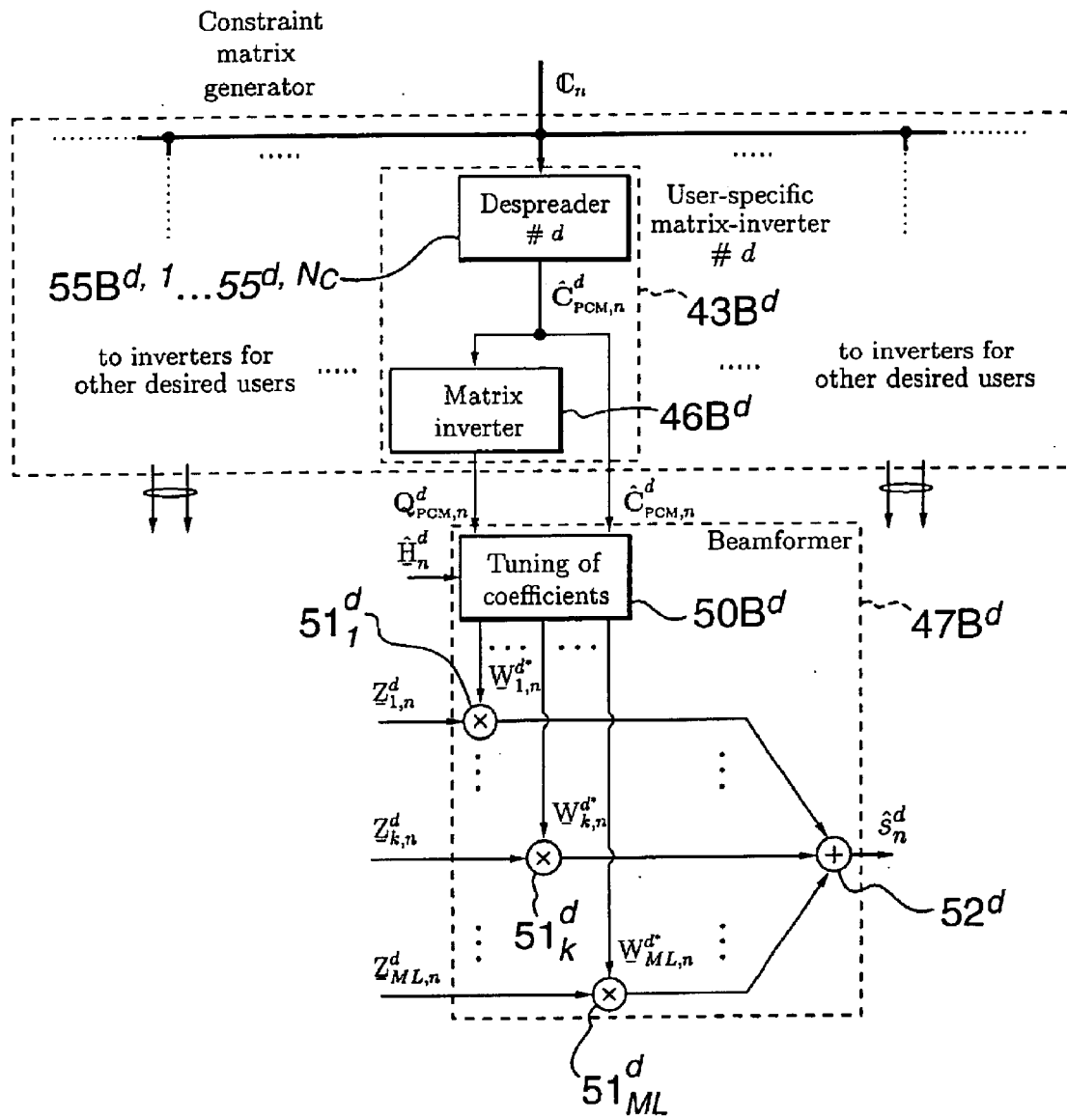
FIG. 12 is a schematic diagram of a user-specific matrix generator and an associated beamformer of one of the receiver modules of FIG. 11.

Referring now to FIG. 12, the common constraint matrix generator means 43B comprises a bank of user-specific constraint matrix generators, one for each of the receiver modules of set D, and each using a respective one of the spreading codes of the users of set D. Since the only difference between the user-specific constraint matrix generators is that they use different spreading codes, only user-specific constraint matrix $43B^d$ is shown in FIG. 12, with the associated beamformer $47A^d$. Thus, user-specific constraint matrix generator $43B^d$ comprises a bank of despreaders $55B^{d,1}, \ldots, 55B^{d,N_c}$ and a matrix inverter $46B^d$. The despreaders $55B^{d,1}, \ldots, 55B^{d,N_c}$ despread respective ones of the $N_c$ matrices in the set of constraints $\mathbb{C}_n$ to form one column of the individual constraint matrix $\hat{C}_{PCM,n}^d$ implicitly normalized to unity. The matrix inverter $46B^d$ processes individual constraint matrix $\hat{C}_{PCM,n}^d$ to form inverse matrix $Q_{PCM,n}^d$. The user-specific constraint matrix generator $43B^d$ supplies the constraint matrix $\hat{C}_{PCM,n}^d$ and inverse matrix $Q_{PCM,n}^d$ to the coefficient tuning unit $50B^d$ of beamformer $47B^d$. As shown in FIG. 12, the beamformer $47B^d$ has ML multipliers $51_1^d \ldots 51_{ML}^d$ which multiply weighting coefficients $\underline{W}_{1,n}^{d*} \ldots \underline{W}_{ML,n}^{d*}$ by elements $\underline{Z}_{1,n}^d \ldots \underline{Z}_{ML,n}^d$ of the post-correlation observation vector $\underline{Z}_n^d$. As before, adder $52^d$ sums the weighted elements to form the signal component estimate $\hat{s}_n^d$. The beamformer coefficients are timed according to Equation (18).

Either of these alternative approaches, i.e. with and without despreading of the data vector supplied to the beamformer, may be used with each of several different ways of implementing the ISR beamforming, i.e. ISR modes. It should be noted that all cases use a constraint matrix which tunes the ISR beamformer to unity response to the desired channel and null response to the interference sub-space. In each case, however, the actual composition of the constraint matrix will differ.

Specific embodiments of the invention implementing the different ISR modes without despreading of the data will now be described with reference to FIG. 13 to 20, following which embodiments implementing the same ISR modes after despreading will be described with reference to FIGS. 21 to 26.

Interference Subspace Rejection Over Total Realisation (ISR-TR)

Figure 13:
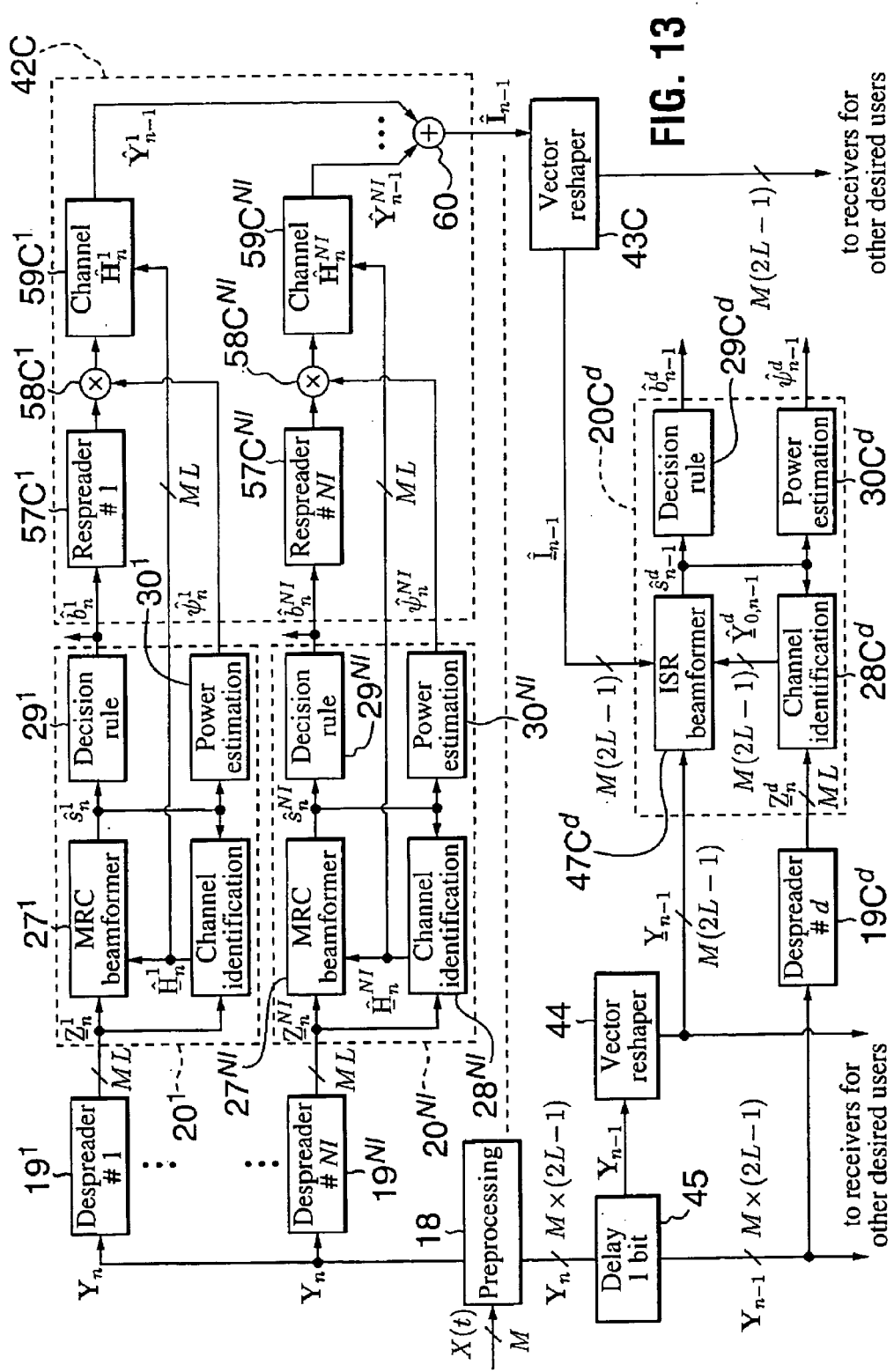
FIG. 13 is a detail block schematic diagram of a receiver using total realisation of the interference to be cancelled (ISR-TR) and without despreading of the data processed by the beamformer.

The receiver unit shown in FIG. 13 is similar to that shown in FIG. 9 in that it comprises a set I of receiver modules $20^1, \ldots, 20^{NI}$ for processing signals of NI strongly interfering mobile stations and a set D of receiver modules for signals of other, "low-power", users. The receiver modules of set D are identical so only receiver module $21C^d$, for channel d, is shown in FIG. 13. As in the receiver of FIG. 9, the observation matrix $Y_n$ from preprocessor 18 is supplied directly to each of the despreaders $19^1 \ldots 19^{NI}$ of the set I receiver modules. Before application to each of the receiver modules of set D, however, it is delayed by one symbol period by a delay element 45 and reshaped by vector reshaper 44. The resulting observation vector $\underline{Y}_{n-1}$ is supplied to the beamformer $47C^d$ and to each of the other beamformers in the set D receiver modules (not shown). STAR receiver module $20C^d$ is associated with despreader 19d and, in addition to beamformer $47C^d$, comprises channel identification unit $28C^d$, decision rule unit $29C^d$ and power estimation unit $30C^d$ which are similar to those shown in FIG. 9. The set of channel estimates $\hat{b}_n^1, \ldots, \hat{b}_n^{NI}$, which are supplied to the constraints-set generator 42C comprise the channel vector estimates $\underline{\hat{H}}_n^1, \ldots, \underline{\hat{H}}_n^{NI}$ and the power estimates $\hat{\psi}_n^1, \ldots, \hat{\psi}_n^{NI}$, respectively.

The constraints-set generator 42C comprises a bank of respreaders $57C^1 \ldots 57C^{NI}$ each having its output connected to the input of a respective one of a corresponding bank of channel replication units $59C^1 \ldots 59C^{NI}$ by a corresponding one of a bank of multipliers $58C^1 \ldots 58C^{NI}$. The respreaders $57C^1 \ldots 57C^{NI}$ are similar so only one, respreader $57C^u$, is illustrated in FIG. 14. Respreader $57C^u$ is similar to the corresponding spreader $13^u$ (FIG. 3) in that it spreads the symbol $\hat{b}_n^u$ from the corresponding decision rule unit $29C^u$ using a periodic personal code sequence $c_l^u$ at a rate $1/T_c$, where $T_c$ is the chip pulse duration. It differs, however, in that it does not include a shaping-pulse filter. The effects of filtering both at transmission with the shaping-pulse (see FIGS. 2 and 3) and at reception with the matched shaping-pulse (see FIGS. 5 and 6) are included baseband in the channel vector estimate $\underline{\hat{H}}_n^u$ or $\hat{H}_n^u$, as disclosed in reference [13].

Referring again to FIG. 13 and, as an example, receiver module $20C^1$, replication of the propagation characteristics of channel $14^1$ is accomplished by digital filtering in the discrete time domain, i.e. by convolution at the chip rate of the channel vector estimate $\underline{\hat{H}}_n^1$ with the respread data $\hat{b}_n^1 c_l^1$. This filtering operation immediately provides decomposed estimates of the signal contribution of user station $10^1$ to the observation matrix $Y_n$. Thus, respreader $57C^1$ respreads the symbol $\hat{b}_n^1$ from decision rule unit $29C^1$, multiplier $58C^1$ scales it by the total amplitude estimate $\hat{\psi}_n^1$ and channel replication filter $59C^1$ filters the resulting respread symbol using the channel vector estimate $\underline{\hat{H}}_n^1$ from channel identification unit $28C^1$. The symbol estimates from the other STAR modules in set I are processed in a similar manner.

It should be noted that the respreaders $57C^1 \ldots 57C^{NI}$, multipliers $58C^1 \ldots 58C^{NI}$ and channel replication filters $59C^1 \ldots 59C^{NI}$ correspond to the elements $13^1$, $15^1$ and $14^1$ in the interfering user channel of FIG. 2. The coefficients of the channel replication filter units $59C^1 \ldots 59C^{NI}$ are updated in successive symbol periods by the channel identification units $28C^1 \ldots 28C^{NI}$ using the same coefficients $\hat{H}_n^1 \ldots \hat{H}_n^{NI}$, corresponding to the transmission channels $14^1 \ldots 14^{NI}$, respectively, used to update their respective MRC beamformers $27C^1 \ldots 27C^{NI}$. It will be appreciated that the re-spread signals $\hat{Y}_{n-1}^1 \ldots \hat{Y}_{n-1}^{NI}$ from the channel replication filter units $59C^1 \ldots 59C^{NI}$, respectively, include information derived from both the sign and the amplitude of each symbol, and channel characteristics information, and so are the equivalents of the set I strong interferer's spread signals as received by the base station antenna elements $12^1 \ldots 12^M$.

The constraint-set generator 42C also comprises an adder 60 coupled to the outputs of the channel replication units $59C^1 \ldots 59C^{NI}$. The adder 60 sums the estimates $\hat{Y}_{n-1}^1 \ldots \hat{Y}_{n-1}^{NI}$ of the individual contributions from the different interferers to form the estimate $\hat{I}_{n-1}$ of the total interference from the NI interferers in the received observation matrix $Y_n$. The sum can be called total realization (TR) of the interference. In this embodiment, the constraint matrix generator simply comprises a single vector reshaper 43C which reshapes the total realization matrix $\hat{I}_{n-1}$ to form the vector $\underline{\hat{I}}_{n-1}$ which, in this embodiment, constitutes the constraint matrix $C_n$. It should be noted that, because the constraint matrix really is a vector, the inverse matrix $Q_n$ reduces to a scalar and, assuming implicit normalization, is equal to 1. Hence, no matrix inverter is needed.

The reshaped vector $\underline{\hat{I}}_{n-1}$ is supplied to the ISR beamformer $47C^d$ of receiver module $20C^d$ and to the beamformers of the other receiver modules in set D. The beamformer $47C^d$ uses the reshaped vector $\underline{\hat{I}}_{n-1}$ and the channel vector estimates $\underline{\hat{Y}}_{0,n-1}^d$ to update its coefficients, according to Equation (45), for weighting of the elements of observation vector $\underline{Y}_{n-1}$.

The beamformer $47C^d$ adjusts its coefficients so that, over a period of time, it will nullify the corresponding interference components in the observation vector $\underline{Y}_{n-1}$ from the vector reshaper 44 and, at the same time, tune for a unity response to the spread channel vector estimate so as to extract the raw signal component estimate $\hat{s}_{n-1}^d$ substantially without distortion.

ISR-TR constitutes the simplest way to characterize the interference subspace, yet the most difficult to achieve accurately; namely by a complete estimation of the instantaneous realization of the total interference vector $\hat{I}_n$ in a deterministic-like approach. The constraint matrix is therefore defined by a single null-constraint (i.e., $N_c=1$) as:

$$\hat{C}_n = \left[\frac{\hat{I}_n}{\|\hat{I}_n\|}\right] = \left[\frac{\sum_{i=1}^{NI} \hat{Y}_n^i}{\left\|\sum_{i=1}^{NI} \hat{Y}_n^i\right\|}\right] \quad (47)$$

where each estimate $\underline{\hat{Y}}_n^i$ is reconstructed by reshaping the following matrix:

$$\hat{Y}_n^i = \hat{\psi}_n^i \hat{H}_n^i \otimes \hat{b}_n^i c_l^i. \quad (48)$$

For each interfering user assigned the index $i=1, \ldots, NI$, this mode uses estimates of its received power $(\hat{\psi}_n^i)^2$ and its channel $\hat{\underline{H}}_n^i$, both assumed constant over the adjacent symbols and made available by STAR. This mode also requires a bit-triplet estimate $[\hat{b}_{n-1}^i, \hat{b}_n^i, \hat{b}_{n+1}^i]$ of each interfering user (see Equation (23)). To obtain estimates of the signs of the interferer bits for both the current and next iterations (i.e., $\hat{b}_n^i$ and $\hat{b}_{n+1}^i$) the ISR-TR mode requires that the processing of all the low-power users be further delayed by one bit duration and one processing cycle (pc), respectively. The one-bit delay is provided by the delay 45 in FIG. 13.

In the ISR-TR mode and in the alternative ISR modes to be described hereafter, the interference (due to the strongest users) is first estimated, then eliminated. It should be noted that, although this scheme bears some similarity to prior interference cancellation methods which estimate then subtract the interference, the subtraction makes these prior techniques sensitive to estimation errors. ISR on the other hand rejects interference by beamforming which is robust to estimation errors over the power of the interferers. As one example, ISR-TR would still implement a perfect null-constraint if the power estimates were all biased by an identical multiplicative factor while interference cancellers would subtract the wrong amount of interference. The next mode renders ISR even more robust to power estimation errors.

The receiver illustrated in FIG. 13 may be modified to reduce the information used to generate the interfering signal estimates $\hat{Y}_{n-1}^1 \ldots \hat{Y}_{n-1}^{NI}$, specifically by omitting the amplitude of the user signal estimates, and adapting the ISR beamformer $47C^d$ to provide more (NI) null constraints. Such a modified receiver will now be described with reference to FIG. 15.

Interference Subspace Rejection Over Realisations (ISR-R)

In the receiver of FIG. 15, the receiver modules in set I are identical to those of FIG. 13. Receiver module $20D^d$ has the same set of components as that shown in FIG. 13 but its beamformer $47D^d$ differs because the constraint matrix differs. The constraints-set generator 42D differs from that shown in FIG. 13 in that it omits the multipliers $58C^1 \ldots 58C^{NI}$ and the adder 60. The outputs from the power estimation units $30^1 \ldots 30^{NI}$ are not used to scale the re-spread signals from the respreaders $57C^1 \ldots 57C^{NI}$, respectively. Hence, in the receiver of FIG. 15, the signals $\hat{b}_n^1 \ldots \hat{b}_n^{NI}$ from the STAR modules $20^1 \ldots 20^{NI}$, respectively, are re-spread and then filtered by channel replication filter units $59C^1 \ldots 59C^{NI}$, respectively, to produce user specific observation matrices $\hat{Y}_{n-1}^1 \ldots \hat{Y}_{n-1}^{NI}$, respectively, as the constraints-set $C_n$. In contrast to the receiver of FIG. 13, however, these respread matrices are not summed but rather are processed individually by the constraint matrix generator 43D, which comprises a bank of vector reshapers $48D^1 \ldots 48D^{NI}$ and a matrix inverter 49D (not shown but similar to those in FIG. 10). The resulting constraint matrix $\hat{C}_n$, comprising the column vectors $\underline{\hat{Y}}_{n-1}^1, \ldots, \underline{\hat{Y}}_{n-1}^{NI}$ is supplied, together with the corresponding inverse matrix $Q_n$, to each of the receiver modules in set D. Again, only receiver module $20D^d$ is shown, and corresponds to that in the embodiment of FIG. 13. Each of the vectors $\underline{\hat{Y}}_{n-1}^1 \ldots \underline{\hat{Y}}_{n-1}^{NI}$, represents an estimate of the interference caused by the corresponding one of the strong interference signals from set I and has the same dimension as the reshaped observation vector $\underline{Y}_{n-1}$.

In this ISR-R mode, the interference subspace is characterized by normalized estimates of the interference vectors $\underline{\hat{Y}}_n^1$. Consequently, it spans their individual realizations with all possible values of the total received powers $(\psi_n^i)^2$.

The constraint matrix is defined by NI null-constraints (i.e., $N_c=NI$) as:

$$\hat{C}_n = \left[\frac{\hat{\underline{Y}}_n^1}{\|\hat{\underline{Y}}_n^1\|}, \ldots, \frac{\hat{\underline{Y}}_n^{NI}}{\|\hat{\underline{Y}}_n^{NI}\|}\right], \quad (49)$$

where each estimate $\hat{\underline{Y}}_n^i$ is reconstructed by reshaping the following matrix:

$$\hat{Y}_n^i = \hat{H}_n^i \otimes \hat{b}_n^i c_l^i. \quad (50)$$

It should be noted that, in the reconstruction of $\hat{Y}_n^i$, the total amplitude of the i-th interferer $\hat{\psi}_n^i$ (see FIG. 15) has been omitted intentionally; hence the higher robustness expected to near-far situations as well as the enlarged margin for power control relaxation.

Interference Subspace Rejection Over Diversity (ISR-D)

Figure 16:
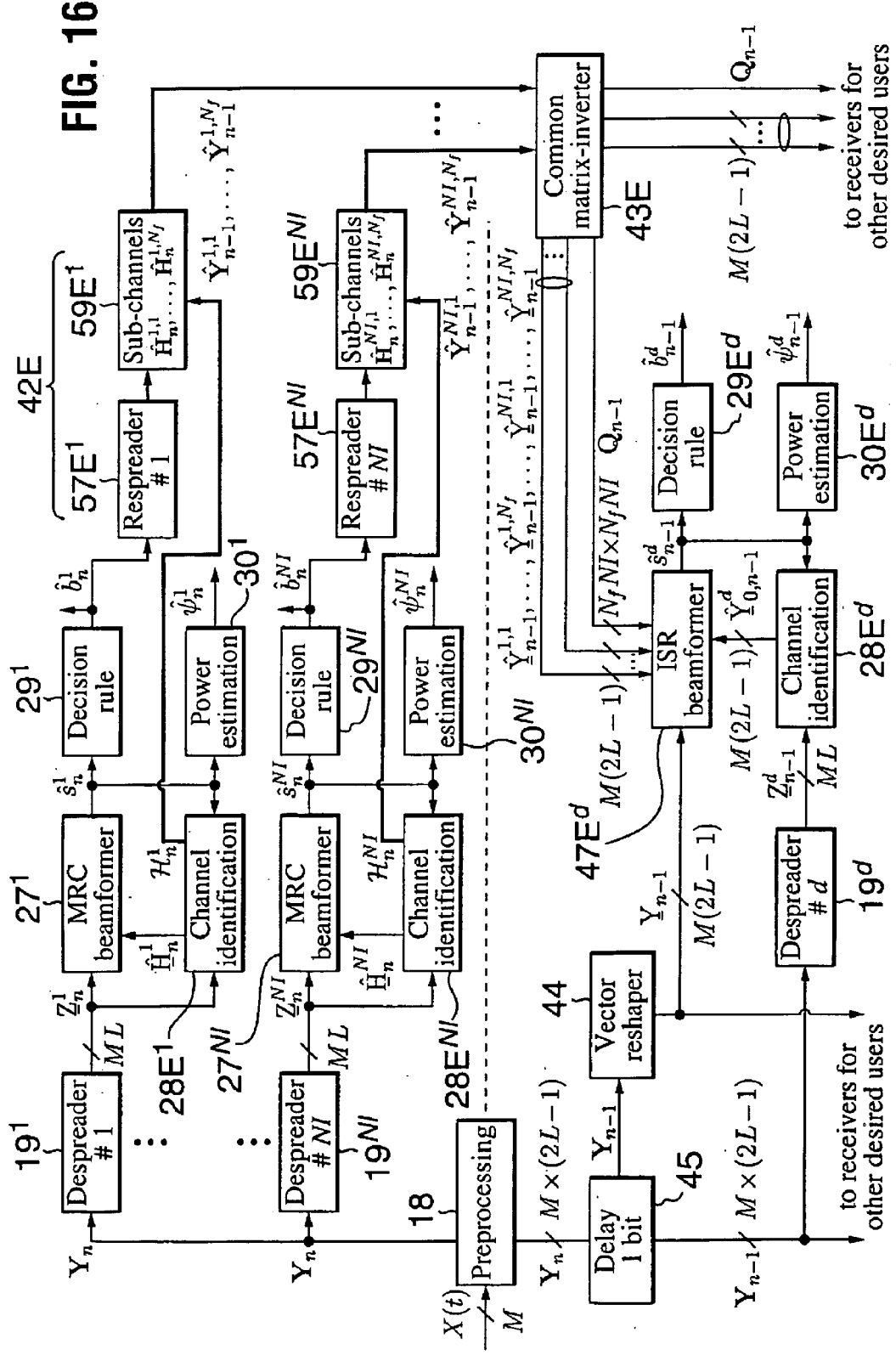
FIG. 16 is a simplified block diagram of a receiver which decomposes each realisation of the interference over diversity paths (ISR-D) and without despreading of the data processed by the beamformer.

The ISR-D receiver shown in FIG. 16 is predicated upon the fact that the signal from a particular user will be received by each antenna element via a plurality of sub-paths. Applying the concepts and terminology of so-called RAKE receivers, each sub-path is termed a "finger". In the embodiments of FIGS. 9, 11, 13 and 15, the channel identification units estimate the parameters for each finger as an intermediate step to estimating the parameters of the whole channel. In the ISR-D receiver shown in FIG. 16, the channel identification units $28E^1 \ldots 28E^{NI}$ supply the whole channel vector estimates $\underline{\hat{H}}_n^1 \ldots \underline{\hat{H}}_n^{NI}$ respectively, to the beamformers $27^1 \ldots 27^{NI}$, respectively, as before. In addition, they supply the sets of channel estimates $\hat{b}_n^1 \ldots \hat{b}_n^{NI}$ comprising a sub-channel vector estimate for each individual sub-channel or finger, to the constraints-set generator 42E.

The set of channel estimates $\hat{b}_n^i$ comprises the subchannel vector estimates $\hat{H}_n^{i,1}, \ldots, \hat{H}_n^{i,N_f}$. The constraints-set generator 42E is similar to that shown in FIG. 15 in that it comprises a bank of respreaders $57^1 \ldots 57^{NI}$ but differs in that the channel replication units $59D^1 \ldots 59D^{NI}$ are replaced by sub-channel replication units $59E^1 \ldots 59E^{NI}$, respectively. The sub-channel replication units $59E^1 \ldots 59E^{NI}$ convolve the respread symbols with the sub-channel vector estimates $\hat{H}_n^{1,1} \ldots \hat{H}_n^{1,N_f}; \ldots; \hat{H}_n^{NI,1}, \ldots, \hat{H}_n^{NI,N_f}$ respectively, to produce normalized estimates $\hat{Y}_{n-1}^{1,1} \ldots \hat{Y}_{n-1}^{1,N_f}; \ldots; \hat{Y}_{n-1}^{NI,1}, \ldots, \hat{Y}_{n-1}^{NI,N_f}$ of the sub-channel-specific observation matrices decomposed over fingers. Hence, the matrices span the space of their realizations with all possible values of the total received powers $(\psi_n^i)^2$ and complex channel coefficients $\zeta_{f,n}^i$. The estimates are supplied to a constraint matrix generator 43E which generally is as shown in FIG. 10 and produces the constraint matrix accordingly.

The constraint matrix $\hat{C}_n$ is simply defined by $N_f$NI null-constraints (i.e., $N_c=N_f \times NI = M \times P \times NI$) as:

$$\hat{C}_n = \left[\frac{\hat{\underline{Y}}_n^{1,1}}{\|\hat{\underline{Y}}_n^{1,1}\|}, \ldots, \frac{\hat{\underline{Y}}_n^{1,N_f}}{\|\hat{\underline{Y}}_n^{1,N_f}\|}, \ldots, \frac{\hat{\underline{Y}}_n^{NI,1}}{\|\hat{\underline{Y}}_n^{NI,1}\|}, \ldots, \frac{\hat{\underline{Y}}_n^{NI,N_f}}{\|\hat{\underline{Y}}_n^{NI,N_f}\|}\right], \quad (51)$$

Each estimate $\hat{\underline{Y}}_n^{i,f}$ is reconstructed by reshaping the following matrix:

$$\hat{Y}_n^{i,f} = \hat{H}_n^{i,f} \otimes \hat{b}_n^i c_l^i. \quad (52)$$

It should be noted that, in the reconstruction of $\hat{Y}_n^{i,f}$, the total amplitude of the i-th interferer $\hat{\psi}_n^i$ as well as the channel coefficients $\zeta_{f,n}^i$ (see FIG. 1) are intentionally omitted; hence the relative robustness of ISR-D to power mismatch, like ISR-R. Unlike other modes, it additionally gains robustness to channel identification errors and remains sensitive only to the estimated channel parameters remaining, namely the multipath time-delays, and to symbol estimation errors.

It should be noted that, in the receivers of FIGS. 13, 15 and 16, estimation errors of the interference bit signs may introduce differences between the estimated constraints and the theoretical ones. Hence, although ISR-D, ISR-R and ISR-TR modes are satisfactory in most situations, it is possible that the realisation could be erroneous, which would affect the validity of the interference cancellation. Additionally, estimation of the signs of the interference bits for reconstruction in the ISR-D mode, as in the ISR-R and ISR-TR modes, requires that the processing of all of the low-power users be further delayed by one bit duration, i.e., by delay 45, and one processing cycle (pc). To avoid these drawbacks, alternative ISR approaches to implementation of the constraints of Equation (42) are envisaged and will now be described, beginning with ISR-H which avoids processing delays and is completely robust to data estimation errors.

Interference Subspace Rejection Over Hypotheses (ISR-H)

Figure 17:
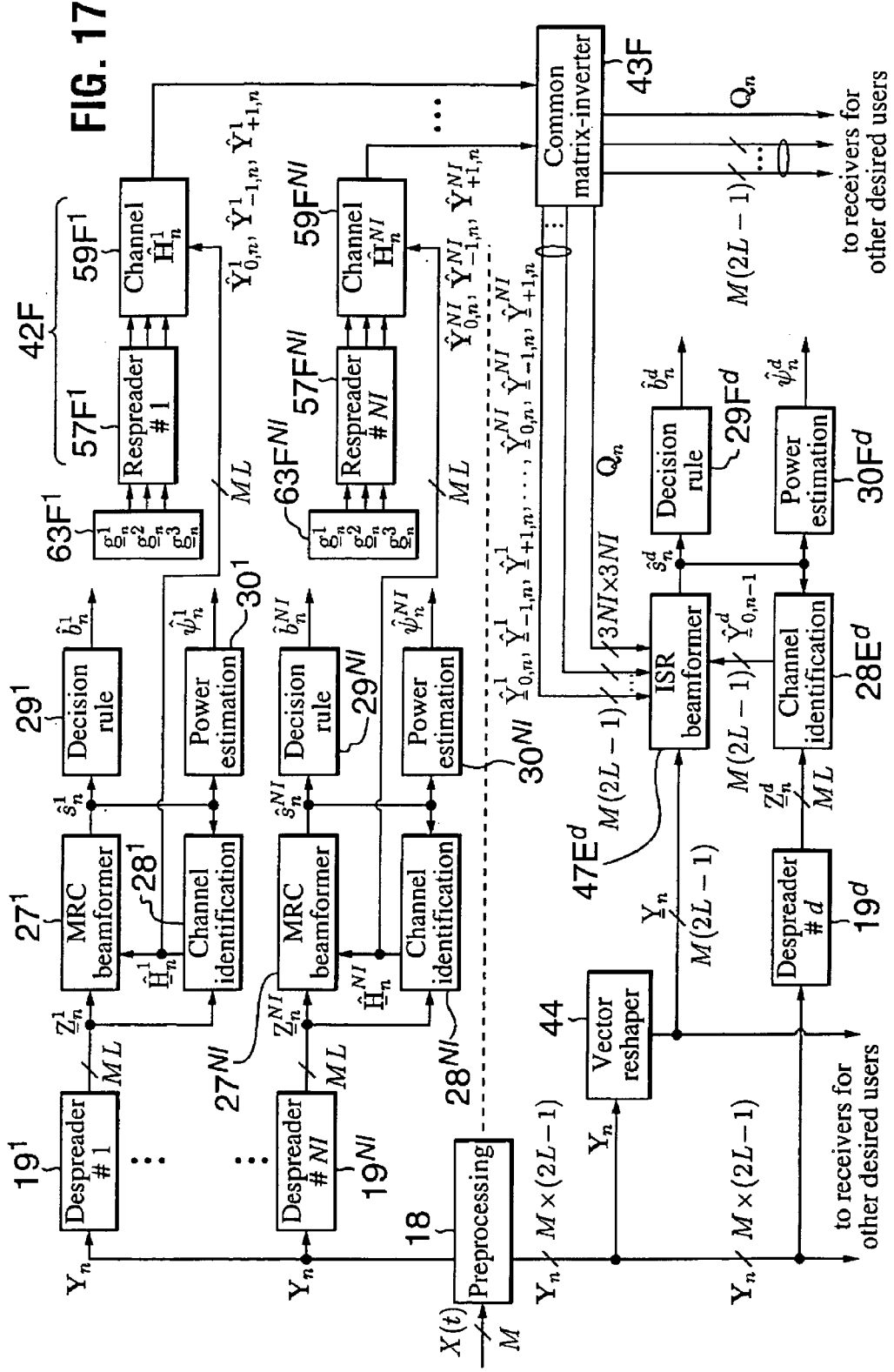
FIG. 17 is a simplified schematic block diagram of a receiver employing interference subspace rejection based upon hypothetical values of the symbols (ISR-H) and without despreading of the data processed by the beamformer.

It is possible to use a set of signals which represent all possible or hypothetical values for the data of the interfering signal. Each of the interfering signals constitutes a vector in a particular domain. It is possible to predict all possible occurrences for the vectors and process all of them in the ISR beamformer and, therefore, virtually guarantee that the real or actual vector will have been nullified. As mentioned, the strong interferers are relatively few, so it is possible, in a practical system, to determine all of the likely positions of the interference vector and compensate or nullify all of them. Such an alternative embodiment, termed Interference Subspace Rejection over Hypotheses (ISR-H) because it uses all possibilities for the realisations, is illustrated in FIG. 17.

The components of the interferer receiver modules of set I, namely the despreaders $19^1 \ldots 19^{NI}$ and STAR modules $20^1 \ldots 20^{NI}$, are basically the same as those in the receiver of FIG. 15 and so have the same reference numbers. In the embodiment of FIG. 17, however, the constraints-set generator 42F differs because the symbol estimates $\hat{b}_n^1 \ldots \hat{b}_n^{NI}$ from the outputs of the decision rule units $29^1 \ldots 29^{NI}$ are not supplied to the respreaders $57F^1 \ldots 57F^{NI}$, respectively, but are merely outputted to other circuitry in the receiver (not shown).

Instead, bit sequence generators $63F^1 \ldots 63F^{NI}$ each generate the three possibilities $g_n^1, g_n^2, g_n^3$, which cover all possible estimated values of the previous, current and next bits of the estimated data sequences $\hat{b}_n^1 \ldots \hat{b}_n^{NI}$, including the realisation itself (as explained later), and supply them to the respreaders $57F^1 \ldots 57F^{NI}$, respectively, which each spread each set of three values again by the corresponding one of the spreading codes. The resulting re-spread estimates are filtered by the channel replication filters $59F^1 \ldots 59F^{NI}$, respectively, to produce, as the constraint set, the matrix estimates $\hat{Y}_{0,n}^1, \hat{Y}_{-1,n}^1, \hat{Y}_{+1,n}^1; \ldots; \hat{Y}_{0,n}^{NI}, \hat{Y}_{-1,n}^{NI}, \hat{Y}_{+1,n}^{NI}$. The bit sequence generators could, of course, be replaced by storage units.

The constraint matrix generator 43F is generally as shown in FIG. 10 and processes the set of estimate matrices to form the column vectors $\hat{\underline{Y}}_{0,n}^1, \hat{\underline{Y}}_{-1,n}^1, \hat{\underline{Y}}_{+1,n}^1; \ldots; \hat{\underline{Y}}_{0,n}^{NI}, \hat{\underline{Y}}_{-1,n}^{NI}, \hat{\underline{Y}}_{+1,n}^{NI}$ of constraint matrix $\hat{C}_n$, which it supplies with corresponding inverse matrix $Q_n$, in common to the beamformer $47F^d$ and the beamformers of the other set D receiver modules.

Receiver module 20F$^d$ comprises similar components to those of the receiver module 20E$^d$ shown in FIG. 16. It should be noted, however, that, because the "next" bit is being hypothesized, it need not be known, so the delay 45 is omitted.

Figure 18:
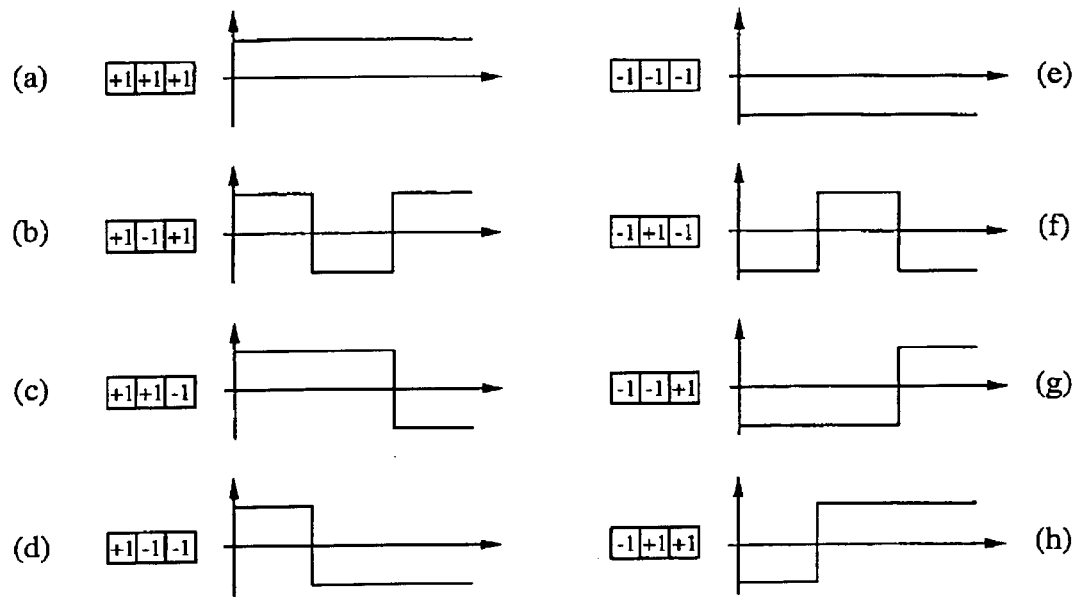
FIG. 18 illustrates all possible triplets for the hypothetical values.
Figure 19:
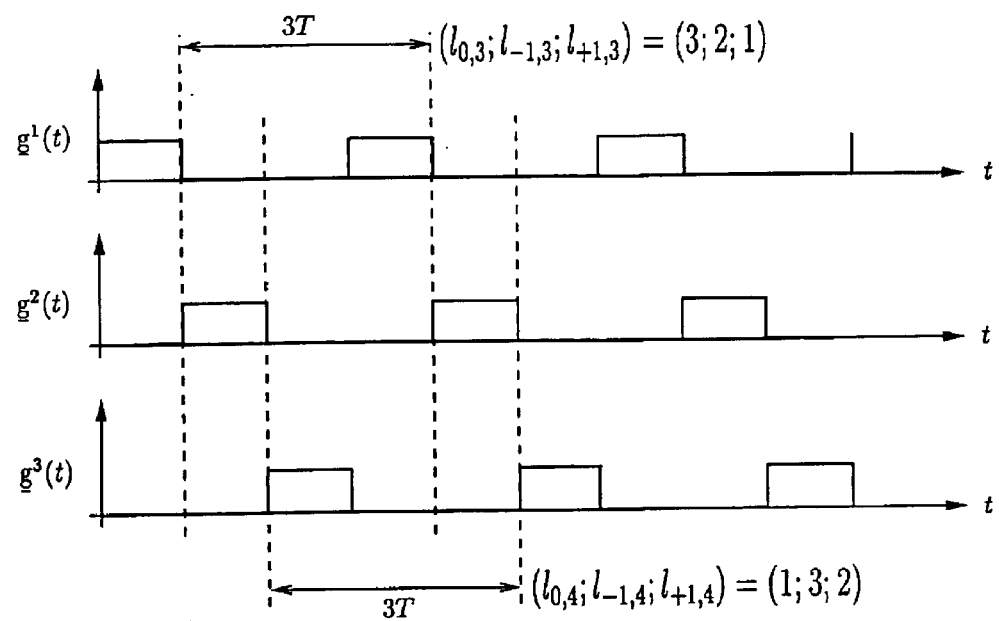
FIG. 19 illustrates bit sequences for generating the hypothetical values.

As mentioned above, the two bits adjacent to the processed bit of the i-th interferer contribute in each bit frame to the corresponding interference vector (symbol) to be rejected. As shown in FIG. 18, enumeration of all possible sequences of the processed and adjacent bits gives $2^3=8$ triplets, each of three bits. Only one of these triplets could occur at any one time at each bit iteration as one possible realization that generates the user-specific observation matrix $\hat{Y}_n^i$. These eight triplets can be identified within a sign ambiguity with one of the four triplets identified as (a) . . . (d) in the left-hand part of FIG. 18, since the four triplets (e) . . . (h) are their opposites.

It should be appreciated that the bit sequence generators $63^1 \ldots 63^{NI}$ (FIG. 17) each supply only three values, $g_n^1$, $g_n^2$, $g_n^3$ because the dimension of the generated signal subspace is 3. It should be noted that frames of duration 3T, taken from these sequences at any bit rate instant, reproduce the eight possible realisations of the bit triplets of FIG. 18. Therefore, at any bit iteration, the bit sequence $b_n^i$ of the interfering mobile station can be locally identified as the summation of the generating sequences $g_n^k$, k=1, . . . , 3 weighted by the bit signs $b_{n-1}^i$, $b_n^i$ and $b_{n+1}^i$. Replacing the estimate $\hat{b}_n^i$ in Equation (50) by $g_n^k$, k=1, . . . , 3, , yields canonic observation matrices that span all possible realisations of the received signal vector from the i-th interfering mobile within a sign ambiguity.

In the ISR-H embodiment of FIG. 17, the interference subspace is characterized by normalized estimates of the canonic interference vectors $\underline{\hat{Y}}_{k,n}^i$. Accordingly, it spans their individual realizations with all possible values of the total received powers $(\psi_n^1)^2$ and bit triplets $[b_{n-1}^1, b_n^i, b_{n+1}^i]$. The constraint matrix is defined by 3NI null-constraints (i.e., $N_c$=3NI) as:

$$\hat{C}_n = \left[ \frac{\underline{\hat{Y}}_{0,n}^1}{\|\underline{\hat{Y}}_{0,n}^1\|}, \frac{\underline{\hat{Y}}_{-1,n}^1}{\|\underline{\hat{Y}}_{-1,n}^1\|}, \frac{\underline{\hat{Y}}_{+1,n}^1}{\|\underline{\hat{Y}}_{+1,n}^1\|}, \ldots, \frac{\underline{\hat{Y}}_{0,n}^{NI}}{\|\underline{\hat{Y}}_{0,n}^{NI}\|}, \frac{\underline{\hat{Y}}_{-1,n}^{NI}}{\|\underline{\hat{Y}}_{-1,n}^{NI}\|}, \frac{\underline{\hat{Y}}_{+1,n}^{NI}}{\|\underline{\hat{Y}}_{+1,n}^{NI}\|} \right], \quad (53)$$

where each estimate $\underline{\hat{Y}}_{k,n}^i$ is reconstructed, respectively, for k=−1, 0, +1 by reshaping the following matrix:

$$\hat{Y}_{k,n}^i = \hat{H}_n^i \otimes g_n^{lcm} c_l^i. \quad (54)$$

It should also be noted that, in the reconstruction above, only the channel vector estimates (assumed stationary over the adjacent symbols) are needed for complete interference rejection regardless of any 2D modulation employed (see FIG. 19); hence the extreme robustness expected to power control and bit/symbol errors of interferers. The ISR-H combiner coefficients are symbol-independent and can be computed less frequently when the channel time-variations are slow.

Merging of the D mode with the H mode along the decomposition of Equation (38) yields ISR-HD (hypothesized diversities) with a very close form to the decorrelator. This ISR-HD mode requires a relatively huge number of constraints (i.e., $3N_f$NI). Consequently, the ISR-HD mode is not considered to be practical at this time.

Figure 20:
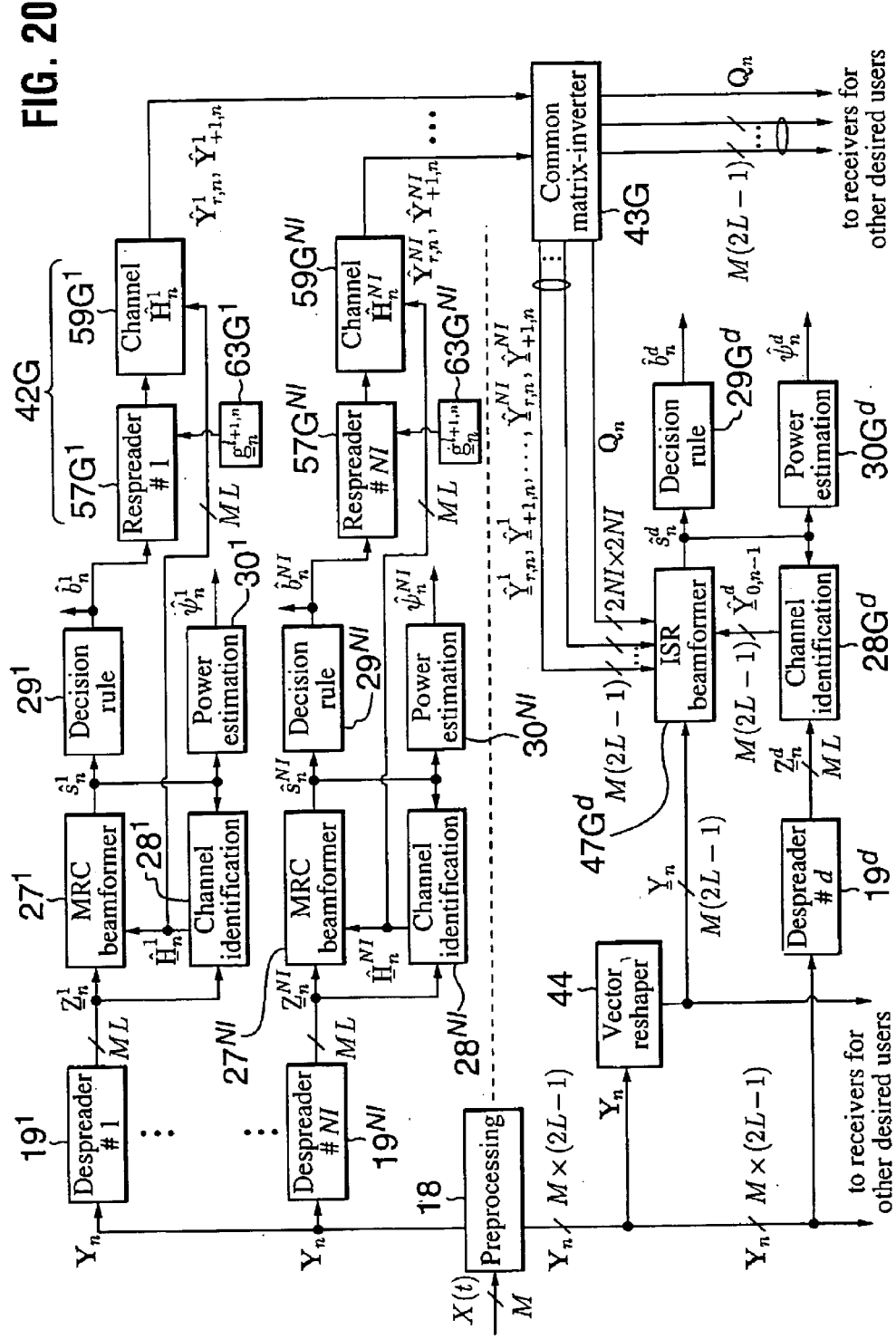
FIG. 20 is a simplified schematic block diagram of a receiver employing interference subspace rejection based upon both hypothetical values of the symbols and realisations (ISR-RH) and without despreading of the data processed by the beamformer.

In fact, it would be desirable to reduce the number of constraints required by the ISR-H receiver described above. This can be done using an intermediate mode which is illustrated in FIG. 20 and in which the receiver modules of both sets I and D are similar to those of FIG. 15; most of their components are identical and have the same reference numbers. In essence, the constraint-set generator 42G of the receiver in FIG. 20 combines the constraint-set generators of FIGS. 15 and 17 in that it uses estimated symbols and hypothetical values. Thus, it comprises a bank of respreaders 57G$^1$ . . . 57G$^{NI}$, a corresponding bank of channel replication units 59G$^1$ . . . 59G$^{NI}$ and a bank of symbol generators 63G$^1$ . . . 63G$^{NI}$. In this case, however, each of the symbol generators 63G$^1$ . . . 63G$^{NI}$ supplies only one symbol to the corresponding one of the respreaders 57G$^1$ . . . 57G$^{NI}$, which receive actual symbol estimates $\hat{b}_n^1 \ldots \hat{b}_n^{NI}$, respectively, from the decision rule units $29^1, \ldots, 29^{NI}$, respectively. It should be appreciated that, although the symbol generators 63G$^1, \ldots,$ 63G$^{NI}$ each supply only one symbol for every actual symbol or realization from the corresponding one of the decision rule units $29^1, \ldots, 29^{NI}$, that is sufficient to generate two hypothetical values of "future" symbols $\hat{b}_{n+1}^1, \ldots, \hat{b}_{n+1}^{NI}$ for every one of the symbol estimates $\hat{b}_{n+1}^1 \ldots \hat{b}_{n+1}^{NI}$ since only two hypothetical values of the symbols, namely 1 and −1, are required. The respreaders 57G$^1, \ldots,$ 57G$^{NI}$ supply the spread triplets to the channel replication units 59G$^1 \ldots$ 59G$^{NI}$ which filter them, using the channel vector estimates $\hat{H}_n^1 \ldots \hat{H}_n^{NI}$, respectively, to produce pairs of matrices $\hat{Y}_{r,n}^1, \hat{Y}_{-1,n}^1; \ldots \hat{Y}_{r,n}^{NI}, \hat{Y}_{+1,n}^{NI}$ and supply them to the constraint matrix generator 43G which is configured generally as shown in FIG. 9. The constraint matrix generator 43G reshapes the matrices $\hat{Y}_{r,n}^1$, $\hat{Y}_{+1,n}^1; \ldots \hat{Y}_{r,n}^{NI}, \hat{Y}_{+1,n}^{NI}$ to form vectors $\underline{\hat{Y}}_{r,n}^1, \underline{\hat{Y}}_{+1,n}^1; \ldots \underline{\hat{Y}}_{r,n}^{NI}, \underline{\hat{Y}}_{+1,n}^{NI}$ which then are used as the column vectors of the constraint matrix $\hat{C}_n$. The constraint matrix generator 43G supplies the constraint matrix $\hat{C}_n$ and the corresponding inverse matrix $Q_n$ in common to the beamformer 47G$^d$ and the beamformers of other receiver modules in set D.

Hence, the beamformer 47G$^d$ uses the past symbol estimate $\hat{b}_{n-1}^i$ of the interference data as well as the present one $\hat{b}_n^i$ (delayed by one processing cycle, i.e. the time taken to derive the interference estimates), and the unknown sign of $b_{n+1}^i$ reduces the number of possible bit triplets and the corresponding realisations for each interference vector to 2.

The receiver of FIG. 20, using what is conveniently referred to as ISR-RH mode for reduced hypotheses over the next interference bits, rejects reduced possibilities of the interference vector realisations. Compared to the receiver of FIG. 17 which uses the ISR-H mode, it is more sensitive to data estimation errors over $\hat{b}_{n-1}^i$ and $\hat{b}_n^i$ and requires only 2 constraints per interferer instead of 3.

Using the previous and current bit estimates of interferers, uncertainty over the interference subspace can be reduced and it can be characterized by the following matrix of 2NI null-constraints (i.e., $N_c$=2NI):
where:

$$\hat{C}_n = \left[ \frac{\underline{\hat{Y}}_{r,n}^1}{\|\underline{\hat{Y}}_{r,n}^1\|}, \frac{\underline{\hat{Y}}_{+1,n}^1}{\|\underline{\hat{Y}}_{+1,n}^1\|}, \ldots, \frac{\underline{\hat{Y}}_{r,n}^{NI}}{\|\underline{\hat{Y}}_{r,n}^{NI}\|}, \frac{\underline{\hat{Y}}_{-1,n}^{NI}}{\|\underline{\hat{Y}}_{-1,n}^{NI}\|} \right], \quad (55)$$

$$\hat{Y}_{r,n}^1 = \hat{b}_n^i \hat{Y}_{0,n}^i + \hat{b}_{n-1}^i \hat{Y}_{-1,n}^i, \quad (56)$$

and where each estimate $\underline{\hat{Y}}_{k,n}^i$ is reconstructed by reshaping the matrices in Equation (38), respectively for k=−1, 0, +1. It should be noted that this mode requires a delay of one processing cycle for the estimation of the current interference bits.

The ISR-RH mode has the advantage of reducing the number of null-constraints as compared to the ISR-H mode.

A larger number of null-constraints indeed increases complexity, particularly when performing the matrix inversion in Equation (43), and may also result in severe noise enhancement, especially when the processing gain L is low. As the number of strong interferes NI increases in a heavily loaded system, the number of null-constraints (2NI and 3NI) approaches the observation dimension M×(2L−1) and the constraint-matrix may become degenerate. To reduce complexity, guarantee stability in the matrix inversion of Equation (43), and minimize noise enhancement, the constraint matrix $\hat{C}_n$ in Equations. (43) and (44) is replaced by the orthonormal interference subspace of rank K that spans its column vectors as follows:

$$\hat{V}_n = Vec\{\hat{C}_n\} = \{\hat{\underline{v}}_{n,1}, \ldots, \hat{\underline{v}}_{n,k}, \ldots, \hat{\underline{v}}_{n,K}\}, \quad (57)$$

to yield the projector $\Pi_n = I_{M^*(2L-1)} - \hat{V}_n \hat{V}_n^H$ used in Equation (31), which replaces matrix inversion operation by matrix orthonormalization. The Gram-Schmidt orthonormalization procedure is used, which implements a cumulative increasing-rank cascade of "corank" −1 projections, like in linear SIC [28], except that projections there are formed differently for direct cancellation. Ultimately, after orthonormalization, ISR exploits a "corank" −$N_c$ projection to implement $N_c$ null-constraints in the combining step. This projection could be implemented as a cascade of $N_c$ corank-1 projections. It should be noted that orthonormalization becomes unnecessary if we check that $\hat{C}_n$ is close to orthonormal (i.e., $\hat{C}_n \propto \hat{V}_n$).

In practice, $\hat{V}_n$ can hardly reflect the real rank of $\hat{C}_n$. It corresponds to the subspace of reduced rank $\hat{K} \leq N_c$ with the highest interference energy to cancel. To further minimize noise enhancement, one can also increase the observation dimension M×(2L−1), as will be described later as "X option", and so on.

Another alternative that reduces noise enhancement constrains the beamformer to implement a close-to-null response towards each null-constraint instead of an exact null-response. This "relaxation" of the null-response leaves more degrees of freedom for ambient noise reduction (i.e., less amplification). It usually amounts to upper-bounding the amplitude of the beamformer response towards each null-constraint to be less than a maximum threshold. This technique is well-known and classified in the literature as a "robust beamforming" method. We can combine it with ISR to reduce noise enhancement.

Constraint relaxation in robust beamforming is usually solved as an optimization problem under constraints using the Lagrange multipliers technique. Without going into the mathematical details of such derivations, we directly provide intuition-based solutions that extend ISR beamforming in a seamless manner. We extend Equations (43) to (45) as follows:

$$\overline{C}_n = \hat{C}_n \Lambda_n, \quad (I1)$$

$$\overline{Q}_n = (\overline{C}_n^H \overline{C}_n + \lambda I_{N_c})^{-1}, \quad (I2)$$

$$\Pi_n = I_{M^*(2L-1)} - \overline{C}_n \overline{Q}_n \overline{C}_n^H, \quad (I3)$$

$$\underline{W}_n^d = \frac{\Pi_n Y_{0,n}^d}{Y_{0,n}^{dH} \Pi_n Y_{0,n}^d}, \quad (I4)$$

where $\Lambda_n$ is a $N_c \times N_c$ diagonal matrix of positive weights and $\lambda$ an additional weighting factor.

The above extended ISR solution reduces to that of Equations (43) to (45) by setting $\Lambda_n = I_{N_c}$ and $\lambda=0$. It also covers the particular case of MMSE (minimum mean square error) combining also known in the beamforming literature as MVDR (minimum variance distortionless response) beamforming. Along the model equation (28), the MMSE or MVDR beamforming solution is given by:

$$\underline{W}_n^d = \frac{R_{I+N}^{-1} Y_{0,n}^d}{Y_{0,n}^{dN} R_{I+N}^{-1} Y_{0,n}^d}, \quad (I5)$$

where $R_{\underline{I}+\underline{N}}$ is the correlation matrix of the interference-plus-noise vector $\underline{I}_n + \underline{N}_n$. Assuming that the additive noise vector is spatially and temporally uncorrelated with variance $\sigma_N^2$, $R_{\underline{I}+\underline{N}}$ is given by:

$$R_{\underline{I}+\underline{N}} = C_n \Phi_n C_n^H + \sigma_N^2 I_{M^*(2L-1)}, \quad (I6)$$

where $C_n$ is the constraint matrix defined along one of the ISR modes described previously, but without normalization column-wise. Depending on the signal parameters assumed unknown a priori (cf., discussion above Equation (15)), the conditional statistical mean in $R_{\underline{I}+\underline{N}}$ gives rise to a particular interference decomposition in $C_n$ along the corresponding ISR mode. The $N_c \times N_c$ diagonal matrix $\Phi_n$ holds the power of the unknown signal parameters along which interference is decomposed.

In the TR mode, interference characterization is quasi-deterministic with:

$$\Phi_n = [1].$$

In the R mode, we have:

$$\Phi_n = diag[(\overline{\psi}_n^1)^2, \ldots, (\overline{\psi}_n^{NI})^2],$$

while in the D mode, we have:

$$\Phi_n = diag[(\overline{\psi}_n^1)^2 |\overline{\zeta}_{1,n}^1|^2, \ldots, (\overline{\psi}_n^1)^2 |\overline{\zeta}_{N_f,n}^1|^2, \ldots, (\overline{\psi}_n^{NI})^2 |\overline{\zeta}_{1,n}^{NI}|^2, \ldots, (\overline{\psi}_n^{NI})^2 |\overline{\zeta}_{N_f,n}^{NI}|^2],$$

where $(\overline{\psi}_n^i)^2$ and $|\overline{\zeta}_{N_T,n}^i|^2$ both denote local averages in time of $(\psi_n^i)^2$ and $|\zeta_{N_T,n}^i|^2$, respectively. The H mode gives:

$$\Phi_n = diag[(\overline{\psi}_n^1)^2, (\overline{\psi}_n^1)^2, (\overline{\psi}_n^1)^2, \ldots, (\overline{\psi}_n^{NI})^2, (\overline{\psi}_n^{NI})^2, (\overline{\psi}_n^{NI})^2].$$

Using the inversion lemma, the inverse of $R_{\underline{I}+\underline{N}}$ can be written as:

$$R_{\underline{I}+\underline{N}}^{-1} = \frac{1}{\sigma_n^2}[I_{M^*(2L-1)} - C_n \Phi_n^{1/2}(\Phi_n^{1/2} C_n^H C_n \Phi_n^{1/2} + \sigma_n^2 I_{N_\sigma})\Phi_n^{1/2} C_n^H], \quad (I7)$$

The MMSE or MVDR beamforming can therefore be identified with the extended ISR solution using:

$$\lambda = \hat{\sigma}_N^2, \tag{I8}$$

and:

$$\Lambda_n = \begin{cases} [1] \text{ in the } TR \text{ mode,} \\ [\hat{\psi}_n^1, \ldots, \hat{\psi}_n^{NI}] \text{ in the } R \text{ mode,} \\ [\hat{\psi}_n^1|\hat{\zeta}_{1,n}^1|, \ldots, \hat{\psi}_n^1|\hat{\zeta}_{N_f,n}^1|, \ldots, \hat{\psi}_n^{NI}|\hat{\zeta}_{1,n}^{NI}|, \ldots, \hat{\psi}_n^{NI}|\hat{\zeta}_{N_f,n}^{NI}|] \text{ in the } D \text{ mode,} \\ [\hat{\psi}_n^1, \hat{\psi}_n^1, \hat{\psi}_n^1, \ldots, \hat{\psi}_n^{NI}, \hat{\psi}_n^{NI}, \hat{\psi}_n^{NI}] \text{ in the } H \text{ mode.} \end{cases}$$

The instantaneous estimates in the equation above can be further averaged or smoothed in time. The columns of the constraint matrix estimate $\hat{C}_n$ are reconstructed without normalization.

Although the MMSE version of ISR serves as a method to reduce noise enhancement, it is still sensitive to hard-decision errors for modes using decision feed-back. Using weights in a different way is a method to reduce sensitivity to hard-decision errors. We notice that the ISR combined signal estimate can be formulated as:

$$\underline{W}_n^{d^H}\underline{Y}_n = (\underline{Y}_{0,n}^{d^H}\Pi_n\hat{Y}_{0,n}^d)^{-1}\hat{Y}_{0,n}^{d^H}(\underline{Y}_n - \hat{C}_n Q_n \hat{C}_n^H \underline{Y}_n), \tag{I9}$$

$$= (\hat{Y}_{0,n}^{d^H}\Pi_n\hat{Y}_{0,n}^d)^{-1}\hat{Y}_{0,n}^{d^H}(\underline{Y}_n - \hat{C}_n \underline{v}_n), \tag{I10}$$

$$= (\hat{Y}_{0,n}^{d^H}\Pi_n\hat{Y}_{0,n}^d)^{-1}\hat{Y}_{0,n}^{d^H}(\underline{Y}_n - \hat{I}_n^1 - \ldots - \hat{I}_n^{N_c}). \tag{I11}$$

The last reformulation stresses that $\hat{C}_n\underline{v}_n$ can be understood as a sum of estimated interference vectors corresponding to the ISR mode applied. For instance each of these estimates corresponds to an interfering user in ISR-R. It can be shown that if tentative decisions, used to form the i-th constraint, are wrong, the corresponding constraint will sometimes be amplified rather than rejected[2]. This amplification is mitigated by considering the alternative projector:

$$\Pi_{\Lambda,n} = I - C_n Q_n \Lambda_n C_n^H, \tag{I12}$$

where $\Lambda_n$ is a diagonal matrix of weights. Using this projection, Equation (I11) is modified as:

$$\underline{W}_n^{d^H}\underline{Y}_n = \tag{I13}$$

$$(\hat{Y}_{0,n}^{d^H}\Pi_{\Lambda,n}\hat{Y}_{0,n}^d)^{-1}\hat{Y}_{0,n}^{d^H}(\underline{Y}_n - \{\Lambda_n\}_{1,1}\hat{I}_n^1 - \ldots - \{\Lambda_n\}_{N_c,N_c}\hat{I}_n^{N_c}).$$

This modification means that the interferer is never completely rejected although tentative decisions are all correct; however, the penalty arising from wrong decisions is reduced as well. For ISR-R and ISR-D it can be shown that the optimal weight to be applied to columns representing interferer i is $\{\Lambda_n\}_{i,i}(1-2SER(i))$ where SER(i) is the Symbol Error Rate of the tentative decisions associated with interferer i.

[2] This is true when the tentative decision, which is in error, is temporally overlapping the current bit.

It should be noted that each of the receivers of FIGS. 13, 15, 16, 17 and 20 could be modified to perform ISR "after despreading" of the observation matrix $Y_n$, in effect in much the same way that the generic "after despreading" receiver of FIG. 11 differs from the generic "without despreading" receiver of FIG. 9. Such modified receivers will now be described with reference to FIGS. 21 to 26.

Figure 21:
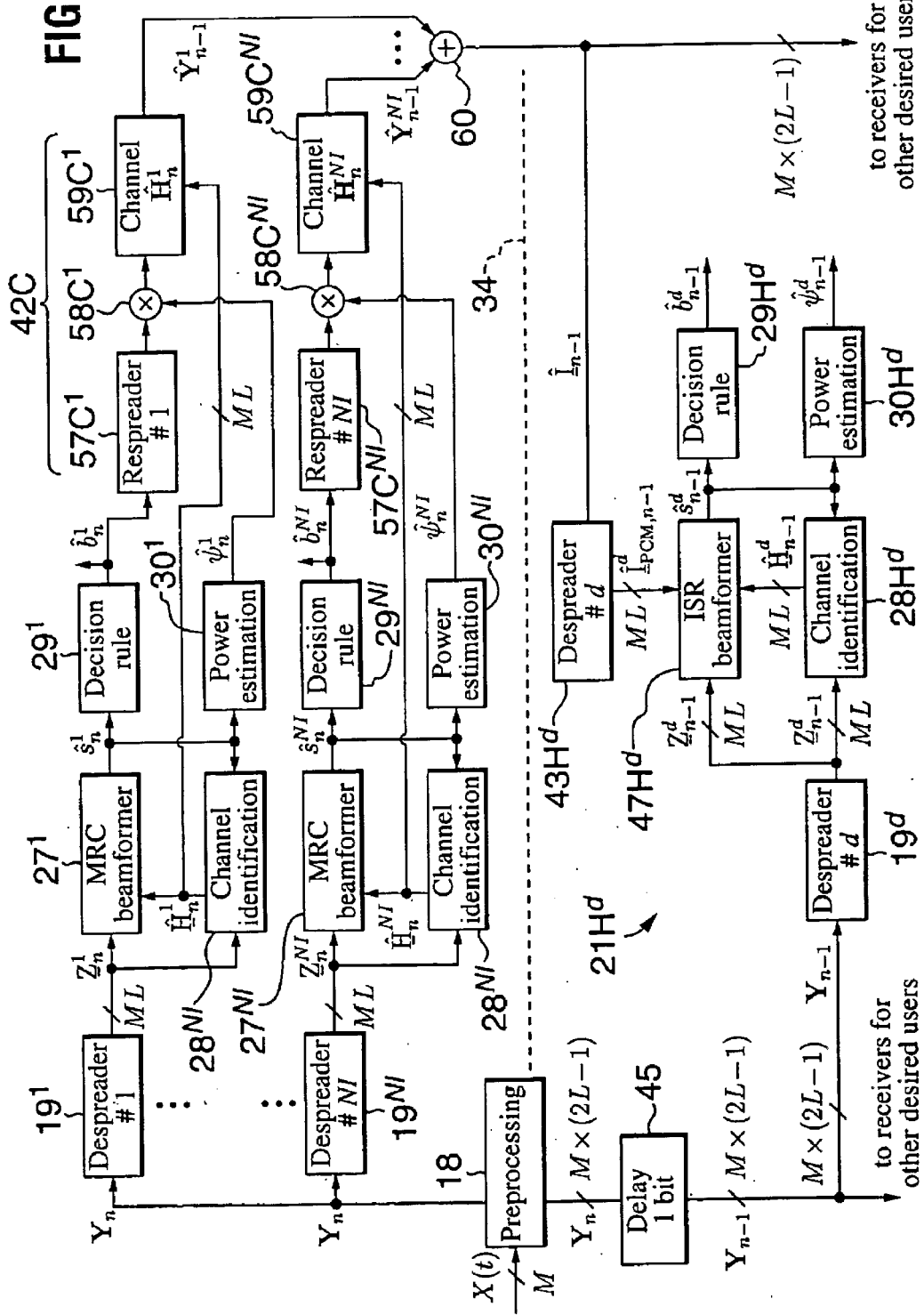
FIG. 21 is a simplified schematic block diagram of a receiver similar to the ISR-TR receiver shown in FIG. 13 but in which the beamformer operates upon the data that has first been despread.

Thus, in the ISR-TR receiver shown in FIG. 21, which corresponds to that shown in FIG. 13, the delay 45 delays the observation matrix $Y_n$ from the preprocessing unit 18 by 1 bit period and supplies the resulting delayed observation matrix $Y_{n-1}$, in common, to each of the low-power user receiver modules in set D. Only one of these receiver modules, 20H$^d$, is shown in FIG. 21, since all are identical. The observation matrix $Y_{n-1}$ is despread by despreader 19$^d$ and the resulting post-correlation observation vector $\underline{Z}_{n-1}^d$ is supplied to both the channel identification unit 28H$^d$ and the beamformer 47H$^d$. The receiver modules of set I and the constraints-set generator 42C are identical to those in the receiver shown in FIG. 13, and supply the matrices $\hat{Y}_{n-1}^1 \ldots \hat{Y}_{n-1}^{NI}$ to an adder 60 which adds them to form the total interference matrix $\hat{I}_{n-1}$ which it supplies to each of the receiver modules in set D.

Receiver module 20H$^d$ is similar to that shown in FIG. 13 but has a second despreader 43H$^d$ which uses the spreading code for user d to despread the total interference matrix $\hat{I}_{n-1}$ to form the user-specific constraint matrix as a single column vector $\hat{\underline{I}}_{PCM,n-1}^d$. This despreader 43H$^d$, in effect, constitutes a user-specific constraint matrix generator because the constraint matrix is a vector and an inverse matrix is not needed. Also, in this case, the channel identification unit 28H$^d$ supplies the channel vector estimate $\underline{\hat{H}}_{n-1}^d$ to the beamformer 47H$^d$.

It should be noted that the despread data vector $\underline{Z}_{n-1}^d$ is equal to $\underline{H}_n^d s_n^d + \underline{I}_{PCM,n}^d + \underline{N}_n^d$, where $\underline{H}_n^d$ is the channel response for user station 10$^d$, $s_n^d$ is the signal transmitted by the mobile station 10$^d$ of user d, and $\underline{I}_{PCM,n}^d$ is the interference component present in the signal $\underline{Z}_n^d$ as a result of interference from the signals from the other user stations 10$^i$ in set I, where $\underline{I}_{PCM,n}^d$ is as defined in Equation (14). The value $\underline{N}_{PCM,n}^d$ is additional noise which might comprise, for example, the summation of the interference from all of the other users on the system at that time, as well as thermal noise. "Other users" means other than those covered by the channels in set I.

As before, the coefficients of the beamformer 47H$^d$ are tuned according to Equations (16) to (18) and the constraint matrix is defined by a single null-constraint (i.e., $N_c=1$) as:

$$\hat{C}_{PCM,n}^d = \left[\frac{\hat{\underline{I}}_{PCM,n}^d}{\|\hat{\underline{I}}_{PCM,n}^d\|}\right] = \left[\frac{\sum_{i=1}^{NI}\hat{\underline{I}}_{PCM,n}^{d,i}}{\left\|\sum_{i=1}^{NI}\hat{\underline{I}}_{PCM,n}^{d,i}\right\|}\right] \tag{58}$$

where the estimate $\hat{\underline{I}}_{PCM,n}^d$ is obtained by despreading the matrix $\hat{I}_n$ (see Equations (47) and (48)) with the spreading sequence of the desired low-power user.

Figure 22:
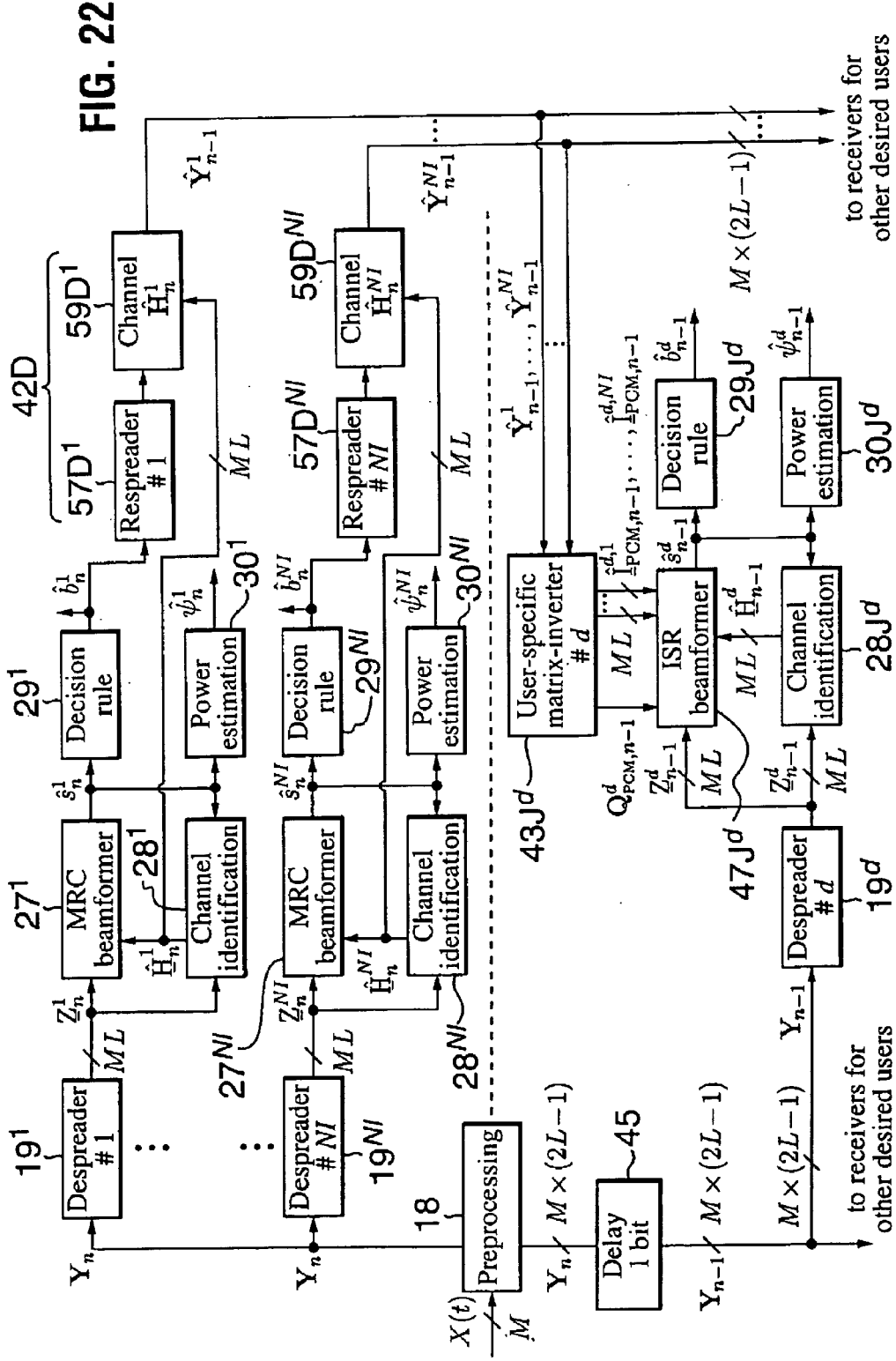
FIG. 22 is a simplified schematic block diagram of a receiver similar to the ISR-R receiver shown in FIG. 15 but in which the beamformer operates upon data that has first been despread.

FIG. 22 shows a similar modification to the low-power (set D) receiver modules of the "without despreading" ISR-R receiver of FIG. 15. In this case, the output of the constraint-set generator 42D, as before, comprises the matrices $\hat{Y}_{n-1}^1 \ldots \hat{Y}_{n-1}^{NI}$. As before, only receiver module 20J$^d$ is shown in FIG. 22 and is identical to that shown in FIG. 21 except that the second despreader 43H$^d$ is replaced by a user-specific constraint matrix generator 43J$^d$ of the kind shown in FIG. 12. The channel identification unit 28J$^d$ again supplies the vector $\underline{\hat{H}}_{n-1}^d$ to the beamformer 47J$^d$. The bank of despreaders in the user-specific constraint matrix generator $43J^d$ despread the respective ones of the matrices $\hat{Y}_{n-1}^1 \ldots \hat{Y}_{n-1}^{NI}$ to form the vectors $\hat{\underline{I}}_{PCM,n-1}^{d,1}, \ldots, \hat{\underline{I}}_{PCM,n-1}^{d,NI}$ which constitute the columns of the user-specific constraint matrix $\hat{C}_{PCM,n-1}^d$ and the matrix inverter $46B^d$ produces the corresponding inverse matrix $Q_{PCM,n-1}^d$. Both of these matrices are supplied to the associated beamformer $47J^d$ which uses them and the channel vector estimate $\hat{\underline{H}}_{n-1}^d$ to adjust its coefficients that are used to weight the elements of the post-correlation observation vector $\underline{Z}_{n-1}^d$. As before, the coefficients are adjusted according to Equations (16) to (18) and the constraint matrix is defined by NI null-constraints (i.e., $N_c$=NI) as:

$$\hat{C}_{PCM,n}^d = \left[ \frac{\hat{\underline{I}}_{PCM,n}^{d,1}}{\|\hat{\underline{I}}_{PCM,n}^{d,1}\|}, \ldots, \frac{\hat{\underline{I}}_{PCM,n}^{d,NI}}{\|\hat{\underline{I}}_{PCM,n}^{d,NI}\|} \right], \quad (59)$$

where each estimate $\hat{\underline{I}}_{PCM,n}^{d,i}$ is obtained by despreading the matrix $\hat{Y}_n^i$ of Equation (50) with the spreading sequence of the desired low-power user.

Figure 23:
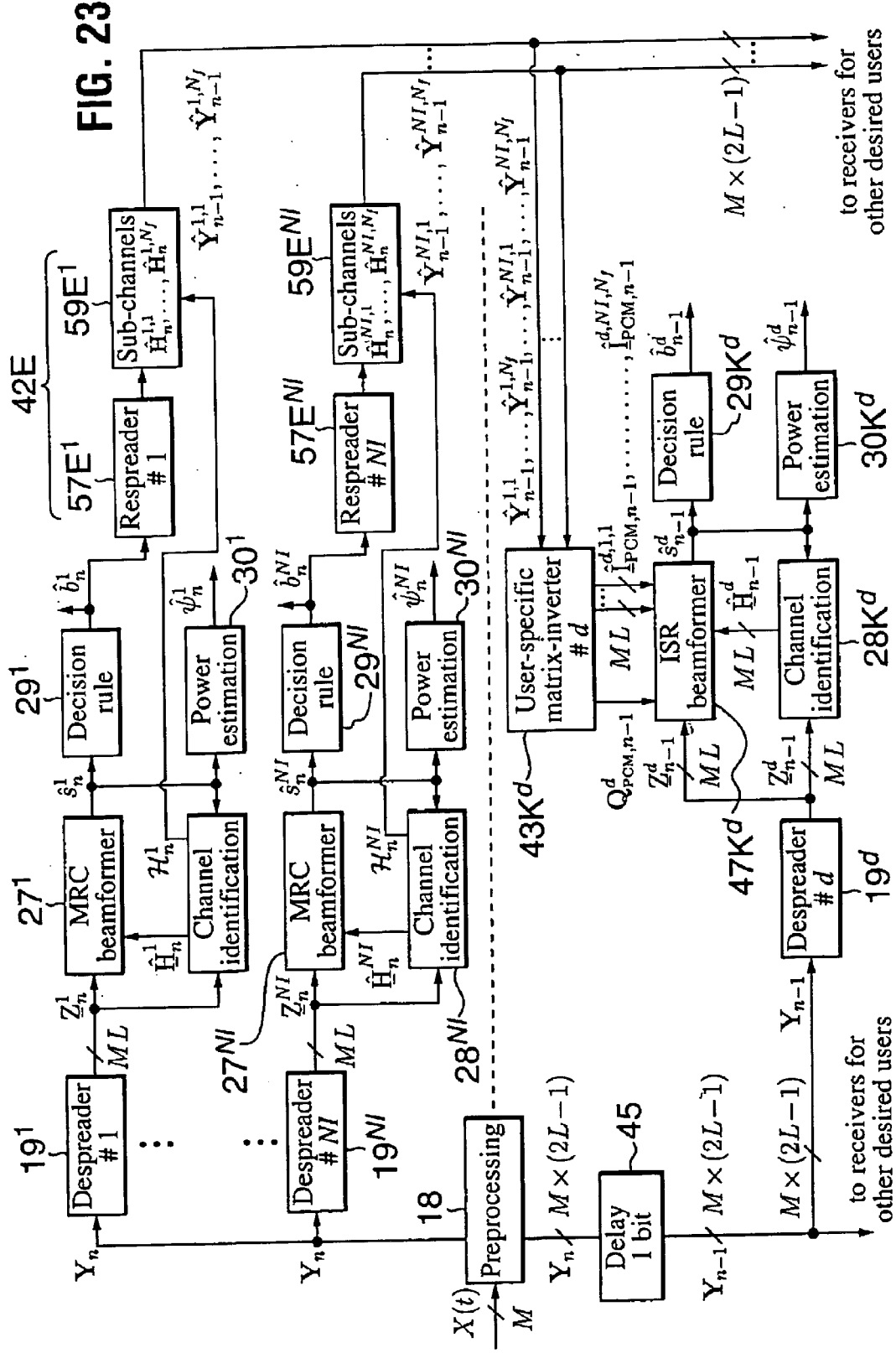
FIG. 23 is a simplified schematic block diagram of a receiver similar to the ISR-D receiver shown in FIG. 16 but in which the beamformer operates upon data that has first been despread.

FIG. 23 illustrates the modification applied to the low-power user receiver module of the ISR-D receiver of FIG. 16. Hence, there is no common matrix inverter. Instead, in the receiver of FIG. 23, each of the receiver modules of set D has a user-specific constraint matrix generator 43K which receives the constraints from the constraints-set generator 42E. As illustrated, user-specific constraint matrix generator $43K^d$ processes the sets of matrices $\hat{Y}_{n-1}^{1,1} \ldots \hat{Y}_{n-1}^{1,N_f}, \ldots; \hat{Y}_{n-1}^{NI,1}, \ldots, \hat{Y}_{n-1}^{NI,N_f}$ to form the set of vectors $\hat{\underline{I}}_{PCM,n-1}^{d,1,1} \ldots \hat{\underline{I}}_{PCM,n-1}^{d,1,N_f}; \ldots; \hat{\underline{I}}_{PCM,n-1}^{d,NI,1}, \ldots, \hat{\underline{I}}_{PCM,n-1}^{d,NI,N_f}$, which constitute the columns of user-specific constraint matrix $\hat{C}_{PCM,n-1}^d$, and the corresponding inverse matrix $Q_{PCM,n-1}^d$ n which it supplies to the beamformer $47K^d$. As before, the beamformer $47K^d$ tunes its coefficients according to Equations (16) and (18). The constraint matrix is defined by $N_f$NI null-constraints (i.e., $N_{c=Nf}\times NI=M\times P\times NI$) as:

$$\hat{C}_{PCM,n}^d = \left[ \frac{\hat{\underline{I}}_{PCM,n}^{d,1,1}}{\|\hat{\underline{I}}_{PCM,n}^{d,1,1}\|}, \ldots, \frac{\hat{\underline{I}}_{PCM,n}^{d,1,N_f}}{\|\hat{\underline{I}}_{PCM,n}^{d,1,N_f}\|}, \ldots, \frac{\hat{\underline{I}}_{PCM,n}^{d,NI,1}}{\|\hat{\underline{I}}_{PCM,n}^{d,NI,1}\|}, \ldots, \frac{\hat{\underline{I}}_{PCM,n}^{d,NI,N_f}}{\|\hat{\underline{I}}_{PCM,n}^{d,NI,N_f}\|} \right], \quad (60)$$

where each estimate $\hat{\underline{I}}_{PCM,n}^{d,i,f}$ is obtained by despreading $\hat{\underline{Y}}_n^{i,f}$ of Equation (52) with the spreading sequence of the desired low-power user.

Figure 24:
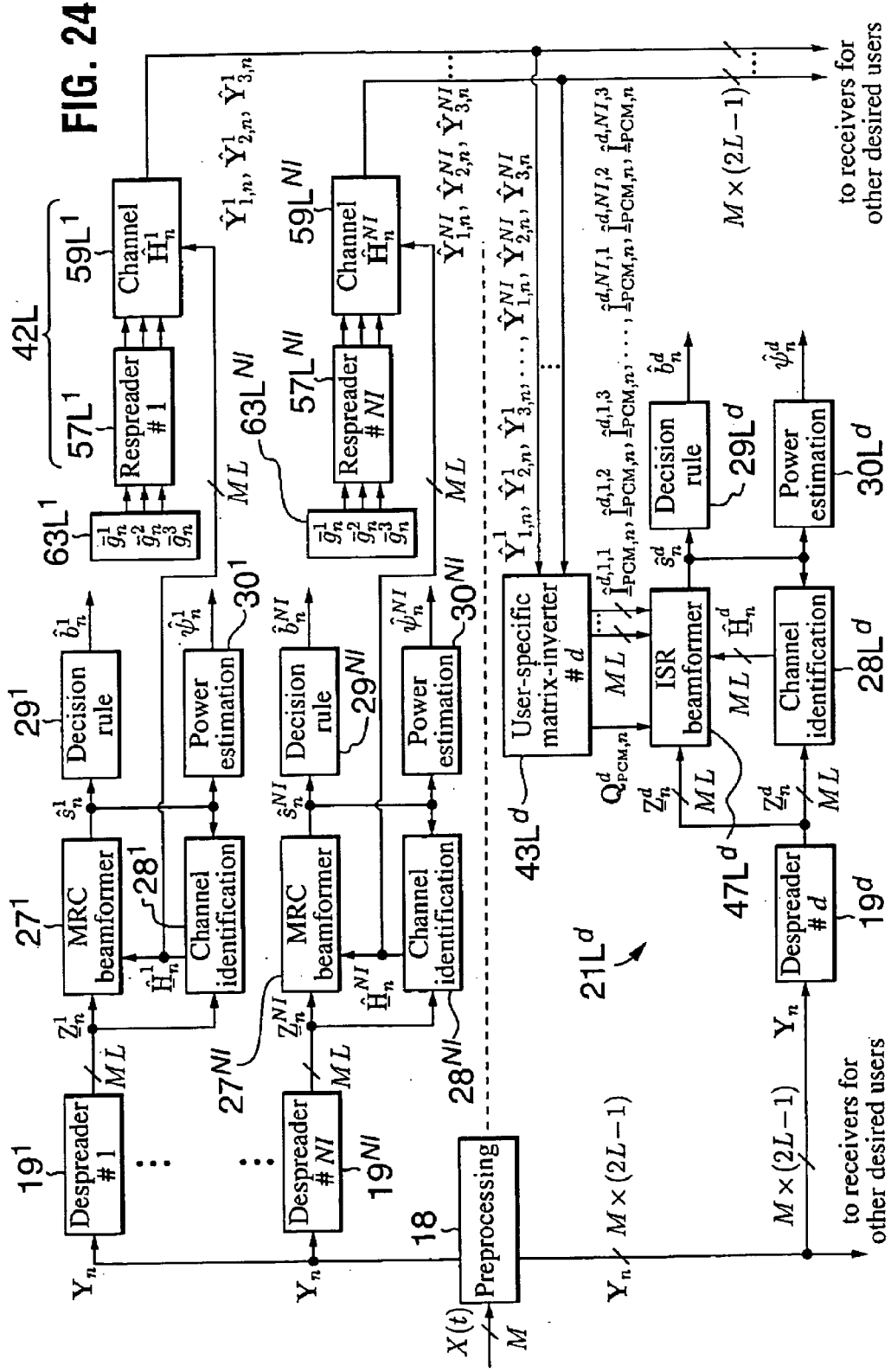
FIG. 24 is a simplified schematic block diagram of a receiver similar to the ISR-H receiver shown in FIG. 18 but in which the beamformer operates upon data that has first been despread.

FIG. 24 illustrates application of the modification to the ISR-H receiver of FIG. 17. Again, the common constraint matrix generator (43F) is replaced by a user-specific constraint matrix generator $43L^d$ in receiver module $20L^d$ and similarly in the other receiver modules of set D. The constraints-set generator 42L differs from constraints-set generator 42F of FIG. 17 because its bit sequence generators $63L^1, \ldots, 63L^{NI}$ use different generating sequences. The sets of matrices $\hat{Y}_{1,n}^1, \hat{Y}_{2,n}^1, \hat{Y}_{3,n}^1; \ldots; \hat{Y}_{1,n}^{NI}, \hat{Y}_{2,n}^{NI}, \hat{Y}_{3,n}^{NI}$ from the constraints-set generator 42F are processed by the user-specific constraint matrix generator $43L^d$ to form the vectors $\hat{\underline{I}}_{1,n}^{d,1}, \hat{\underline{I}}_{2,n}^{d,1}, \hat{\underline{I}}_{3,n}^{d,1}; \ldots; \hat{\underline{I}}_{1,n}^{d,NI}, \hat{\underline{I}}_{2,n}^{d,NI}, \hat{\underline{I}}_{3,n}^{d,NI}$ which constitute the columns of the user-specific constraint matrix $\hat{C}_{PCM,n}^d$, and the matrix inverter (not shown) produces the corresponding inverse matrix $Q_{PCM,n}^d$. The constraint matrix $\hat{C}_{PCM,n}^d$ and the inverse matrix $Q_{PCM,n}^d$ are used by the beamformer $47L^d$, together with the channel vector estimate $\hat{\underline{H}}_n^d$, to adjust its coefficients that are used to weight the elements of the post-correlation observation vector $\underline{Z}_n^d$ received from despreader $19^d$. As before, the coefficients are adjusted according to Equations (16) and (18) and the constraint matrix is defined by 3NI null-constraints (i.e., $N_c$=3NI) as:

$$\hat{C}_{PCM,n}^d = \left[ \frac{\hat{\underline{I}}_{PCM,n}^{d,1,1}}{\|\hat{\underline{I}}_{PCM,n}^{d,1,1}\|}, \frac{\hat{\underline{I}}_{PCM,n}^{d,1,2}}{\|\hat{\underline{I}}_{PCM,n}^{d,1,2}\|}, \right. \quad (61)$$

$$\left. \frac{\hat{\underline{I}}_{PCM,n}^{d,1,3}}{\|\hat{\underline{I}}_{PCM,n}^{d,1,3}\|}, \ldots, \frac{\hat{\underline{I}}_{PCM,n}^{d,NI,1}}{\|\hat{\underline{I}}_{PCM,n}^{d,NI,1}\|}, \frac{\hat{\underline{I}}_{PCM,n}^{d,NI,2}}{\|\hat{\underline{I}}_{PCM,n}^{d,NI,2}\|}, \frac{\hat{\underline{I}}_{PCM,n}^{d,NI,3}}{\|\hat{\underline{I}}_{PCM,n}^{d,NI,3}\|} \right],$$

where each estimate $\hat{\underline{I}}_{PCM,n}^{d,i,k}$ is obtained by despreading the matrix $\hat{Y}_{k,n}^i$ with the spreading sequence of the desired low-power user.

In this case, each of the bit sequence generators $63L^1, \ldots, 63L^{NI}$ uses four generating bit sequences $\bar{g}^1(t), \bar{g}^2(t), \bar{g}^3(t)$ and $\bar{g}^4(t)$ as shown in FIG. 25.

It should be noted that, in any frame of duration 3T in FIG. 25, a bit triplet of any of the four generating sequences is a linear combination of the others. Therefore, any one of the four possible realisations of each interference vector is a linear combination of the others and the corresponding null-constraint is implicitly implemented by the three remaining null-constraints. The four null-constraints are restricted arbitrarily to the first three possible realisations.

Figure 26:
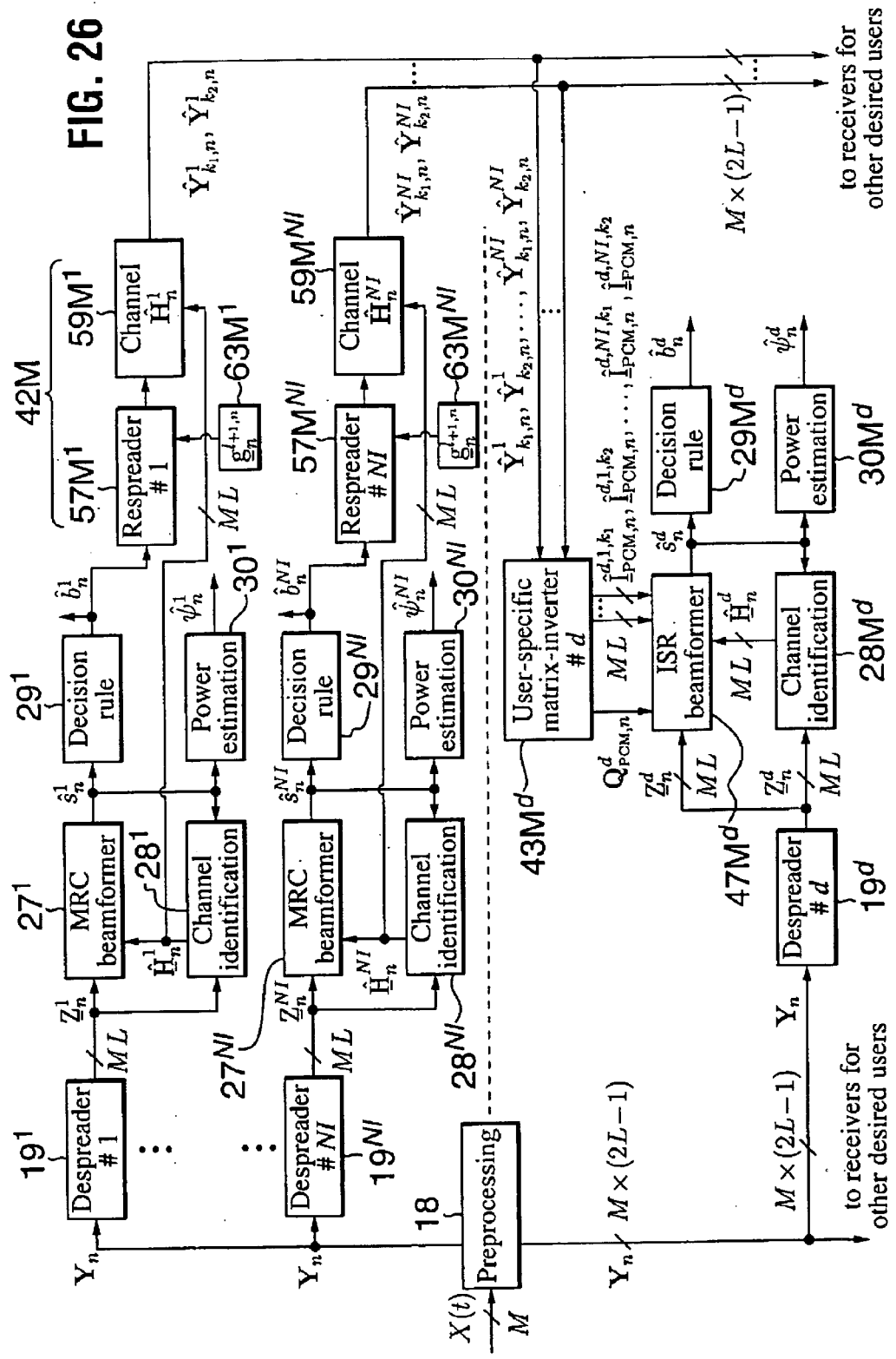
FIG. 26 is a simplified schematic block diagram of a receiver similar to the ISR-RH receiver shown in FIG. 20 but in which the beamformer operates upon data that has first been despread.

FIG. 26 illustrates application of the modification to the ISR-RH receiver of FIG. 20. Again, the common constraint matrix generator 43G of FIG. 20 is replaced by a set of user-specific constraint matrix generators, $43M^d$ in receiver module $20M^d$ and similarly in the other receiver modules of set D. The constraints-set generator 42M shown in FIG. 26 differs slightly from that (42G) shown in FIG. 20 because each of the bit sequence generators $63M^1, \ldots, 63M^{NI}$ in the receiver of FIG. 26 generate the bit sequence $g_n^{l+1,n}$.

The user-specific constraint generator $43M^d$ processes the pairs of constraint-set matrices $\hat{Y}_{k_1,n}^1, \hat{Y}_{k_2,n}^1; \ldots; \hat{Y}_{k_1,n}^{NI}, \hat{Y}_{k_2,n}^{NI}$ from the channel identification units $59M^1, \ldots, 59M^{NI}$, respectively, by to produce the corresponding set of vectors $\hat{\underline{I}}_{PCM,n}^{d,1,k_1}, \hat{\underline{I}}_{PCM,n}^{d,1,k_2}; \ldots; \hat{\underline{I}}_{PCM,n}^{d,NI,k_1}, \hat{\underline{I}}_{PCM,n}^{d,NI,k_2}$ which constitute the columns of the user-specific constraint matrix $\hat{C}_{PCM,n}^d$, and to produce the corresponding inverse matrix $Q_{PCM,n}^d$. The constraint matrix $\hat{C}_{PCM,n}^d$ and the inverse matrix $Q_{PCM,n}^d$ are used by the beamformer $47M^d$, together with the channel vector estimate $\hat{\underline{H}}_n^d$, to adjust its coefficients that are used to weight the elements of the post-correlation observation vector $\underline{Z}_n^d$ received from despreader $19^d$. As before, the coefficients are adjusted according to Equations (16) to (18) and the constraint matrix is defined by 2NI null-constraints (i.e., $N_c$=2NI) as follows:

$$\hat{C}_{PCM,n}^d = \left[ \frac{\hat{\underline{I}}_{PCM,n}^{d,1,k_1}}{\|\hat{\underline{I}}_{PCM,n}^{d,1,k_1}\|}, \frac{\hat{\underline{I}}_{PCM,n}^{d,1,k_1}}{\|\hat{\underline{I}}_{PCM,n}^{d,1,k_2}\|}, \ldots, \frac{\hat{\underline{I}}_{PCM,n}^{d,NI,k_1}}{\|\hat{\underline{I}}_{PCM,n}^{d,NI,k_1}\|}, \frac{\hat{\underline{I}}_{PCM,n}^{d,NI,k_2}}{\|\hat{\underline{I}}_{PCM,n}^{d,NI,k_1}\|} \right], \quad (62)$$

where each pair of estimates $\hat{\underline{I}}_{PCM,n}^{d,i,k_1}$ and $\hat{\underline{I}}_{PCM,n}^{d,i,k_2}$ is obtained by despreading the matrices $\hat{Y}_{k_1,n}^i$ and $\hat{Y}_{k_2,n}^i$, respectively, with the spreading sequence of the desired low-power user.

Inter-Symbol Interference (ISI) Rejection

In any of the above-described embodiments of the invention it may be desirable to reduce inter-symbol interference in the receiver modules in set D, especially when low processing gains are involved. As noted in the PCM model where despreading reduces ISI to a negligible amount, for a large processing gain, $\underline{Y}_{0,n}^{d^H}\underline{Y}_{-1,n}^d \approx 0$ and $\underline{Y}_{0,n}^{d^H}\underline{Y}_{+1,n}^d \approx 0$. Hence, the before despreading spatio-temporal beamformer $\underline{W}_n^d$ approximately implements the following additional constraints:

$$\begin{cases} \underline{W}_n^{d^H}\hat{\underline{Y}}_{-1,n}^d \simeq 0, \\ \underline{W}_n^{d^H}\hat{\underline{Y}}_{+1,n}^d \simeq 0. \end{cases} \quad (63)$$

Accordingly, it rejects interference and significantly reduces ISI. Complete ISI rejection can be effected by modifying the receiver to make the set of the channel parameter estimators $\hat{b}_n^d$ available to the constraints-sets generator 42 for processing in parallel with those of the set I receiver modules. The resulting additional constraint matrix and inverse matrix would also be supplied to the beamformer 47$^d$ and taken into account when processing the data.

In such a case, the following matrix can be formed:

$$\hat{C}_{ISI,n}^d = \left[ \frac{\Pi_n \hat{Y}_{-1,n}^d}{\|\Pi_n \hat{Y}_{-1,n}^d\|}, \frac{\Pi_n \hat{Y}_{+1,n}^d}{\|\Pi_n \hat{Y}_{+1,n}^d\|} \right], \quad (64)$$

and the following 2×2 matrix $$Q_{ISI,n}^d = (\hat{C}_{ISI,n}^{d^H}\hat{C}_{ISI,n}^d)^{-1}, \quad (65)$$

inverted to obtain the constrained spatio-temporal beamformer $\underline{W}_n^d$ before despreading by:

$$\Pi_{ISI,n}^d = I_{M*(2L-1)} - \hat{C}_{ISI,n}^d Q_{ISI,n}^d \hat{C}_{ISI,n}^{d^H}, \quad (66)$$

$$\Pi_n^d = \Pi_{ISI,n}^d \Pi_n, \quad (67)$$

$$\underline{W}_n^d = \frac{\Pi_n^d \hat{Y}_{0,n}^d}{\hat{Y}_{0,n}^{d^H}\Pi_n^d \hat{Y}_{0,n}^d}. \quad (68)$$

The projector $\Pi_n$ is produced in the manner described earlier according to Equations (43) and (44). The projector $\Pi_n^d$ orthogonal to both $\hat{C}_{ISI,n}^d$ and $\hat{C}_n$, is formed and then the low-power response vector $\hat{\underline{Y}}_{0,n}^d$ is projected and normalized to form the beamformer which fully rejects ISI from the processed user d and interference from the NI users in set I.

Figure 27:
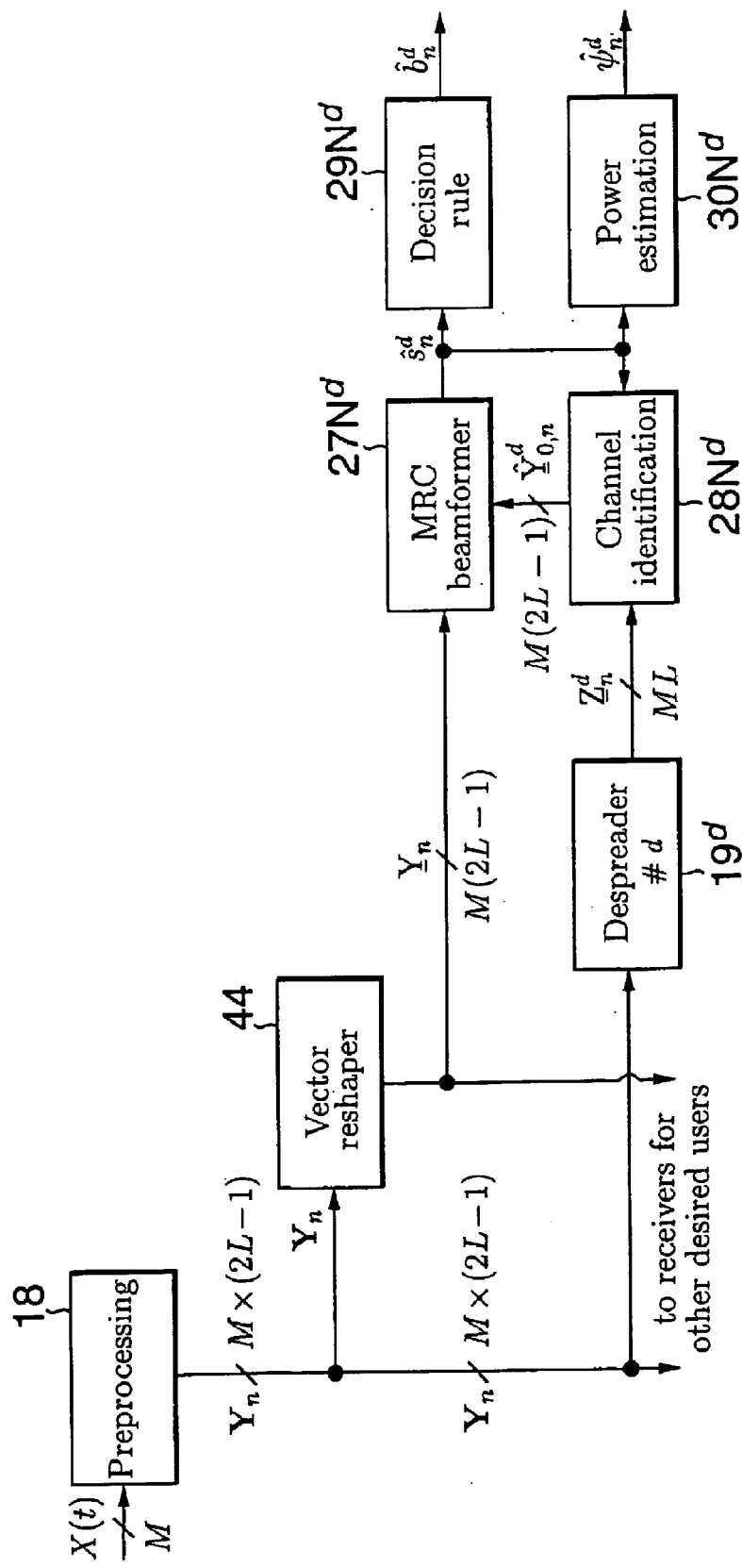
FIG. 27 illustrates an alternative STAR module which may be used in the receiver of FIG. 5 or in place of some of the receiver modules in the receivers of FIGS. 13–17, 20–24 and 26.

It should be noted that, if the suppression of strong interferers is not needed, ISI can still be rejected by the following beamformer:

$$\underline{W}_n^d = \frac{\Pi_{ISI,n}^d \hat{Y}_{0,n}^d}{\hat{Y}_{0,n}^{d^H}\Pi_{ISI,n}^d \hat{Y}_{0,n}^d}, \quad (69)$$

where projector $\Pi_n$ in Equation (67) would be set to identity and hence would have no effect. This is the same as setting the matrix $\hat{C}_n$ to null matrix. If the projector $\Pi_{ISI,n}^d$ in the above equation is replaced by an identity matrix, (equivalent to setting matrix $\hat{C}_{ISI,n}^d$ to null matrix) then a simple MRC beamformer is implemented before despreading. A receiver module using such an MRC beamformer is illustrated in FIG. 27 and could be used to replace any of the "contributors" only receiver modules, such as receiver modules $20^1, \ldots, 20^{NI}$ in FIG. 9 et seq. The receiver module shown in FIG. 27 is similar to receiver module 20A$^d$ of FIG. 9 except that the ISR beamformer 47A$^d$ is replaced by an MRC beamformer 27N$^d$ which implements the equation $$\underline{W}_n^d = \frac{\hat{Y}_{0,n}^d}{\|\hat{Y}_{0,n}^d\|^2}. \quad (70)$$

It is also envisaged that the receiver module of FIG. 27 using the MRC beamformer denoted $\underline{W}_{MRC,n}^d$ in the following, could be incorporated into a STAR which did not use ISR, for example the STAR described in reference [13].

Pilot-Assisted ISR

STAR-ISR performs blind channel identification within a sign ambiguity (or quantized-phase ambiguity for MPSK). It hence avoids differential demodulation and enables quasi-coherent detection. However, differential decoding is still required at the cost of some loss in performance to resolve the sign ambiguity. To implement full coherent detection and avoid differential decoding, a pilot signal, i.e., a predetermined sequence of symbols known to the receiver (usually a constant "1" sequence), can be sent by the transmitter to enable the receiver to resolve the sign ambiguity. Two pilot types are common namely 1) A pilot-symbol will insert pilot symbols in the data sequence at predetermined symbol positions or iterations $n_\pi$, the other indices $n_\delta$ being allocated to the data symbols with some overhead loss; 2) A pilot-channel will multiplex the pilot sequence with the data sequence using a pair of distinct spreading codes $c_i^{\pi,u}$ and $c_i^{\delta,u}$; a fraction $\zeta^2/(1+\zeta^2)$ of the power available being allocated to the pilot, the rest $1/(1+\zeta^2)$ to the data with some relative power loss.

Figure 46:
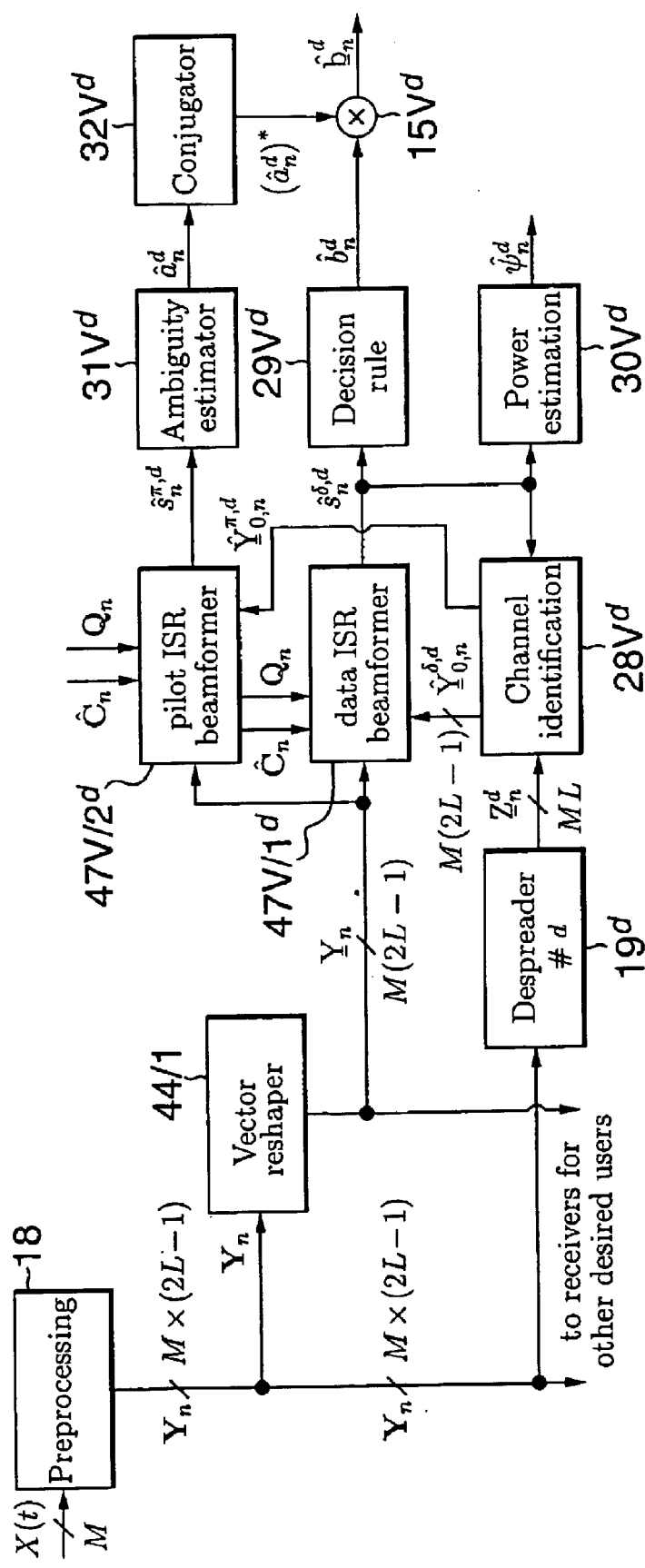
FIG. 46 illustrates an alternative ISR receiver module using pilot channels.

Pilot signals are usually used to perform channel identification. STAR-ISR achieves this task without a pilot and hence reduces the role of the pilot to a simple resolution of the phase ambiguity resulting from its blind channel identification approach. This new approach to pilot use enables significant reduction of the overhead or power fraction allocated to the pilot, as disclosed in references [21] and [31] in the single-user context of STAR on both uplink and downlink, respectively. Insertion of a pilot in STAR-ISR along the new approach is depicted by FIGS. 44 and 46 for a pilot-symbol and a pilot-channel, respectively.

Figure 44:
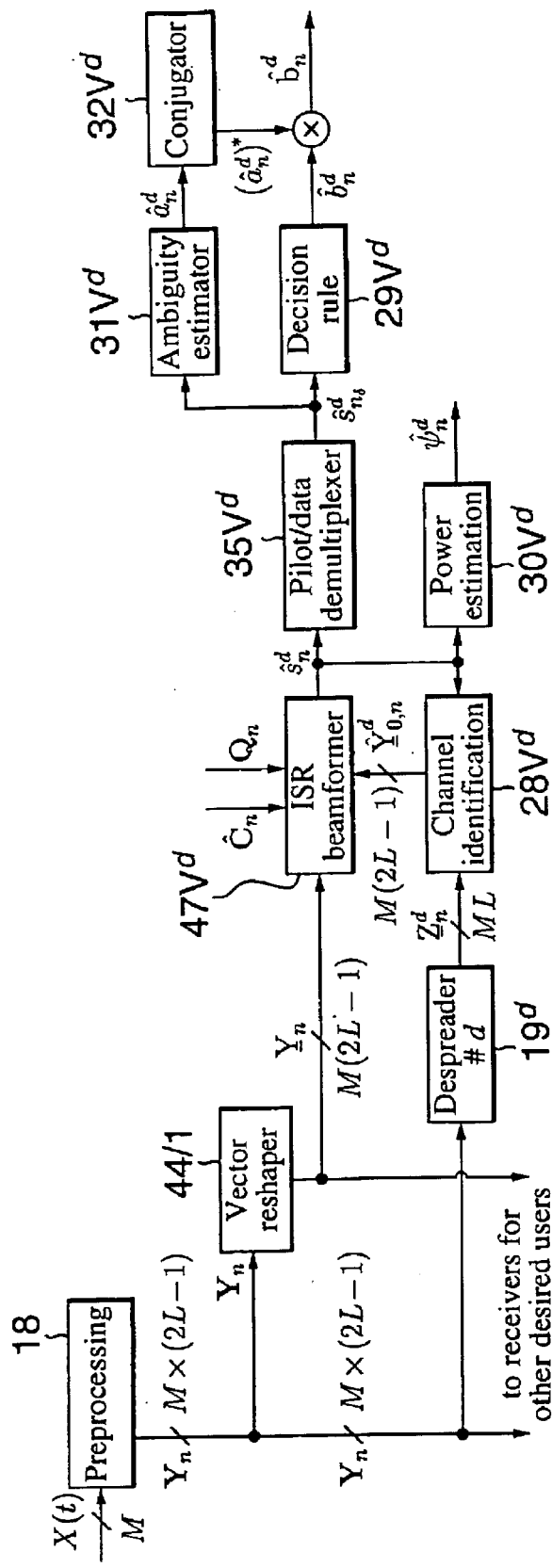
FIG. 44 illustrates an ISR receiver module using pilot symbols.

In FIG. 44, a pilot-symbol assisted ISR receiver is shown for user d. The ISR beamformer 47V$^d$ outputs the signal component estimates $\hat{s}_n^d$ and interacts with the channel identification and power control units 28V$^d$ and 30V$^d$ in the regular steps described earlier. However, an additional pilot/data demultiplexer 35V$^d$ at the beamformer output isolates the symbol positions $n_\delta$ and $n_\pi$ allocated to the data and the pilot. It hence extracts at the corresponding index positions two distinct streams of signal component estimates $\hat{s}_{n_\delta}^d$ and $\hat{s}_{n_\pi}^d$, respectively.

On one hand the data signal component estimates $\bar{s}_{n_\delta}^d \approx a^d \psi_n^d b_n^d$ delivered within a quantized phase ambiguity $a^d$ (i.e., belongs to the constellation) are fed to the decision rule unit 29V$^d$ to estimate the corresponding symbol estimates $\hat{b}_{n_\delta}^d \approx a^d b_n^d$ within the same phase ambiguity $a^d$.

Figure 45:
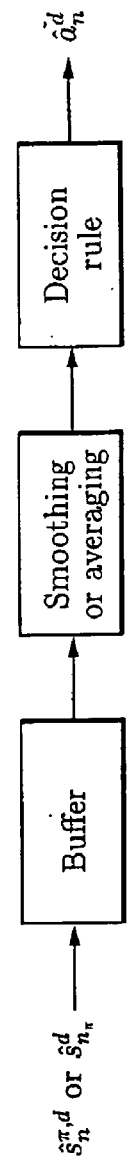
FIG. 45 illustrates in more detail an ambiguity estimator of the receiver module of FIG. 44.

On the other hand the pilot signal component estimates $\hat{s}_{n_i}^d \approx a^d \psi_n^d$, which basically hold the constant phase ambiguity within little fluctuation of the received power $(\psi_n^d)^2$, are fed to an ambiguity estimator 31V$^d$ shown in FIG. 45. This estimator buffers the pilot signal component estimates over a predetermined number of symbols. Once the buffer 33V$^d$ is full, the estimator averages (or smooths) the buffered values to significantly reduce the residual noise and hence minimize estimation errors using the averaging or smoothing unit $34V^d$. It then feeds the resulting average pilot signal component estimate to a decision rule unit $29V/2^d$ identical to the one used for the data (i.e., $29V^d$) to quantize and estimate the phase ambiguity $\hat{a}_n^d$. Once a new estimation is made, the buffer $33V^d$ is flushed and the phase ambiguity estimate is kept constant until a new estimate is derived when the buffer is filled again.

In the pilot-symbol assisted ISR receiver of FIG. 44, a conjugator $32V^d$ conjugates the ambiguity estimate and a multiplier $15V^d$ multiplies the resulting phase conjugate $(\hat{a}_n^d)^*$ with the data symbol estimate $\hat{b}_{n_i}^d \approx a^d b_n^d$ for phase ambiguity compensation. The resulting symbol estimate $\underline{b}_n^d \approx b_n$ is ambiguity-free and no longer needs differential decoding.

In FIG. 46, a pilot-channel assisted ISR receiver is shown for user d. To better understand this structure, it is necessary to develop the corresponding data model a step further beforehand. Taking into account the fact that user d uses a pair of spreading codes for pilot and data multiplexing with relative powers $\zeta^2$ and 1, respectively, the data model writes:

$$\underline{Y}_n = \underline{Y}_{0,n}^{\delta,d} s_n^{\delta,d} + \underline{Y}_{0,n}^{\pi,d} s_n^{\pi,d} + \underline{I}_n + \underline{N}_n$$

$$= \underline{Y}_{0,n}^{\delta,d} \psi_n^d b_n^d + \underline{Y}_{0,n}^{\pi,d} \psi_n^d \zeta + \underline{I}_n + \underline{N}_n,$$

where $s_n^{\delta,d}$ and $s_n^{\pi,d}$ denote the data and pilot signal components, respectively.

The received pilot and data signals can be seen as two separate users received from the same physical channel (i.e., $\underline{H}_n^d$ spread by a pair of codes to yield two spread channel versions $\underline{Y}_{0,n}^{\delta,d}$ and $\underline{Y}_{0,n}^{\pi,d}$).

In FIG. 46, a data ISR beamformer $47V/1^d$ tuned to the corresponding data spreading code outputs the data signal component estimates $\hat{s}_n^{\delta,d}$ and interacts with the channel identification and the power control units $28V^d$ and $30V^d$ in the regular steps described earlier. However, an additional pilot ISR beamformer $47V/2^d$ tuned to the corresponding pilot spreading code simultaneously provides pilot signal component estimates $\hat{s}_n^{\pi,d}$. Since the pilot power fraction is weaker than the data power, the channel identification unit $28V^d$ uses a more reliable and stronger feedback from the data signal component estimates. The channel estimate is spread by the pair of codes and the resulting estimates $\hat{\underline{Y}}_{0,n}^{\delta,d}$ and $\hat{\underline{Y}}_{0,n}^{\pi,d}$ are fed to the data and pilot ISR beamformers, $47V/1^d$ and $47V/2^d$, respectively. The data ISR beamformer $47V/1^d$ may not need to steer a null towards its own weak-power pilot channel.

On one hand, the data signal component estimates $\hat{s}_n^{\delta,d} \approx a^d \psi_n^d b_n^d$ are derived within a quantized phase ambiguity $a^d$. They are fed the decision rule unit $29V^d$ to estimate the data symbol estimates $\hat{b}_{n_i}^d = a^d b_n^d$ within the same phase ambiguity. On the other hand the pilot signal component estimates $\hat{s}_n^{\pi,d} \approx a^d \psi_n^d \zeta$ hold the constant phase ambiguity within little fluctuations of the received power fraction $\zeta^2 (\psi_n^d)^2$. Hence, in the same way described above for pilot-symbol assisted ISR, the ambiguity estimator $31V^d$ estimates the phase ambiguity $\hat{a}_n^d$, and forwards it to the conjugator $32V^d$ to have $(\hat{a}_n^d)^*$, then to the multiplier $15V^d$ for phase compensation of the data symbol estimate $\hat{b}_{n_i}^d \approx a^d b_n^d$. The resulting symbol estimate $\underline{b}_n^d \approx b_n$ is again ambiguity-free and no longer needs differential decoding.

Joint ISR Detection

In the foregoing embodiments of the invention, ISR was applied to a selected set D of users, typically users with a low data-rate, who would implement ISR in respect of a selected set I of high-rate users. Although this approach is appropriate in most cases, particularly when the number of high-rate users is very low, there may be cases where the mutual interference caused by other high-rate users is significant, in which case mutual ISR among high-rate users may be desired as well. Such a situation is represented by user sets M1 and M2 of FIG. 8. Hence, whereas in the foregoing embodiments of the invention, the receiver modules of set I do not perform ISR, but merely supply constraints sets for use by the receiver modules of set D, it is envisaged that some or all of the receiver modules in set M1 and M2 also could have beamformers employing ISR. Such a Joint ISR (J-ISR) embodiment will now be described with reference to FIG. 28, which shows only one receiver module, $20^i$, as an example. In any symbol period, each such receiver module $20^i(i)$ receives a constraint matrix $\hat{C}_{n-1}$ and an inverse matrix $Q_{n-1}$ and uses them in suppressing interference, including its own interference component, and (ii) contributes constraints to the constraint matrix $\hat{C}_n$ and inverse matrix $Q_n$ which will be used in the next symbol period. In the case of ISR-H mode receivers, which use hypothetical symbols, it is merely a matter of replacing the receiver modules in set I with receiver modules $20^d$ having ISR beamformers, since the constraints sets are generated by the hypothetical symbols from the bit sequence generators $63^1, \ldots, 63^{NI}$. Contrary to other ISR modes which require decision-feedback, in the ISR-H mode receiver module, no processing delay is required for one user to cancel another. Hence, ISR-H can be implemented to cancel strong interferers without successive interference cancellation or multistage processing, which will be described later.

Using $\hat{C}_n$ and $Q_n$ already computed, the ISR combiner for each interferer can be obtained readily by:

$$\underline{W}_n^i = \hat{C}_n Q_n \underline{R}_{3 \cdot (i-1)+1}, \quad (71)$$

where $\underline{R}_k = [0, \ldots, 0, 1, 0, \ldots, 0]^T$ is a (3NI)-dimensional vector with null components except for the k-th one. This implementation has the advantage of implicitly rejecting ISI among strong interferers with a single 3NI×3NI-matrix inversion.

For the ISR-TR, ISR-R and ISR-D modes, each receiver module, in effect, combines a receiver module of set I with a receiver module of set D, some components being omitted as redundant. Referring again to FIG. 28, which shows such a combined receiver module, the preprocessor 18 supplies the observation matrix $Y_n$ to a 1-bit delay 45 and a first vector reshaper 44/1, which reshapes the observation matrix $Y_n$ to form the observation vector $\underline{Y}_n$. A second vector reshaper 44/2 reshapes the delayed observation matrix $Y_{n-1}$ to form delayed observation vector $\underline{Y}_{n-1}$. These matrices and vectors are supplied to the receiver module $20P^i$ and to others of the receiver modules, together with the constraint matrix $\hat{C}_{n-1}$ and the inverse matrix $Q_{n-1}$ from a common constraint matrix generator 43P, which generates the constraint matrix $C_{n-1}$ and the inverse matrix $Q_{n-1}$ from the constraints-set $\mathcal{C}_{n-1}$ produced by constraint set generator 42P.

The receiver module $20P^i$ comprises a despreader $19^i$, a channel identification unit $28P^i$, a power estimation unit $30P^i$, and a decision rule unit $29P^i$, all similar to those of the above-described receiver modules. In this case, however, the receiver module $20P^i$ comprises two beamformers, one an ISR beamformer $47P^i$ and the other an MRC beamformer $27P^i$, and an additional decision rule unit $29P/2^i$ which is connected to the output of MRC beamformer $27P^i$. The ISR beamformer $47P^i$ processes the delayed observation vector $\underline{Y}_{n-1}$ to form the estimated signal component estimate $\hat{s}_{n-1}^i$ and supplies it to the first decision rule unit $29P^i$, the power estimation unit $30P^i$, and the channel identification unit $28P^i$, in the usual way. The decision rule unit $29P^i$ and the power estimation unit $30P^i$ operate upon the signal component estimate $\hat{s}_{n-1}{}^i$ to derive the corresponding symbol estimate $\hat{b}_{n-1}{}^i$ and the power estimate $\hat{\psi}_{n-1}{}^i$ and supply them to other parts of the receiver in the usual way.

The despreader $19^i$ despreads the delayed observation matrix $Y_{n-1}$ to form the post-correlation observation vector $\underline{Z}_{n-1}{}^i$ and supplies it to only the channel identification unit $28P^i$, which uses the post-correlation observation vector $\underline{Z}_{n-1}{}^i$ and the signal component estimate to produce both a spread channel vector estimate $\underline{\hat{Y}}_{0,n-1}{}^i$ and a set of channel vector estimates $\hat{b}_{n-1}{}^i$. At the beginning of the processing cycle, the channel identification unit $28P^i$ supplies the spread channel vector estimate $\underline{\hat{Y}}_{0,n-1}{}^i$ to both the ISR beamformer $47P^i$ and the MRC beamformer $27P^i$ for use in updating their coefficients, and supplies the set of channel vector estimates $\hat{b}_{n-1}{}^i$ to the constraints-set generator $42P$.

The MRC beamformer $27P^i$ processes the current observation vector $\underline{Y}_n$ to produce a "future" signal component estimate $\hat{s}_{MRC,n}{}^i$ for use by the second decision rule unit $29P/2^i$ to produce the "future" symbol estimate $\hat{b}_{MRC,n}{}^i$, which it supplies to the constraints-set generator $42P$ at the beginning of the processing cycle. The constraints-set generator $42P$ also receives the symbol estimate $\hat{b}_{n-1}{}^i$ from the decision rule unit $29^i$, but at the end of the processing cycle. The constraints-set generator $42P$ buffers the symbol $\hat{b}_{MRC,n}{}^i$ from the decision rule unit $29P/2^i$ and the symbol estimate $\hat{b}_{n-1}{}^i$ from the decision rule unit $29P^i$ at the end of the processing cycle. Consequently, in a particular symbol period n−1, when the constraints-set generator $42P$ is computing the constraints-set $\mathbb{C}_{n-1}$ it has available the set of channel vector estimates $\hat{b}_{n-1}$, the "future" symbol estimate $\hat{b}_{MRC,n}{}^i$, the "present" symbol estimate $\hat{b}_{MRC,n-1}{}^i$ and the "past" symbol estimate $\hat{b}_{n-2}{}^i$, the latter two from its buffer.

Each of the other receiver modules in the "joint ISR" set supplies its equivalents of these signals to the constraints-set generator $42P$. The constraints-set generator $42P$ processes them all to form the constraints set $\mathbb{C}_{n-1}$ and supplies the same to the constraint matrix generator $42P$, which generates the constraint matrix $\hat{C}_n$ and the inverse matrix $Q_n$ and supplies them to the various receiver modules.

The constraints-set generator $42P$ and the constraint matrix generator $43P$ will be constructed and operate generally in the same manner as the constraints-set generator $43$ and constraint matrix generator $42$ of the embodiments of the invention described hereinbefore with reference to FIGS. 9 to 27. Hence, they will differ according to the ISR mode being implemented.

Figure 28:
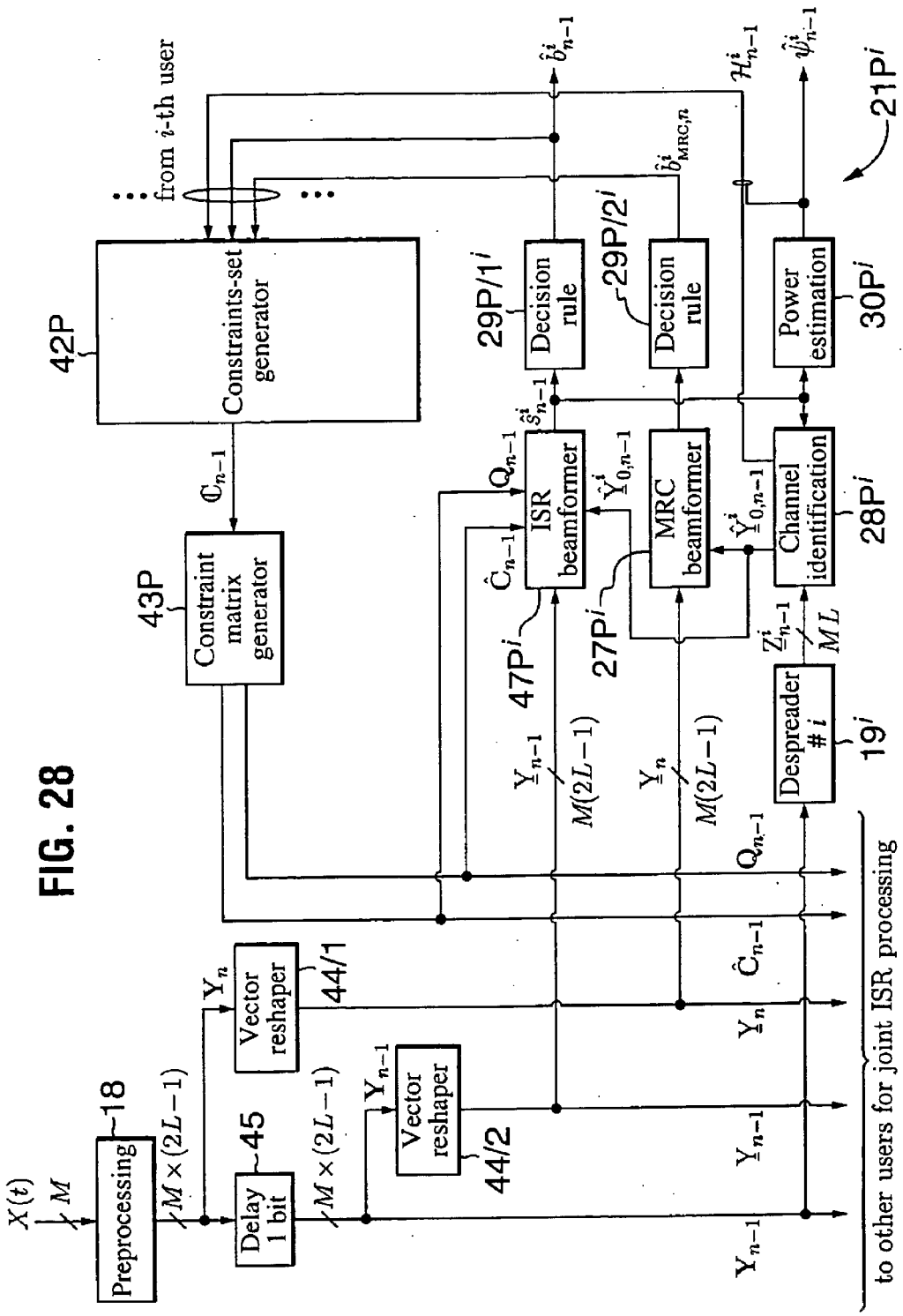
FIG. 28 illustrates a receiver module which both contributes to the constraint matrix and uses the constraint matrix to cancel interference (JOINT-ISR)

When the constraints-set generator $42P$ of the receiver of FIG. 28 is configured for the ISR-D mode, i.e. like the constraints-set generator shown in FIG. 16, the constraint matrix $\hat{C}_n$ supplied to the ISR beamformer $47P^1$ contains enough information for the beamformer $47P^i$ to estimate the channel parameters itself. Hence, it forwards these estimates to the channel identification unit $28P^i$ for use in improving the channel vector estimation and the set of channel vector estimates produced thereby.

An ISR-RH receiver module will use a similar structure, except that the one-bit delay $45$ will be omitted and the constraints-set generator $42P$ will use the previous symbol, estimate $\hat{b}_{n-1}{}^i$, the current MRC symbol estimate $\hat{b}_{MRC,n}{}^i$ and the two hypothetical values for "future" symbol $b_{n+1}{}^i$ to produce current symbol estimate $\hat{b}_n{}^i$. Modification of the receiver module shown in FIG. 28 to implement such a "ISR-RH mode" will be straightforward for a skilled person and so will not be described hereafter.

In order to implement J-ISR, a more general formulation of the constraint matrix is required. The general ISR constraint matrix counting $N_c$ constraints, is as follows:

$$\hat{C}_n = \left[ \frac{\hat{\underline{C}}_{n,1}}{\|\hat{\underline{C}}_{n,1}\|}, \ldots, \frac{\hat{\underline{C}}_{n,j}}{\|\hat{\underline{C}}_{n,j}\|}, \ldots, \frac{\hat{\underline{C}}_{n,N_c}}{\|\hat{\underline{C}}_{n,N_c}\|} \right] \quad (72)$$

where the j-th constraint $\hat{\underline{C}}_{nj}$ is given by:

$$\hat{\underline{C}}_{n,j} \triangleq \sum_{(u,f,k)\in S_j} \hat{\underline{Y}}_{k,n}^{u,f} \quad (73)$$

where $S_j$ defines a subset of diversities which form the j-th constraint when summed. As shown in Table 2, the sets $S_j$, $j=1, \ldots, N_c$ are assumed to satisfy the following restrictions:

$$S = S_1 \cup S_2 \cup \ldots \cup S_{N_c} = \{(u,f,k)|u=1, \ldots, NI \cdot f=1, \ldots, N_f; k=-1,0,+1\},$$

and $$S_1 \cap S_2 \cap \ldots \cap S_{N_c} = \emptyset,$$

$\emptyset$ being the empty set. Table 1 defines the sets $S_j$, $j=1, \ldots, N_c$ for all presented ISR modes of operation.

The objective signal belongs to the total interference subspace as defined by the span of the common constraint matrix $\hat{C}_n$. Therefore, to avoid signal cancellation of the desired user d by the projection:

$$\Pi_n{}^d = I_{M+(2L-1)} - \hat{C}_n Q_n \hat{C}_n{}^{d^H}, \quad (74)$$

the desired-signal blocking matrix $\hat{C}_n{}^d$ is introduced, as given by:

$$\hat{C}_n^d = \left[ \frac{\hat{\underline{C}}_{n,1}^d}{\|\hat{\underline{C}}_{n,1}\|}, \ldots, \frac{\hat{\underline{C}}_{n,j}^d}{\|\hat{\underline{C}}_{n,j}\|}, \ldots, \frac{\hat{\underline{C}}_{n,N_c}^d}{\|\hat{\underline{C}}_{n,N_c}\|} \right], \quad (75)$$

where:

$$\hat{\underline{C}}_{n,j}^d \triangleq \sum_{(u,f,k)\in S_j \backslash S^d} \hat{\underline{Y}}_{k,n}^{u,f}, \quad (76)$$

with $S^d = \{(u,f,k)|u=d; f=1, \ldots, N_f; k=0\}$. Normally $S^d$ is a small subset of S and $\hat{C}_n{}^d$ is very close to $\hat{C}_n$.

Joint Multi-User Data and Channel Gain Estimation in ISR-D

Neglecting the signal contributions from the weak-power low-rate users, and limiting to the signals of the NI interferers, $\underline{Y}_n$, can be formulated as:

$$\underline{Y}_n = \sum_{i=1}^{NI} \sum_{f=1}^{N_f} \psi_n^i \zeta_{f,n}^i \underline{Y}_n^{i,f} + \underline{N}_n^{pth} \quad (77)$$

$$= C_n [\psi_n^i \zeta_{1,n}^1, \ldots, \psi_n^i \zeta_{N_f,n}^1, \ldots \psi_n^{NI} \zeta_{1,n}^{NI}, \ldots \psi_n^{NI} \zeta_{N_f,N}^{NI}]^T + \quad (78)$$

$$\underline{N}_n^{pth}$$

$$= C_n \underline{\Gamma}_n + \underline{N}_n^{pth}, \quad (79)$$

where $\underline{\Gamma}_n$ is a $N_f NI \times 1$ vector which aligns channel coefficients from all fingers over all users. Estimation of $\underline{\Gamma}_n$, may be regarded as a multi-source problem:

$$\hat{\underline{\Gamma}}_n = Q_n \hat{C}_n{}^H \underline{Y}_n. \quad (80)$$

This constitutes one step of ISR-D operations and allows joint multi-user channel identification.

Multi-Stage ISR Detection

Multi-stage processing may be used in combination with those of the above-described embodiments which use the above-described joint ISR, i.e. all except the receivers implementing ISR-H mode. It should be appreciated that, in each of the receivers which use decision-feedback modes of ISR (TR,R,D,RH), coarse MRC symbol estimates are used in order to reconstruct signals for the ISR operation. Because they are based upon signals which include the interference to be suppressed, the MRC estimates are less reliable than ISR estimates, causing worse reconstruction errors. Better results can be obtained by using multi-stage processing and, in successive stages other than the first, using improved ISR estimates to reconstruct and perform the ISR operation again.

Figure 29:
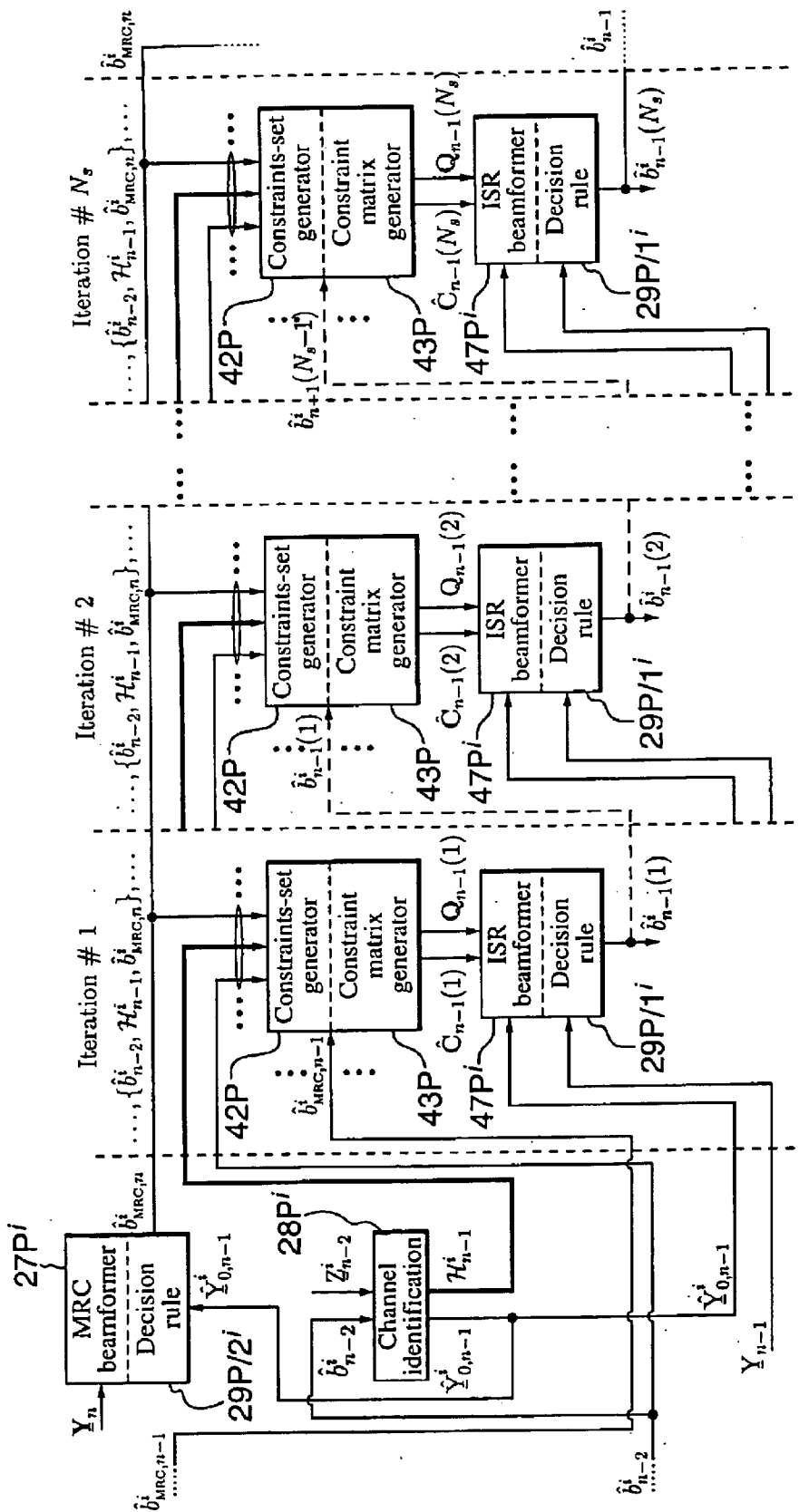
FIG. 29 illustrates a multi-stage ISR receiver module.

Operation of a multi-stage processing receiver module which would perform several iterations to generate a particular symbol estimate is illustrated in FIG. 29, which depicts the same components, namely constraint-sets generator 42P, constraint matrix generator 43P, ISR beamformer 47P$^i$ and decision rule unit 29P/1$^i$, MRC beamformer 27P$^i$ and decision rule unit 29P/2$^i$, in several successive symbol periods, representing iterations 1, 2, . . . , N$_s$ of frame n which targets the symbol estimate $\hat{b}_{n-1}^i$ for user station 10$^i$. Iteration 1, if alone, would represent the operation of the receiver module 20$^i$ of FIG. 28 in which the constraints-set generator 42P uses the coarse symbol estimates $\hat{b}_{MRC,n-1}^i$ previously received from the second decision rule unit 29P/2$^i$ (and others as applicable) and buffered. In each iteration within the frame, the other variables used by the constraints-set generator 42P remain the same, These variables comprise, from at least each "contributor" receiver module in the same joint processing set, the previous symbol estimate $\hat{b}_{n-2}^i$, the set of channel parameters $\hat{b}_{n-1}^i$ and the current MRC symbol estimate $\hat{b}_{MRC,n}^i$. Likewise, the spread channel vector estimate $\hat{\underline{Y}}_{0,n-1}^i$ and the delayed observation vector $\underline{Y}_{n-1}$ used by the ISR beamformer 47P$^i$ will remain the same.

In iteration 1, the constraint matrix generator 42P generates constraint matrix $\hat{C}_{n-1}(1)$ and the inverse matrix $Q_{n-1}(1)$ and supplies them to the beamformer 47P$^i$ which uses them, and the spread channel vector estimate $\hat{\underline{Y}}_{0,n-1}^i$ to tune its coefficients for weighting each element of the delayed observation vector $\underline{Y}_{n-1}$, as previously described, to produce a signal component estimate which the decision rule unit 29P/1$^i$ processes to produce the symbol estimate $\hat{b}_{n-1}^i(1)$ at iteration 1, which would be the same as that generated by the receiver of FIG. 28. This symbol estimate $\hat{b}_{n-1}^i(1)$ is more accurate than the initial coarse MRC estimate $\hat{b}_{MRC,n-1}^i$ so it is used in iteration 2 as the input to the constraints-set generator 42P$^i$, i.e., instead of the coarse MRC estimate of beamformer 27P$^i$. As a result, in iteration 2, the constraint matrix generator 42P produces a more accurate constraint matrix $\hat{C}_{n-1}(2)$ and inverse matrix $Q_{n-1}(2)$. Using these improved matrices, the ISR beamformer 47P$^i$ is tuned more accurately, and so produces a more accurate symbol estimate $\hat{b}_{n-1}^i(2)$ in iteration 2. This improved symbol estimate is used in iteration 3, and this iterative process is repeated for a total of N$_s$ iterations. Iteration N$_s$ will use the symbol estimate $\hat{b}_{n-1}^i(N_s-1)$ produced by the preceding iteration and will itself produce a symbol estimate $\hat{b}_{n-1}^i(N_s)$ which is the target symbol estimate of frame n and hence is outputted as symbol estimate $\hat{b}_{n-1}^i$.

This symbol estimate $\hat{b}_{n-1}^i$ will be buffered and used by the constraints-set generator 42P in every iteration of the next frame (n+1) instead of symbol estimate $\hat{b}_{n-2}^i$. Other variables will be incremented appropriately and, in iteration 1 of frame n+1, a new coarse MRC beamformer 27P$^i$ symbol estimate $\hat{b}_{MRC,n+1}^i$ will be used by the constraints-set generator 42P. The iterative process will then be repeated, upgrading the symbol estimate in each iteration, as before.

It should be noted that, in FIG. 29, the inputs to the channel identification unit 28P$^i$ use subscripts which reflect the fact that they are produced by a previous iteration. These subscripts were not used in FIG. 28 because it was not appropriate to show the transition between two cycles. The transition was clear, however, from the theoretical discussion.

One stage ISR operation can be generalized as follows:

$$\hat{s}_n^d(1) = \hat{s}_{MRC,n}^d - \underline{W}_{MRC,n}^{d H} \hat{C}_n^d(1) \underline{v}_n(1), \quad (81)$$

$$\underline{v}_n(1) = Q_n(1) \hat{C}_n(1)^H \underline{Y}_n,$$

where $\hat{s}_n^d(1)$ is the ISR estimate from first ISR stage, $\hat{s}_{MRC,n}^u$ is the MRC signal estimate, and the constraint matrices $\hat{C}_n(1)$, $\hat{C}_n^d(1)$, and $Q_n(1)$ are formed from MRC estimates at the first stage. Generalizing notation, the signal estimate at stage N$_s$ may be derived after the following iterations:

$$\hat{s}_n^d(2) = \hat{s}_{MRC,n}^d - \underline{W}_{MRC,n}^{d H} \hat{C}_n^d(2) \underline{v}_n(2), \quad \underline{v}_n(2) = Q_n(2) \hat{C}_n(2)^H \underline{Y}_n, \quad (82)$$

$$\vdots$$

$$\hat{s}_n^d(N_s) = \hat{s}_{MRC,n}^d - \underline{W}_{MRC,n}^{d H} \hat{C}_n^d(N_s) \underline{v}_n(N_s), \quad \underline{v}_n(N_s) = Q_n(N_s) \hat{C}_n(N_s)^H \underline{Y}_n.$$

The multistage approach has a complexity cost; however, complexity can be reduced because many computations from one stage to the next are redundant. For instance, the costly computation $\underline{v}(j)$ could instead be tracked because via $\underline{v}(j) \approx \underline{v}(j-1)$ if the number of symbol estimation errors does not change much from stage to stage, which can be expected in most situations.

It should be noted that, in the embodiment of FIG. 29, the channel identification unit 28P$^i$ updates the channel coefficients after the last iteration N$_s$. Hence, for the next cycle, the inputs to the channel identification unit 28P$^i$ will be $\hat{b}_{n-1}^i$, $\underline{Z}_{n-1}^i$, $\hat{\underline{Y}}_{0,n}$ and H$_n^i$. It is envisaged, however, that the channel coefficients could be updated more frequently, conveniently at each iteration. Hence, after the first iteration, the interim symbol estimate $\hat{b}_{n-1}^i(1)$ would be used; in an interim signal component feedback to the channel identification unit 28P$^i$, after the second iteration, interim symbol estimate $\hat{b}_{n-1}^i(2)$ would be used, and so on. The corresponding interim channel estimates for a given iteration would be supplied to the constraints-set generator 42P for use in the next iteration.

ISR Using Multistage with Intermediate Channel Decoding (MICD)

The TURBO channel encoder has recently attracted researchers interest as a new efficient coding structure to achieve Information Bit Error Rates (IBER) close to the Shannon limit. Basically, the strength of the TURBO coding scheme is the concatenation of two convolutional decoders each transmitting the same information data, however, data is temporally organized differently (different interleaving) before it is encoded. From one of the data streams, the decoder provides likelihood estimates to be used as a sort of extrinsic information for decoding of the second stream.

Figure 47:
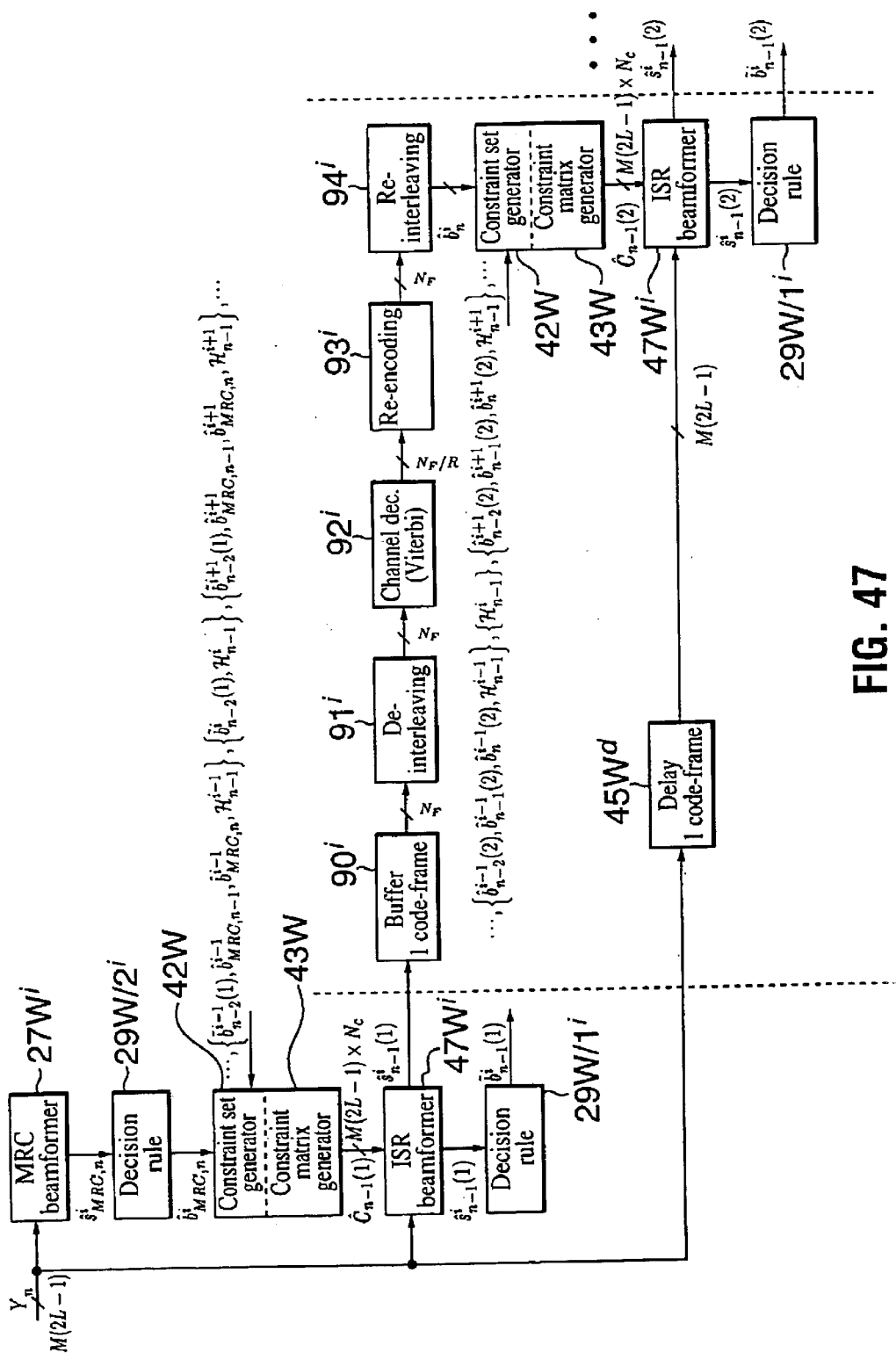
FIG. 47 illustrates an alternative ISR receiver module employing symbol decoding at an intermediate stage.

The TURBO idea has recently been generalized to TURBO multiuser receivers. Like the TURBO decoder, the TURBO multiuser principle concatenates detection stages. This idea applies to ISR, and we will name this extension of ISR Multistage with Intermediate Channel Decoding, ISR-MICD. Contrary to multistage ISR, ISR-M, ISR-MICD performs channel decoding between stages as illustrated in FIG. 47.

First MRC beamforming $27W^i$ is as usual performed in a preliminary stage to provide coarse signal estimates ($\hat{s}_{MRC,n}^i$) from which tentative estimates of the transmitted data is derived using the decision rule unit $29W/1^i$. The tentative decision is fed to the constraint set generator 42W, which reconstructs the signals of the objective users as well as all other interfering users. The constraint matrix generator 43W assembles the constraint matrix ($\hat{C}_{n-1}(1)$) to be applied to the ISR beamformer $47W^i$. The ISR beamformer $47W^i$ outputs an improved signal estimate ($\hat{s}_{n-1}^i(1)$). As usual is, the ISR symbol estimate ($\bar{b}_{n-1}^i(1)$) is computed using the decision rule unit $29W/1^i$, and fed back to the constraint set generator[3] 42W for construction of later constraints. More importantly, though, the ISR signal estimate is passed on for intermediate channel decoding (horizontal branch on figure). First the buffer $90^i$ collects $N_F$ symbols corresponding to a code frame[4]. The code frame is passed to the de-interleaving unit $91^i$ which de-interleaves data using a predefined rule[5]. The de-interleaved data is Viterbi decoded in the channel decoding unit $92^i$ to provide a block of $N_F/R$ information bits where R is the rate of the code. Having performed the channel decoding, the decoded information bit sequence is next re-encoded in the re-encoding unit $93^i$, then re-interleaved in the re-interleaving unit $94^i$ to arrive at the improved channel decoded symbol sequence $\hat{b}_n^i$. This estimate is usually much better than the ISR estimate ($\hat{b}_{n-1}(1)$) available before the channel decoding step because redundancy of coding and time diversity due to interleaving is exploited[6]. ISR-MICD, as opposed to ISR-M, therefore gains from improved estimates in the second stage. As usual constraints are generated by the constraint set generator 42W and fed to the constraint matrix generator 43W to form the improved constraint matrix ($\hat{C}_{n-1}(2)$). This matrix is then passed to the ISR beamformer $47W^i$ to provide the improved ISR-MICD second stage signal estimate ($\hat{s}_{n-1}^i(2)$) which is fed to decision rule unit $29W/1^i$ to provide the ISR-MICD second stage data symbol estimate ($\bar{b}_{n-1}^i(2)$) ISR-MICD can also be performed in more stages by repeating the whole process, which amounts to repeating the part of the block diagram limited by the broken lines using $\hat{s}_{n-1}^i(2)$ for channel decoding in the third stage, $\hat{s}_{n-1}^i(3)$ in the fourth stage, etc.

[3] This feed back is not explicitly shown on the figure
[4] It is assumed that frame synchronization has been achieved.
[5] Usually block interleaving.
[6] Only at very low SNR, channel decoding does not provide better estimates.

Group ISR Detection

In practice, the receiver of FIG. 28 could be combined with one of the earlier embodiments to create a receiver for a "hierarchical" situation, i.e., as described hereinbefore with reference to FIG. 8, in which a first group of receiver modules, for the weakest signals, like those in set D of FIG. 8, for example, are "recipients" only, i.e., they do not contribute to the constraint matrix at all; a second group of receiver modules, for the strongest signals, like the receiver modules of set I in FIG. 8, do not need to cancel interference and so are "contributors" only, i.e., they only contribute constraints-sets to the constraint matrix used by other receiver modules; and a third set of receiver modules, for intermediate strength signals, like the receiver modules of sets M2 of FIG. 8, are both "recipients" and "contributors", i.e. they both use the constraint matrix from the set I receiver modules to cancel interference from the strongest signals and contribute to the constraint matrix that is used by the set D receiver modules. Generally, this approach is referred to as "Group ISR" (G-ISR) and the equations for the constraint matrices and inverse matrices comprising the set $K_n = \{\hat{C}_{Outset,n}, Q_{Outset,n}, \hat{C}_{Inset,n}, Q_{Inset,n}\}$ used by the ISR beamformers in the different receivers are as follows:

$$Q_{Outset,n} = \left(\hat{C}_{Outset,n}^H \hat{C}_{Outset,n}\right)^{-1}, \tag{83}$$

$$\Pi_{outset,n} = I_{M+(2L-1)} - \hat{C}_{Outset,n} Q_{Outset,n} \hat{C}_{Outset,n}^H, \tag{84}$$

$$\hat{C}_{Inset,n} = \Pi_{Outset,n} \hat{C}_{Inset,n}, \tag{85}$$

$$Q_{Inset,n} = \left(\hat{C}_{Inset,n}^H \hat{C}_{Inset,n}\right)^{-1}, \tag{86}$$

$$\Pi_{Inset,n}^d = I_{M*(2L-1)} - \hat{C}_{Inset,n} Q_{Inset,n} \hat{C}_{Inset,n}^{dH}, \tag{87}$$

$$\Pi_n^d = \Pi_{Inset,n}^d \Pi_{Outset,n}, \tag{88}$$

$$\underline{W}_n^d = \frac{\Pi_n^d \hat{Y}_{0,n}^d}{\hat{Y}_{0,n}^{dH} \Pi_n^d \underline{Y}_{0,n}^d} = \Pi_n^d \times \frac{\hat{Y}_{0,n}^d}{\hat{Y}_{0,n}^{dH} \Pi_n^d \hat{Y}_{0,n}^d}. \tag{89}$$

It should be noted that normalization of the columns of $\hat{C}_{Inset,n}$ and $\hat{C}_{Outset,n}$ is implicit.

A receiver module for set D will set $\Pi_{Inset}$ in Equation (88) to identity which means that only "outset" interference will be cancelled. Otherwise, the processing will be as described for other receivers of set D.

A receiver in set M1 does not need to cancel "outset" interference, but does need to cancel "inset" interference. Consequently, it will set $\Pi_{Outset}$ in Equation (88) to identity so that only inset interference will be cancelled. This corresponds to the joint ISR embodiment described with reference to FIG. 28.

Finally, a receiver in set I does not need to cancel any interference. Consequently, it will set both $\Pi_{Inset}$ and $\Pi_{Outset}$ to identity, which means that nothing will be cancelled. This corresponds to the group I receiver modules $20^1, \ldots, 20^{NI}$ described with reference to FIGS. 9, 11, 13, 15–17, 20–24 and 26.

Successive Versus Parallel ISR Detection

Figure 30:
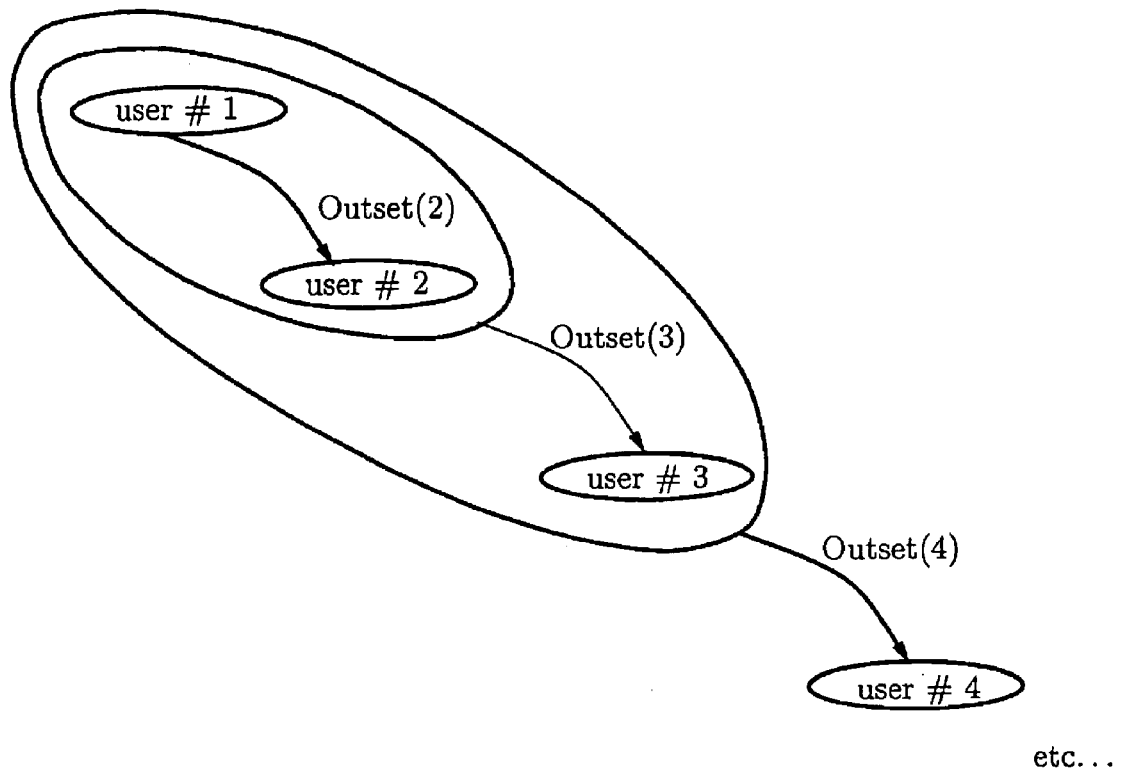
FIG. 30 illustrates successive implementation of ISR.

Although the embodiments of ISR receivers described hereinbefore use a parallel implementation, ISR may also be implemented in a successive manner, denoted S-ISR, as illustrated in FIG. 30. Assuming implementation of successive ISR among NI interferers, U users, and assuming without loss of generality that users are sorted in order of decreasing strength such that user 1 is the strongest and user NI is the weakest user, when processing user i in S-ISR, the ISR estimate can be computed as:

$$\hat{s}_n^i = \hat{s}_{MRC,n}^i - \underline{W}_{MRC,n}^{iH} \hat{C}_{i,n}^i \underline{v}_n(i), \underline{v}_n(i) = Q_n^i \hat{C}_{i,n}^H \underline{Y}_n, \tag{90}$$

where $\hat{C}_{i,n}$ by spans only the subspace of users $1, \ldots, i-1$[7], $Q_n^i$ is the corresponding inverse and where $\hat{C}_{i,n}^i$ is the user specific constraint matrix. Clearly, $\hat{C}_{i,n}^i$ is no longer common for all users, which entails expensive matrix inversion for each user. However, with ISR-TR this inversion is avoided, since $\hat{C}_{i,n}^{iH}\hat{C}_{i,n}^{i}$ is a scalar, and S-ISR-TR is a good alternative to its parallel counterpart, ISR-TR. Other ISR modes may take advantage of the common elements of $\hat{C}_{i,n}$ from one processing cycle to the next using matrix inversion by partitioning.

[7] And also user i if ISR rejection is desired.

Hybrid ISR Detection

It should also be appreciated that the different ISR modes may be mixed, conveniently chosen according to the characteristics of their signals or transmission channels, or data rates, resulting hybrid ISR implementations (H-ISR). For example, referring to FIG. 8, the sets I, M1 and M2 might use the different modes ISR-H, ISR-D and ISR-TR, respectively, and the receiver modules in set D would use the different modes to cancel the "outset" interference from those three sets. Of course, alternatively or additionally, different modes might be used within any one of the sets.

ISR Projection for Enhanced Channel Identification

In all of the above-described embodiments of the invention, the channel identification units $28^d$ in the ISR receiver modules use the post-correlation observation vector $\underline{Z}_n^i$ to generate the spread channel vector estimate $\underline{\hat{Y}}_{0,n}^d$ (by spreading $\underline{\hat{H}}_n^d$). Unfortunately, the interference present in the observation matrix $Y_n$ is still present in the post-correlation observation vector $\underline{Z}_n^i$ (see Equation (14)) and, even though it is reduced in power by despreading, it detracts from the accuracy of the spread channel vector estimate $\underline{\hat{Y}}_{0,n}^d$. As has been discussed hereinbefore, specifically with reference to Equations (83) to (89), the ISR beamformer $47^d$ effectively constitutes a projector $\Pi_n^d$ and a tuning and combining portion $$\frac{\underline{\hat{Y}}_{0,n}^d}{\underline{\hat{Y}}_{0,n}^{dH} \Pi_n^d \underline{\hat{Y}}_{0,n}^d}$$

which, in effect, comprises a residual MRC beamformer $$\underline{W}_n^d = \frac{\underline{\hat{Y}}_{0,n}^{\Pi,d}}{\|\underline{\hat{Y}}_{0,n}^{\Pi,d}\|^2}.$$

Figure 31:
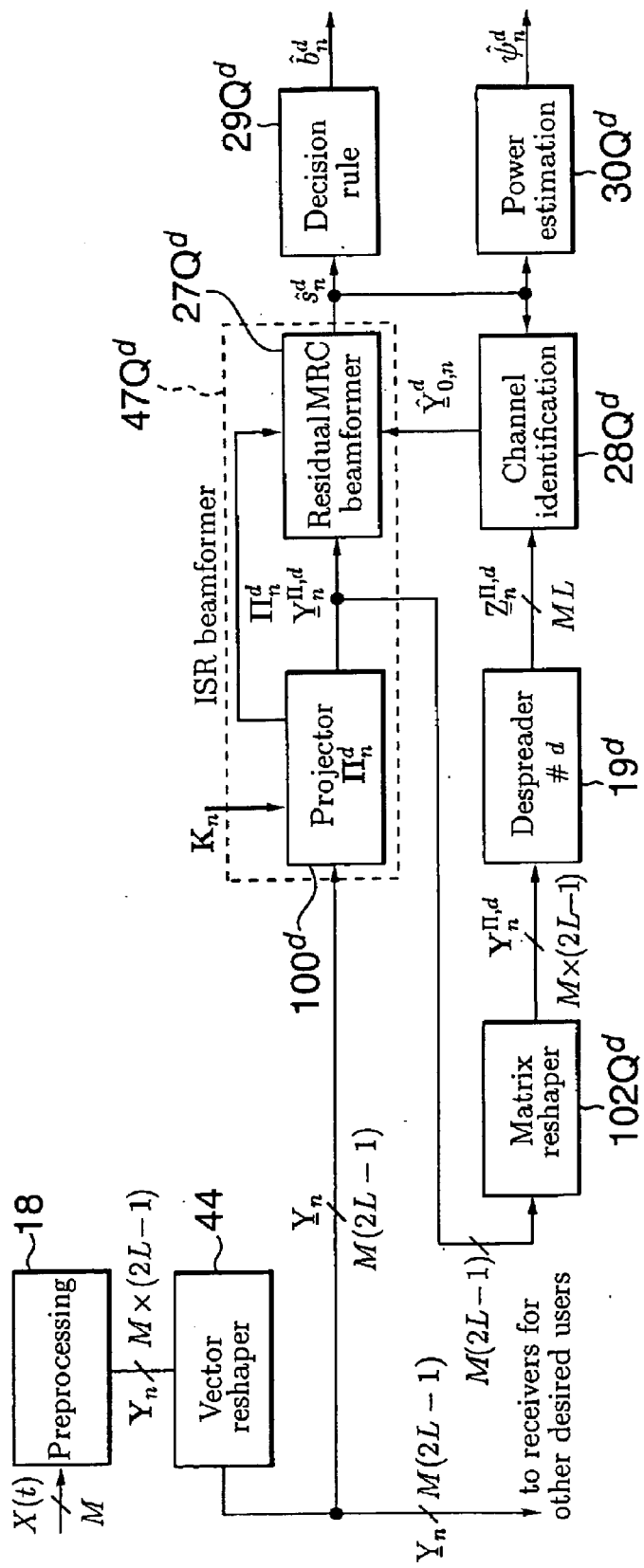
FIG. 31 illustrates a receiver module which uses ISR to enhance channel identification.

FIG. 31 illustrates a modification, applicable to all embodiments of the invention described herein including those described hereafter, which exploits this relationship to improve the spread channel vector estimate $\underline{\hat{Y}}_{0,n}^d$ (or channel vector estimate $\underline{\hat{H}}_n^d$) by using the projector $\Pi_n^d$ to suppress the interference component from the observation vector $\underline{Y}_n$. In the receiver of FIG. 31, the ISR beamformer $47Q^d$ is shown as comprising a projector $100^d$ and a residual MRC beamformer portion $27Q^d$. The projector $100^d$ multiplies the projection $\Pi_n^d$ by the observation vector $\underline{Y}_n$ to produce the "cleaned" observation vector $\underline{Y}_n^{\Pi,d}$ and supplies it to the residual MRC beamformer $27Q^d$, which effectively comprises a tuner and combiner to process the "cleaned" observation vector $\underline{Y}_n^{\Pi,d}$ and produce the signal component estimate $\hat{s}_n^d$ from which decision rule unit $29Q^d$ derives the symbol estimate $\hat{b}_n^d$ in the usual way.

The "cleaned" observation vector $\underline{Y}_n^{\Pi,d}$ is reshaped by matrix reshaper $102Q^d$ to form "cleaned" observation matrix $Y_n^{\Pi,d}$ which despreader $19^d$ despreads to form the "cleaned" post-correlation observation vector $\underline{Z}_n^{\Pi,d}$ for application to the channel identification unit $28Q^d$ for use in deriving the spread channel vector estimate $\underline{\hat{Y}}_{0,n}^d$.

The new "cleaned" vector resulting from the projection of the observation vector $\underline{Y}_n$ by $\Pi_n^d$ is defined as follows:

$$\underline{Y}_n^{\Pi,d} = \Pi_n^d \underline{Y}_n \qquad (91)$$

$$= \Pi_n^d \left\{ \sum_{\mu \in \{1,\dots,NI\} \cup \{d\}} \underline{Y}_n^u + \underline{N}_n \right\} \simeq (\Pi_n^d \underline{Y}_{0,n}^d) s_n^d + (\Pi_n^d \underline{N}_n)$$

$$= \underline{Y}_{0,n}^{\Pi,d} s_n^d + \underline{N}_n^{\Pi,d}.$$

The new observation vector is free from the interferers and ISI and contains a projected version of the channel vector $\underline{Y}_{0,n}^{\Pi,d}$. Without being a condition, it is reasonable to assume that the projector $\Pi_n^d$ is almost orthogonal to the channel vector, especially in high processing gain situations and/or in the presence of few interferers, and therefore consider that $\underline{Y}_{0,n}^{\Pi,d} \approx \underline{Y}_{0,n}^d$. Otherwise an oblique projection can be formed which guarantees $\underline{Y}_{0,n}^{\Pi,d} = \underline{Y}_{0,n}^d$. When despreader $19^d$ despreads $\underline{Y}_n^{\Pi,d}$ with the spreading sequence of the desired user d, it produces an interference-free projected post-correlation observation vector $\underline{Z}_n^{\Pi,n}$ which the channel identification unit $28Q^d$ uses to create the channel vector estimate $\underline{\hat{Y}}_{0,n}^d$ to use in updating the coefficients of the residual MRC beamformer portion $27Q^d$.

With respect to the new observation vectors $\underline{Y}_n^{\Pi,d}$ and $\underline{Z}_n^{\Pi,n}$, before and after despreading, respectively, the ISR and DFI steps in STAR are modified as follows:

$$\underline{W}_n^d = \frac{\underline{\hat{Y}}_{0,n}^{\Pi,d}}{\|\underline{\hat{Y}}_{0,n}^{\Pi,d}\|^2} \equiv \frac{\underline{\hat{Y}}_{0,n}^d}{\underline{\hat{Y}}_{0,n}^{dH} \Pi_n^d \underline{\hat{Y}}_{0,n}^d}, \qquad (92)$$

$$\hat{s}_n^d = \text{Real}\{\underline{W}_n^{dH} \underline{Y}_n^{\Pi,d}\}, \qquad (93)$$

$$\underline{\tilde{H}}_{n+1}^d = \underline{\hat{H}}_n^d + \mu(\underline{Z}_n^{\Pi,d} - \underline{\hat{H}}_n^d \hat{s}_n^d)\hat{s}_n^d. \qquad (94)$$

The equivalence between the two expressions of the beamformer coefficients in Equation (92) due to the nilpotent property of projections should be noted. In more adverse near-far situations, the modification illustrated in FIG. 31 allows more reliable channel identification than simple DFI and hence increases near-far resistance. If necessary, this new DFI version will be termed Π-DFI. It is expected to be suitable for situations where the interferers are moderately strong and when the null constraints cover them all. For simplicity of discussion, projection of the observation will become implicit without reference to $\underline{Y}_{\Pi,n}^d$, $\underline{Z}_{\Pi,n}^d$ or to the corresponding modifications in STAR-ISR operations.

Expanding Dimensionality (X-option)

When the number of users becomes high compared to the processing gain, the dimension of the interference subspace becomes comparable to the total dimension (M(2L−1)). The penalty paid is an often devastating enhancement of the white noise. Unlike ISR-TR, which always requires a single constraint, other DF modes, namely ISR-R and ISR-D, may suffer a large degradation because the number of constraints these modes require easily becomes comparable to the total dimension available. However, the dimension may be increased by using additional data in the observation. This option also allows for asynchronous transmission and for the application of ISR to Mixed Spreading Factor (MSF) systems.

The matched-filtering observation vector $\underline{Y}_n$ is generated to include additional past spread data which has already been processed. If the model is expanded to include past processed $N_x$ symbols and arrive at a total temporal dimension $N_\tau=(N_x+1)L-1$, the observation becomes:

$$\underline{Y} = \begin{bmatrix} \underline{Y}_{n-N_x+1} \\ \vdots \\ \underline{Y}_n \end{bmatrix} = \sum_{u=1}^{U}\sum_{f=1}^{N_f} \begin{bmatrix} \underline{Y}_{n-N_x+1}^{u,f} \\ \vdots \\ \underline{Y}_n^{u,f} \end{bmatrix} + \begin{bmatrix} \underline{N}_{n-N_x+1}^{pth} \\ \vdots \\ \underline{N}_n^{pth} \end{bmatrix} \quad (95)$$

$$= \sum_{u=1}^{U}\sum_{f=1}^{N_f} \underline{Y}_n^{u,f} + \underline{N}_n^{pth}$$

where double underlining stresses the extended model. It should be noted that $\underline{Y}_j^{u,f}$ is overlapping temporally $\underline{Y}_{j\pm 1}^{u,f}$ and only the first ML samples of the past frames n−1, n−2, . . . etc. are used; however the same syntax is used for simplicity of notation.

As an example, application of the X option to ISR-D, referred to as ISR-DX, requires the following constraint matrix:

$$\hat{C}_n = \begin{bmatrix} \frac{\hat{\underline{Y}}_n^{1,1}}{\|\hat{\underline{Y}}_n^{1,1}\|}, \ldots, \frac{\hat{\underline{Y}}_n^{1,N_f}}{\|\hat{\underline{Y}}_n^{1,N_f}\|}, \frac{\hat{\underline{Y}}_n^{NI,1}}{\|\hat{\underline{Y}}_n^{NI,1}\|}, \ldots, \frac{\hat{\underline{Y}}_n^{NI,N_f}}{\|\hat{\underline{Y}}_n^{NI,N_f}\|} \end{bmatrix} \quad (96)$$

The extended vectors in Equation (96) have been treated in the same way as those in Equation (95), i.e., by concatenating reconstructed vectors from consecutive symbols in the extended frame and by implicitly discarding overlapping dimensions in the concatenated vectors. Clearly, extension of the observation space leaves additional degrees of freedom and results in less white noise enhancement. However, it may exact a penalty in the presence of reconstruction errors.

Although the X-option was illustrated in the case of ISR-D, its application to the remaining DF modes is straightforward. It should also be noted that the X-option allows for processing of more than one symbol at each frame while still requiring one matrix inversion only. The duration of the frame, however, should be small compared to the variations of the channel.

In the above-described embodiments, ISR was applied to a quasi-synchronous system where all temporal delays were limited to 0<τ<L. Although this model reflects well the large processing gain situation, where the limit (L→∞), allows for placing a frame of duration 2L−1 chips which fully cover one bit of all users, including delay spreads. With realistic processing gains, and in particular in the low processing gain situation, this model tends to approach a synchronous scenario. Using the X-option serves as a method supporting complete asynchronous transmission.

Figure 32:
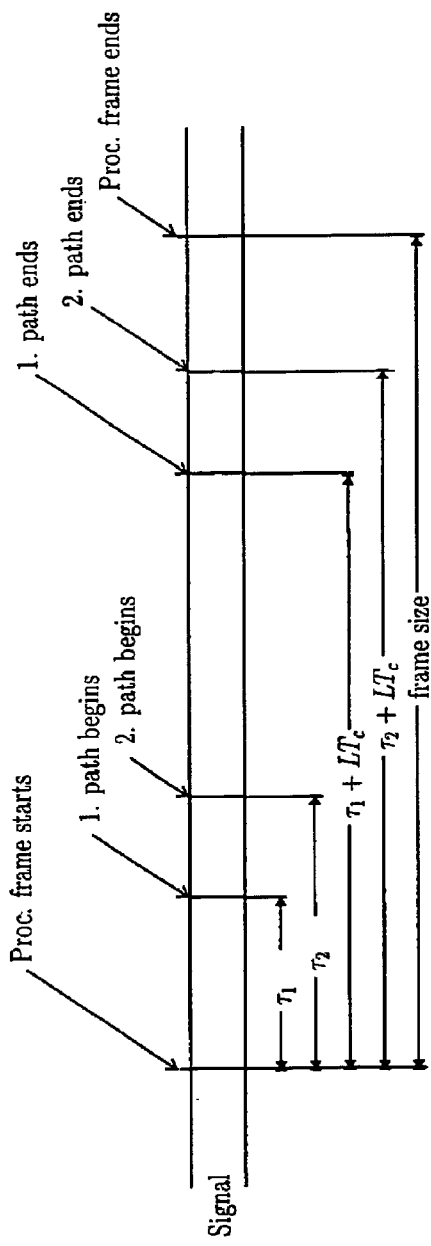
FIG. 32 illustrates extension of the frame size to reduce noise enhancement and facilitate asynchronous operation and processing of high data rates.

Referring to FIG. 32, assuming that the users of the system have processing gain L as usual, the transmitted signal of any user is cyclo-stationary and a possible time-delay of the primary path $\tau_1$ is therefore $0<\tau_1<L$ where possible time delays of remaining paths are $\tau_1<\tau_2<\ldots <L+\Delta\tau$ where $\Delta\tau$ is the largest possible delay spread considered. To ensure that the frame covers at least one bit of all users, the frame must at least span $L+\Delta\tau$ in the despread domain and therefore $2L+\Delta\tau$ in the spread domain. The observation should be extended slightly beyond that to ease interpolation near the edges of the frame.

Multi-Modulation (MM), Multi-Code (MC), and Mixed Spreading Factor (MSF) are technologies that potentially can offer mixed-rate traffic in wideband CDMA. MSF, which has become very timely, was shown to outperform MC in terms of performance and complexity and is also proposed by UMTS third generation mobile system as the mixed-rate scenario. Application of ISR to MSF as the mixed rate scenario considered herein will now be discussed.

Figure 33:
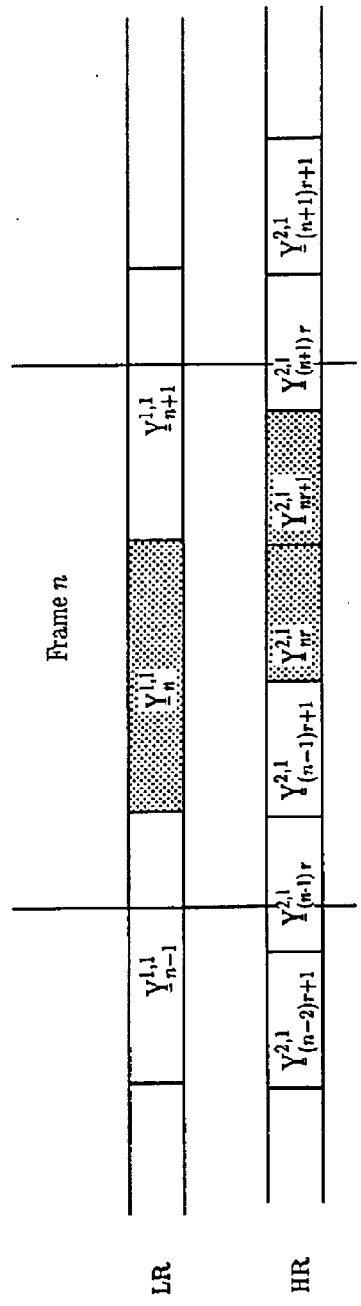
FIG. 33 illustrates implementation of ISR with mixed spreading factors.

In MSF, mixed rate traffic is obtained by assigning different processing gains while using the same carrier and chip-rate. In a system counting two groups of users, a low-rate (LR) and a high rate (HR) group, this means that every time a LR rate user transmits 1 symbol, a HR user transmits 2r+1 HR symbols, $r=L_l/L_h$ being the ratio of the LR processing gain to HR processing gain. This is illustrated in FIG. 33 with r=2.

Therefore, fitting the ISR frame subject to LR users or in general the lowest-rate users ensures that also at least r HR symbols are covered when HR and LR have the same delay spread. The ISR generalizes readily to this scenario regarding every HR user as r LR users. In FIG. 33, the grey shaded HR/LR bits symbolize the current bits to be estimated; whereas, former bits have already been estimated (ISR-bits) and future bits are unexplored. It should be noted that current HR bits should be chosen to lie at the end of the frame.

Multi-Code ISR

Figure 34:
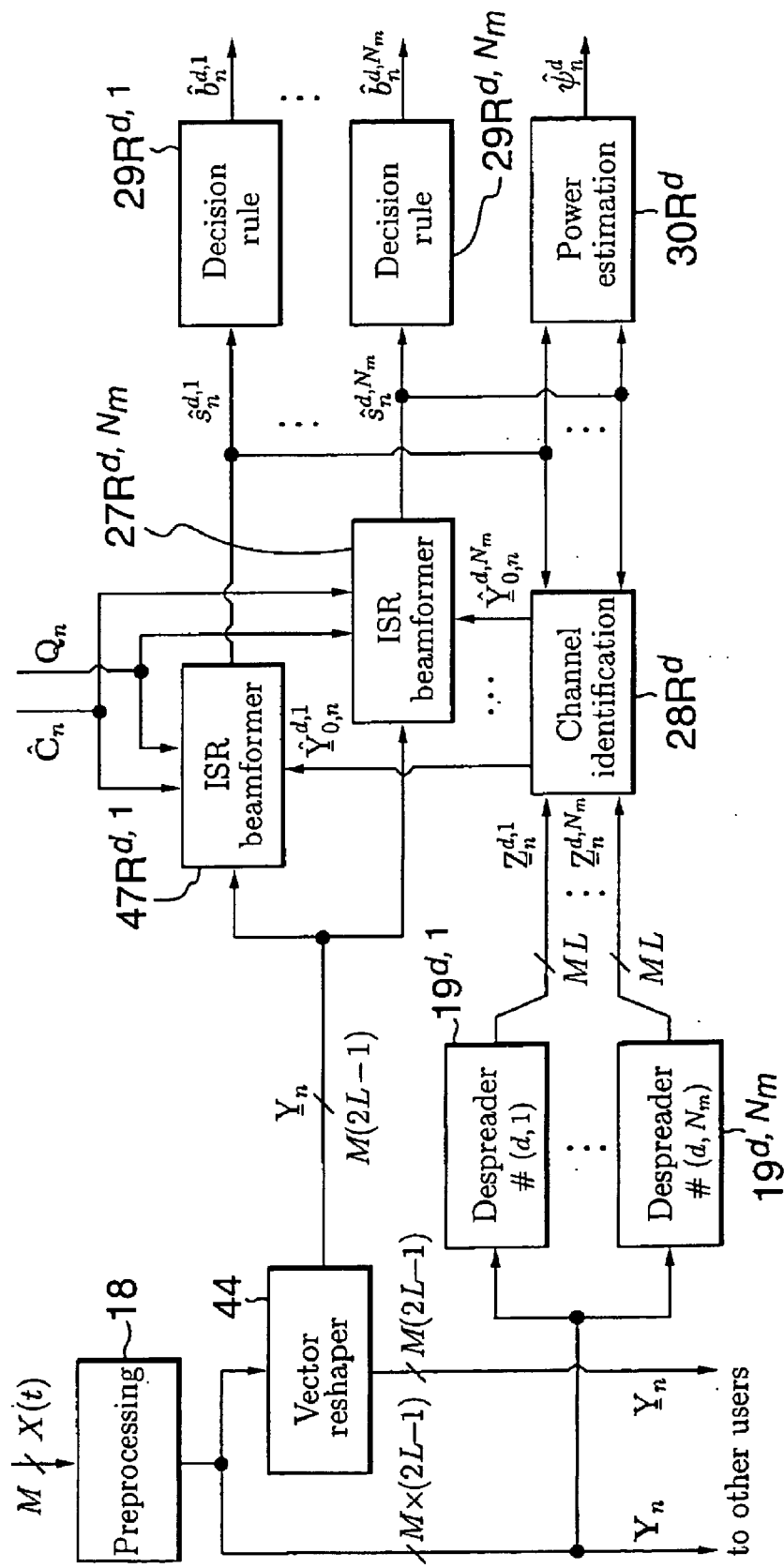
FIG. 34 illustrates an uplink ISR receiver module for a user employing multicode signals.

It is envisaged that a user station could use multiple codes, $N_m$ in number, each to transmit a different stream of symbols. FIG. 34 illustrates this modification as applied to a "without despreading" receiver module $20R^d$ for receiving such a multicode signal and using ISR cancellation to cancel interference from other users. The receiver module shown in FIG. 34 is similar to that shown in FIG. 9 except that, instead of a single ISR beamformer $47^d$, the receiver module of FIG. 34 has a bank of ISR beamformers $47R^{d,1}, \ldots, 47R^{d,N_m}$ for extracting signal component estimates $\hat{s}_n^{d,1}, \ldots, \hat{s}_n^{d,N_m}$, respectively, and supplying them to a bank of decision rule units $29R^{d,1}, \ldots, 29R^{d,N_m}$, respectively which produce a corresponding plurality of symbol estimates $\hat{b}_n^{d,1}, \ldots, \hat{b}_n^{d,N_m}$. Likewise, the receiver module $20R^d$ has a bank of despreaders $19^{d,1}, \ldots, 19^{d,N_m}$ each of which uses a respective one of the multiple spreading codes of the corresponding user d to despread the observation matrix $Y_n$ from the preprocessing unit 18 to produce a corresponding one of a multiplicity of post-correlation observation vectors $\underline{Z}_n^{d,1}, \ldots, \underline{Z}_n^{d,N_m}$ which are supplied to a common channel identification unit $28R^d$. It should be appreciated that the post-correlation observation vectors share the same channel characteristics, i.e., of the channel $14^d$ between user station $10^d$ and the base station antenna array. Consequently, only one channel identification unit $28R^d$ is required, which essentially processes the plural signal component estimates $\hat{s}_n^{d,1}, \ldots, \hat{s}_n^{d,N_m}$ and the post-correlation observation vectors and, in essence, averages the results to produce a single channel vector estimate $\hat{\underline{H}}_n^d$ representing the physical channel $14^d$. The channel identification unit $28R^d$ has a bank of spreaders (not shown) which spread the channel vector estimate $\hat{\underline{H}}_n^d$ using the multiple spreading codes to create a set of spread channel vector estimates $\hat{\underline{Y}}_{0,n}^{d,1}, \ldots, \hat{\underline{Y}}_{0,n}^{d,N_m}$, which it supplies to the ISR beamformers $47R^{d,1}, \ldots, 47R^{d,N_m}$, respectively. Likewise, the power estimation unit $30R^d$ is adapted to receive plural signal component estimates $\hat{s}_n^{d,1}, \ldots, \hat{s}_n^{d,N_m}$ and essentially average their powers to produce the power estimate $\hat{\psi}_n^d$.

While using all of the multiple codes advantageously gives a more accurate channel vector estimate, it requires many expensive despreading operations. In order to reduce the cost and complexity, the receiver module $20M^d$ may use only a subset of the spreading codes.

Figure 35:
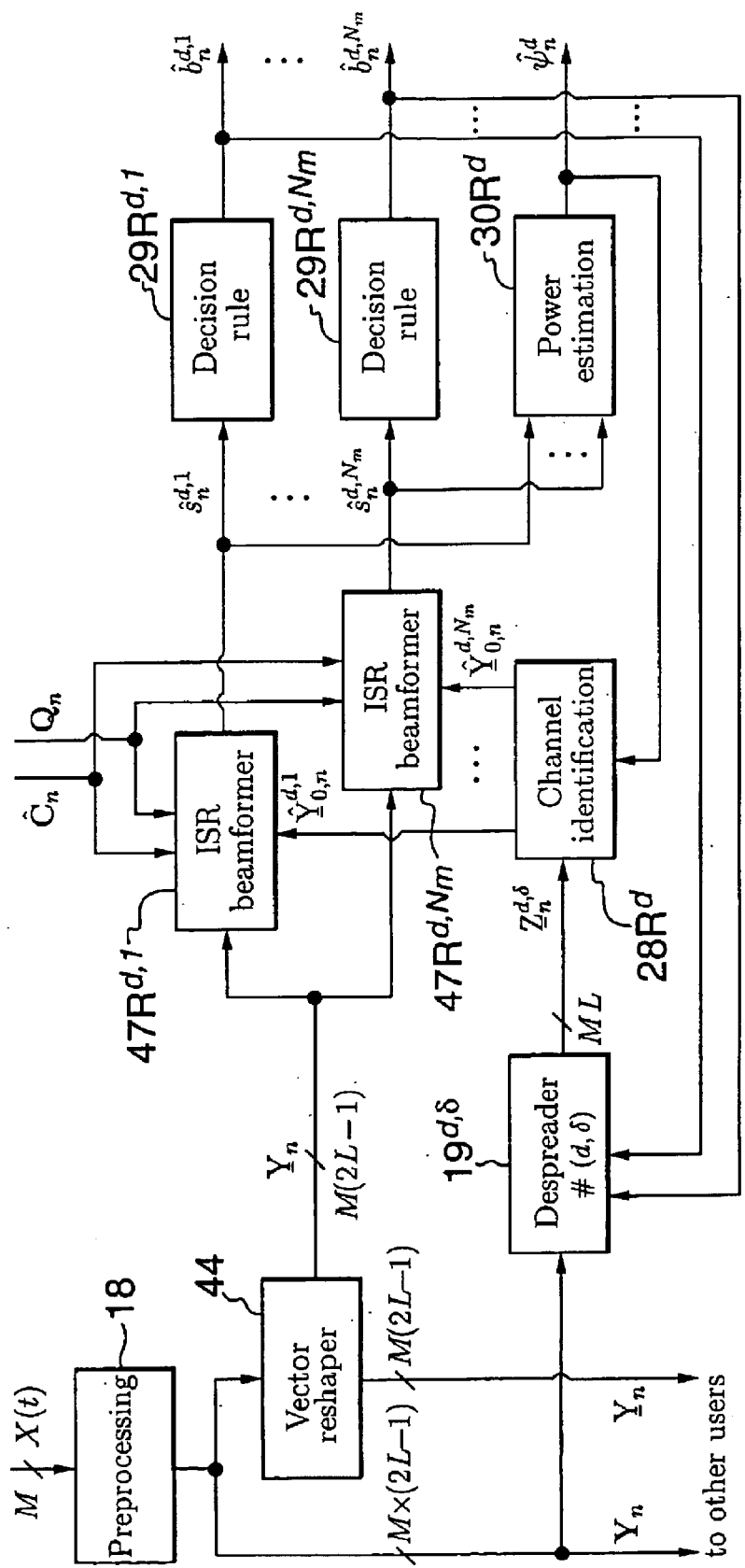
FIG. 35 illustrates a modification of the receiver module of FIG. 34.

It can be demonstrated that the multiple spreading codes can be replaced by a single spreading code formed by multiplying each of the multiple spreading codes by the corresponding one of the symbol estimates $\underline{b}_n^{d,1}, \ldots, \underline{b}_n^{d,N_m}$ and combining the results. FIG. 35 illustrates a receiver module which implements this variation. Thus, the receiver module $20R^d$ shown in FIG. 35 differs from that shown in FIG. 34 in that the bank of despreaders $19^{d,1}, \ldots, 19^{d,N_m}$ are replaced by a single despreader $19^{d,\delta}$ which receives the symbol estimates $\hat{b}_n^{d,1}, \ldots, \hat{b}_n^{d,N_m}$ and multiplies them by the multiple spreading codes to form a compound spreading code, which it then uses to despread the observation matrix $\underline{Y}_n$ and form a single post-correlation observation vector $\underline{Z}_n^{d,\delta}$. The channel identification unit $28R^d$ does not receive the signal component estimates but instead receives the total amplitude $\hat{\psi}_n^d$ from the power estimation unit $30R^d$. This serves as a compound signal component estimate because the use of the compound code is equivalent to modulating a constant "1" or a constant "−1" with that code, as will be formulated by equations later. The channel identification unit $28R^d$ processes the single post-correlation observation vector $\underline{Z}_n^{d,\delta}$ to produce a single channel vector estimate $\hat{H}_n^d$ and spreads it, as before, using the multiple spreading codes to form the multiple spread channel vector estimates $\hat{\underline{Y}}_{0,n}^{d,1}, \ldots, \hat{\underline{Y}}_{0,n}^{d,N_m}$ for use by the beamformers $47R^{d,1}, \ldots, 48R^{d,N_m}$ as before.

The theory of such multicode operation will now be developed. Assuming for simplicity that each user assigned the index u transmits $N_m$ streams of DBPSK data $b^{u,1}(t), \ldots, b^{u,N_m}(t)$ using $N_m$ spreading codes $c^{u,1}(t), \ldots, c^{u,N_m}(t)$, each spread stream can be seen as a separate user among a total of $U \times N_m$ access channels, assigned the couple-index (u,l). The data model can then be written as follows:

$$Y_n = \sum_{u=1}^{U} \sum_{l=1}^{N_m} \sum_{k=-1}^{+1} \psi_n^u b_n^{u,l} Y_{k,n}^{u,l} + N_n^{pth} \quad (97)$$

$$= \sum_{u=1}^{U} \sum_{l=1}^{N_m} \sum_{f=1}^{N_f} \sum_{k=-1}^{+1} \psi_n^u b_{n+k}^{u,l} \zeta_{f,n}^u Y_{k,n}^{u,l,f} + N_n^{pth},$$

where the canonic u-th user l-th code observation matrices $Y_{k,n}^{u,l,f}$ from finger f are obtained by Equations (3) and (4) of with X(t) in Equation (3) replaced, respectively for k=−1, 0, +1, by:

$$X_k^{u,l,f}(t) = \underline{R}_m \delta(t - \tau_P(t))) \otimes g^{l,n}(t) c^{u,l}(t). \quad (98)$$

In the equation above, $\underline{R}_m = [0, \ldots, 0, 1, 0, \ldots, 0]^T$ is an M-dimensional vector with null components except for the m-th one and δ(t) denotes the Dirac impulse. Reshaping matrices into vectors yields:

$$\underline{Y}_n = \sum_{u=1}^{U} \sum_{l=1}^{N_m} \sum_{k=-1}^{+1} \psi_n^u b_{n+k}^{u,l} \underline{Y}_{k,n}^{u,l} + \underline{N}_n^{pth} \quad (99)$$

$$= \sum_{u=1}^{U} \sum_{l=1}^{N_m} \sum_{f=1}^{N_f} \sum_{k=-1}^{+1} \psi_n^u b_{n+k}^{u,l} \zeta_{f,n}^u \underline{Y}_{k,n}^{u,l,f} + \underline{N}_n^{pth},$$

The particularity of the above multi-code model, where $N_m$ codes of each user share the same physical channel $\underline{H}_n^u$ and the same total received power $(\psi_n^u)^2$ should be noted. Exploitation of these common features will be discussed hereinafter in relation to adapting of the power-control and the channel-identification procedures to the multi-code configuration. The ISR combining step will now be explained.

Considering first joint ISR combining among the group of N interferers, the regular ISR modes, namely TR, R, D, H and RH easily generalize to the new multi-code configuration of $N_m$NI users instead of NI, as shown in Table 3. ISR combining operations are carried out as usual using the constraint and blocking matrices $\hat{C}_n$ and $\hat{C}_n^{i,l'}$, respectively. It should be noted, however, that a further dimension of interference decomposition and rejection arises over the codes of each user, yielding two additional ISR modes. The new modes depicted in Table 3 and referred to as MCR and MCD (multi-code R and D) characterize interference from the entire set of codes of each user by its total realization or by the decomposition of this total realization over diversities, respectively. They combine the R and D modes, respectively, with the TR mode by summing the corresponding constraints over all the multi-codes of each user.

Although these modes partly implement TR over codes, they are still robust to power estimation errors. Indeed, the fact that the received power of a given user is a common parameter shared between all codes enables its elimination from the columns of the constrain matrices (see Table 3). The MCR and MCD modes inherit the advantages of the R and D modes, respectively. They relatively increase their sensitivity to data estimation errors compared to the original modes, since they accumulate symbol errors over codes. However, they reduce the number of constraints by $N_m$.

For a desired user assigned the index d, the constraint matrix $\hat{C}_n$ is used to form the projector $\Pi_n$. The receiver of the data stream from a user-code assigned the couple-index (d,l) can simply reject the NI interfering multi-code users by steering a unit response to $\hat{\underline{Y}}_{0,n}^{d,l}$ and a null response to the constraint matrix $\hat{C}_n$ with the projector $\Pi_n$. It can further reject ISI by steering nulls to $\hat{\underline{Y}}_{-1,n}^{d,l}$ and $\hat{\underline{Y}}_{-1,n}^{d,l}$. However, the signals received from other multi-codes contribute to self-ISI. This interference, referred to here as MC-ISI, is implicity suppressed when receiving an interfering user. It can be suppressed too when receiving the desired low-power user by joint ISR among the codes of each mobile with any of the ISR modes. The multi-code constraint and blocking matrices $\hat{C}_{MC,n}^d$ and $\hat{C}_{MC,n}^{d,l'}$, respectively, as shown in Table 4 are formed, and derive the ISR beamformer coefficients for user-code (d,l) derived, as follows:

$$Q_{MC,n}^d = \left( \hat{C}_{MC,n}^{d H} \hat{C}_{MC,n}^d \right)^{-1}, \quad (100)$$

$$\Pi_{MC,n}^{d,l} = I_{M*(2L-1)} - \hat{C}_{MC,n}^d Q_{MC,n}^d \hat{C}_{MC,n}^{d,l H}, \quad (101)$$

$$\Pi_n^{d,l} = \Pi_{MC,n}^{d,l} \Pi_n, \quad (102)$$

$$\underline{W}_n^{d,l} = \frac{\Pi_n^{d,l} \hat{\underline{Y}}_{0,n}^{d,l}}{\hat{\underline{Y}}_{0,n}^{d,l H} \Pi_n^{d,l} \hat{\underline{Y}}_{0,n}^{d,l}}. \quad (103)$$

The projector $\Pi_n^{d,l}$ that is orthogonal to both MC-ISI and to the NI interferers is formed and then its response normalized to have a unity response to $\hat{\underline{Y}}_{0,n}^{d,l}$.

The above processing organization of ISR among the high-power or low-power user-codes themselves or between both subsets is a particular example that illustrates G-ISR well. The fact that joint ISR among the high-power users and joint ISR among the codes of a particular low-power user may each implement a different mode is another example that illustrates H-ISR well. In the more general case, ISR can implement a composite mode that reduces to a different mode with respect to each user. For instance, within the group of NI interferers, each user-code assigned the index (i,l) can form its own multi-code constraint and blocking matrices $\hat{C}_{MC,n}^l$ and $\hat{C}_{MC,n}^{i,l}$ along a user-specific mode ($\Pi_n$ should be set to identity in Table 4). The constraint and blocking matrices then can be reconstructed for joint ISR processing by aligning the individual constraint and blocking matrices row-wise into larger matrices as follows:

$$\hat{C}_n^i = [\hat{C}_{MC,n}^1, \ldots, \hat{C}_{MC,n}^{NI}], \quad (104)$$

$$\hat{C}_n^{i,l} = [\hat{C}_{MC,n}^1, \ldots, \hat{C}_{MC,n}^{i-1}, \hat{C}_{MC,n}^{i,l}, \hat{C}_{MC,n}^{i+1}, \ldots, \hat{C}_{MC,n}^{NI}]. \quad (105)$$

This example illustrates the potential flexibility of ISR in designing an optimal interference suppression strategy that would allocate the null constraints among users in the most efficient way to achieve the best performance/complexity tradeoff. It should be noted that, in the particular case where the TR mode is implemented, the matrices in Equations (104) and (105) are in fact vectors which sum the individual multi-code constraint vectors $\hat{C}_{MC,n}^i$ and $\hat{C}_{MC,n}^{i,l}$, respectively.

After deriving the beamformer coefficients, each MC user assigned the index u estimates its $N_m$ streams of data for $l=1, \ldots, N_m$ as follows (see FIG. 34):

$$\hat{s}_n^{u,l} = \text{Real}\{\underline{W}_n^{u,l^H} \underline{Y}_n\}, \quad (106)$$

$$\hat{b}_n^{u,l} = \text{Sign}\{\hat{s}_n^{u,l}\}, \quad (107)$$

and exploits the fact that it $N_m$ access channels share the same power, and hence smooths the instantaneous signal power of each data stream over all its codes as follows:

$$(\hat{\psi}_n^u)^2 = (1-\alpha)(\hat{\psi}_{n-1}^u)^2 + \alpha \frac{\sum_{i=1}^{N_m} |\hat{s}_n^{u,l}|^2}{N_m}. \quad (108)$$

It should be noted that the multi-code data-streams can be estimated using MRC, simply by setting the constraint matrices to null matrices. This option will be referred to as MC-MRC.

After despreading of the post-correlation observation vector $\underline{Y}_n$ by the $N_m$ spreading codes of a user assigned the index u, the following post-correlation observation vectors for $l=1, \ldots, N_m$ are obtained as follows:

$$\underline{Z}_n^{u,l} = \underline{H}_n^u \psi_n^u b_n^{u,l} + \underline{N}_{PCM,n}^{u,l} = \underline{H}_n^u s_n^{u,l} + \underline{N}_{PCM,n}^{u,l}. \quad (109)$$

The fact that all user-codes propagate through the same channel is exploited in the following cooperative channel identification scheme (see FIG. 34):

$$\hat{H}_{n+1}^u = \hat{H}_n^u + \frac{\mu}{N_m} \sum_{l=1}^{N_m} (\underline{Z}_n^{u,l} - \hat{H}_n^u \hat{s}_n^{u,l}) \hat{s}_n^{u,l}, \quad (110)$$

which implements a modified DFI scheme, referred to as multi-code cooperative DFI (MC-CDFI). MC-CDFI amounts to having the user-codes cooperate in channel identification by estimating their propagation vectors separately, then averaging them over all codes to provide a better channel vector estimate. It should be noted that implicit incorporation of the Π-DFI version in the above MC-CDFI scheme further enhances channel identification.

Since the STAR exploits a data channel as a pilot, it can take advantage of a maximum of $N_m$ expensive despreading operations. To limit their number in practice, MC-CDFI can be restricted to a smaller subset of 1 to $N_m$ user-codes. A compromise can be found between channel estimation enhancement and complexity increase.

Another solution that reduces the number of despreading operations reconstructs the following data-modulated cumulative-code after ISR combining and symbol estimation in Equations (106) and (107):

$$c_k^{u,\delta} = \frac{1}{N_m} \sum_{l=1}^{N_m} \hat{b}_n^{u,l} c_k^{u,l}. \quad (111)$$

A single despreading operation with this code yields:

$$Z_n^{u,\delta} = \psi_n^u H_n^u \left( \frac{\sum_{i=1}^{N_m} \hat{b}_n^{u,l} b_n^{u,l}}{N_m} \right) + \left( \frac{\sum_{i=1}^{N_m} \underline{N}_{PCM,n}^{u,l}}{N_m} \right) \quad (112)$$

$$\simeq \psi_n^u H_n^u + \underline{N}_{PCM,n}^{u,\delta}.$$

It has the advantage of further reducing the noise level by $N_m$ after despreading, while keeping the signal power practically at the same level[8]. The data-modulated cumulative-code can be used to implement channel identification as follows:

$$a = \text{sign}\{Re\{\hat{H}_n^{u^H} Z_n^{u,\delta}\}\}, \quad (113)$$

$$\tilde{H}_{n+1}^u = \hat{H}_n^u + \mu(Z_n^{u,\delta} - \hat{H}_n^u a \hat{\psi}_n^u) a \hat{\psi}_n^u.$$

This CDFI version is referred to as δ-CDFI (see FIG. 35).

[8] There is a small power loss due symbol estimation errors (very low in practice).

Whereas multicode operation involves user stations transmitting using multiple spreading codes, but usually at the same data rate, it is also envisaged that different users within the same system may transmit at different data rates. It can be demonstrated that the receiver modules shown in FIGS. 34 and 35 need only minor modifications in order to handle multirate transmissions since, as will now be explained, multicode and multirate are essentially interchangeable.

Multi-Code Approach to Multi-Rate ISR

Reconsidering now the conventional MR-CDMA, in this context, STAR-ISR operations previously were implemented at the rate 1/T where T is the symbol duration. As described earlier, with reference to FIG. 32, the "X option" extensions, enables reduction of noise enhancement by increasing the dimension of the observation space and provides larger margin for time-delay tracking in asynchronous transmissions. A complementary approach that decomposes the observation frame into blocks rather than extends it using past reconstructed data will now be described.

This block-processing version of STAR-ISR will still operate at the rate 1/T on data frames barely larger than the processing period T. However, it will decompose each data stream within that frame into data blocks of duration $T_r$ where $T_r$ is a power-of-2 fraction of T. The resolution rate 1/T, can be selected in the interval $[1/T, 1/T_c]$. Hence, a receiver module that processes data frames at a processing rate 1/T with a resolution rate $1/T_r$ can only extract or suppress data transmissions at rates slower than or equal to $1/T_r$. Also, the channel parameters of the processed transmissions must be almost constant in the interval T, the processing period. This period should be chosen to be much larger than the delay spread Δτ for asynchronous transmissions, but short enough not to exceed the coherence time of the channel.

Figure 36:
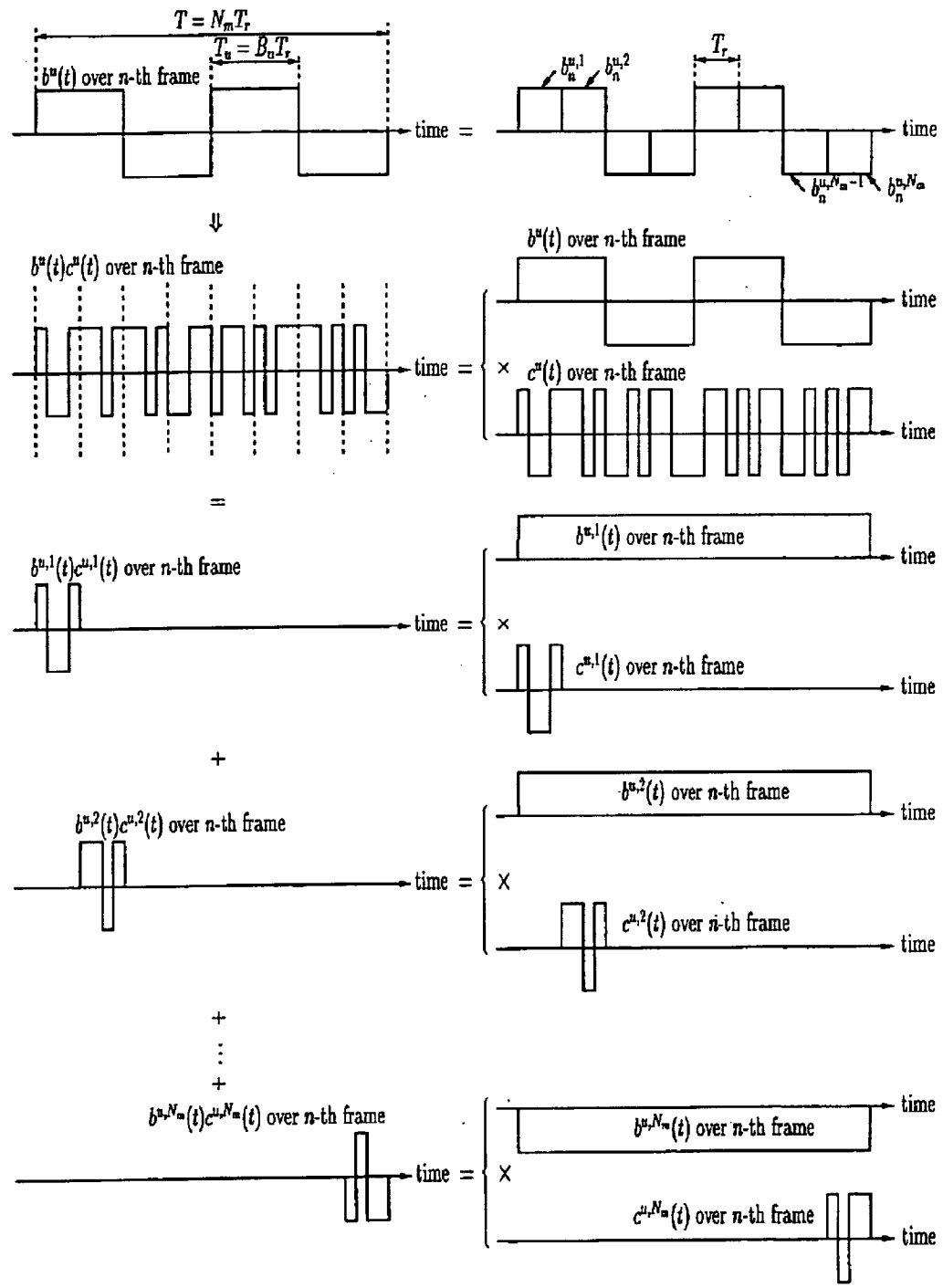
FIG. 36 illustrates how multirate can be modelled as multicode.

In one processing period, STAR-ISR can simultaneously extract or suppress a maximum $N_m = T/T_r$ blocks ($N_m$ is a power of 2). In the n-th processing period of duration T, a stream of data $b^u(i)$ yields $N_m$ samples $b_n^{u,1}, \ldots, b_n^{u,N_m}$ sampled at the resolution rate. Over this processing period, therefore, the spread data can be developed as follows:

$$c^u(t)b^u(t) = \sum_{l=1}^{N_m} b_n^{u,l} \sqcap_{T_r}^{l}(t-nT)c^u(t), \quad (114)$$

where $\sqcap_{T_r}^{l}(t)$ is the indicator function of the interval $[(l-1)T_r, lT_r)$. This equation can be rewritten as follows:

$$c^u(t)b^u(t) = \sum_{l=1}^{N_m} b^{n,l}(t)c^{u,l}(t), \quad (115)$$

where $b^{u,1}(t), \ldots, b^{u,N_m}(t)$ represent $N_m$ data-streams at rate $1/T$ spread by $N_m$ virtual orthogonal codes $c^{u,1}(t), \ldots, c^{u,N_m}(t)$ (see FIG. 36).

With the above virtual decomposition, one arrives at a MC-CDMA model where each of the processed users can be seen as a mobile that code-multiplexes $N_m$ data-streams over $N_m$ access channels. This model establishes an equivalence between MC-CDMA and MR-CDMA and provides a unifying framework for processing both interfaces simultaneously. In this unifying context, codes can be continuous or bursty. Use of bursty codes establishes another link with hybrid time-multiplexing CDMA (T-CDMA); CDMA); only the codes there are of an elementary duration $T_r$ that inserts either symbols or fractions of symbols. A larger framework that incorporates MR-CDMA, MC-CDMA, and hybrid T-CDMA can be envisaged to support HDR transmissions for third generation wireless systems.

Exploiting this MC approach to MR-CDMA, the data model of MR-CDMA will be developed to reflect a MC-CDMA structure, then a block-processing version of STAR-ISR derived that implements estimation of a symbol fraction or sequence.

The multi-code model of Equation (97) applies immediately to MR-CDMA. However, due to the fact that codes are bursty with duration $T_r < T$, the self-ISI vectors $\hat{Y}_{-1,n}^{u,l}$ and $\hat{Y}_{+1,n}^{u,l}$ and the spread propagation vector $\hat{Y}_{0,n}^{u,l}$ of a given user-code do not overlap with each other. If $\overline{\Delta\tau}$ denotes an arbitrarily enlarged delay-spread (reference [20]) to leave an increased uncertainty margin for the tracking of time-varying multipath-delays (i.e., $\Delta\tau < \overline{\Delta\tau} < T$), and if $N_r = \lceil \overline{\Delta\tau}/T_r \rceil$ denotes the maximum delay-spread in $T_r$ units, then only the last $N_r$ symbols $b_{n-1}^{u,N_m-N_r+1}, \ldots, b_{n-1}^{u,N_m}$ among the past-symbols in the previous frame may contribute to self-ISI in the current processed frame (see FIG. 37):

$$Y_n = \sum_{u=1}^{U} \left\{ \sum_{l=N_m-N_r+1}^{N_m} \psi_n^u b_{n-1}^{u,l} Y_{-1,n}^{u,l} + \sum_{l=1}^{N_m} \psi_n^u b_n^{u,l} Y_{0,n}^{u,l} + \sum_{l=1}^{N_m} \psi_n^u b_{n+1}^{u,l} Y_{+1,n}^{u,l} \right\} + N_n^{pth}, \quad (116)$$

Figure 37:
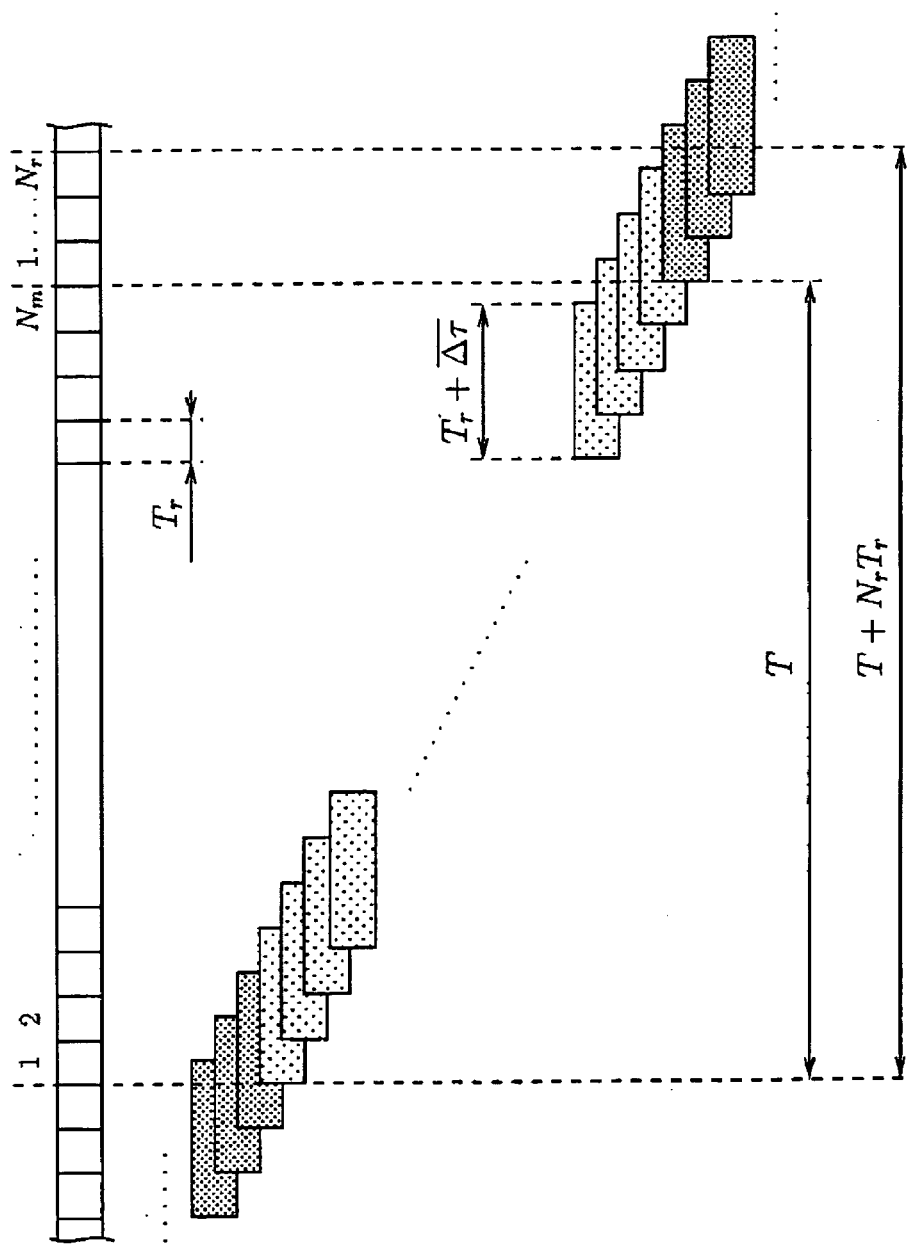
FIG. 37 illustrates frame size determination for multirate signals.

In this frame of duration $2T - T_c$, the desired signals contribution from the $N_m$ current symbols is contained in the first interval of duration $T + \overline{\Delta\tau}$, whereas the remaining interval of the frame contains non-overlapping interference from the last $N_m - N_r$ future symbols in the next frame, namely $b_{n+1}^{u,N_r+1}, \ldots, b_{n+1}^{n,N_m}$ (see FIG. 37). The remaining part of the frame can be skipped without any signal contribution loss from the current bits. Hence, the duration of the processed frame can be reduced to $T + \overline{\Delta\tau} - T_c$ as follows:

$$Y_n = [Y_{n,0}, Y_{n,1}, \ldots, Y_{n,L+L_l-2}], \quad (117)$$

where $L_\Delta = \lceil \overline{\Delta\tau}/T_c \rceil$ is the maximum length of the enlarged delay-spread in chip samples. With the data block-size reduced to $M \times (L+L_\Delta-1)$, the matched-filtering observation matrix reduces to:

$$Y_n = \sum_{u=1}^{U} \left\{ \sum_{l=N_m-N_r+1}^{N_m} \psi_n^u b_{n-1}^{u,l} Y_{-1,n}^{u,l} + \sum_{l=1}^{N_m} \psi_n^u b_n^{u,l} Y_{0,n}^{u,l} + \sum_{l=1}^{N_m} \psi_n^u b_{n-1}^{u,l} Y_{+1,n}^{u,l} \right\} + N_n^{pth}, \quad (118)$$

where $N_n^{pth}$ is the noise matrix reduced to the same dimension. This data model equation can be rewritten in the following compact vector form:

$$\underline{Y}_n = \sum_{u=1}^{U} \sum_{l=1}^{N_m} \sum_{k=-1}^{+1} \psi_n^u b_{n+k}^{u,l} \underline{Y}_{k,n}^{u,l} \lambda_k^l + \underline{N}_n^{pth}, \quad (119)$$

where $\lambda_k^i = 0$ if $k=-1$ and $l \in \{1, \ldots, N_r\}$ or if $k=+1$ and $l \in \{N_m-N_r+1, \ldots, N_m\}$, and 1 otherwise.

The constraint matrices can be formed in an MC approach to implement joint or user-specific ISR processing in any of the modes described in Tables 3 or 4, respectively. In contrast to the conventional MC-CDMA, the factor $\lambda_k^i$ discards all non-overlapping interference vectors in the processed frame and somehow unbalances ISI contribution among the virtual multi-code streams. In the DF modes, only the central streams of each user (i.e., $l=N_r+1, \ldots, N_m-N_r$) sum symbol contributions from the previous, current and future symbols; whereas the remaining streams sum signal contributions from either the current and the previous or the current and the future symbols. Indeed, the $2(N_m-N_r)$ ISI terms discarded from summation contribute with null vectors to the processed frame. In the ISR-H mode, the columns previously allocated to individually suppress these vectors are eliminated from the constraint matrices, thereby reducing the number of its columns to $N_H = N_m + 2N_r$ constraints per user[9] (see Tables 3 and 4). ISR-H hence approaches ISR-R in computational complexity when $N_r$ is small compared to $N_m$.

[9]ISR may be equally reformulated with $N_m + 2N_r$ generating sequences that process all the contributing symbols as if they were independent streams without MC-ISI. Only the $N_m$ current symbols are estimated then; the $2N_r$ remaining symbols being corrupted by the edge effect.

After derivation of the beamformer coefficients of each virtual user-code assigned the couple-index (u,l), its signal component $s_n^{u,l}$ is estimated using Equation (106). In this process, each ISR combiner rejects the processed interferers regardless of their exact data rates, which only need to be higher than the resolution rate. This feature finds its best use when implementing ISR at the mobile station on the downlink where data rates of suppressed interferers are not necessarily known to the desired mobile-station. For instance, orthogonal variable spreading factor (OVSF) allocation of Walsh spreading codes is no longer necessary. On the uplink, each transmission rate is known to the base station. However, one can still gain from this feature by allowing joint and well integrated processing of mixed data traffic at a common resolution rate.

Indeed, the estimation of the signal components provides sequences oversampled to the resolution rate $1/T_r$. Hence, after a given data stream is decomposed at this common rate, its signal component estimate must be restored to its original rate in an "analysis/synthesis" scheme. To do so, the data rate $1/T_u \leq 1/T_r$ of user u is defined and it is assumed temporarily that it is faster than the processing rate (i.e., $1/T_u \geq 1/T$). Hence, one can extract from each frame $F_u = T/T_u \leq N_m$ signal component estimates out of $N_m$ by averaging the oversampled sequence $s_n^{u,l}$ over consecutive blocks of size $B_u = N_m/F_u = T_u/T_r$ for n'=0, ..., $F_u - 1$ as follows:

$$\hat{s}_{nF_u+n'} = \frac{\sum_{l=n'B_u+1}^{(n'+1)B_u} \hat{s}_n^{u,l}}{B_u}, \quad (120)$$

$$\hat{b}_{nF_u+n'}^u = \text{Sign}\{\hat{s}_{nF_u+n'}^u\}, \quad (121)$$

$$(\hat{\psi}_n^u)^2 = (1-\alpha)(\hat{\psi}_{n-1}^u)^2 + \alpha \frac{\sum_{n'=0}^{F_u-1} |\hat{s}_{nF_u+n'}^u|^2}{F_u}. \quad (122)$$

In the particular case where the data rate is equal to the processing rate (i.e., $1/T_u = 1/T$), the equations above have simpler expressions with $F_u = 1$ and $B_u = N_m$:

$$\hat{s}_n^u = \frac{\sum_{l=1}^{N_m} \hat{s}_n^{u,l}}{N_m}, \quad (123)$$

$$\hat{b}_n^u = \text{Sign}\{\hat{s}_n^u\}, \quad (124)$$

$$(\hat{\psi}_n^u)^2 = (1-\alpha)(\hat{\psi}_{n-1}^u)^2 + \alpha |\hat{s}_n^u|^2. \quad (125)$$

If the data rate is slower than the processing rate, the signal component estimate $\hat{s}_n^u$ of Equation (123) is further averaged over consecutive blocks of size $F'_u = T_u/T$ to yield the following subsampled sequence:

$$\tilde{s}_{\lfloor n/F'_u \rfloor}^u = \frac{\sum_{n'=0}^{F'_u-1} \hat{s}_{\lfloor n/F'_u \rfloor F'_n + n'}^u}{F'_u}. \quad (126)$$

Symbol and power estimations in Equations (124) and (125) are on the other hand modified as follows:

$$\hat{b}_{\lfloor n/F'_u \rfloor}^u = \text{Sign}\{\tilde{s}_{\lfloor n/F'_u \rfloor}^u\}, \quad (127)$$

$$(\hat{\varphi}_{\lfloor n/F'_u \rfloor}^u)^2 = (1-\alpha)(\hat{\varphi}_{\lfloor n/F'_n \rfloor-1}^u)^2 + \alpha |\tilde{s}_{\lfloor n/F'_n \rfloor}^u|^2. \quad (128)$$

It should be noted that a higher value is needed for the smoothing factor α to adapt to a slower update rate of power estimation. If the channel power variations are faster than the data rate, then it is preferable to keep the power estimation update at the processing rate in Equation (125).

In this case, Equation (126) is modified as follows[10]:

$$\tilde{s}_{\lfloor n/F'_u \rfloor}^u = \frac{\sum_{n'=0}^{F'_u-1} \hat{\psi}_{\lfloor n/F'_u \rfloor F'_u + n'}^u \hat{s}_{\lfloor n/F'_u \rfloor F'_u + n'}^u}{\sum_{n'=0}^{F'_u-1} (\hat{\psi}_{\lfloor n/F'_u \rfloor F'_u + n'}^u)^2}, \quad (129)$$

to take into account channel power variations within each symbol duration.

[10] This signal component estimate is not used for power estimation. Only its sign is taken in Equation (127) as the estimate of the corresponding bit. Hence, power normalization given here for completeness is skipped in practice.

It should be noted that the multi-rate data-streams can be estimated using MRC, simply by setting the constraint matrices to null matrices. This option may be referred to as MR-MRC.

It should be also noted that combination of Equations (106) and (120), along with Equation (128) for data rates slower than the processing rate, successively implements the processing gain of each user in fractioned ISR combining steps.

In general, regrouping the symbol-fractions back to their original rate can be exploited in the design of the constraint matrices; first by reducing reconstruction errors from enhanced decision feedback; and secondly by reducing the number of constraints of a given user u from $N_m$ to $F_u$ in the modes implementing decomposition over user-codes (i.e., R, D, and H). For these modes, the common factor $N_m NI$ appearing in the total number of constraints $N_c$ reduces to $$\sum_{i=1}^{NI} F_i,$$

by regrouping the constraint vectors over the user-code indices that restore a complete symbol within the limit of the processing period[11].

[11] Feedback of symbols with rates slower than the processing rate to the constraints-set generator is feasible.

Figure 38:
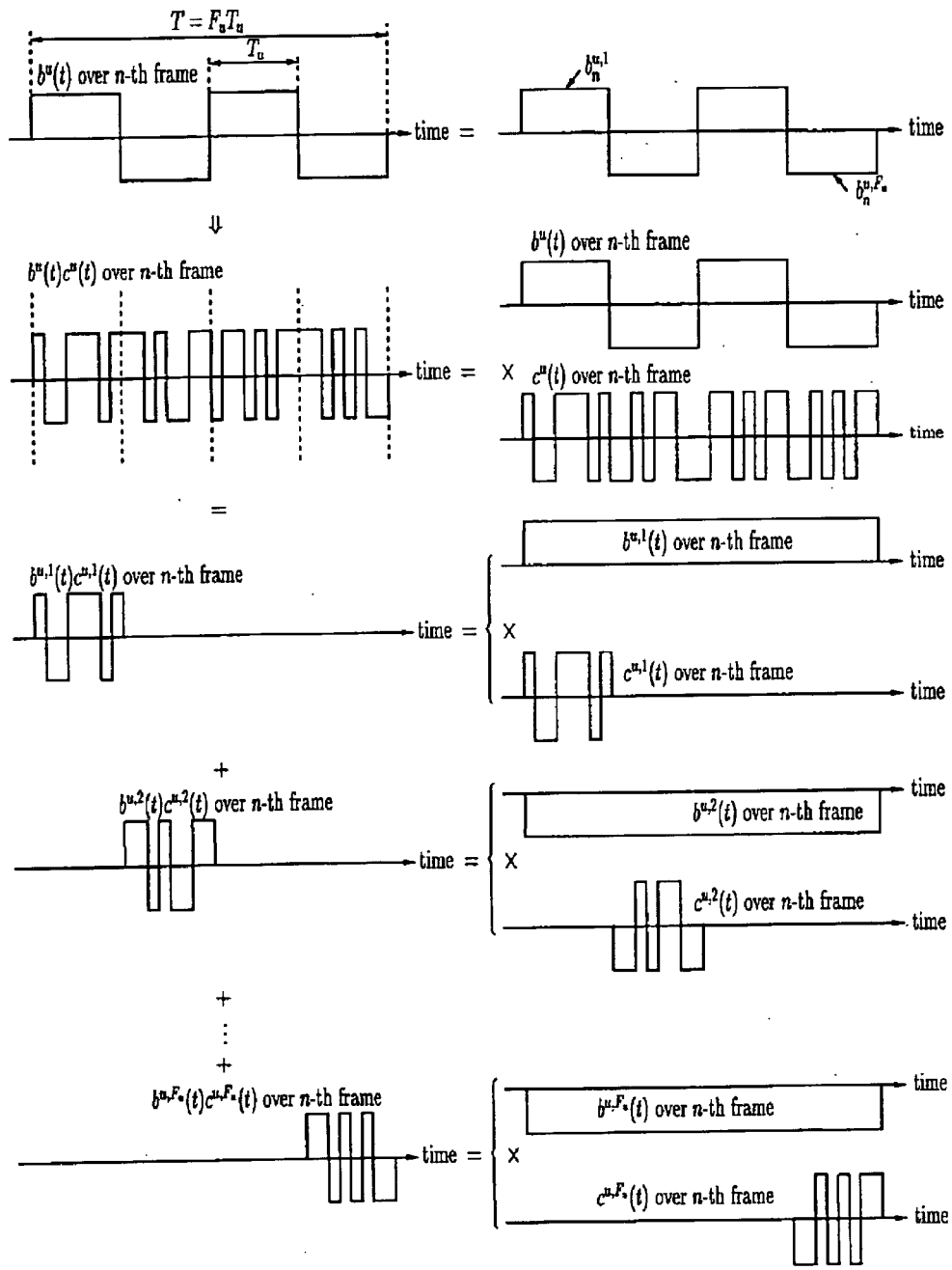
FIG. 38 illustrates grouping of multirate signals to correspond to a specific user's symbol rate.
Figure 39:
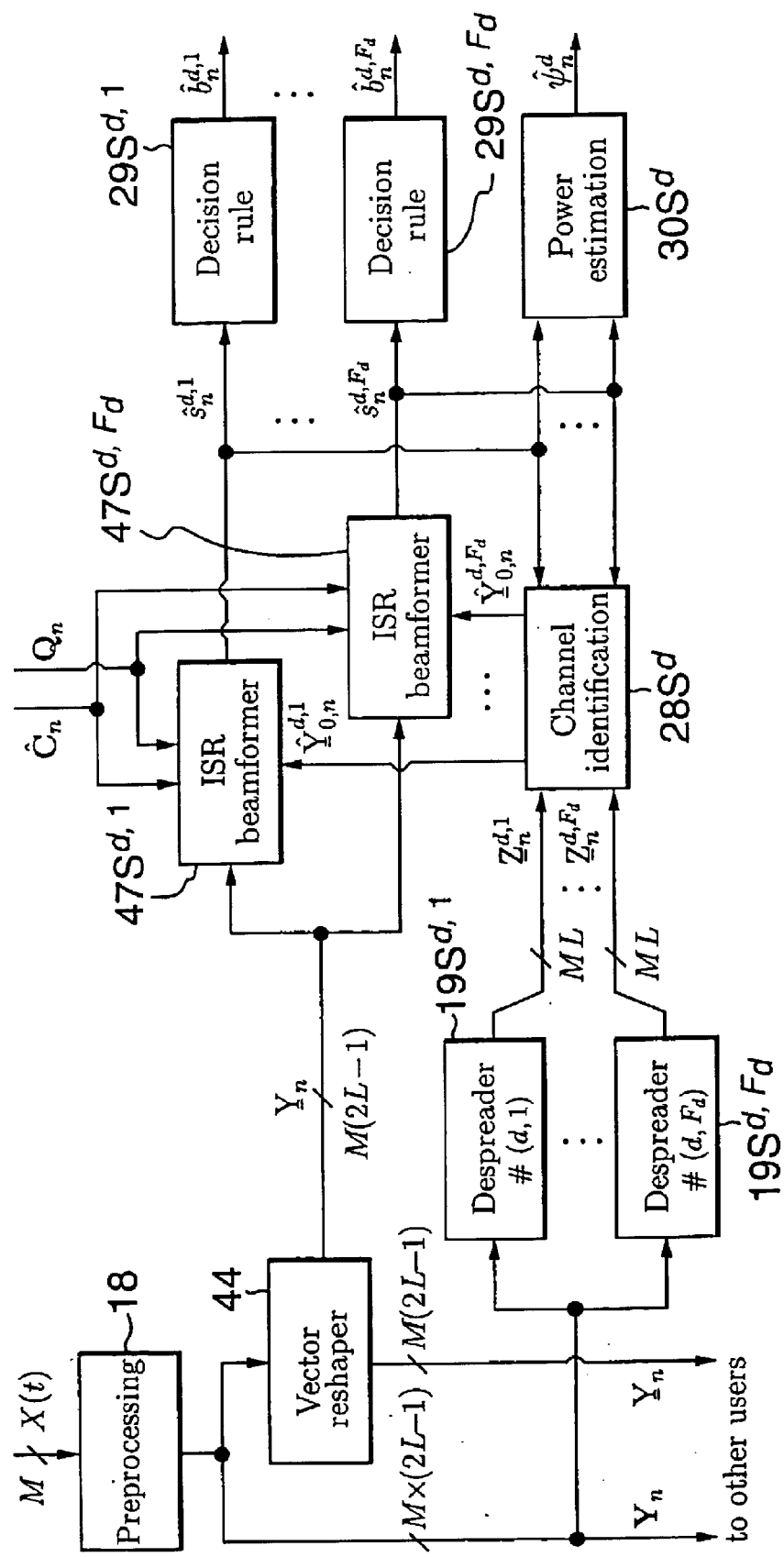
FIG. 39 illustrates an "uplink" multirate ISR receiver module for a base station.

Regrouping the constraints of user u to match its original transmission rate amounts to regrouping the codes of this user into a smaller subset that corresponds to a subdivision of its complete code over durations covering its symbol periods instead of the resolution periods. In fact, user u can be characterized by $F_u$ concatenated multi-codes instead of $N_m$. Overall, MR-CDMA can be modeled as a mixed MC-CDMA system where each user assigned the index u has its own number $F_u$ of multi-codes (see FIG. 38). Therefore, the ISR-combining and channel-identification steps can be carried out in one step along the MC formulation of the previous section, using user-codes simply renumbered from 1 to $F_u$ for simplicity. Hence, as shown in FIG. 39, the only change needed to the receiver module of FIG. 34 is to the bank of despreaders. In the receiver module shown in FIG. 34, the spreading codes used by the despreaders $19^{d,l}, \ldots, 19^{d,F_i}$ comprise segments of the spreading code of user d, i.e., the segments together form the part of the code used in a particular frame. The number of code segments $F_u$ corresponds to the number of symbols $b_n^{u,l}, \ldots, b_n^{u,F_u}$ transmitted in the frame. The estimates of these symbols, and the signal component estimates $\hat{s}_n^{u,l}, \ldots, \hat{s}_n^{u,F_u}$ map with those of Equations (120), (121), (123) and (124) within a parallel/serial transform.

This illustrates again the flexibility afforded by using ISR in designing optimal interference suppression strategies that suit well with MR-CDMA. It enables simultaneous processing of blocks of symbols or fractions of symbols in an integrated manner at two common resolution and processing rates.

To carry out channel identification operations, the $M \times L_\Delta$ reduced-size post-correlation observation matrix of user-code $(u,l)$ is defined as follows:

$$\underline{Z}_n^{u,l} = [Z_{n,0}^{u,l}, Z_{n,1}^{u,l}, \ldots, Z_{n,L_\Delta-1}^{u,l}], \quad (130)$$

where the columns of this matrix are given for $j = 0, \ldots, L_\Delta - 1$ by:

$$Z_{n,j}^{u,l} = \frac{1}{L_r} \sum_{j'=0}^{L-1} Y_{n,j+j'} C_{j'}^{u,l} = \frac{1}{L_r} \sum_{j'=(i-1)*L_r}^{l*L_r} Y_{n,j+j'} C_{j'}^u. \quad (131)$$

This correlation with the virtual user-code $(u,l)$ amounts to partial despreading by a reduced processing gain $L_r = T_r/T_c = L/N_m$, using the l-th block of length $L_r$ of the user's code $c_{j'}^u$. It should be noted that, in contrast to conventional MC-CDMA, the above partial despreading operations are less expensive in terms of complexity per user-code.

The reduced-size post-correlation observation vector $\underline{Z}_n^{u,l}$ resulting from vector-reshaping of $Z_n^{u,l}$, has the same model expression of Equations (109), except that vectors there all have reduced dimension $(ML_\Delta) \times 1$. It should be noted that the post-correlation window length $L_\Delta$ was fixed long enough to contain the delay-spread with an enlarged margin for asynchronous time-delay estimation from the reduced-size propagation vector $\underline{H}_n^u$ (reference [20]). Identification with post-correlation windows shorter than L, investigated in [6], reduces complexity and proves to work nearly as well as the original full-window version of STAR (i.e. $L_\Delta = L$).

Channel identification with the MC-CDFI scheme of Equation (110) can be readily implemented using the user-code post-correlation observation vectors $\underline{Z}_n^{u,l}$. However, this procedure would feed back symbol fractions without taking full advantage of the complete processing gain. Instead, the vectors $\underline{Z}_n^{u,l}$ are regrouped and averaged in the same way the signal component estimates are restored to their original rate in Equations (120), (123) or (126), and $\underline{Z}_{n,F_t+n'}^u, \underline{Z}_n^u$ or $\underline{Z}_{\lfloor n/F_u' \rfloor}^u$, respectively[12] are obtained. Hence, the CDFI channel identification procedure, renamed MR-CDFI, is implemented as follows:

$$\tilde{\underline{H}}_{n+1}^u = \hat{\underline{H}}_n^u + \frac{\mu}{F_u} \sum_{n'=0}^{F_u-1} (\underline{Z}_{nF_u+n'}^u - \hat{\underline{H}}_n^u \hat{s}_{nF_u+n'}^u) \hat{s}_{nF_u+n'}^u, \quad (132)$$

when the data-rate is faster than the processing rate[13], or by:

$$\tilde{\underline{H}}_{n+1}^u = \hat{\underline{H}}_n^u + \mu(\underline{Z}_n^u - \hat{\underline{H}}_n^u \hat{s}_n^u) \hat{s}_n^u, \quad (133)$$

in the particular case where the data rate is equal to the processing rate, or by:

$$\hat{\underline{H}}_{\lfloor n/F_u' \rfloor}^u = \hat{\underline{H}}_{\lfloor n/F_u' \rfloor}^u + \mu(\underline{Z}_{\lfloor n/F_u' \rfloor}^u - \hat{\underline{H}}_{\lfloor n/F_u' \rfloor}^u \hat{s}_{\lfloor n/F_u' \rfloor}^u) \hat{s}_{\lfloor n/F_u' \rfloor}^u, \quad (134)$$

when the data-rate is slower than the processing rate. It should be noted that channel identification at data rates faster than the processing gain in Equation (132) has a structure similar to MC-CDFI. Averaging over $F_u$ despread observations there can be reduced to a smaller subset to gain in complexity like in MC-CDMA. Use of the $\delta$-CDFI version described in Equations (111) to (113) instead of, or combination with, the above scheme are other alternatives that reduce the amount of complexity due to despreading operations.

[12] In practice, these vectors are computed directly from $Y_n$ in regular despreading steps which exploit the entire spreading sequences in one step along a mixed MC-CDMA scheme.

[13] Implementation of $F_u$ channel updates (with time-delay tracking) instead of averaging is computationally more expensive.

By regrouping codes to match the original data transmission rates as discussed earlier (see FIG. 38), channel identification can be easily reformulated along a mixed MC-CDMA model where each user is characterized by $F_u$ multi-codes and $F_u$ despread vectors $\underline{Z}_n^{u,1}, \ldots, \underline{Z}_n^{u,F_u}$, as shown in FIG. 39.

To reduce further the number of expensive despreading operations, slower channel identification (reference [20]) can update channel coefficients less frequently if the channel can still show very weak variations over larger update periods. However, high mobility can prevent the implementation of this scheme and faster channel identification update may even be required. For data rates faster than the processing rate, updating at a rate higher than the processing rate is not necessary. The processing period T is chosen to guarantee that the channel parameters are constant over that time interval. For data rates slower than the processing rate, the channel update rate could be increased above the data rate up to the processing rate using Equation (133) and partial despreading to provide $\underline{Z}_n^u$. In Equation (133), $\hat{s}_{\lfloor n/F_u' \rfloor}^u$ from Equation (126) should be fed back instead of $\hat{s}_n^u$ to benefit from the entire processing gain in the decision feedback process.

Although the foregoing embodiments of the invention have been described as receiver modules for a base station, i.e., implementing ISR for the uplink, the invention is equally applicable to the downlink, i.e., to receiver modules of user stations.

Downlink ISR

Figure 48:
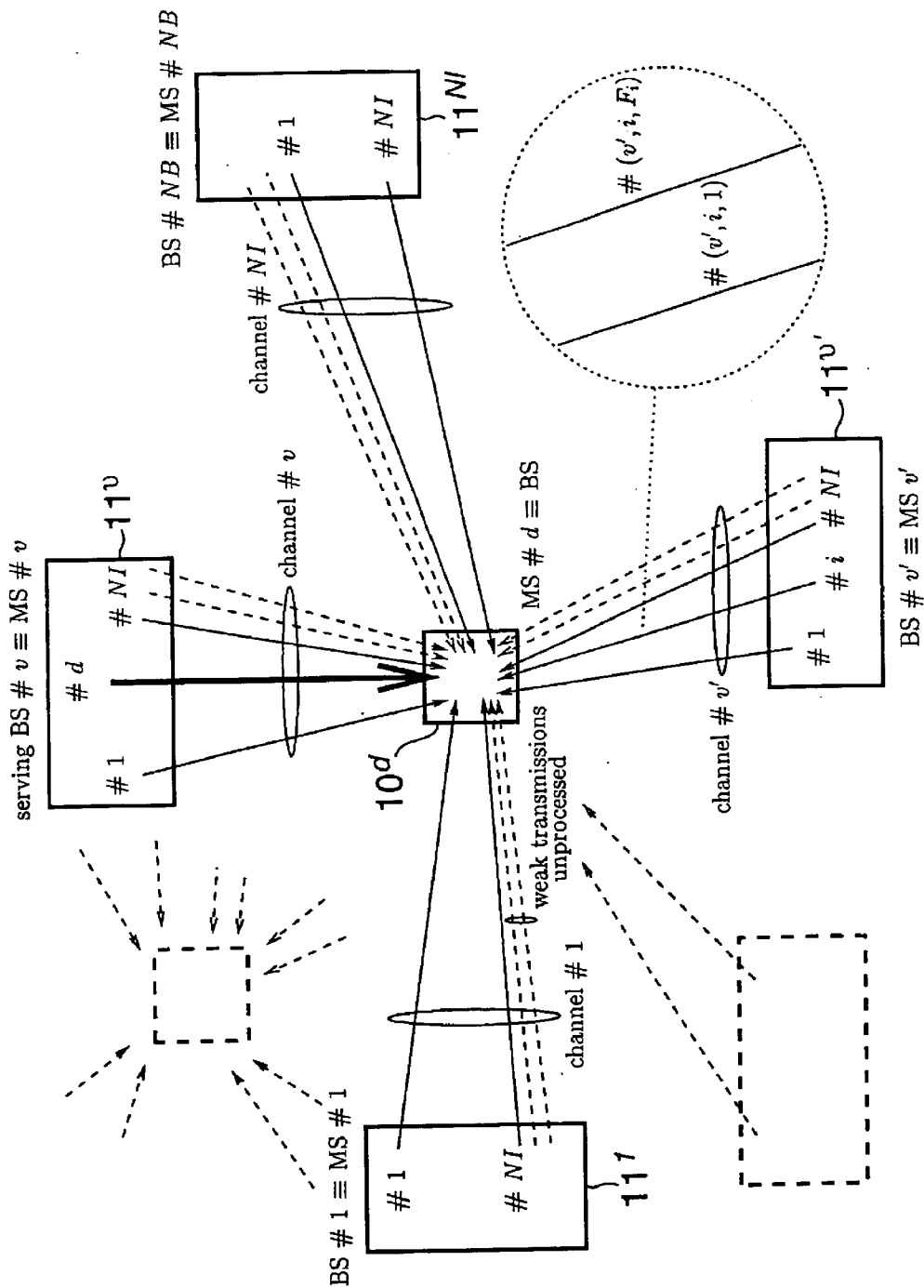
FIG. 48 illustrates modelling of the downlink as an uplink.

FIG. 48 illustrates how the downlink can be modelled like an uplink, so that the ISR techniques developed for the uplink can be employed. FIG. 48 shows a single (desired user) mobile $10^d$ which will be one of many, receiving signals from all base stations within range. Only the serving base station $11^v$ and three main interfering base stations $11^1, \ldots, 11^v, \ldots 11^{NI}$ are shown. The mobile station may communicate with two or three base stations at a given time, so two of the interferers could be such other stations. The bold arrow illustrates that only one signal, the desired user signal d from server base station $11^v$ is the signal which is to be received. The serving base station $11^v$ will also transmit to other mobiles and those signals will also be received by mobile $10^d$ as interfering signals. Also, each of the other three base stations will be transmitting. Even though one of the signals from each of the other base stations are intended for the mobile d, they constitute interference so far as the reception of signal $10^d$ from serving base station $11^v$ is concerned, Basically, signals #1 to #NI of BS $11^v$ (excepting d) are in-cell interferers and the interfering signals from the other base stations are out-cell interferers.

The base stations range from #1 to # NB. BS $11^v$ is a generic one of them. BS $11^v$ is a specific one of the NB stations is the serving base station.

There will be other signals from other base stations, some of which are shown in broken lines, and other signals also shown in broken lines, from the base stations shown in full, since FIG. 48 shows only the strongest signals transmitted by each base station. I.e., there will be more than NI mobile stations in cell v but their transmissions weaker. Those mobiles close to the base station will require weak transmissions whereas those far from the base station will require more power, and the base station power control will increase transmit power to achieve it. Also, the data rates could vary and hence affect power levels. Consequently, many signals are not represented in FIG. 48. They are ignored because they are relatively weak. Of course, they will be part of the noise signal represented in FIG. 2.

Each base station may be transmitting multiple codes, so its signal will have a multi-code structure. Because these signals are being transmitted via the same antenna, they are similar to a multicode signal. Hence, mobile station $10^d$ receives from base station $11^v$ the signals #1 . . . d . . . NI via channel v, so those signals appear to be a multicode signal. The same applies to signals received from other base stations for processing.

The "zoom" inset shows the signal transmitted to a mobile station i by its serving base station v' but received as interference by mobile $10^d$. It could be a multirate and/or multicode signal, since it is a summation of different signals using different codes and possibly different rates as described with reference to FIGS. 40–42, for example, though their despreaders handle all interferers whereas here we select only one. The composite signal comprises components transmitted from base station v' to user i using codes ranging from 1 to $F_i$, i.e., from first component #(v', i, 1) to a final component (v', i, $F_i$). Hence the multicode structure model developed for the uplink applies to the downlink as well at the mobile receiver.

To implement ISR rejection, the user/mobile station needs to identify the group of users (i.e., interferers) to suppress. Assuming temporarily that suppression is restricted to in-cell users, served by base-station v, and that the number of suppressed interferers is limited to NI to reduce the number of receivers needed at the desired base-station to detect each of the suppressed users, in order to identify the best users to suppress, the user station can probe the access channels of base-station v, seeking the NI strongest transmissions. Another scheme would require that the strongest in-cell interfering mobiles cooperate by accessing the first NI channels (i.e. u=i∈{1, . . . , NI}) of base-station v.

Once the NI suppression channels have been identified, the desired user-station can operate as a "virtual base-station" receiving from NI "mobiles", i.e., base station transmitter modules, on a "virtual uplink". If the desired user is not among the NI interferers, an additional user station is considered. Similar NI channels may be identified for transmissions from the neighbouring base-stations. Accordingly, consideration will be given to the NB base-stations, assigned the index v'∈{1, . . . , NB}, which include the desired base-station with index v'=v without loss of generality. This formulation allows the user-station to apply block-processing STAR-ISR with specific adaptations of ISR combining and channel identification to the downlink.

In essence, each "virtual base station" user station would be equipped with a set of receiver modules similar to the receiver modules $20^1$, . . . , $20^U$, one for extracting a symbol estimate using the spreading code of that user station and the others using spreading codes of other users to process actual or hypothesized symbol estimates for the signals of those other users. The receiver would have the usual constraints-set generator and constraint matrix generator and cancel ISR in the manner previously described according to the mode concerned.

It should be appreciated, however, that the signals for other users emanating from a base station are similar to multicode or multirate signals. Consequently, it would be preferable for at least some of the user station receiver modules to implement the multicode or multirate embodiments of the invention with reference to FIGS. 34 and 39. Unlike the base station receiver, the user stations receiver modules usually would not know the data rates of the other users in the system. In some cases, it would be feasible to estimate the data rate from the received signal. Where that was not feasible or desired, however, the multirate or multicode receiver modules described with reference to FIGS. 34 and 39 could need to be modified to dispense with the need to know the data rate.

Figure 40:
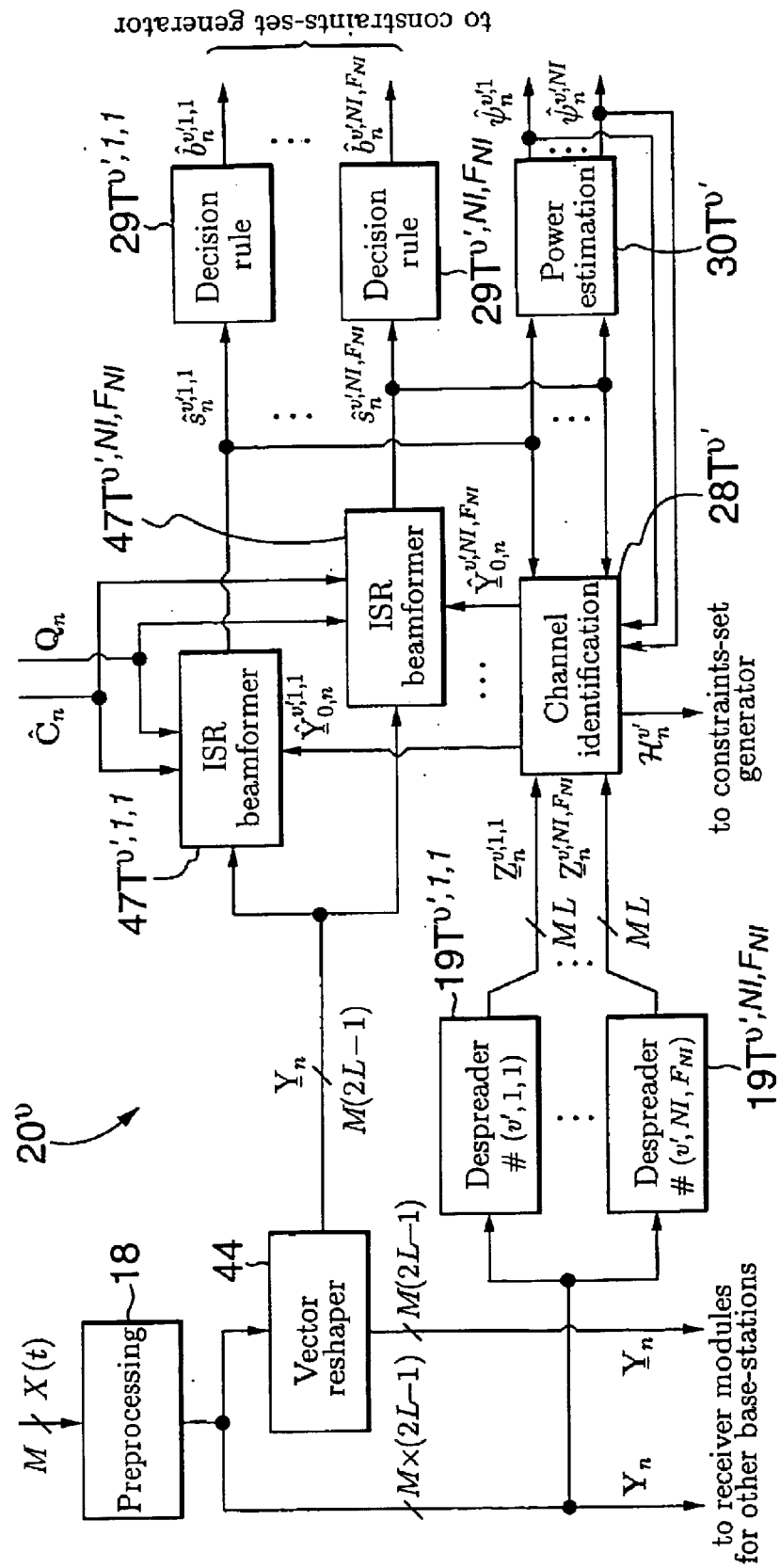
FIG. 40 illustrates one of a plurality of "downlink" multirate receiver modules for a user station operating as a "virtual base station"

Referring to FIG. 40, the user station receiver comprises a plurality of receiver modules similar to those of FIG. 39, one for each of the NB base stations whose NI strongest users' signals are to be cancelled, though only one of them, receiver module $20^{v'}$ for base station v', is shown in FIG. 40. Recognizing that one or more of those NI signals could be multirate or multicode, and hence involve not only different spreading codes but also different code segmentations, the number of despreaders equals $$\sum_{i=1}^{i=NI} F_i,$$

i.e. $19^{v',1,1}$, . . . , $19^{v',1,F_1}$, . . . , $19^{v',i,1}$, . . . , $19^{v',i,F_n}$, . . . , $19^{v',NI,1}$, . . . , $19^{v',NI,F_{NI}}$. In any given base station, the NI users are power-controlled independently and so are received by the mobile/user station with different powers. Consequently, it is necessary to take into account their power separately, so the power estimates from power estimation means $30T^{v'}$ are supplied to the channel identification unit $28T^{v'}$. The channel identification unit $28T^{v'}$ processes the data in the same way as previously described, spreading the resulting channel vector estimate $\underline{\hat{H}}_{0,n}^{v'}$ to form the spread channel vector estimates $\underline{\hat{Y}}_{0,n}^{v',1,1}$, . . . , $\underline{\hat{Y}}_{0,n}^{v',NI,F_{NI}}$ and supplying them to the ISR beamformers $47T^{v',1,1}$, . . . , $47T^{v',NI,F_{NI}}$, respectively, for use in processing the observation vector $Y_n$.

The resulting signal component estimates $\hat{s}_n^{v',1,1}$, . . . , $\hat{s}_n^{v',NI,F_{NI}}$ are similarly fed back to the channel identification unit $28T^{v'}$ to update the channel vector estimates and to the decision rule units $30T^{v',1,1}$, . . . , $30T^{v',NI,F_{NI}}$ for production of the corresponding symbol estimates $\hat{b}_n^{v',1,1}$, . . . , $\hat{b}_n^{v',NI,F_{NI}}$. In all modes except ISR-H, these symbol estimates are supplied to the constraints-set generator (not shown in FIG. 40), together with the set of channel vector estimates $\hat{b}_n^{v'}$, from channel identification unit $28T^{v'}$ for use by the constraint matrix generator (not shown) in forming the set of constraints $C_n$. The set of channel parameter estimates includes the power estimates from the power estimation units. It should be noted that the constraints-set generator and constraint matrix generator may be described hereinbefore, the actual configuration and operation being determined by the particular ISR mode selected.

If the desired user, i.e. of the user station receiver $20^v$, is among the NI users, its symbols will be extracted and output to the subsequent parts of the receiver in the usual way. If, however, the desired user is not among the NI strong users of the serving base station v, the user station receiver will include not only one of the receiver modules of FIG. 40 for each base station but also a separate receiver module specifically for extracting the signal for the desired user and which could be similar to that shown in FIG. 39.

Figure 41:
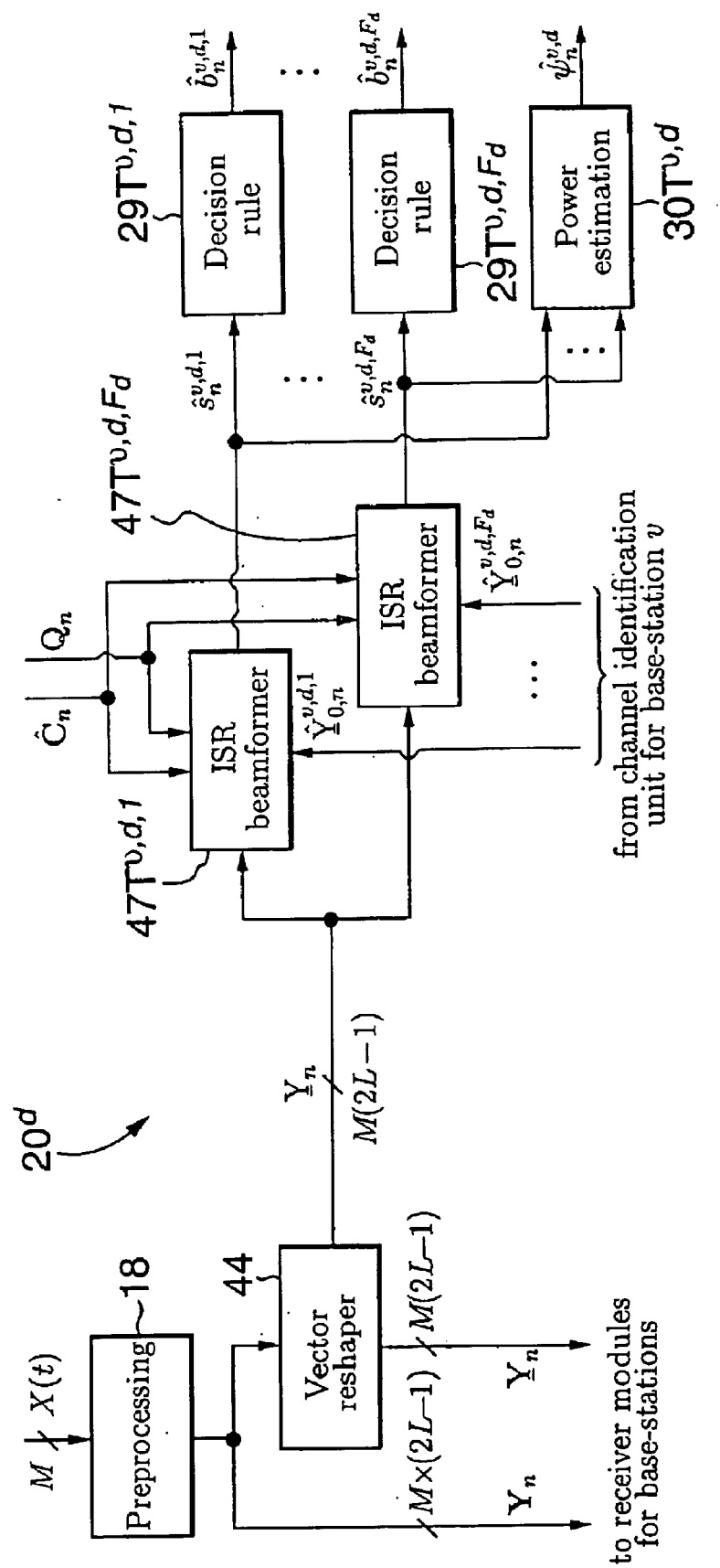
FIG. 41 illustrates a "downlink" multirate receiver module of the user station of FIG. 41 for extracting signals for that user station.

Bearing in mind, however, that the channel vector estimate derived by the receiver module for the serving base station's strong users in FIG. 40 will be for the same channel, but more accurate than the estimate produced by the channel identification unit of FIG. 39, it would be preferable to omit the channel identification unit ($29^{Fi}$) and despreaders $19^{d,1}, \ldots, 19^{d,F_d}$ (FIG. 39), and supply the spread channel vector estimates from the channel identification unit of the receiver module for serving base station v. As shown in FIG. 41, in such a modified receiver module $20T^d$, the beamformer means comprises a bank of ISR beamformers ($47T^{v,d,1}, \ldots, 47T^{v,d,F_d}$), a bank of decision rule means ($29T^{v,d,1}, \ldots, 29T^{v,d,F_d}$), and power estimation means $30T^{v,d}$ which process elements of the observation vector $\underline{Y}_n$ from vector reshaper 44 in a similar manner to the receiver module of FIG. 39. The bank of beamformers ($47T^{v,d,1}, \ldots, 47T^{v,d,F_d}$), are tuned, however, by a set of channel vector estimates ($\hat{\underline{Y}}_{0,n}^{v,d,1}, \ldots, \hat{\underline{Y}}_{0,n}^{v,d,F_d}$), produced by the channel estimation means ($28T^v$) (FIG. 40) corresponding to serving base station v, which produces the channel vector estimate $\hat{H}_n^v$ and spreads it to produce the channel vector estimates ($\hat{\underline{Y}}_{0,n}^{v,d,1}, \ldots, \hat{\underline{Y}}_{0,n}^{v,d,F_d}$),.

Figure 42:
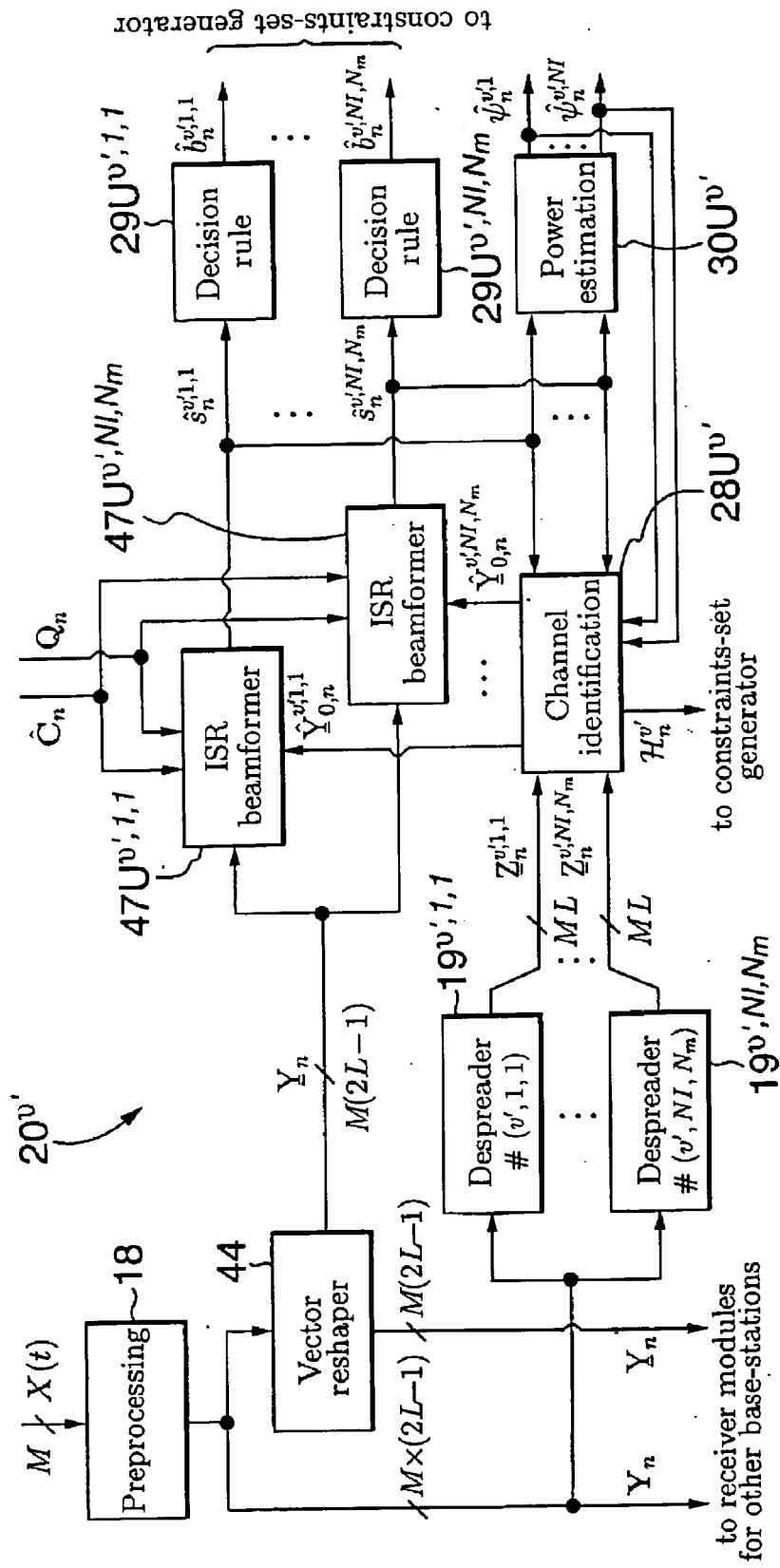
FIG. 42 illustrates a multicode alternative to the receiver module of FIG. 40.

The receiver module shown in FIG. 40 is predicated upon the data rates of each set of NI users being known to the instant user station receiver. When that is not the case, the receiver module shown in FIG. 40 may be modified as shown in FIG. 42, i.e., by changing the despreaders to segment the code and oversample at a fixed rate that is higher than or equal to the highest data rate that is to be suppressed.

Figure 43:
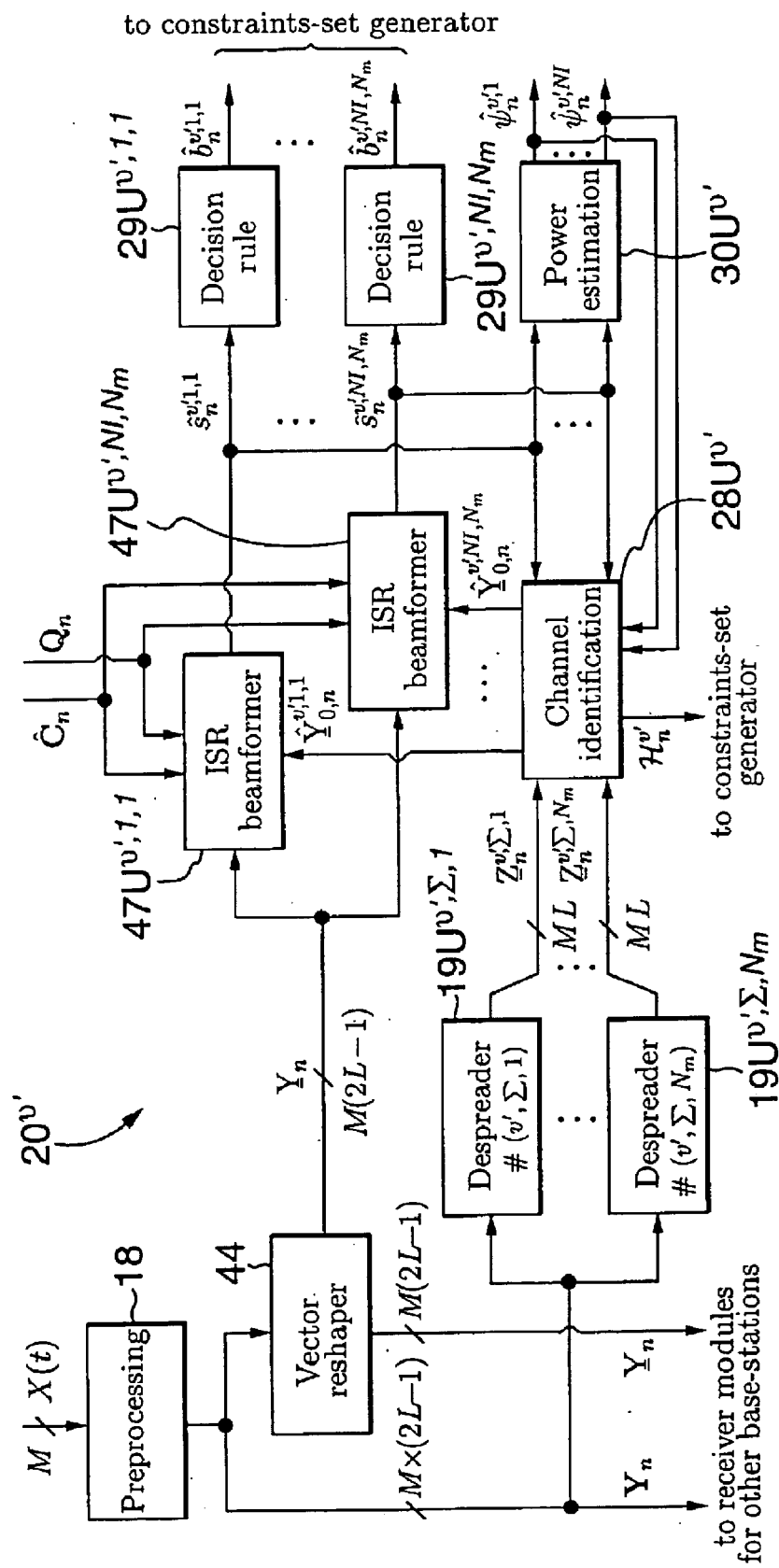
FIG. 43 illustrates a second alternative to the receiver module of FIG. 40.

It is also possible to reduce the number of despreading operations performed by the receiver module of FIG. 42 by using a set of compound segment codes as previously described with reference to FIG. 35 to compound over segments. However, as shown in FIG. 43, a set of different compound codes could be used to compound over the set of NI interferers. It would also be possible to combine the embodiment of FIG. 43 with that of FIG. 35 and compound over both the set of interferers and each set of code segments.

A desired user station receiver receiving transmissions on the downlink from its base-station and from the base-stations in the neighbouring cells will now be discussed. Each base-station communicates with the group of user stations located in its cell. Indices v and u will be used to denote a transmission from base-station v destined for user u. For simplicity of notation, the index of the desired user station receiving those transmissions will be omitted, all of the signals being implicity observed and processed by that desired user station.

Considering a base-station assigned the index v, its contribution to the matched-filtering observation vector $\underline{Y}_n$ of the desired user station is given by the signal vector of the v-th base-station $\underline{Y}_n^v$ defined as:

$$Y_{u,n}^u = \sum_{u=1}^{U_v} Y_{u,n}^{v,u}, \quad (135)$$

where the vector $\underline{Y}_{u,n}^{v,u}$ denotes the signal contribution from one of the $U_v$ users communicating with base-station v and assigned the index u. Using the block-processing approach described in the previous section, the vector $\underline{Y}_{u,n}^{v,u}$ can be decomposed as follows:

$$Y_n^{v,u} = \psi_n^{v,u} \sum_{l=k}^{N_m} \sum_{k=-1}^{+1} b_{n+k}^{v,u,l} \zeta_{f,n}^{v} Y_{k,n}^{v,u,l,f} \lambda_k^l, \quad (136)$$

It should be noted that the channel coefficients $\zeta_{f,n}^v$ just hold the index of the base-station v. Indeed, transmissions from base-station u to all its mobiles propagate to the desired user station through a common channel. Base-station signals therefore show a multi-code structure at two levels. One comes from the virtual or real decomposition of each user-stream into multiple codes, and one, inherent to the downlink, comes from summation of code-multiplexed user-streams with different powers. As will be described hereinafter, this multi-code structure will be exploited to enhance cooperative channel identification at both levels.

In a first step, the desired user-station estimates the multi-code constraint and blocking matrices of each of the processed in-cell users (i.e., $u \in \{1, \ldots, NI\} \cup \{d\}$). Table 4 shows how to build these matrices, renamed here as $\hat{C}_{MC,n}^{v,u}$ and $\hat{C}_{MC,n}^{v,u,l}$ to show the index v of the serving base-station. Indexing the symbol and channel vector estimates with v in Table 4 follows from Equation (136). In a second step, the user-station estimates the base-specific constraint and blocking matrices $\hat{C}_{BS,n}^v$ and $\hat{C}_{BS,n}^{v,u,l}$ using Table 5. These matrices enable suppression of the in-cell interferers using one of the modes described in Table 5. For the downlink, a new mode BR, for base-realization, replaces the TR mode of Table 3. Suppression of interfering signals from multiple base-stations adds another dimension of interference decomposition and results in TR over the downlink as shown in Table 6. Therefore, in a third step the mobile-station estimates the base-specific constraint and blocking matrices $\hat{C}_{BS,n}^v$ and $\hat{C}_{BS,n}^{v,u,l}$ from the interfering base-stations and concatenates them row-wise to form the multi-base constraint and blocking matrices denoted as $\hat{C}_n$ and $\hat{C}_n^{v,u,l}$, respectively. In the TR mode, the base-specific constraint and blocking vectors in the BR mode now are summed over all interfering base-stations, leaving a single constraint. For the other modes, the number of constraints $N_c$ in Table 3 is multiplied by the number of interfering base-stations NB. The receiver module dedicated to extracting the data destined to the desired mobile-station #d from the serving base station #v is depicted in FIG. 41.

It should be noted that the multi-rate data-streams can be estimated using MRC on the downlink, simply by setting the constraint matrices to null matrices[14]. This option will be termed D-MRC.

[14] In this case, ISR processing is not needed and the desired signal is expected to be strong enough to enable reliable channel identification for its own.

If the user-station knows[15] the data rates of the suppressed users, it can estimate their symbols[16] as long as their symbol rate does not exceed the processing rate. As mentioned hereinbefore, this block-based implementation of the symbol detection improves reconstruction of the constraint matrices from reduced decision feedback errors[17]. Otherwise, the user-station can process all interfering channels at the common resolution rate regardless of their transmission rate. It should be noted that estimation of the interferers' powers is necessary for reconstruction in both the BR and TR modes, for channel identification as detailed below, and possibly for interference-channel probing and selection. It is carried out at the processing rate.

[15] Data-rate detection can be implemented using subspace rank estimation over each stochastic sequence of $N_m$ symbol fractions.
[16] In the ISR-H mode, only the signal component estimates are needed for power and channel estimation (see next subsection).
[17] Recovery of the interfering symbols at data rates slower than the processing gain could be exploited in slow channel identification. However, selection of a user as a strong interferer suggests that its transmission rate should be high.

Identification of the propagation channels from each of the interfering base-stations to the desired user station is required to carry out the ISR operations. Considering the in-cell propagation channel, its identification from the post-correlation vectors of the desired user is possible as described hereinbefore with reference to FIG. 39. It exploits the fact that the multi-codes of the desired user propagate through the same channel. However, the in-cell interfering users share this common channel as well. Therefore, the MC-CDFI and MR-CDFI approaches apply at this level as well. Indeed, the user-station has access to data channels which can be viewed as NI×$N_m$ virtual pilot-channels with strong powers. It is preferable to implement cooperative channel identification over the interfering users whether the desired user is among the in-cell interferers or not. The same scheme applies to the neighbouring base-stations and therefore enables the identification of the propagation channel from each out-cell interfering base-station using its NI interfering users.

If the data rates are known to the base-station, identification of the propagation channel from a given base-station $v' \in \{1, \ldots, NB\}$ can be carried out individually from each of its NI interfering users, as described in the previous section. To further enhance channel identification, the resulting individual channel vector estimates are averaged over the interfering users. Both steps combine into one as follows:

$$\tilde{H}_{n+1}^{v'} = \tilde{H}_n^{v'} + \frac{\mu}{\sum_{i=1}^{NI}(\hat{\psi}_n^{v',i})^2} \sum_{i=1}^{NI} \frac{1}{F_i} \sum_{n'=0}^{F_i-1} (Z_{nF_i+n'}^{v',i} - \hat{H}_n^{u} \hat{s}_{nF_i+n'}^{v',i}) \hat{s}_{nF_i+n'}^{v',i}. \quad (137)$$

This downlink version of MR-CDFI, referred to as DMR-CDFI, is illustrated in FIG. 40. It should be noted that averaging over the interferers takes into account normalization by their total power, To reduce the number of despreading operations, averaging over interferers can be limited to a smaller set ranging between 1 and NI.

If the data rates of the interfering users are unknown to the user-station, identification can be then carried out along the steps described with reference to FIG. 34 to process interfering signals at the common resolution rate as follows:

$$\tilde{H}_{n+1}^{v'} = \hat{H}_n^{v'} + \frac{\mu}{N_m \sum_{i=1}^{NI}(\hat{\psi}_n^{v'})^2} \sum_{i=1}^{NI} \sum_{l=1}^{N_m} (Z_n^{v',i,l} - \hat{H}_n^{v'} \hat{s}_n^{v',i,l}) \hat{s}_n^{v',i,l}. \quad (138)$$

This downlink version of MC-CDFI, referred to as DMC-CDFI, is illustrated in FIG. 42. To reduce the number of despreading operations, averaging over interferers and user-codes can be limited to smaller subsets ranging between 1 and NI and 1 and $N_m$, respectively.

An alternative solution that reduces the number of despreading operations utilizes the following cumulative multi-codes for $l=1, \ldots, N_m$:

$$c_k^{v',\Sigma,l} = \frac{1}{\sqrt{NI}} \sum_{i=1}^{NI} c_k^{v',i,l}. \quad (139)$$

Despreading with these cumulative codes yields:

$$Z_n^{v',\Sigma,l} = H_n^{v'} \left( \frac{\sum_{i=1}^{NI} s_n^{v',i,l}}{\sqrt{NI}} \right) + \left( \frac{\sum_{i=1}^{NI} N_{PCM,n}^{v',i,l}}{\sqrt{NI}} \right) \quad (140)$$

$$= H_n^{v'} s_n^{v',\Sigma,l} + N_{PCM,n}^{v',\Sigma,l}.$$

Averaging the user-codes over interferers does not reduce noise further after despreading. However, the composite signal $\hat{s}_n^{v',\Sigma,l}$ collects an average power from the NI interferers and therefore benefits from higher diversity, The cumulative multi-codes can be used to implement channel identification as follows:

$$\tilde{H}_{n+1}^{v'} = \hat{H}_n^{v'} + \frac{\mu}{N_m(\hat{\psi}_n^{v',\Sigma})^2} \sum_{l=1}^{N_m} (Z_n^{v',\Sigma,l} - \hat{H}_n^{v'} \hat{s}_n^{v',\Sigma,l}) \hat{s}_n^{v',\Sigma,l}, \quad (141)$$

where:

$$\hat{s}_n^{v',\Sigma,l} = \frac{\sum_{i=1}^{NI} \hat{s}_n^{v',i,l}}{\sqrt{NI}}, \quad (142)$$

$$(\hat{\psi}_n^{v',\Sigma})^2 = (1-\alpha)(\hat{\psi}_{n-1}^{v',\Sigma})^2 + \alpha \frac{\sum_{l=1}^{N_m} \sum_{i=1}^{NI} |\hat{s}_n^{v',i,l}|^2}{N_{in} NI}. \quad (143)$$

This downlink version of MC-CDFI, referred to as DSMC-CDFI, is illustrated in FIG. 43. Again, averaging over a smaller set of user-codes reduces the number of despreading operations. Use of the δ-CDFI version described in Equations (111) to (113) instead of, or combination with, the above scheme[18], are other alternatives that reduce the amount of complexity due to despreading operations.

[18] Summing user-codes over resolution periods does not increase diversity. However, use of the δ-CDFI version further reduces noise after despreading.

In situations where a pilot code is transmitted, it can be incorporated into the cumulative code. This version which we denote δπ-MC-CDFI, uses a data modulated cumulative code over multi-codes, interferers, and pilot(s) for despreading. We also introduce normalization by powers in order to meet situations with significant differences in powers (such as on the downlink). δπ-MC-CDFI uses the following code for despreading:

$$c_k^{v',\delta\pi} = \quad (144)$$

$$\frac{1}{\sum_{l=1}^{N_m} \left[ \sum_{i=1}^{NI} (\psi_n^{v',i,l})^2 + (\lambda^\pi \psi_n^{v',l})^2 \right]} \sum_{l=1}^{N_m} \left[ \sum_{i=1}^{NI} \hat{s}_n^{v',i,l} c_k^{v',i,l} + \lambda^\pi \pi_k^{v',l} \right],$$

where $\pi$, is the spread pilot signal and $\lambda^\pi$ is a weight factor which may serve to signify the pilot since no decision errors are associated with it. In the special case where $\lambda^\pi = 0$, the scheme amounts to δ-MC-CDFI with normalization by powers.

Moreover, these downlink versions could be combined with the pilot assisted ISR embodiments described with reference to FIGS. 44 and 46. It will be appreciated that the pilot channel will not be user-specific but rather specific to the serving base station or to a group of user stations served by that serving base station. In such cases, the pilot power is relatively strong so the corresponding beamformer (see FIG. 46) may implement simple MRC instead of ISR.

The embodiments of the invention described so far use one transmit (Tx) antenna. Adding spatial dimension using multiple Tx antennas provides a means of supporting more users. In the following section we present a transmitter structure especially suited for high-rate low-processing gain downlink transmission, which can potentially provide high capacity when ISR is employed at the receiver.

Multiple-Input, Multiple Output (MIMO) ISR with Space-Time Coding (STC)

On the uplink, increasing the number of receive (Rx) antennas from one to two almost doubles capacity of the system when ISR is employed at the BS. The improvement results from the additional spatial dimension which allows users to be distinguished not only by their code but also by their spatial signature. When, on the downlink, a single Tx antenna is employed, all signals originating from one specific base station (BS) antenna have the same spatial signature at the antenna array of the receiver. It is therefore a demand that the BS transmitter is equipped with multiple antennas and that a wise space-time coding strategy for transmitting signals is employed.

Figure 49:
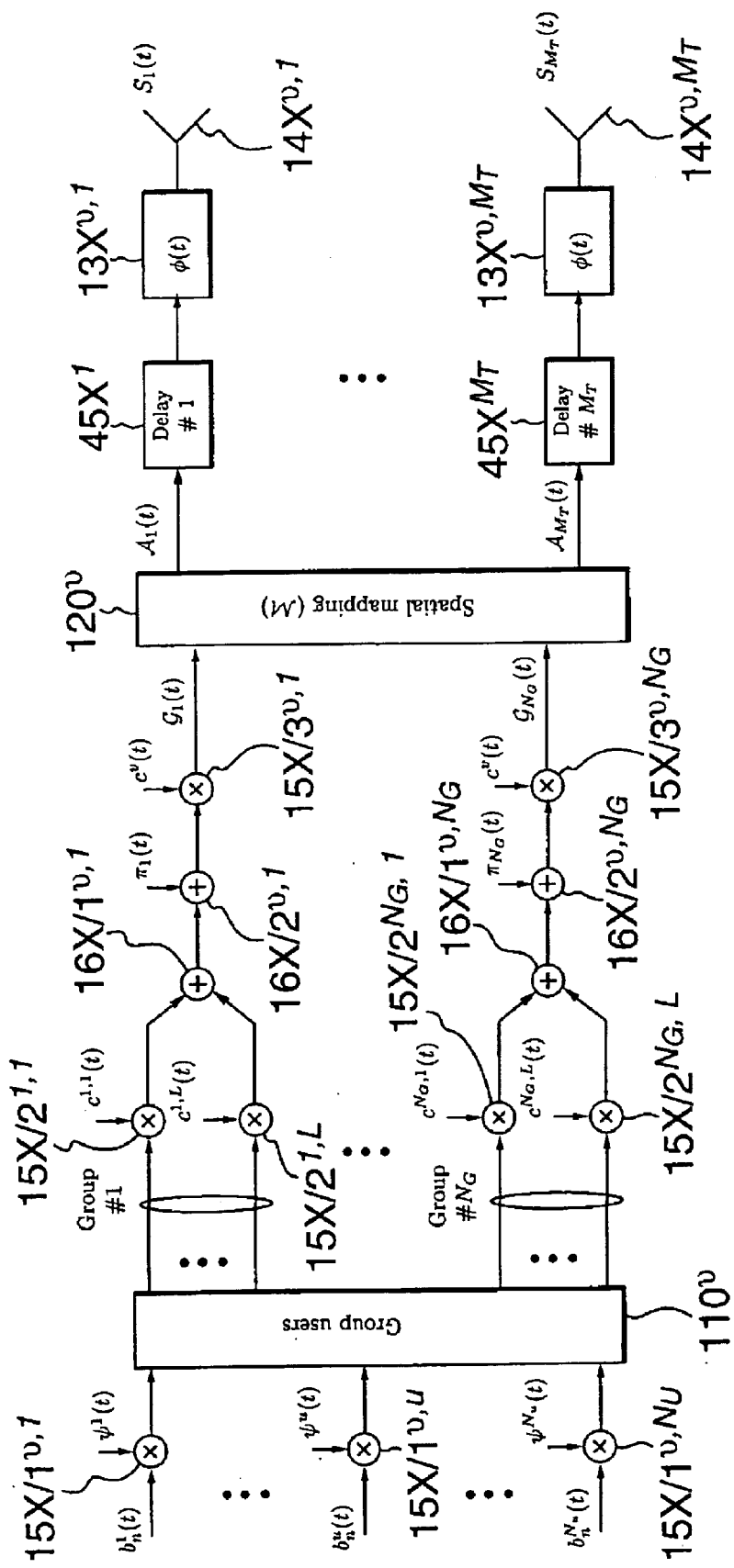
FIG. 49 illustrates a transmitter having multiple antennas with which receivers embodying the invention can operate.

Such a MIMO transmitter using STC is shown in FIG. 49 for serving base station v. This figure shows base station v serving the mobiles indexed from 1 to $N_u$ located within its cell coverage. It transmits to each of these mobile a corresponding stream of data ($b_n^u$), each power-controlled with the total amplitude ($\psi_n^u$) using a multiplier $15X^{v,u}$. It should be noted that ($\psi_n^u$) is not the real amplification factor, but a product obtained at the receiver and put at the transmitter to ease both data modelling and algorithmic description (please refer to description of FIG. 4).

The power-controlled data streams are then fed to a group-selector $110^v$ to divide the $N_u$ served mobiled in $N_G$ groups (see discussion below). Each group cannot be large than L mobiles in number. Depending on the cell load $N_u$, a given number $N_{IG} \leq L$ of mobiles will be allocated within each group. For convenience of notation, $N_{IG}$ is fixed in FIG. 49 to L, i.e., the maximum.

For each group, identical operation will be performed; hence only operation for group # 1 will be described. The $N_{IG}=L$ data streams in group # 1 will be spread by codes $c^{1,1}(t), \ldots, c^{1,L}(t)$ using multipliers $15X/2^{1,1}, \ldots, 15X/2^{1,L}$, respectively. The spread signals are then summed using adder $16X/1^{v,1}$. The resulting signal is summed to a pilot signal $\pi_1(t)$ specific to group #1 using adder $16X/2^{v,1}$, then spread with code $c^v(t)$ specific to base station v using multiplier $15X/3^{v,1}$. The resulting spread signal is denoted as $G_1(t)$. Identical operations on other groups will result in similar signals. The $N_G$ signals resulting from such operations in the $N_G$ groups of mobiles are denoted as $G_1(t), \ldots, G_{N_G}(t)$.

These signals are fed to a spatial mapper $120^v$. This mapper operates like a $N_G \times M_T$ coupler to linearly transform the $N_G$ input streams inot $M_T$ output streams equal in number to the Tx antennas and denoted as $A_1(t), \ldots, A_{M_G}(f)$. The first stream $A_1(t)$ is delayed by delay $45X^1$ and filtered by the shaping pulse $13X^{v,1}$ (which includes carrier frequency modulation), then transmitted over antenna $14X^{v,1}$ as signal $S_1(t)$. Identical operations performed on the mapper output streams result in signals $S_1(t), \ldots, S_{M_T}(t)$ being separately transmitted on antennas $14X^{v,1}, \ldots, 14X^{v,M_T}$, respectively. The structure of this transmitter is particularly interesting in high data-rate, low-processing gain situations. First, the data sequences $b^{v,u}(t)$ of the $N_u$ users, are scaled with $\Phi^{v,u}(t)$, where $\Phi^{v,u}(t)^2$, u=1, . . . , $N_u$ is the desired transmit power. These signals are then grouped in $N_G$ groups. A user belonging to group g is assigned a user specific short channelization code drawn from a fixed set of $N_{IG}$ L-chip codes (L is the processing gain) which we conveniently organize column-wise in the matrix $C_g=[c^{g,1}(t)^T, \ldots, c^{g,N_{IG}}(t)^T]^T$ and denote it the code-set of group g. Codes belonging to same code-set are all chosen mutually orthogonal such that $C_g^H C_g$ is diagonal, which in its turn means that the number of fixed channelization codes per group is limited to $N_{IG} \leq L$; at the same time code-sets across groups should have low cross-correlation, as will be explained later. It should be noted that code-sets are assumed to be reused in all sectors. When user signals of the same group are coded by their respective channelization code, they are summed to provide a one streamed signal. A group-specific pilot code is added, and the resulting signal is scrambled by a BS specific PN code to arrive at the total group signal $G_g^v(t)$. Using a linear mapping function M, the $N_G$ group signals are mapped onto $M_T$ antenna branches, to arrive at $$A^v(t) = MG^v(t), \qquad (145)$$

where $A^v(t)=[A_1^v(t)^T, \ldots, A_M^v(t)^T]$, and $G^v(t)=[G_1^v(t)^T, \ldots, G_{N_v}^v(t)^T]$. Branch signals are finally delayed to allow for transmit delay diversity, then formed by the chip-pulse matched filter.

The physical channel matrix which defines transmission from $M_T$ Tx antennas of the BS indexed υ to the M receive antennas of the mobile with couple index (υ,u) is:

$$H^{v,u}(t) = \begin{bmatrix} h_{1,1}^{v,u}(t) & \cdots & h_{1,M_T}^{v,u}(t) \\ \vdots & & \vdots \\ h_{M,1}^{v,u}(t) & \cdots & h_{M,M_T}^{v,u}(t) \end{bmatrix}, \qquad (146)$$

where the (ij)-th element of the matrix is the channel between the j-th Tx antenna of the base-station and the i-th Rx antenna of the mobile. This definition allows the signal transmitted from the base-station υ, when received at the antenna array of the desired mobile, to be written as:

$$X^{v,u}(t) = H^{v,u}(t) \otimes S^v(t) \qquad (147)$$

$$= H^{v,u}(t) \otimes MG^v(t) \otimes D(t) \qquad (148)$$

$$= H^{v,u}(t)M \otimes [G^v(t) \otimes D(t)] \qquad (149)$$

$$= D(t) \otimes H^{u,v}(t)M \otimes G^v(t) \qquad (150)$$

where $D(t)=[\phi(t-\Delta_1), \ldots, \phi(t-\Delta_{M_T})]^T$ represent the transmit delays and chip-pulse forming. From Equation (149) it is clear that the effective spatial mapping function due to the channel becomes H(t)M, which is generally not orthogonal which in its turn means that groups will interfere with each other. Therefore, unless the transmitter has knowledge of the channel, orthogonality at reception cannot be promised. Design of the mapping function will be described later. Equation (150) further shows that the delay elements can be regarded as part of the channel, and it is clear that they provide virtual multi-path. This is normally referred to as "delay transmit diversity."

If the channel as seen by the vector of group signals $G^v(t)$ is denoted by $\Gamma^{v,u}(t)=D(t)\otimes H^{v,u}(t)M$, then the signal received at the antenna array may be written as:

$$X^{v,u}(t) = \sum_{v=1}^{N_B} \Gamma^{v,u}(t) \otimes G^v(t) \qquad (151)$$

$$= \sum_{v=1}^{N_B} \Gamma_1^{v,u} \otimes G_1^v(t) + \ldots + \Gamma_{N_G}^{v,u} \otimes G_{N_G}^v(t) \qquad (152)$$

where $\Gamma_j^{v,u}$ is the $j^{th}$ column of $\Gamma^{v,u}$. From Equation (20) it is noted that each group of users' signals propagate through the same channel, and that the receiver sees $N_B N_G$ sources. When the proposed MIMO downlink transmitter is employed, the model for the received matched filtered signal (Equation 3) can be written as:

$$Y(t) = \sum_{v=1}^{N_B} \sum_{u=1}^{N_u} Y^{v,u}(t) + N(t) \qquad (153)$$

$$= \sum_{v=1}^{N_B} \sum_{u=1}^{N_u} \varphi^{v,u}(t)(H^{v,u}(t) \otimes b^{v,u}(t) c^{v,u}(t)) + N(t) \qquad (154)$$

$$= \sum_{v=1}^{N_B} \sum_{g=1}^{N_G} \sum_{u \in G_g^v} \varphi^{v,u}(t)(H_\Sigma^{v,g}(t) \otimes b^{v,u}(t) c^{v,u}(t)) + N(t) \qquad (155)$$

$$= \sum_{v=1}^{N_B} \sum_{g=1}^{N_G} H_\Sigma^{v,g}(t) \otimes \left( \sum_{u \in G_g^u} \varphi^{v,u}(t) b^{v,u}(t) c^{v,u}(t) \right) + N(t) \qquad (156)$$

from which it is clear that users belonging to the same group of same BS, have the same channel response $H_\Sigma^{v,g}(t)$. This allows for improved identification of the channel at the mobile receiver. The most apparent difference from the uplink model is hence that users belonging to the same group experience the same channel, a feature well exploited on the downlink using CDFI (see previous descriptions).

Appropriate choice of codes across groups is important since the resultant channel is not generally orthogonal. Since channelization codes are chosen from a fixed set, sets with good properties can be found by optimization. It should be noted that, since the same scrambling code is used across groups, cross-correlation properties, once set by proper choice of channelization code-sets, are preserved after scrambling and hence after transmission. Here, only the situation with two groups ($N_G=2$) is considered since it is particularly simple. $C_1$ is first chosen as an orthogonal matrix, for instance the Hadamard matrix (or part of it). It is noted that, if $\Lambda$ is a diagonal matrix having $\pm 1$ entries, then $\Lambda C_1$ will still be an orthogonal span because $\Lambda$ is unitary. Therefore, the second set of codes is defined by $C_2 = \Lambda C_1$, where $\Lambda$ satisfies $$\Lambda = \arg \min_\Lambda \{ \sup \max_{ij} |A_{ij}| \}, \qquad (157)$$

where $$A = C_1^H \Lambda^H C_1 \qquad (158)$$

which, in most cases, is easily solved by search. When sets are full (i.e., $N_{iG}=L$), this amounts to a 45° rotation between sets, In the more general case where $N_G>2$, the optimization becomes difficult especially when the processing gain is large. Here a blend of guessing and search must be invoked.

Experience shows that reusing the same or opposite code in different groups is not attractive. The number of users (total number of possible channelization codes) is therefore limited by $2^{L-1}$. This limit clearly suggests that a low processing gain also encompasses a very limited potential capacity. For instance if L=2, only two users can be supported, and it can be verified that there is no profit from multiple Tx antennas, since one Tx antenna can already provide near orthogonal transmission (using orthogonal codes). With L=4, the limit is $N_u \leq 8$, and for this situation, there is benefit from going from one to two Tx antennas, but not three, In general, the number of Tx antennas for a cost-effective system is limited by $$M_T \leq \frac{2^{L-1}}{L}$$

because adding more antennas will not provide potential increase of capacity.

The purpose of the spatial mapping function is to assign a unique $M_T$-dimensional spatial signature to each of the $N_G$ groups. In situations where the transmitter has some knowledge of the channel[19], the mapping function may be chosen as a function of time such that the resultant channel $\Gamma^{v,u}(t)$ becomes orthogonal. In mobile cellular CDMA, however, this is not an option because the physical channels are user specific, and therefore an orthogonality condition can only be provided for one receiving user.

[19]E.g., feed-back from the receivers or time-division duplex.

Considering therefore the design of a fixed mapping function, the rank properties of the resultant channel $\Gamma^{v,u}(t)=D(t)\otimes H^{v,u}(t)M$ are intuitively optimized if the mapping function M is chosen to have the best rank properties. In the case where the number of groups ($N_G$) equals the number of Tx antennas ($M_T$), optimal rank properties are obtained by choosing an orthogonal mapping function. Identity mapping (M=I) is orthogonal, and simply maps group 1 to antenna 1, group 2 to antenna 2, etc. However, it causes unequal load on antennas, and delay transmit diversity is not exploited. These problems are both avoided if the Hadamard matrix is used, since it distributes signals equally on antenna branches and therefore exploits "delay transmit diversity" and avoids power imbalance.

In the more general case, power control can be distributed among the transmit antennas. Such power control distribution techniques are well known and will not be described in detail here.

It should be noted that embodiments of the invention are not limited to using the space-time coding scheme described with reference to FIG. 49 but could use other known space-time coding schemes.

It will be appreciated that the base station transmitter described with reference to FIG. 49 does not require a modification to the receiver at the user station, i.e., any of the receivers described with reference to FIGS. 40–43 may be used to receive its signals. Actually, with a MIMO system, the receiver will "see" the MIMO base station transmitter as $N_G$ sub-base stations corresponding to the group partitioning of FIG. 49.

It should be noted that each user station could have a plurality of transmit antennas and use a MIMO transmitter similar to that of the base station and described with reference to FIG. 49. Of course, the corresponding receiver at the base station will not require modification for the reasons given above.

TABLE 1

|  | IC Method | $N_c$ | Delay | Robustness to estimation errors of | | | |
|---|---|---|---|---|---|---|---|
|  |  |  |  | Timing | Phase | Power | Symbols |
| PIC | Subtracts reconstructed interference | — | 1 + PC | | | | |
| SIC | Subtracts reconstructed interference of higher power users | — | 1 + NI PC | | | | |
| ISR-H | Nulls reconstructed bits of interfering users | 3NI | 1PC | | (some) | ✓ | ✓ |
| ISR-D | Nulls reconstructed interfering diversities | M × P × NI | 1 + 1PC | | ✓ | ✓ | |
| ISR-R | Nulls reconstructed interfering users | NI | 1 + 1PC | | (some) | ✓ | |
| ISR-TR | Nulls total reconstructed interference | 1 | 1 + 1PC | | | (some) | |
| ISR-TR-S | Nulls total reconstructed interference of higher power users | 1 | 1 + NI PC | | | (some) | |

TABLE 2

|  | $S_j$ | $j=$ |
|---|---|---|
| ISR-TR | $S_i = \{(u,f,l) \mid u = 1, \ldots, N_u; f = 1, \ldots, N_f; l = -1,0,1\}$ | 1 |
| ISR-R | $S_j = \{(u,f,l) \mid u = j; f = 1, \ldots, N_f; l = -1,0,1\}$ | $1, \ldots, NI$ |
| ISR-H | $S_j = \left\{(u, f, l) \mid u = \left\lfloor \dfrac{j-1}{3} \right\rfloor; f = 1, \ldots, N_f; l = j - \left\lfloor \dfrac{j-1}{3} \right\rfloor - 1\right\}$ | $1, \ldots, 3NI$ |
| ISR-D | $S_j = \left\{(u, f, l) \mid u = \left\lfloor \dfrac{j-1}{N_f} \right\rfloor; f = j - \left\lfloor \dfrac{j-1}{N_f} \right\rfloor; l = -1, 0, 1\right\}$ | $1, \ldots, N_f NI$ |

TABLE 3

|  | $\hat{C}_n$ ↑ $\left[\ldots, \dfrac{\hat{\underline{C}}_{n,j}}{\|\hat{\underline{C}}_{n,j}\|}, \ldots\right]$ ↑ $[\ldots, \hat{\underline{C}}_{n,j}, \ldots]$ ⇑ | $\hat{C}_n^{i',l'}$ ↑ $\left[\ldots, \dfrac{\hat{\underline{C}}_{n,j}^{i',l'}}{\|\hat{\underline{C}}_{n,j}\|}, \ldots\right]$ ↑ $[\ldots, \hat{\underline{C}}_{n,j}^{i',l'}, \ldots]$ ⇑ | $N_c$ |
|---|---|---|---|
| TR | $\left[\sum_{i=1}^{NI}\sum_{l=1}^{N_m}\sum_{f=1}^{N_f}\sum_{k=-1}^{+1} \hat{\psi}_n^i \hat{b}_{n+k}^{i,l} \hat{\zeta}_{f,n}^i \underline{Y}_{k,n}^{i,l,f} \lambda_k^l\right]$ | $\left[\sum_{i=1}^{NI}\sum_{l=1}^{N_m}\sum_{f=1}^{N_f}\sum_{k=-1}^{+1} \hat{\psi}_n^i \hat{b}_{n+k}^{i,l} \hat{\zeta}_{f,n}^i \underline{Y}_{k,n}^{i,l,f} \overline{\delta}_{i,l,k}^{i',l',0} \lambda_k^l\right]$ | 1 |
| MCR | $\left[\ldots, \sum_{l=1}^{N_m}\sum_{f=1}^{N_f}\sum_{k=-1}^{+1} \hat{b}_{n+k}^{i,l} \hat{\zeta}_{f,n}^i \underline{Y}_{k,n}^{i,l,f} \lambda_k^l, \ldots\right]$ | $\left[\ldots, \sum_{l=1}^{N_m}\sum_{f=1}^{N_f}\sum_{k=-1}^{+1} \hat{b}_{n+k}^{i,l} \hat{\zeta}_{f,n}^i \underline{Y}_{k,n}^{i,l,f} \overline{\delta}_{i,l,k}^{i',l',0} \lambda_k^l, \ldots\right]$ | NI |
| MCD | $\left[\ldots, \sum_{l=1}^{N_m}\sum_{k=-1}^{+1} \hat{b}_{n+k}^{i,l} \underline{Y}_{k,n}^{i,l,f} \lambda_k^l, \ldots\right]$ | $\left[\ldots, \sum_{l=1}^{N_m}\sum_{k=-1}^{+1} \hat{b}_{n+k}^{i,l} \underline{Y}_{k,n}^{i,l,f} \overline{\delta}_{i,l,k}^{i',l',0} \lambda_k^l, \ldots\right]$ | $N_f NI$ |
| R | $\left[\ldots, \sum_{f=1}^{N_f}\sum_{k=-1}^{+1} \hat{b}_{n+k}^{i,l} \hat{\zeta}_{f,n}^i \underline{Y}_{k,n}^{i,l,f} \lambda_k^l, \ldots\right]$ | $\left[\ldots, \sum_{f=1}^{N_f}\sum_{k=-1}^{+1} \hat{b}_{n+k}^{i,l} \hat{\zeta}_{f,n}^i \underline{Y}_{k,n}^{i,l,f} \overline{\delta}_{i,l,k}^{i',l',0} \lambda_k^l, \ldots\right]$ | $N_m NI$ |
| D | $\left[\ldots, \sum_{k=-1}^{+1} \hat{b}_{n+k}^{i,l} \underline{Y}_{k,n}^{i,l,f} \lambda_k^l, \ldots\right]$ | $\left[\ldots, \sum_{k=-1}^{+1} \hat{b}_{n+k}^{i,l} \underline{Y}_{k,n}^{i,l,f} \overline{\delta}_{i,l,k}^{i',l',0} \lambda_k^l, \ldots\right]$ | $N_f N_m NI$ |

TABLE 3-continued

| $\hat{C}_n$ | $\hat{C}_n^{i',l'}$ | |
|---|---|---|
| ↑ | ↑ | |
| $\left[\ldots, \dfrac{\hat{\underline{C}}_{n,j}}{\|\hat{\underline{C}}_{n,j}\|}, \ldots\right]$ | $\left[\ldots, \dfrac{\hat{\underline{C}}_{n,j}^{i',l'}}{\|\hat{\underline{C}}_{n,j}\|}, \ldots\right]$ | |
| ↑ | ↑ | |
| $[\ldots, \hat{\underline{C}}_{n,j}, \ldots]$ | $[\ldots, \hat{\underline{C}}_{n,j}^{i',l'}, \ldots]$ | |
| ⇑ | ⇑ | $N_c$ |
| H | $\left[\ldots, \sum_{f=1}^{N_f} \hat{\zeta}_{f,n}^i \underline{\Upsilon}_{k,n}^{i,l,f} \lambda_k^1, \ldots\right]$ | $\left[\ldots, \sum_{f=-1}^{N_f} \hat{\zeta}_{f,n}^i \underline{\Upsilon}_{k,n}^{i,l,f} \bar{\delta}_{i,l,k}^{i',l',0} \lambda_k^1, \ldots\right]$ | $N_H NI$ |

Table 3 shows common constraint and blocking matrices $\hat{C}_n$ and $\hat{C}_n^{i',l'}$, respectively, and the corresponding number of constraints or columns $N_c$ for each ISR mode: Generic columns are shown before normalization and $\bar{\delta}_{i,l,k}^{i',l',k'} = 0$ if $(i,l,k) = (i',l',k')$ and 1 otherwise. In the conventional MC case, $\lambda_k^1 = 1$ and $N_H = 3N_m$. In the MR case modeleled as MC-CDMA, $\lambda_k^1 = 0$ if $k = -1$ and $1 \in \{1, \ldots, N_r\}$ or if $k = +1$ and $1 \in \{N_m - N_r + 1, \ldots, N_m\}$, and 1 otherwise. In the H mode, $2(N_m - N_r)$ columns or more in $\hat{C}_n$ are null. These columns and the corresponding ones in $\hat{C}_n^{i',l'}$ are removed leaving a maximum of $N_H = N_m + 2N_r$ constraints.

TABLE 4

| | $\hat{C}_{MC,n}^u$ | $\hat{C}_{MC,n}^{u,l'}$ | |
|---|---|---|---|
| | ↑ | ↑ | |
| | $\left[\ldots, \dfrac{\Pi_n \hat{\underline{C}}_{n,j}}{\|\Pi_n \hat{\underline{C}}_{n,j}\|}, \ldots\right]$ | $\left[\ldots, \dfrac{\Pi_n \hat{\underline{C}}_{n,j}^{u,l'}}{\|\Pi_n \hat{\underline{C}}_{n,j}^u\|}, \ldots\right]$ | |
| | ↑ | ↑ | |
| | $[\ldots, \hat{\underline{C}}_{n,j}^u, \ldots]$ | $[\ldots, \underline{C}_{n,j}^{n\,i',l'}, \ldots]$ | |
| | ⇑ | ⇑ | $N_c$ |
| MCR | $\left[\sum_{l=1}^{N_m}\sum_{f=1}^{N_f}\sum_{k=-1}^{+1} \hat{b}_{n+k}^{u,l} \hat{\zeta}_{f,n}^u \underline{\Upsilon}_{k,n}^{u,l,f} \lambda_k^1\right]$ | $\left[\sum_{l=1}^{N_m}\sum_{f=1}^{N_f}\sum_{k=-1}^{+1} \hat{b}_{n+k}^{u,l} \hat{\zeta}_{f,n}^u \underline{\Upsilon}_{k,n}^{u,l,f} \bar{\delta}_{l,k}^{l',0} \lambda_k^1\right]$ | 1 |
| MCD | $\left[\ldots, \sum_{l=1}^{N_m}\sum_{k=-1}^{+1} \hat{b}_{n+k}^{u,l} \underline{\Upsilon}_{k,n}^{u,l,f} \lambda_k^1, \ldots\right]$ | $\left[\ldots, \sum_{l=1}^{N_m}\sum_{k=-1}^{+1} \hat{b}_{n+k}^{u,l} \underline{\Upsilon}_{k,n}^{u,l,f} \bar{\delta}_{l,k}^{l',0} \lambda_k^1, \ldots\right]$ | $N_f$ |
| R | $\left[\ldots, \sum_{f=1}^{N_f}\sum_{k=-1}^{+1} \hat{b}_{n+k}^{u,l} \hat{\zeta}_{f,n}^u \underline{\Upsilon}_{k,n}^{u,l,f} \lambda_k^1, \ldots\right]$ | $\left[\ldots, \sum_{f=1}^{N_f}\sum_{k=-1}^{+1} \hat{b}_{n+k}^{u,l} \hat{\zeta}_{f,n}^u \underline{\Upsilon}_{k,n}^{u,l,f} \bar{\delta}_{l,k}^{l',0} \lambda_k^1, \ldots\right]$ | $N_m$ |
| D | $\left[\ldots, \sum_{k=-1}^{+1} \hat{b}_{n+k}^{u,l} \underline{\Upsilon}_{k,n}^{u,l,f} \lambda_k^1, \ldots\right]$ | $\left[\ldots, \sum_{k=-1}^{+1} \hat{b}_{n+k}^{u,l} \underline{\Upsilon}_{k,n}^{u,l,f} \bar{\delta}_{l,k}^{l',0} \lambda_k^1, \ldots\right]$ | $N_f N_m$ |
| H | $\left[\ldots, \sum_{f=1}^{N_f} \hat{\zeta}_{f,n}^u \underline{\Upsilon}_{k,n}^{u,l,f} \lambda_k^1, \ldots\right]$ | $\left[\ldots, \sum_{f=1}^{N_f} \hat{\zeta}_{f,n}^u \underline{\Upsilon}_{k,n}^{u,l,f} \bar{\delta}_{l,k}^{l',0} \lambda_k^1, \ldots\right]$ | $N_H NI$ |

Table 4 shows multi-code constraint and blocking matrices $\hat{C}_{MC,n}^u$ and $\hat{C}_{MC,n}^{u,l'}$ respectively, and the corresponding number of constraints or columns $N_c$ for each ISR mode: Generic columns are shown before projection and normalization and $\bar{\delta}_{l,k}^{l',k'} = 0$ if $(l,k) = (l',k')$ and 1 otherwise. In the conventional MC case, $\lambda_k^1 = 1$ and $N_H = 3N_m$. In the MR case modeled as MC-CDMA, $\lambda_k^1 = 0$ if $k = -1$ and $1 \in \{1, \ldots, N_r\}$ or if $k = +1$ and $1 \in \{N_m - N_r + 1, \ldots, N_m\}$, and 1 otherwise. In the H mode, $2(N_m - N_r)$ columns in $\hat{C}_{MC,n}^u$ are null. These columns and the corresponding ones in $\hat{C}_{MC,n}^{u,l'}$ are removed leaving a maximum of $N_H = N_m + 2N_r$ constraints.

TABLE 5

| BR | |
|---|---|
| $\hat{C}_{BS,n}^{v} \Leftarrow$ | $\left[ \sum_{u=1}^{NI} \hat{\psi}_n^{v,u} \sum_{l=1}^{N_m} \sum_{f=1}^{N_f} \sum_{k=-1}^{+1} \hat{b}_{n+k}^{v,i,l} \hat{\zeta}_{f,n}^{v} \Upsilon_{k,n}^{v,i,l,f} \lambda_k^1 \right]$ |
| $\hat{C}_{BS,n}^{v,i',l'} \Leftarrow$ | $\left[ \sum_{u=1}^{NI} \hat{\psi}_n^{v,u} \sum_{l=1}^{N_m} \sum_{f=1}^{N_f} \sum_{k=-1}^{+1} \hat{b}_{n+k}^{v,i,l} \hat{\zeta}_{f,n}^{u} \Upsilon_{k,n}^{i,l,f} \bar{\delta}_{i,l,k}^{v',i',l',0} \lambda_k^1 \right]$ |
| $N_c$ | 1 |

Table 5 shows base-specific constraint and blocking matrices $\hat{C}_{BS,n}^{v}$ and $\hat{C}_{BS,n}^{v,i',l'}$ which will apply to the modes shown in Table 3 except for TR, replaced by BR. Indices of remaining modes in Table 3 should be modified to include the index of the base-station v as shown for the TR mode. It should be noted that channel coefficients $\hat{\zeta}_{f,n}^{u}$ hold the index of the base-station u instead of the user i. Transmissions to all user-stations from base-station u propagate to the desired user station though a common channel. It should also be noted that summation over users is weighted by the estimate of the total amplitude due to user-independent power control. Definitions of $\bar{\delta}_{i,l,k}^{i',l',0}$ and $\lambda_k^1$ are given in Table 3.

TABLE 6

| TR | |
|---|---|
| $\hat{C}_n \Leftarrow$ | $\left[ \sum_{v=1}^{NB} \sum_{U=1}^{NI} \hat{\psi}_n^{v,u} \sum_{l=1}^{N_m} \sum_{f=1}^{N_f} \sum_{k=-1}^{+1} \hat{b}_{n+k}^{v,i,l} \hat{\zeta}_{f,n}^{v} \Upsilon_{k,n}^{v,i,l,f} \lambda_k^1 \right]$ |
| $\hat{C}_n^{v',i',l'} \Leftarrow$ | $\left[ \sum_{v=1}^{NB} \sum_{u=1}^{NI} \hat{\psi}_n^{v,u} \sum_{l=1}^{N_m} \sum_{f=1}^{N_f} \sum_{k=-1}^{+1} \hat{b}_{n+k}^{v,i,l} \hat{\zeta}_{f,n}^{v} \Upsilon_{k,n}^{i,l,f} \bar{\delta}_{v,i,l,k}^{v',i',l',0} \lambda_k^1 \right]$ |
| $N_c$ | 1 |
| BR | |
| $\hat{C}_n \Leftarrow$ | $\left[ \ldots, \sum_{i=1}^{NI} \hat{\psi}_n^{v,u} \sum_{l=1}^{N_m} \sum_{f=1}^{N_f} \sum_{k=-1}^{+1} \hat{b}_{n+k}^{v,i,l} \hat{\zeta}_{f,n}^{v} \Upsilon_{k,n}^{v,i,l,f} \lambda_k^1 \right]$ |
| $\hat{C}_n^{v',i',l'} \Leftarrow$ | $\left[ \ldots, \sum_{u=1}^{NI} \hat{\psi}_n^{v,u} \sum_{l=1}^{N_m} \sum_{f=1}^{N_f} \sum_{k=-1}^{+1} \hat{b}_{n+k}^{v,i,l} \hat{\zeta}_{f,n}^{v} \Upsilon_{k,n}^{i,l,f} \bar{\delta}_{v,i,l,k}^{v',i',l',0} \lambda_k^1, \ldots \right]$ |
| $N_c$ | NB |

Table 6 shows a multi-base constraint and blocking matrices $\hat{C}_n$ and $\hat{C}_n^{v,i',l'}$ which apply to the modes of Table 5 by row-wise aligning the constraint and blocking matrices $\hat{C}_{BS,n}$ and $\hat{C}_{BS,n}^{v,i',l'}$ from base-stations into larger matrices $\hat{C}_n$ and $\hat{C}_n^{v,i',l'}$ in the way suggested by Equations (104) and (105). The number of constraints in Table 5 is multiplied by NB as shown here for the BR mode. The additional TR mode sums the constraint-vectors of the BR mode over all base-stations. The definition of $\lambda_k^1$ is given in Table 3 and $\bar{\delta}_{v,i,l,k}^{v',i',l',0} = 0$ if (v,i,l,k) = (v',i',l',k') and 1 otherwise.

It should be appreciated that, whether ISR is used for the uplink or the downlink, it will function either as a single antenna or multiple antenna for reception or transmission.

Embodiments of the invention are not limited to DBPSK but could provide for practical implementation of ISR in mixed-rate traffic with MPSK or MQAM modulations without increased computing complexity. Even orthogonal Walsh signalling can be implemented at the cost of a computational increase corresponding to the number of Walsh sequences. Moreover, different users could use different modulations. Also, one or more users could use adaptive coding and modulation (ACM).

It is also envisaged that embodiments of the invention could employ carrier frequency offset recovery (CFOR). It should be appreciated that the decision rule units do not have to provide a binary output; they could output the symbol and some other signal state.

It should also be noted that, although the above-described embodiments are asynchronous, a skilled person would be able to apply the invention to synchronous systems without undue experimentation.

The invention comprehends various other modifications to the above-described embodiments. For example, long PN codes could be used, as could large delay-spreads and large inter-user delay-spreads.

For simplicity, the foregoing description of preferred embodiments assumed the use of short spreading codes. In most practical systems, however, long spreading codes would be used. Because the portion of the long code differs from one symbol to the next, certain operations, which were unnecessary for short codes, will have to be performed, as would be appreciated by one skilled in this art. For further information, the reader is directed to references [22] and [23]. It is envisaged, however, that short codes could still be used during acquisition and the long codes used once a link has been established.

During the acquisition step, a user station could be required to connect using one of a plurality of predetermined (short) codes. The null-constraints used by the receiver then would be preselected to cancel signals using such predetermined codes. This would avoid problems arising when a user station begins to transmit and for which the receiver has not derived any constraints. Such a modification would be applicable to the downlink situation and use ISR-H.

REFERENCES

For further information, the reader is directed to the following documents, the contents of which are incorporated herein by reference.

1. F. Adachi, M. Sawahashi and H. Suda, "Wideband DS-CDMA for next generation mobile communications systems", IEEE communications Magazine, vol. 36, No. 9, pp. 55–69, September 1998.
2. A. Duel-Hallen, J. Holtzman, and Z. Zvonar, "Multiuser detection for CDMA systems", *IEEE Personal Communications*, pp. 46–58, April 1995.
3. S. Moshavi, "Multi-user detection for DS-CDMA communications", *IEEE Communications Magazine*, pp. 124–136, October 1996.
4. S. Verdu, "Minimum probability of error for asynchronous Gaussian multiple-access channels", *IEEE Trans. on Information Theory*, vol. 32, no. 1, pp. 85–96, January 1986.
5. K. S. Schneider, "Optimum detection of code division multiplexed signals", *IEEE Trans. on Aerospace and Electronic Systems*, vol. 15, pp. 181–185, January 1979.
6. R. Kohno, M. Hatori, and H. Imai, "Cancellation techniques of co-channel interference in asynchronous spread spectrum multiple access systems", *Electronics and Communications in Japan*, vol. 66-A, no. 5, pp. 20–29, 1983.
7. Z. Xie, R. T. Short, and C. K. Rushforth, "A family of suboptimum detectors for coherent multi-user communications", *IEEE Journal on Selected Areas in Communications*, vol. 8, no. 4, pp. 683–690, May 1990.
8. A. J. Viterbi, "Very low rate convolutional codes for maximum theoretical performance of spread-spectrum multiple-access channels", *IEEE Journal of Selected Areas in Communications*, vol. 8, no 4, pp. 641–649, May 1990.

9. M. K. Varanasi and B. Aazhang, "Multistage detection in asynchronous code-division multiple-access communications", *IEEE Trans. on Communications*, vol. 38, no. 4, pp. 509–519, April 1990.
10. R. Kohno et al, "Combination of an adaptive array antenna and a canceller of interference for direct-sequence spread-spectrum multiple-access system", *IEEE Journal on Selected Areas in Communications*, vol. 8, no. 4, pp. 675–682, May 1990.
11. A. Duel-Hallen, "Decorrelating decision-feedback multi-user detector for synchronous code-division multiple-access channel", *IEEE Trans. on Communications*, vol. 41, no. 2, pp. 285–290, February 1993.
12. A. Klein, G. K. Kaleh, and P. W. Baier, "Zero forcing and minimum mean-square-error equalization for multi-user detection in code-division multiple-access channels", *IEEE Trans. on Vehicular Technology*, vol. 45, no. 2, pp. 276–287, May 1996.
13. S. Affes and P. Mermelstein, "A new receiver structure for asynchronous CDMA: STAR—the spatio-temporal array-receiver", *IEEE Journal on Selected Areas in Communications*, vol. 16, no. 8, pp. 1411–1422, October 1998.
14. S. Affes, S. Gazor, and Y. Grenier, "An algorithm for multisource beamforming and multitarget tracking", *IEEE Trans. on Signal Processing*, vol. 44, no. 6, pp. 1512–1522, June 1996.
15. P. Patel and J. Holtzman, "Analysis of a simple successive interference cancellation scheme in a DS/CDMA system", *IEEE Journal on Selected Areas in Communications*, vol. 12, no. 5, pp. 796–807, June 1994.
16. J. Choi, "Partial decorrelating detection for DS-CDMA systems", *Proceedings of IEEE PIMRC '99*, Osaka, Japan, vol. 1, pp. 60–64, Sep. 12–15, 1999.
17. S. Affes and P. Mermelstein, "Signal Processing Improvements for Smart Antenna Signals in IS-95 CDMA", *Proceedings of IEEE PIMRC '98*, Boston, U.S.A., Vol. II, pp. 967–972, Sep. 8–11, 1998.
18. S. Affes and P. Mermelstein, "Performance of a CDMA beamforming array-receiver in spatially-correlated Rayleigh-fading multipath", *Proc. of IEEE VTC'99*, Houston, USA, May 16–20, 1999.
19. H. Hansen, S. Affes and P. Mermelstein, "A beamformer for CDMA with enhanced near-far resistance", *Proc. of IEEE ICC'99*, Vancouver, Canada, Vol. 3, pp. 1583–1587, Jun. 6–10, 1999.
20. K. Cheikhrouhou, S. Affes, and P. Mermelstein, "Impact of synchronization on receiver performance in wideband CDMA networks", *Proc. of 34th Asilomar Conference on Signals, and Computers*, Pacific Grove, USA, to appear, Oct. 29–Nov. 1, 2000.
21. S. Affes, A. Louzi, N. Kandil, and P. Mermelstein, "A High Capacity CDMA Array-Receiver Requiring Reduced Pilot Power", *Proc. IEEE GLOBECOM'2000*, San Francisco, USA, vol. 2, pp. 910–916, Nov. 27–Dec. 1, 2000.
22. S. Affes, H. Hansen, and P. Mermelstein, "Interference subspace rejection in wideband CDMA—part I: Modes for mixed power operation", submitted to *JSAC*, October 2000.
23. H. Hansen, S. Affes, and P. Mermelstein, "Interference subspace rejection in wideband CDMA—part II: Modes for high data-rate operation", submitted to *JSAC*, October 2000.
24. E. H. Dinan and B. Jabbari, "Spreading codes for direct sequence CDMA and wideband CDMA cellular networks", *IEEE Communications Magazine*, vol. 36, no. 9, pp. 48–54, September 1998.
25. R. Lupas and S. Verdu, "Near-far resistance of multiuser detectors in asynchronous channels", *IEEE Trans. on Communications*, vol 38, no. 4, pp.496–508, April 1990.
26. A. Duel-Hallen, "A family of multiuser decision-feedback detectors for asynchronous code-division multiple-access channels", *IEEE Trans. on Communications*, vol. 43, no. 5, pp. 796–807, June 1994.
27. C. Schlegel, P. Alexander, and S. Roy, "Coded asynchronous CDMA and its efficient detection", *IEEE Trans. on Information Theory*, vol. 44, no. 7, pp. 2837–2847, November 1998.
28. L. K. Rasmussen, T. J. Lim, and A.-L. Johansson, "A matrix-algebraic approach to successive interference cancellation in CDMA", *IEEE Trans. on Communications*, vol. 48, no. 1, pp. 145–151, January 2000.
29. M. Latva-aho and M. J. Juntti, "LMMSE detection for DS-CDMA systems in fading channels", *IEEE Trans. on Communications*, vol. 48, no. 2, pp. 194–199, February 2000.
30. S. Affes, H. Hansen, and P. Mermelstein, "Near-Far Resistant Single-User Channel Identification by Interference Subspace Rejection in Wideband CDMA", *Proc. of IEEE Signal Processing Workshop on Signal Processing Advances in Wireless Communications SPAWC'01*, Taoyuan, Taiwan, to appear, Mar. 20–23, 2001.
31. S. Affes, A. Saadi, and P. Mermelstein, "Pilot-Assisted STAR for Increased Capacity and Coverage on the Downlink of Wideband CDMA Networks", *Proc. of IEEE Signal Processing Workshop on Signal Processing Advances in Wireless Communications SPAWC'01*, Taoyuan, Taiwan, to appear, Mar. 20–23, 2001.

What is claimed is:

1. A receiver suitable for a base station of a CDMA communications system comprising at least one base station (11) having a transmitter and a said receiver and a multiplicity (U) of user stations ($10^1, \ldots, 10^U$) including a plurality (U') of user stations served by said at least one base station, each user station having a transmitter and a receiver for communicating with said at least one base station via a corresponding one of a plurality of channels ($14^1, \ldots, 14^U$), the base station receiver for receiving a signal (X(t)) comprising components corresponding to spread signals transmitted by the transmitters of the plurality of user stations, each of said spread signals comprising a series of symbols spread using a spreading code unique to the corresponding user station, said base station receiver comprising:

a plurality (U') of receiver modules ($20^1, \ldots, 20^{NI}, 20^d$) each for deriving from successive frames of the received signal (X(t)) estimates of said series of symbols of a corresponding one of the user stations, preprocessing means (18) for deriving from the received signal (X(t)) a series of observation matrices ($Y_n$) each for use by each of the receiver modules (20) in a said frame to derive an estimate of a symbol of a respective one of said series of symbols, and means (19,44;44/1,44/2) for deriving from each observation matrix a plurality of observation vectors ($\underline{Y}_n$; $\underline{Y}_{n-1}$; $\underline{Z}_n^1 \ldots \underline{Z}_n^{NI}$; $\underline{Z}_n^d$) and applying each of the observation vectors to a respective one of the plurality of receiver modules ($20^1, \ldots, 20^{NI}, 20^d$); each receiver module comprising;

channel identification means (28) for deriving from one of the observation vectors a channel vector estimate ($\hat{\underline{H}}_n^1, \ldots, \hat{\underline{H}}_n^{NI}; \hat{\underline{Y}}_{0,n}^d; \hat{\underline{Y}}_{0,n-1}^i$) based upon parameter estimates of the channel between the base station receiver and the corresponding user station transmitter;

beamformer means ($27^1, \ldots, 27^{NI}, 27^d; 47^d$) having coefficient tuning means (50) for producing a set of weighting coefficients in dependence upon the channel vector estimate, and combining means (51,52) for using the weighting coefficients to weight respective ones of the elements of a respective one of the observation vectors and combining the weighted elements to provide a signal component estimate ($\hat{s}_n^1, \ldots, \hat{s}_n^U$); and symbol estimating means ($29^1, \ldots, 29^U, 30^1, \ldots, 30^U$) for deriving from the signal component estimate an estimate ($\hat{b}_n^1, \ldots, \hat{b}_n^U$) of a symbol ($b_n^1, \ldots, b_n^U$) transmitted by a corresponding one of the user stations ($10^1, \ldots, 10^U$), wherein said receiver further comprises means (42,43) responsive to symbol estimates ($\hat{b}_n^1, \ldots, \hat{b}_n^{NI}; g^1, g^2, g^3; g^{I-1,n}$) and to channel estimates ($\hat{\underline{h}}_n^1 \ldots \hat{\underline{h}}_n^{NI}; \hat{\underline{h}}_{n-1}^i$) comprising at least said channel vector estimates ($\hat{\underline{H}}_n^1, \ldots, \hat{\underline{H}}_n^{NI}$) for channels ($14^1, \ldots, 14^{NI}$) of a first group (I) of said plurality of user stations ($10^1, \ldots, 10^{NI}$) to provide at least one constraint matrix ($\hat{C}_n$) representing interference subspace of components of the received signal corresponding to said predetermined group, and in each of one or more receiver modules ($20A^d$) of a second group (D) of said plurality of receiver modules, the coefficient tuning means ($50A^d$) produces said set of weighting coefficients in dependence upon both the constraint matrix ($\hat{C}_n$) and the channel vector estimates ($\hat{\underline{H}}_n^d$) so as to tune said one or more receiver modules ($20A^d$) each towards a substantially null response to that portion of the received signal ($X(t)$) corresponding to said interference subspace.

2. A receiver according to claim 1, wherein said coefficient tuning means ($50A^d$) also tune said one or more receiver nodules ($20A^d$), respectively, each towards a substantially unity response for the component of the received signal ($X(t)$) from the transmitter of the corresponding one of the user stations.

3. A receiver according to claim 1, wherein the observation vector deriving means (19;44) comprises first reshaping means (44) for reshaping the observation matrix ($Y_n$) from the preprocessing means (18) and supplying the resulting observation vector ($\underline{Y}_n$) to said beamformer means ($47A^d$) of each of said one or more receiver modules ($20A^d$), and wherein the means (42,43) for providing said at least one constraint matrix comprises constraints-set generating means (42A) responsive to said channel estimates ($\hat{\underline{h}}_n^l, \ldots, \hat{\underline{h}}_n^{NI}; \hat{\underline{h}}_{n-1}^i$) symbol estimates ($\hat{b}_n^1, \ldots, \hat{b}_n^{NI}; g^1, g^2, g^3; g^{I-1,n}$) corresponding to said first group for generating a plurality of constraints-set matrices ($\mathbb{C}_n^1, \ldots, \mathbb{C}_n^{N_c}$) together characterizing the subspace of interference attributable to said first group of user stations and the constraint matrix generating means (43A) comprises a bank of vector reshapers ($48A^1, \ldots, 48A^{N_c}$) for reshaping the constraints-set matrices ($\mathbb{C}_n^1, \ldots, \mathbb{C}_n^{N_c}$) to form columns, respectively, of the constraint matrix ($\hat{C}_n$), the constraint matrix generating means (43A) supplying the constraint matrix to each of said coefficient tuning means ($50A^d$) of said one or more receiver modules ($20^d$) of said second group, and wherein, in each of said one or more receiver modules ($20A^d$), the channel estimation means ($28A^d$) supplies spread channel vector estimates ($\hat{\underline{Y}}_{0,n}^d$) to the coefficient tuning means ($50A^d$) for use in updating said weighting coefficients.

4. A receiver according to claim 3, wherein said constraint matrix generating means (43A) comprises transformation means (49A) for forming an inverse matrix ($Q_n$) in dependence upon the constraint matrix ($\hat{C}_n$) and supplying said inverse matrix to said coefficient tuning means ($50A^d$) of said one or more receiver modules ($20A^d$), and wherein said coefficient tuning means ($50A^d$) computes said weighting coefficients in dependence upon said constraint matrix, said inverse matrix and said channel vector estimate.

5. A receiver according to claim 1, wherein the observation vector deriving means comprises a plurality of despreaders ($19^1, \ldots, 19^{NI}, 19^d$) each for using a corresponding one of the user spreading codes to despread the observation matrix ($Y_n$) using a respective one of the spreading codes to form a user-specific post-correlation vector ($\underline{Z}_n^1, \ldots, \underline{Z}_n^{NI}, \underline{Z}_n^d$) and supplying same to a respective one of the channel identification means ($28^1, \ldots, 28^{NI}, 28^d$).

6. A receiver according to claim 3, further comprising means ($30^1, \ldots, 30^{NI}$) for deriving amplitude estimates ($\psi_n^1, \ldots, \psi_n^{NI}$) of signal components from said first group of user stations and supplying the amplitude estimates to said constraints-set generating means as parts of said channel estimates, and wherein the constraints-set generating means (42C) comprises a plurality of respreaders ($57C^1, \ldots, 57C^{NI}$) each for using a corresponding one of the user spreading codes to respread a respective one of the symbol estimates ($\hat{b}_n^1, \ldots, \hat{b}_n^{NI}$) from the receiver modules corresponding to said first group (I) of user stations, scaling means ($58C^1, \ldots, 58C^{NI}$) for scaling the respread symbol estimates by the amplitudes ($\hat{\psi}_n^1, \ldots, \hat{\psi}_n^{NI}$) of the signal components corresponding to the symbol estimates ($\hat{b}_n^1, \ldots, \hat{b}_n^{NI}$), respectively, and a plurality of channel replication means ($59C^1, \ldots, 59C^{NI}$) having coefficients adjustable in dependence upon the channel vector estimates ($\hat{\underline{H}}_n^1, \ldots, \hat{\underline{H}}_n^{NI}$), respectively, for filtering the corresponding respread and scaled symbol estimates to provide user-specific observation matrix estimates ($\hat{Y}_{n-1}^1, \ldots, \hat{Y}_{n-1}^{NI}$), respectively, and means (60) for summing the user-specific observation matrices to form an observation matrix estimate ($\hat{I}_{n-1}$) and supplying same to the constraint matrix generator means (43C), the constraint matrix generator means (43C) comprising vector reshaping means for reshaping the observation matrix estimate ($\hat{I}_{n-1}$) to form an observation vector estimate ($\underline{\hat{I}}_{n-1}$) as a single column constraint matrix ($\hat{C}_n$) for application to the coefficient tuning means ($50A^d$) of each of said receiver modules ($20^d$) of said second group (D).

7. A receiver according to claim 3, wherein the constraints-set generating means (42D) generates a number of constraints ($N_c$) equal to the number (NI) of user stations in said first group (I) and comprises a plurality of respreaders ($57D^1, \ldots 3,57D^{NI}$) each for using a corresponding one of the user spreading codes to respread a respective one of the symbol estimates ($\hat{b}_n^1, \ldots, \hat{b}_n^{NI}$) from a predetermined group (I) of said receiver modules corresponding to said selected ones of said components of the received signals, and a plurality of channel replication means ($59D^1, \ldots, 59D^{NI}$) having coefficients adjustable in dependence upon the channel vector estimates ($\hat{\underline{H}}_n^1, \ldots, \hat{\underline{H}}_n^{NI}$), respectively, for filtering the corresponding respread symbol estimates to provide a plurality of user-specific observation matrix estimates ($\hat{Y}_{n-1}^1, \ldots, \hat{Y}_{n-1}^{NI}$) respectively, and wherein, in the constraint matrix generator (43D), the bank of vector reshapers ($48A^1, \ldots, 48A^{N_c}$) reshape the user-specific observation matrix estimates to form a plurality of user-specific observation vector estimates ($\underline{\hat{Y}}_{n-1}^1, \ldots, \underline{\hat{Y}}_{n-1}^{NI}$), respectively, as respective columns of the constraint matrix ($\hat{C}_n$) for supply to each of the coefficient tuning means ($50A^d$) of each of said receiver modules ($20^d$) of said second group (D).

8. A receiver according to claim 3, wherein the plurality of channel identification means ($28^1, \ldots, 28^{NI}$) of said first group of receiver modules ($20E^1, \ldots, 20E^{NI}$) provide both the channel vector estimates ($\hat{\underline{H}}_n^1, \ldots, \hat{\underline{H}}_n^{NI}$), respectively, and a plurality of sets of sub-channel vector estimates ($\hat{H}_n^{1,1}, \ldots, \hat{H}_n^{1,N_f}, \ldots, \hat{H}_n^{NI,1}, \ldots, \hat{H}_n^{NI,N_f}$), respectively, each of the channel estimates ($\hat{b}_n^1, \ldots, \hat{b}_n^{NI}$) comprising a respective one of the sets of sub-channel vector estimates, each of the sets of sub-channel vector estimates representing an estimate of the channel parameters of $N_f$ sub-channels of said channel between the base station and the transmitter of the corresponding one of the NI user stations in said first group, the constraints-set generator means (42E) comprises a plurality of respreaders ($57E^1, \ldots, 57E^{NI}$) and a plurality of channel replicators ($59E^1, \ldots, 59E^{NI}$) coupled to the plurality of respreaders ($57E^1, \ldots, 57E^{NI}$), respectively, for filtering the plurality of respread symbols ($\hat{b}_n^1, \ldots, \hat{b}_n^{NI}$), respectively, using respective ones of the sub-channel vector estimates ($\hat{H}_n^{1,1}, \ldots, \hat{H}_n^{1,N_f}, \ldots, \hat{H}_n^{NI,1}, \ldots, \hat{H}_n^{NI,N_f}$), to form a plurality ($N_c$) of constraints equal in number to $N_f$NI and forming a plurality of user-specific sub-channel observation matrix estimates ($\hat{Y}_{n-1}^{1,1}, \ldots, \hat{Y}_{n-1}^{1,N_f}, \ldots, \hat{Y}_{n-1}^{NI,1}, \ldots, \hat{Y}_{n-1}^{NI,N_f}$) corresponding to the sub-channels, respectively, and, in the constraint matrix generator (43E), the bank of reshapers ($48A^1, \ldots, 48A^{N_c}$) reshape the sets of user-specific observation matrix estimates to form a corresponding plurality of sets of user-specific sub-channel observation vector estimates ($\hat{\underline{Y}}_{n-1}^{1,1}, \ldots, \hat{\underline{Y}}_{n-1}^{1,N_f}, \ldots, \hat{\underline{Y}}_{n-1}^{NI,1}, \ldots, \hat{\underline{Y}}_{n-1}^{NI,N_f}$) as respective columns of the constraint matrix ($\hat{C}_n$) for supply to each of the coefficient tuning means ($50A^d$) of each of said receiver modules ($20^d$) of said second group (D).

9. A receiver according to claim 3, further comprising hypothetical symbol estimate generating means ($63F^1, \ldots, 63F^{NI}$) for generating for each of said selected ones of said components a series of hypothetical symbol estimates ($g_n^1, g_n^2, g_n^3$), wherein the constraints-set generating means (42F) comprises a plurality of respreaders ($57F^1, \ldots, 57F^{NI}$) each for respreading, using a corresponding one of the user spreading codes, selected sets of said hypothetical symbol estimates, and a plurality of channel replicator means ($59F^1, \ldots, 59F^{NI}$), respectively, for filtering the sets of respread symbol estimates, each to form a plurality ($N_c$) of constraints equal in number to 3 NI and forming a plurality of user-specific observation matrix estimates ($\hat{Y}_{0,n}^1, \hat{Y}_{-1,n}^1, \hat{Y}_{+1,n}^1, \ldots, \hat{Y}_{0,n}^{NI}, \hat{Y}_{-1,n}^{NI}, \hat{Y}_{+1,n}^{NI}$), the plurality of channel replication means ($59F^1, \ldots, 59F^{NI}$) having coefficients adjustable in dependence upon the channel vector estimates ($\hat{\underline{H}}_n^1, \ldots, \hat{\underline{H}}_n^{NI}$), respectively, and, in the constraint matrix generating means (43F), the bank of reshapers ($48A^1, \ldots, 48A^{N_c}$) reshape the sets of user-specific observation matrix estimates to form a plurality of user-specific observation vector estimates ($\hat{\underline{Y}}_{0,n}^1, \hat{\underline{Y}}_{-1,n}^1, \hat{\underline{Y}}_{+1,n}^1, \ldots, \hat{\underline{Y}}_{0,n}^{NI}, \hat{\underline{Y}}_{-1,n}^{NI}, \hat{\underline{Y}}_{+1,n}^{NI}$), respectively, as respective columns of the constraint matrix ($\hat{C}_n$) for supply to each of the coefficient tuning means ($50A^d$) of each of said receiver modules ($20^d$) of said second group (D).

10. A receiver according to claim 3, further comprising means ($63G^1, \ldots, 63G^{NI}$) for providing hypothetical symbol estimates ($g_n^{1+1,n}$) and wherein the constraints-set generating means uses a combination of said symbol estimates ($\hat{b}_n^1, \ldots, \hat{b}_n^{NI}$) and said hypothetical symbol values in producing said set of user-specific observation matrix estimates.

11. A receiver according to claim 10, wherein the constraints-set generating means (42G) comprises a plurality of respreaders ($57G^1, \ldots, 57G^{NI}$) each for respreading, using a corresponding one of the user spreading codes, a respective one of the symbol estimates ($\hat{b}_n^1, \ldots, \hat{b}_n^{NI}$) and a said hypothetical symbol estimates ($g_n^{1+1,n}$) to provide a plurality of respread symbol estimates, and a plurality of channel replicator means ($59G^1, \ldots, 59G^{NI}$), respectively, for filtering the respread symbol estimates to form a plurality ($N_c$) of constraints equal in number to 2NI and forming a plurality of user-specific observation matrix estimates ($\hat{Y}_{r,n}^1, \hat{Y}_{+1,n}^1, \ldots, \hat{Y}_{r,n}^{NI}, \hat{Y}_{+1,n}^{NI}$), the plurality of channel replication means ($59F^1, \ldots, 59F^{NI}$) having coefficients adjustable in dependence upon the channel vector estimates ($\hat{\underline{H}}_n^1, \ldots, \hat{\underline{H}}_n^{NI}$), respectively, and, in the constraint matrix generating means (43G), the bank of vector reshapers ($48A^1, \ldots, 48A^{N_c}$) reshape the user-specific observation matrix estimates to form a corresponding plurality of user-specific observation vector estimates ($\hat{\underline{Y}}_{r,n}^1, \hat{\underline{Y}}_{+1,n}^1, \ldots, \hat{\underline{Y}}_{r,n}^{NI}, \hat{\underline{Y}}_{+1,n}^{NI}$) respectively, as respective columns of the constraint matrix ($\hat{C}_n$) for supply to each of the coefficient tuning means ($50A^d$) of each of said receiver modules ($20^d$) of said second group (D).

12. A receiver according to claim 1, wherein the observation vector deriving means comprises a plurality of despreaders ($19^1, \ldots, 19^{NI}, 19^d$) each for despreading the observation matrix ($Y_n$) using a corresponding one of the user spreading codes to produce a corresponding one of a plurality of post-correlation observation vectors ($\underline{Z}_n^1, \ldots, \underline{Z}_n^{NI}, \underline{Z}_n^d$) and supplying the post-correlation observation vectors to both the channel identification means and the coefficient tuning means of the beamformer means of each of said one or more receiver modules, said elements of the observation vector weighted by said combining means of said one or more receiver modules being elements of the corresponding post-correlation observation vector, and wherein the constraint matrix providing means (42B, 43B) comprises means (42B) responsive to said channel estimates ($\hat{b}_n^1, \ldots, \hat{b}_n^{NI}; \hat{b}_{n-1}^i$) and to symbol estimates ($\hat{b}_n^1, \ldots, \hat{b}_n^{NI}; g^1, g^2, g^3; g^{I+1,n}$) corresponding to said first group (I) of user stations for providing a plurality of constraints-sets matrices ($C_n$) together characterizing the subspace of interference attributable to said spread signals of said first group of user stations, and constraint matrix generating means (43B) comprising a plurality of user-specific constraint matrix generators ($43B^d$) each associated with a respective one of said one or more receiver modules ($20^d$), each user-specific matrix generator ($43B^d$) having despreading means ($55B^{d,1}, \ldots, 55B^{d,N_I}$) for using the corresponding user spreading code of the specific user to despread each of the user-specific constraints-set matrices respectively, to form a respective column of a corresponding one of a plurality of user-specific post-correlation constraint matrices ($\hat{C}_{PCM,n}^d$), the plurality of user-specific constraint matrix generating means ($43B^d$) supplying said plurality of user-specific post-correlation constraint matrices to the coefficient tuning means of the respective one of said one or more receiver modules ($20B^d$).

13. A receiver according to claim 12, further comprising means ($30^1, \ldots, 30^{NI}$) for deriving amplitude estimates ($\hat{\psi}_n^1, \ldots, \hat{\psi}_n^{NI}$) of signal component estimates of said first group of user stations and supplying the amplitude estimates to said constraints-set generating means as parts of said channel estimates, and wherein the constraints-set generating means (42C) comprises a plurality of respreaders ($57C^1, \ldots, 57C^{NI}$) each for using a corresponding one of the user spreading codes to respread a respective one of the symbol estimates from receiver modules ($20^1, \ldots, 20^{NI}$)

corresponding to said first group of user stations, scaling means ($58C^1, \ldots, 58C^{NI}$) for scaling each of the respread symbol estimates by said amplitudes ($\psi_n^1, \ldots, \psi_n^{NI}$), respectively, a plurality of channel replication means ($59C^1, \ldots, 59C^{NI}$) having coefficients adjustable in dependence upon the channel vector estimates ($\underline{\hat{H}}_n^1, \ldots, \underline{\hat{H}}_n^{NI}$), respectively, for filtering the corresponding respread and scaled symbol estimates to provide user-specific observation matrix estimates ($\hat{Y}_{n-1}^1, \ldots, \hat{Y}_{n-1}^{NI}$), respectively, and means (60) for summing the user-specific observation matrix estimates to form an observation matrix estimate ($\hat{I}_{n-1}$) and supplying same to each of the user-specific constraint matrix generators ($43H^d$) of said one or more receiver modules of said second group, each of the user-specific constraint matrix generators ($43H^d$) comprising despreading means ($55B^d$) for despreading the observation matrix estimate ($\hat{I}_{n-1}$) using the corresponding user spreading code to form a respective one ($\hat{I}_{PCM,n-1}^d$) of a plurality of post-correlation user-specific observation vector estimates each as a single column respective constraint matrix ($\hat{C}_{PCM,n}^d$), for use by the associated one of the coefficient tuning means ($50B^d$) in said second group (D).

14. A receiver according to claim 12, wherein the constraints-set generating means (42D) comprises a plurality of respreaders ($57D^1, \ldots, 57D^{NI}$) each for respreading a respective one of the symbol estimates ($\hat{b}_n^1, \ldots, \hat{b}_n^{NI}$) from a predetermined group (I) of said receiver modules corresponding to said selected ones of said components of the received signals, and a plurality of channel replication means ($59D^1, \ldots, 59D^{NI}$) having coefficients adjustable in dependence upon the channel vector estimates ($\underline{\hat{H}}_n^1, \ldots, \underline{\hat{H}}_n^{NI}$), respectively, for filtering the corresponding respread symbol estimates to provide a plurality of user-specific observation matrix estimates ($\hat{Y}_{n-1}^1, \ldots, \hat{Y}_{n-1}^{NI}$) and wherein, in each of the user-specific constraint matrix generating means ($43I^d$), the despreading means ($55B^{d,1}, \ldots, 55B^{d,N_c}$) despreads the user-specific observation matrix estimates to form a plurality of user-specific observation vector estimates ($\underline{\hat{Y}}_{n-1}^1, \ldots, \underline{\hat{Y}}_{n-1}^{NI}$) respectively, as respective columns of a respective user-specific constraint matrix ($\hat{C}_{PCM,n}$) for supply to the associated one of the coefficient tuning means ($50B^d$) of said one or more receiver modules ($20^d$) in said second group (D).

15. A receiver according to claim 12, wherein the plurality of channel identification means ($28^1, \ldots, 28^{NI}$) of said first group (I) of receiver modules ($20E^1, \ldots, 20E^{NI}$) generate both said channel vector estimates ($\underline{\hat{H}}_n^1, \ldots, \underline{\hat{H}}_n^{NI}$), respectively, and a plurality of sets of sub-channel vector estimates ($\hat{H}_n^{1,1}, \ldots, \hat{H}_n^{1,N_f}, \ldots, \hat{H}_n^{NI,1}, \ldots, \hat{H}_n^{NI,N_f}$), respectively, each of the channel vector estimates ($\underline{\hat{H}}_n^1, \ldots, \underline{\hat{H}}_n^{NI}$), comprising a respective one of the sets of sub-channel vector estimates, each of the sets of sub-channel vector estimates representing an estimate of the channel parameters of sub-channels of said channel between the base station and the transmitter of the corresponding user station, the constraints-set generator means (42E) comprises a plurality of respreaders ($57E^1, \ldots, 57E^{NI}$) and a plurality of channel replicators ($59E^1, \ldots, 59E^{NI}$) coupled to the plurality of respreaders ($57E^1, \ldots, 57E^{NI}$), respectively, for filtering the plurality of respread symbols ($\hat{b}_n^1, \ldots, \hat{b}_n^{NI}$), respectively, of said first group using respective ones of the sub-channel vector estimates ($\hat{H}_n^{1,1}, \ldots, \hat{H}_n^{1,N_f}, \ldots, \hat{H}_n^{NI,1}, \ldots, \hat{H}_n^{NI,N_f}$), to form a plurality of sets of user-specific observation matrix estimates ($\hat{Y}_{n-1}^{1,1}, \ldots, \hat{Y}_{n-1}^{1,N_f}, \ldots, \hat{Y}_{n-1}^{NI,1}, \ldots, \hat{Y}_{n-1}^{NI,N_f}$), the sets corresponding to the sub-channels, respectively, and, in each of the user-specific constraint matrix generators ($43K^d$), the despreading means ($55B^{d,1}, \ldots, 55B^{d,N_c}$) despreads the sets of user-specific observation matrix estimates to form a corresponding plurality of sets of user-specific observation vector estimates ($\hat{\underline{I}}_{PCM,n-1}^{d,1,1}, \ldots, \hat{\underline{I}}_{PCM,n-1}^{d,NI,N_f}$), the sets forming respective columns of a respective user-specific constraint matrix ($\hat{C}_{PCM,n}^d$) for supply to the associated one of the coefficient tuning means ($50B^d$) of the one or more receiver modules ($20^d$) in said second group (D).

16. A receiver according to claim 12, further comprising hypothetical symbol estimate generating means ($63L^1, \ldots, 63L^{NI}$) for generating for each of said selected ones of said components a series of hypothetical symbol estimates ($\underline{g}_n^1, \underline{g}_n^2, \underline{g}_n^3$), wherein the constraints-set generating means (42L) comprises respreading means ($57L^1, \ldots, 57L^{NI}$) for respreading, using a corresponding one of the user spreading codes for said first group, selected sets of said hypothetical symbol estimates, and channel replicator means ($59L^1, \ldots, 59L^{NI}$), respectively, for filtering the sets of respread hypothetical values, each to form one of a plurality of sets of user-specific observation matrix estimates ($\hat{Y}_{0,n}^1, \hat{Y}_{-1,n}^1, \hat{Y}_{+1,n}^1, \ldots, \hat{Y}_{0,n}^{NI}, \hat{Y}_{-1,n}^{NI}, \hat{Y}_{+1,n}^{NI}$), the plurality of channel replication means ($59L^1, \ldots, 59L^{NI}$) having coefficients adjustable in dependence upon the channel vector estimates ($\underline{\hat{H}}_n^1, \ldots, \underline{\hat{H}}_n^{NI}$), respectively, and, in each of the user-specific constraint matrix generating means ($43L^d$), the despreading means ($55B^{d,1}, \ldots, 55B^{d,N_c}$) despreads the sets of user-specific observation matrix estimates to form a corresponding plurality of sets of user-specific observation vector estimates ($\hat{\underline{I}}_{PCM,n}^{d,1,1}, \hat{\underline{I}}_{PCM,n}^{d,1,2}, \hat{\underline{I}}_{PCM,n}^{d,1,3}, \ldots, \hat{\underline{I}}_{PCM,n}^{d,NI,1}, \hat{\underline{I}}_{PCM,n}^{d,NI,2}, \hat{\underline{I}}_{PCM,n}^{d,NI,3}$), respectively, as respective columns of a respective user-specific constraint matrix ($\hat{C}_{PCM,n}^d$) for supply to the coefficient tuning means ($50B^d$) of the associated one of said one or more receiver modules ($20^d$) in said second group (D).

17. A receiver according to claim 12, further comprising means ($63M^1, \ldots, 63M^{NI}$) for providing hypothetical symbol estimates ($\underline{g}_n^{l_{n1,n}}$) and wherein the constraints-set generating means (42M) uses a combination of said symbol estimates ($\hat{b}_n^1, \ldots, \hat{b}_n^{NI}$) and said hypothetical symbol estimates in producing said sets of user-specific observation matrix estimates.

18. A receiver according to claim 17, wherein the constraints-set generating means (42M) comprises a respreading means ($57M^1, \ldots, 57M^{NI}$) for respreading, using the symbol estimates ($\hat{b}_n^1, \ldots, \hat{b}_n^{NI}$) and said hypothetical symbol estimates ($\underline{g}_n^{l_{+1,n}}$) using respective ones of the user spreading codes, to provide a plurality of respread symbol estimates, and channel replicator means ($59M^1, \ldots, 59M^{NI}$) for filtering the respread symbol estimates to form a plurality of pairs of user-specific observation matrix estimates ($\hat{Y}_{r,n}^1, \hat{Y}_{+1,n}^1, \ldots, \hat{Y}_{r,n}^{NI}, \hat{Y}_{+1,n}^{NI}$), each pair corresponding to one of said first group of user stations, the channel replication means ($59M^1, \ldots, 59M^{NI}$) having coefficients adjustable in dependence upon the channel vector estimates ($\underline{\hat{H}}_n^1, \ldots, \underline{\hat{H}}_n^{NI}$), respectively, and, in each of the user-specific constraint matrix generating means ($43M^d$), the despreading means ($55B^{d,1}, \ldots, 55B^{d,N_c}$) despreads the user-specific observation matrix estimates to form a corresponding plurality of user-specific observation vector estimates ($\hat{\underline{I}}_{PCM,n}^{d,l,k_1}, \hat{\underline{I}}_{PCM,n}^{d,l,K_2}, \ldots, \hat{\underline{I}}_{PCM,n}^{d,NI,k_1}, \hat{\underline{I}}_{PCM,n}^{d,NI,k_2}$), respectively, as respective columns of a corresponding user-specific constraint matrix ($\hat{C}_{PCM,n}$) for supply to the coefficient tuning means ($50B^d$) of the associated one of said one or more receiver modules ($20^d$) in said second group (D).

19. A receiver according to claim 1, wherein:

at least one ($20^i$) of said one or more receiver modules both supplies symbol estimates to said constraint-matrix generating means (42P,43P) for use in deriving said constraint matrices and uses said constraint matrices in tuning weighting coefficients of its beamformer means ($47P^i$), said at least one of said one or more receiver modules further comprising a second beamformer means ($27P^i$) having second combining means and second coefficient tuning means for tuning the weighting coefficients of the second combining means;

the observation vector deriving means (19,44;44/1,44/2) further comprising second reshaping means (44/2) for reshaping said observation matrix ($Y_n$) and supplying a resulting second observation vector ($\underline{Y}_n$) to said second combining means ($27P^i$) and delay means (45) for delaying the first observation vector ($\underline{Y}_{n-1}$) relative to the second observation vector ($\underline{Y}_n$);

the second coefficient tuning means also being arranged to tune the weighting coefficients of the second combining means in dependence upon the channel vector estimate ($\hat{\underline{Y}}_{0,n-1}{}^i$) used by the first coefficient tuning means in beamformer ($47P^i$); and wherein the channel identification means ($28P^i$) of said at least one of the one or more receiver modules derives the channel vector estimate ($\hat{\underline{Y}}_{0,n-1}{}^i$) from the delayed first observation vector ($\underline{Y}_{n-1}$) and supplies said channel vector estimate to the respective coefficient tuning means of the first combining means and the second combining means for use in updating their weighting coefficients and supplies to the constraint matrix generator means (42P,43P) said channel estimates ($\hat{b}_{n-1}{}^i$) for use in deriving the constraint matrix;

the first combining means ($47P^i$;51,52) and second combining means ($27P^i$;51,52) use their respective weighting coefficients to weight respective ones of the elements of the delayed first observation vector and the second observation vector, respectively, and combine the weighted elements of the respective first and second observation vectors to provide first signal component estimate ($\hat{s}_{n-1}{}^i$) and second signal component estimate ($\hat{s}_{MRC,n}{}^i$), respectively;

said at least one of said one or more receiver modules further comprises second symbol estimating means ($29P/2^i$) for deriving from the second signal component estimate ($\hat{s}_{MRC,n}{}^i$) a symbol estimate ($\hat{b}_{MRC,n}{}^i$) and supplying said symbol estimate ($\hat{b}_{MRC,n}{}^i$) to the constraint matrix providing means (42P,43P);

the constraint means (42P,43P) comprises constraints-set generating means (42P) for generating a plurality of constraints-set matrices ($\mathbb{C}_{n-1}$) together characterizing the subspace of interference attributable to said first group of user station signals and the constraint matrix generating means (43P) comprises vector reshaping means ($48A^1, \ldots, 48A^{Nc}$) for reshaping the constraints-set matrices ($\mathbb{C}_n{}^1, \ldots, \mathbb{C}_n{}^{Nc}$) to form columns, respectively, of the constraint matrix ($\hat{C}_{n-1}$), the constraint matrix generating means (43P) supplying the constraint matrix to each of said coefficient tuning means ($50P^d$) of said one or more receiver modules ($20^d$).

20. A receiver according to claim 19, wherein said at least one of said one or more receiver modules further comprises amplitude estimation means ($30P^i$) for providing amplitude estimates ($\hat{\psi}_{n-1}{}^i$) of signal components from said first group of user stations and supplying the amplitude estimates to the constraints-set generating means (42P) as parts of the channel estimates ($\hat{b}_{n-1}{}^i$).

21. A receiver according to claim 19, wherein said at least one of the one or more receiver modules is arranged to perform for each frame a plurality of iterations (#1, #2, . . . , #$N_s$) to derive each symbol estimate, the arrangement being such that:

in each of the iterations of a particular frame (n), the constraints-set generator (42P) uses the channel estimates ($\hat{b}_{n-1}{}^i$), a first symbol estimate ($\hat{b}_{n-2}{}^i$) and a second symbol estimate ($\hat{b}_{MRC,n}{}^i$) from the first and second beamformer means, respectively of said one or more receiver modules, in a first iteration, the constraint matrix providing means (42P,43P) generates a first-iteration constraint matrix ($\hat{C}_{n-1}(1)$) in dependence also upon a previous symbol estimate ($\hat{b}_{MRC,n-1}{}^i$) previously generated by each of said second beamformers of said one or more receiver modules and supplies said first-iteration constraint matrix ($\hat{C}_{n-1}(1)$) to the coefficient tuning means of the first beamformer means ($47P^i$) for use, with the spread channel estimate $\hat{\underline{Y}}_{0,n-1}{}^i$, to tune the coefficients of the first beamformer means ($47P^i$) for weighting each element of the delayed first observation vector ($\underline{Y}_{n-1}$) to produce a first-iteration signal component estimate and the decision rule unit ($29P/1^i$) processes said first-iteration signal component estimate to produce a first-iteration symbol estimate ($\hat{b}_{n-1}{}^i(1)$), in a second iteration, the constraint matrix generating means (43P) uses said first-iteration symbol estimate ($\hat{b}_{n-1}{}^i(1)$), instead of the previous symbol estimate ($\hat{b}_{MRC,n-1}{}^i$) to tune the weighting coefficients and derive a second-iteration constraint matrix ($\hat{C}_{n-1}(2)$) for use by the first beamformer means and first decision rule means to produce a second-iteration symbol estimate ($\hat{b}_{n-1}{}^i(2)$), and in a final iteration of a total of $N_s$ iterations, the constraint matrix providing means (42P,43P) uses a penultimate-iteration symbol estimate ($\hat{b}_{n-1}{}^i(N_s-1)$) produced by the first decision rule means ($29P/1^i$) in the penultimate iteration to provide a final-iteration constraint matrix ($\hat{C}_{n-1}(N_s)$) for use by the first combining means and first decision rule means to provide a final iteration symbol estimate ($\hat{b}_{n-1}{}^i(N_s)$) as the target symbol estimate of that frame (u) for output as the symbol estimate ($\hat{b}_{n-1}{}^i$), and wherein the constraints-set generator (42P) buffers the symbol estimate ($\hat{b}_{n-1}{}^i$) for use in every iteration of the next frame (n+1) instead of symbol estimate $\hat{b}_{n-2}{}^i$, and the constraints-set generator (42P) uses a new symbol estimate ($\hat{b}_{MRC,n+1}{}^i$) from said second beamformer ($27P^i$) for all iterations of the new frame, and uses the previous symbol estimate ($\hat{b}_{MRC,n}{}^i$) from said second beamformer means ($27P^i$) in only the first iteration of said new frame, said previous symbol estimate being buffered as required and other variables being incremented appropriately.

22. A receiver according to claim 1, wherein said plurality of receiver modules ($20^1, \ldots, 20^{NI}, 20^d$) comprises a first set (I) of receiver modules ($20^1, \ldots, 20^{NI}$) for relatively strong user signals and that contribute at least respective sets of said channel estimates to said constraints-set generator (42) for use in deriving said constraint matrices but do not use said constraint matrices to update the weighting coefficients of their respective beamformer means, and a second set (D) of receiver modules ($20^d$) for relatively weaker user signals and that use the constraint matrices to update the weighting coefficients of their respective beamformer means but do not contribute either channel estimates or symbol estimates to the constraints-set generator (42) for use in deriving said constraint matrices.

23. A receiver according to claim 22, wherein said plurality of receiver modules further comprises at least one further set (M1) of at least one receiver module ($20^i$) as defined in claim 19 for a user signal having a signal strength that is intermediate the relatively strong and relatively weaker user signals and that both supplies at least channel estimates to said constraint-matrix generating means (42P, 43P) for use by receiver modules in other sets in deriving said constraint matrices and uses said constraint matrices derived from constraints supplied by receiver modules in its own set in tuning weighting coefficients of its beamformer means ($47P^i$).

24. A receiver according to claim 22, wherein said plurality of receiver modules further comprises at least one further set (M2) of at least one receiver module ($20^i$) as defined in claim 19 for a user signal having a signal strength that is intermediate the relatively strong and relatively weaker user signals and that both supplies at least channel estimates to said constraint-matrix generating means (42P, 43P) for use in deriving said constraint matrices and, in tuning weighting coefficients of its beamformer means ($47P^i$), uses said constraint matrices derived from constraints supplied by receiver modules in either or both of its own set and other sets.

25. A receiver according to claim 23, wherein the receiver modules are arranged in hierarchical order according to signal power and each lower power receiver module uses a constraint matrix formed from constraints-sets supplied by each of the higher power receiver modules.

26. A receiver according to claim 24, wherein the receiver modules are arranged in hierarchical order according to signal power and each lower power receiver module uses a constraint matrix formed from constraints-sets supplied by each of the higher power receiver modules.

27. A receiver according to claim 23, wherein each of the receiver modules in one of said sets is different from the receiver modules in the other sets.

28. A receiver according to claim 23, wherein the receiver modules in one of said second and further sets of receiver modules differ from each other.

29. A receiver according to claim 3, wherein said beamformer means of said at least one of the one or more receiver modules comprise projector means ($100^d$) for multiplying a projection ($\Pi_n^d$) with the observation vector ($\underline{Y}_n$) to form an interference-reduced observation vector ($\underline{Y}_n^{\Pi,d}$), and a residual beamformer ($27Q^d$) responsive to the projection ($\Pi_n^d$) and to the channel vector estimate ($\hat{\underline{Y}}_{0,n}^d$) to produce said signal component estimate ($\hat{s}_n^d$), and the channel identification means ($28Q^d$) derives the channel vector estimate ($\hat{\underline{Y}}_{0,n}^d$) from the interference-reduced observation vector ($\underline{Y}_n^{\Pi,d}$).

30. A receiver according to claim 29, wherein said at least one of the one or more receiver modules further comprises reshaping means ($102Q^d$) for reshaping the interference-reduced observation vector ($\underline{Y}_n^{\Pi,d}$) to form an interference-reduced observation matrix ($Y_n^{\Pi,d}$), and a despreader ($19^d$) for despreading the interference-reduced observation matrix ($Y_n^{\Pi,d}$), with the corresponding user spreading code to form a post-correlation reduced-interference observation vector ($\underline{Z}_n^{\Pi,d}$) for use by the channel identification means (28Qd) in deriving said channel vector estimate.

31. A receiver according to claim 3, for a base station in a CDMA system in which at least one of the user stations uses a plurality of different spreading codes to spread respective ones of said series of symbols for simultaneous transmission, such that the component of the received signal (X(t)) corresponding to that user station comprises a corresponding plurality of spread signals, and wherein, in said at least one of the one or more receiver modules ($20^d$), said beamformer means ($47R^{d,1}, \ldots, 47R^{d,N_m}$) uses different sets of weighting coefficients to weight each element of said observation vector ($\underline{Y}_n$) to form a plurality of signal component estimates ($\hat{s}_n^{d,1}, \ldots, \hat{s}_n^{d,N_m}$) corresponding to said respective ones of said series of symbols and the symbol estimating means derives from the plurality of signal component estimates ($\hat{s}_n^{d,1}, \ldots, \hat{s}_n^{d,N_m}$) a corresponding plurality of symbol estimates ($\hat{b}_n^{d,1}, \ldots, \hat{b}_n^{d,N_m}$), said observation vector deriving means comprises means ($19^{d,1}, \ldots, 19^{d,N_m}$) for deriving from the observation matrix a plurality of post-correlation observation vectors ($\underline{Z}_n^{d,1}, \ldots, \underline{Z}_n^{d,N_m}$) each corresponding to a respective one of the plurality of different spreading codes, the channel identification means ($28R^d$) derives from said plurality of post-correlation observation vectors ($\underline{Z}_n^{d,1}, \ldots, \underline{Z}_n^{d,N_m}$) a corresponding plurality of sets of channel vector estimates ($\hat{\underline{Y}}_{0,n}^{d,1}, \ldots, \hat{\underline{Y}}_{0,n}^{d,N_m}$) and supplies the sets to said beamformer means ($47R^{d,1}, \ldots, 47R^{d,N_m}$) and the coefficient tuning means of the beamformer means ($47R^{d,1}, \ldots, 47R^{d,N_m}$) uses the sets of channel vector estimates ($\hat{\underline{Y}}_{0,n}^{d,1}, \ldots, \hat{\underline{Y}}_{0,n}^{d,N_m}$) to derive said different sets of weighting coefficients, respectively.

32. A receiver according to claim 31, wherein the means ($19^{d,1}, \ldots, 19^{d,N_m}$) for deriving the plurality of observation vectors comprises despreading means for despreading said observation matrix ($Y_n$) using one or more of said plurality of different spreading codes to form a plurality of post-correlation observation vectors ($\underline{Z}_n^{d,1}, \ldots, \underline{Z}_n^{d,N_m}$) for use by the channel identification means ($28R^d$) in deriving said plurality of spread channel vector estimates ($\hat{\underline{Y}}_{0,n}^{d,1}, \ldots, \hat{\underline{Y}}_{0,n}^{d,N_m}$).

33. A receiver according to claim 32, wherein the observation vector deriving means further comprises also supplies said plurality of post-correlation observation vectors ($\underline{Z}_n^{d,1}, \ldots, \underline{Z}_n^{d,N_m}$) to said beamformer means ($47R^{d,1}, \ldots, 47R^{d,N_m}$), and the coefficient tuning means therein uses said sets of weighting coefficients to weight elements of respective ones of the plurality of post-correlation observation vectors, and each of the user-specific constraint-matrix generator means comprises despreading means ($55B^{d,1}, \ldots, 55B^{d,N_m}$) for despreading the user-specific constraints-set matrices using one or more of the plurality of different spreading codes.

34. A receiver according to claim 31, wherein said means for deriving said plurality of observation vectors comprises despreading means ($19^{d,\delta}$) for weighting said plurality of different spreading codes by the plurality of symbol estimates ($\hat{b}_n^{d,1}, \ldots, \hat{b}_n^{d,N_m}$), respectively, to form a single spreading code and despreading the observation matrix ($Y_n$) using said single spreading code to produce a compound post-correlation observation vector ($\underline{Z}_n^{d,\delta}$) for use by the channel identification means ($28R^d$) to derive said plurality of sets of channel vector estimates ($\hat{\underline{Y}}_{0,n}^{d,1}, \ldots, \hat{\underline{Y}}_{0,n}^{d,N_m}$).

35. A receiver according to claim 34, wherein the observation vector deriving means also supplies said plurality of post-correlation observation vectors ($\underline{Z}_n^{d,1}, \ldots, \underline{Z}_n^{d,N_m}$) to said beamformer means ($47R^{d,1}, \ldots, 47R^{d,N_m}$), and the coefficient tuning means therein uses said sets of weighting coefficients to weight elements of respective ones of the plurality of post-correlation observation vectors, and each of the user-specific constraint-matrix generator means comprises despreading means ($55B^{d,1}, \ldots, 55B^{d,N_m}$) for despreading the user-specific constraints-set matrices using the plurality of different spreading codes.

36. A receiver according to claim 3, wherein each of said plurality of receiver modules ($20^1, \ldots, 20^{NI}, 20^d$) operates with a frame duration equal to integer multiples ($F_1, \ldots, F_{NI}, F_d$) of symbol periods of the corresponding users and uses a plurality ($F_1, \ldots, F_{NI}, F_d$) of different segments of the same long spreading code equal to said the number of symbol periods in said frame, in said at least one of the one or more receiver modules ($20^d$), said beamformer means ($47S^{d,1}, \ldots, 47S^{d,F_d}$) uses different sets of weighting coefficients to weight each element of said observation vector ($\underline{Y}_n$) to form a plurality ($F_d$) of signal component estimates ($\hat{s}_n^{d,1}, \ldots, \hat{s}_n^{d,F_d}$), respectively, and the symbol estimating means ($29S^{d,1}, \ldots, 29S^{d,F_d}$) derives from the plurality of signal component estimates ($\hat{s}_n^{d,1}, \ldots, \hat{s}_n^{d,F_d}$) a corresponding plurality of symbol estimates ($\hat{b}_n^{d,1}, \ldots, \hat{b}_n^{d,F_d}$), said observation vector deriving means deriving from the observation matrix one or more of a plurality of post-correlation observation vectors ($\underline{Z}_n^{d,1}, \ldots, \underline{Z}_n^{d,F_d}$) the channel identification means ($28S^d$) derives from said post-correlation observation vectors ($\underline{Z}_n^{d,1}, \ldots, \underline{Z}_n^{d,F_d}$) a corresponding plurality of spread channel vector estimates ($\underline{\hat{Y}}_{0,n}^{d,1}, \ldots, \underline{\hat{Y}}_{0,n}^{d,F_d}$), and supplies said spread channel vector estimates ($\underline{\hat{Y}}_{0,n}^{d,1}, \ldots, \underline{\hat{Y}}_{0,n}^{d,F_d}$), to said beamformer means ($47S^{d,1}, \ldots, 47S^{d,F_d}$), each spread channel vector estimate being spread by a respective one of the segments of the long spreading code, and the coefficient tuning means of the beamformer means ($47S^{d,1}, \ldots, 47S^{d,F_d}$) uses said channel vector estimates ($\underline{\hat{Y}}_{0,n}^{d,1}, \ldots, \underline{\hat{Y}}_{0,n}^{d,F_d}$) to derive said different sets of weighting coefficients.

37. A receiver according to claim 36, wherein the means ($19S^{d,1}, \ldots, 19S^{d,F_d}$) for deriving one or more of the plurality of post-correlation observation vectors comprises despreading means for despreading said observation matrix ($Y_n$) using one or more of said different segments of the same long spreading code such that said plurality of observation vectors comprise a plurality of post-correlation observation vectors ($\underline{Z}_n^{d,1}, \ldots, \underline{Z}_n^{d,F_d}$) one or more thereof for use by the channel identification means ($28S^d$).

38. A receiver according to claim 37, wherein the observation vector deriving means also supplies said plurality of post-correlation observation vectors ($\underline{Z}_n^{d,1}, \ldots, \underline{Z}_n^{d,F_d}$) to said beamformer means ($47S^{d,1}, \ldots, 47S^{d,F_d}$), and the coefficient tuning means therein uses said sets of weighting coefficients to weight elements of respective ones of the plurality of post-correlation observation vectors, and each of the user-specific constraint-matrix generator means comprises despreading means ($55B^{d,1}, \ldots, 55B^{d,F_d}$) for despreading the user-specific constraints-set matrices using the corresponding one of the plurality ($F_d$) of different spreading code segments.

39. A user station receiver for a CDMA communications system comprising a plurality (NB) of base stations (11) and a multiplicity (U) of user stations ($10^1, \ldots, 10^U$), at least a plurality (U') of the user stations being in a cell associated with one of said base stations and served thereby, said one base station having a plurality of transmitter modules for spreading user signals for transmission to the plurality (U') of user stations, respectively, and a receiver for receiving spread user signals transmitted by the plurality (U') of user stations, the user stations each having a receiver for receiving the corresponding spread user signal transmitted by the base station, said plurality (U') of user stations each having a unique spreading code assigned thereto for use by the user station and the corresponding one of the base station transmitter modules to spread the user signals of that user for transmission, the spread user signals transmitted from the base station transmitter modules to a particular one of the plurality (U') of user stations propagating via a plurality of channels ($14^1, \ldots, 14^{U'}$), respectively, the receiver of a particular one of said plurality (U') of user stations receiving a signal (X(t)) comprising components corresponding to spread user signals for said particular user station and spread user signals transmitted by other transmitter modules of said plurality (NB) of base stations for other users, each of said spread user signals comprising a series of symbols spread using the spreading code associated with the corresponding one of the user stations, said user station receiver comprising:

a plurality (NB) of receiver modules ($20^{v'}$) each for deriving from successive frames of the received signal (X(t)) estimates of sets of said series of symbols from a corresponding one of the base stations, preprocessing means (18) for deriving from the received signal (X(t)) a series of observation matrices ($Y_n$) each for use by each of the receiver modules ($20^{v'}$) in a said frame to derive estimates of sets of said symbols, and means (19,44) for deriving from each observation matrix a plurality of sets of observation vectors ($\underline{Y}_n^{v',1,1}, \ldots, \underline{Y}_n^{v',NI,F_{NI}}; \underline{Z}_n^{v',1,1}, \ldots, \underline{Z}_n^{v',NI,F_{NI}}$) and applying each of the sets of observation vectors to a respective one of the plurality of receiver modules ($20^{v'}$);

each receiver modules comprising;

channel identification means ($28T^{v'}$) for deriving from the respective one of the sets of observation vectors a set of spread channel vector estimates ($\underline{\hat{Y}}_{0,n}^{v',1,1}, \ldots, \underline{\hat{Y}}_{0,n}^{v',NI,F_{NI}}$) based upon parameter estimates of the channel between the corresponding one of the base stations and said user station;

beamformer means ($47T^{v',1,1}, \ldots, 47T^{v',NI,F_{NI}}$) having coefficient tuning means for producing sets of weighting coefficients in dependence upon the sets of channel vector estimates, respectively, and combining means for using each of the sets of weighting coefficients to weight respective ones of the elements of a respective one of the observation vectors and combining the weighted elements to provide a corresponding set of signal component estimates ($\hat{s}_n^{v',1,1}, \ldots, \hat{s}_n^{v',NI,F_{NI}}$) and symbol estimating means ($29T^{v',1,1}, \ldots, 29T^{v',NI,F_{NI}}$) for deriving from the set of signal component estimates a set of estimates ($\hat{b}_n^{v',1,1}, \ldots, \hat{b}_n^{v',NI,F_{NI}}$) of symbols spread by the corresponding one of the transmitter modules and transmitted by the base station;

said user station receiver further comprising means (42,43) responsive to said symbol estimates ($\hat{b}_n^{v',1,1}, \ldots, \hat{b}_n^{v',NI,F_{NI}}; g_n^{-1}, g_n^{-2}, g_n^{-3}$) and channel estimates ($\hat{b}_n^{v'}$) from each of said plurality (NB) of receiver modules, said channel estimates comprising at least channel vector estimates ($\underline{\hat{H}}_n^{v'}$) for channels ($14^{v'}$) between the user station receiver and said base stations, for providing at least one constraint matrix ($\hat{C}_n$) representing interference subspace of components of the received signal corresponding to said spread signals, and in each of said receiver modules ($20^{v'}$), the coefficient tuning means produces said sets of weighting coefficients in dependence upon both the constraint matrix ($\hat{C}_n$) and the channel vector estimates so as to tune said receiver module ($20^{v'}$) towards a substantially null response to that portion of the received signal (X(t)) corresponding to said interference subspace.

40. A user station receiver according to claim 39, wherein said observation vector deriving means comprises means ($19^{v',1,1}, \ldots, 19^{v',NI,F_{NI}}$) for deriving from the observation matrix a plurality of post-correlation observation vectors ($\underline{Z}_n^{v',1,1}, \ldots, \underline{Z}_n^{v',NI,F_{NI}}$) and supplying said plurality of post-correlation observation vectors ($\underline{Z}_n^{v',1,1}, \ldots, \underline{Z}_n^{v',NI,F_{NI}}$) to the channel identification means ($28T^{v'}$) for use in producing said sets of channel vector estimates ($\underline{\hat{Y}}_{0,n}^{v',1,1}, \ldots, \underline{\hat{Y}}_{0,n}^{v',NI,F_{NI}}$).

41. A user station receiver according to claim 39, wherein said plurality (NB) of receiver modules ($20^{v'}$) derive symbols for user signals other than those destined for the user of said user station receiver, and said user station receiver comprises an additional receiver module ($20^d$) for deriving symbols from the received signal destined for said user of said user station receiver and transmitted by a corresponding serving one (v) of said plurality of base stations, wherein each of said plurality of receiver modules ($20^{v'}, 20^d$) operates with a frame duration equal to an integer multiple of the symbol period and uses a corresponding number of segments ($F_1, \ldots, F_{NI}, F_d$) of a long spreading code, each segment corresponding to a respective one of a plurality ($F_1, \ldots, F_{NI}, F_d$) of different segments of the same long spreading code equal to said plurality of symbol periods in said frame, and wherein, in said additional receiver module ($20^d$), said beamformer means ($47S^{d,1}, \ldots, 47S^{d,F_d}$) uses different sets of weighting coefficients to weight each element of said observation vector ($\underline{Y}_n$) to form a plurality ($F_d$) of signal component estimates ($\hat{s}_n^{d,1}, \ldots, \hat{s}_n^{d,F_d}$), respectively, and the symbol estimating means ($29S^{d,1}, \ldots, 29S^{d,F_d}$) derives from the plurality of signal component estimates ($\hat{s}_n^{d,1}, \ldots, \hat{s}_n^{d,F_d}$) a corresponding plurality of symbol estimates ($\hat{b}_n^{d,1}, \ldots, \hat{b}_n^{d,F_d}$), said observation vector deriving means deriving from the observation matrix a plurality of observation vectors ($\underline{Y}_n^{d,1}, \ldots, \underline{Y}_n^{d,F_d}$) the channel identification means ($28S^d$) derives from said observation vectors ($\underline{Y}_n^{d,1}, \ldots, \underline{Y}_n^{d,F_d}$) a corresponding plurality of spread channel vector estimates ($\underline{\hat{Y}}_{0,n}, \ldots, \underline{\hat{Y}}_{0,n}^{d,F_d}$), and supplies same said beamformer means ($47S^{d,1}, \ldots, 47S^{d,F_d}$), each spread channel vector estimate being spread by a respective one of the segments of the long spreading code, and the coefficient tuning means of the beamformer means ($47S^{d,1}, \ldots, 47S^{d,F_d}$) uses said channel vector estimates ($\underline{\hat{Y}}_{0,n}^{d,1}, \ldots, \underline{\hat{Y}}_{0,n}^{d,F_d}$) to derive said different sets of weighting coefficients.

42. A user station receiver according to claim 39, wherein said plurality (NB) of receiver modules ($20^{v'}$) derive symbols for user signals other than those destined for the user of said user station receiver, and said user station receiver comprises an additional receiver module ($20^d$) for deriving symbols from the received signal destined for said user of said user station receiver, wherein each of said plurality of receiver modules ($20^{v'}, 20^d$) operates with a frame duration equal to an integer multiple of the symbol period and uses a corresponding number of segments of a long spreading code, each segment corresponding to a respective one of a plurality ($F_1, \ldots, F_{NI}, F_d$) of different segments of the same long spreading code equal to said plurality of symbol periods in said frame, and wherein, in said additional receiver module ($20^d$), said beamformer means ($47T^{v,d,1}, \ldots, 47T^{v,d,F_d}$) uses different sets of weighting coefficients to weight each element of said observation vector ($\underline{Y}_n$) to form a plurality ($F_d$) of signal component estimates ($\hat{s}_n^{v,d,1}, \ldots, \hat{s}_n^{v,d,F_d}$), respectively, and the symbol estimating means ($29T^{v,d,1}, \ldots, 29T^{v,d,F_d}$) derives from the plurality of signal component estimates ($\hat{s}_n^{v,d,1}, \ldots, \hat{s}_n^{v,d,F_d}$) a corresponding plurality of symbol estimates ($\hat{b}_n^{v,d,1}, \ldots, \hat{b}_n^{v,d,F_d}$), and wherein the coefficient tuning means of said beamformer means ($47T^{v,d,1}, \ldots, 47T^{v,d,F_d}$) derives the weighting coefficients using said constraint matrix received from the constraint matrix generating means ($43T$) and said spread channel vector estimates ($\underline{\hat{Y}}_{0,n}^{v,d,1}, \ldots, \underline{\hat{Y}}_{0,n}^{v,d,F_d}$) produced by the channel identification means ($28T^{v'}$) of the receiver module ($20^{v'}$) corresponding to the base station (v) serving said user station.

43. A user station receiver according to claim 42, wherein said observation vector deriving means comprises despreading means ($19^{v',1,1}, \ldots, 19^{v',NI,F_{NI}}$) for despreading the observation matrix to form a plurality of post-correlation observation vectors ($\underline{Z}_n^{v',1,1}, \ldots, \underline{Z}_n^{v',NI,F_{NI}}$) and supplying said plurality of post-correlation observation vectors ($\underline{Z}_n^{v',1,1}, \ldots, \underline{Z}_n^{v',NI,F_{NI}}$) to the channel identification means ($28T^{v'}$) for use in producing said sets of channel vector estimates ($\underline{\hat{Y}}_{0,n}^{v',1,1}, \ldots, \underline{\hat{Y}}_{0,n}^{v',NI,F_{NI}}$).

44. A user station receiver according to claim 39, wherein at least one said transmitter module of one of the base stations uses a plurality ($N_m$) of different spreading codes to spread respective ones of said series of symbols for simultaneous transmission in the same frame, such that the component of the received signal (X(t)) corresponding to that base station transmitter module comprises a corresponding plurality of spread signals, and at least one ($20^{v'}$) of the plurality of receiver modules (20U) further comprises amplitude estimation means ($30U^{v'}$) for deriving total amplitude of a set of signal component estimates ($\hat{s}_n^{v',1,1}, \ldots, \hat{s}_n^{v',NI,N_m}$) produced by beamformer means ($47U^{v',1,1}, \ldots, 47U^{v',NI,N_m}$) thereof, said beamformer means ($47U^{v',1,1}, \ldots, 47U^{v',NI,N_m}$) uses different sets of weighting coefficients to weight each element of said observation vector ($\underline{Y}_n$) to form said plurality of signal component estimates ($\hat{s}_n^{v',1,1}, \ldots, \hat{s}_n^{v',NI,N_m}$) corresponding to said respective ones of said series of symbols, and the symbol estimating means ($29U^{v',1,1}, \ldots, 29U^{v',NI,N_m}$) derives from the plurality of signal component estimates ($\hat{s}_n^{v',1,1}, \ldots, \hat{s}_n^{v',NI,N_m}$) a corresponding plurality of symbol estimates ($\hat{b}_n^{v',1,1}, \ldots, \hat{b}_n^{v',NI,N_m}$), the channel identification means ($28U^{v'}$) derives a corresponding plurality of sets of spread channel vector estimates ($\underline{\hat{Y}}_{0,n}^{v',1,1}, \ldots, \underline{\hat{Y}}_{0,n}^{v',NI,N_m}$) each spread by a respective one of said plurality of different spreading codes, and supplies the sets to said beamformer means ($47U^{v',1,1}, \ldots, 47U^{v',NI,N_m}$) and the coefficient tuning means of the beamformer means ($47U^{v',1,1}, \ldots, 47U^{v',NI,N_m}$) uses the sets of spread channel vector estimates ($\underline{\hat{Y}}_{0,n}^{v',1,1}, \ldots, \underline{\hat{Y}}_{0,n}^{v',NI,N_m}$) to derive said different sets of weighting coefficients, respectively.

45. A user station receiver according to claim 44, wherein said plurality (NB) of receiver modules ($20^{v'}$) derive symbols for user signals other than those destined for the user of said user station receiver, and said user station receiver comprises an additional receiver module ($20^d$) for deriving symbols from the received signal destined for said user of said user station receiver, wherein each of said plurality of receiver modules ($20^{v'}, 20^d$) operates with a frame duration equal to an integer multiple of the symbol period and uses a corresponding number of segments of a long spreading code, each segment corresponding to a respective one of a plurality ($N_m$, $F_d$) of different segments of the same long spreading code equal to said plurality of symbol periods in said frame, and wherein, in said additional receiver module ($20^d$), said beamformer means ($47T^{v,d,1}, \ldots, 47T^{v,d,F_d}$) uses different sets of weighting coefficients to weight each element of said observation vector ($\underline{Y}_n$) to form a plurality ($F_d$) of signal component estimates ($\hat{s}_n^{v,d,1}, \ldots, \hat{s}_n^{v,d,F_d}$), respectively, and the symbol estimating means ($29T^{v,d,1}, \ldots, 29T^{v,d,F_d}$) derives from the plurality of signal component estimates ($\hat{s}_n^{v,d,1}, \ldots, \hat{s}_n^{v,d,F_d}$) a corresponding plurality of symbol estimates ($\hat{b}_n^{v,d,1}, \ldots, \hat{b}_n^{v,d,F_d}$), and wherein the coefficient tuning means of said beamformer means ($47T^{v,d,1}, \ldots, 47T^{v,d,F_d}$) derives the weighting coefficients using said constraint matrix received from the constraint matrix generating means ($43T$) and said spread channel vector estimates ($\hat{\underline{Y}}_{0,n}^{v,d,1}, \ldots, \hat{\underline{Y}}_{0,n}^{v,d,F_d}$) produced by the channel identification means ($28T^v$) of the receiver module ($20^v$) corresponding to the base station (v) serving said user station.

46. A receiver according to claim 44, wherein said observation vector deriving means comprises despreading means ($19^{v',1,1}, \ldots, 19^{v',NI,N_m}$) for despreading the observation matrix to form a plurality of post-correlation observation vectors ($\underline{Z}_n^{v',1,1}, \ldots, \underline{Z}_n^{v',NI,N_m}$) and supplying said plurality of post-correlation observation vectors ($\underline{Z}_n^{v',1,1}, \ldots, \underline{Z}_n^{v',NI,N_m}$) to the channel identification means ($28U^{v'}$) for use in producing said sets of channel vector estimates ($\hat{\underline{Y}}_{0,n}^{v',1,1}, \ldots, \hat{\underline{Y}}_{0,n}^{v',NI,N_m}$).

47. A user station receiver according to claim 39, wherein at least one said transmitter module of one of the base stations uses a plurality ($N_m$) of different spreading codes to spread respective ones of said series of symbols for simultaneous transmission in the same frame, such that the component of the received signal (X(t)) corresponding to that base station transmitter module comprises a corresponding plurality of spread signals, and at least one (2OU') of the plurality of receiver modules further comprises amplitude estimation means ($3OU^{v'}$) for deriving total amplitudes ($\Psi_n^{v',1}, \ldots, \Psi_n^{v',NI}$) of a set of signal component estimates ($\hat{s}_n^{v',1,1}, \ldots, \hat{s}_n^{v',NI,N_m}$) produced by beamformer means ($47U^{v',1,1}, \ldots, 47U^{v',1,1}, \ldots, 47U^{v',NI,N_m}$) thereof, said beamformer means ($47U^{v',1,1}, \ldots 47^{v',NI,N_m}$) uses different sets of weighting coefficients to weight each element of said observation vector ($\underline{Y}_n$) to form said plurality of signal component estimates ($\hat{s}_n^{v',1,1}, \ldots, \hat{s}_n^{vv',NI,N_m}$) corresponding to said respective ones of said series of symbols and the symbol estimating means ($29U^{v',1}, \ldots, 29U^{v',NI,N_m}$) derives from the plurality of signal component estimates ($\hat{s}_n^{v',1,1}, \ldots, \hat{s}_n^{v',NI,n_m}$) a corresponding plurality of symbol estimates ($\hat{b}_n^{v',1,1}, \ldots, \hat{b}_n^{v',NI,N_m}$), said observation vector deriving means comprises despreading means ($19^{v/\Sigma,1}, \ldots, 19^{v',\Sigma,N_m}$) for despreading the observation matrix ($Y_n$), using one or more of said plurality ($N_m$) of different spreading codes, each of these codes being a compound code formed by averaging the codes of all others of said multiplicity of interfering users (NI), to form a plurality of observation vectors ($\underline{Z}_n^{vv',\Sigma,1}, \ldots, \underline{Z}_n^{v',\Sigma,N_m}$), the channel identification means ($28U^{v'}$) derives from said plurality of observation vectors ($\underline{Z}_n^{v',\Sigma,1}, \ldots, \underline{Z}_n^{v',\Sigma,N_m}$), said signal component estimates ($\hat{s}_n^{v',\Sigma,1}, \ldots, \hat{s}_n^{v',\Sigma,N_m}$) and said amplitudes ($\Psi_n^{v',1}, \ldots, \Psi_n^{v',NI}$) a corresponding plurality of sets of channel vector estimates ($\hat{\underline{Y}}_{0,n}^{v',1,1}, \ldots, \hat{\underline{Y}}_{0,n}^{v',NI,N_m}$) and supplies the sets to said beamformer means ($47U^{v',1,1}, \ldots, 47U^{v',NI,N_m}$) and the coefficient tuning means of the beamformer means ($47U^{v',1,1}, \ldots, 47U^{v',NI,N_m}$) uses the sets of channel vector estimates ($\hat{\underline{Y}}_{0,n}^{v',1,1}, \ldots, \hat{\underline{Y}}_{0,n}^{v',NI,N_m}$) to derive said different sets of coefficients, respectively.

48. A receiver according to claim 1, each said receiver module it located in a user/mobile station and the received signal comprises a plurality of spread user signals transmitted by a plurality of transmitter modules at a base station communicating with said receiver via said channels.

49. A receiver for a CDMA communications system comprising preprocessing means (18) for deriving from a received signal (X(t)) a succession of observation matrices ($Y_n$), means (44) for reshaping each observation matrix to form an observation vector ($\underline{Y}_n$), beamformer means ($27N^d$) for weighting each element of the observation vector using weighting coefficients and combining the weighted elements to form a signal component estimate ($\hat{s}_n^3$), said beamformer means comprising tuning means for tuning said weighting coefficients in dependence upon a channel vector estimate ($\hat{\underline{Y}}_{0,n}^d$), means ($29N^d$) for deriving from the signal component estimate ($\hat{s}_n^d$) a corresponding symbol estimate ($\hat{b}_n^d$) for output from the receiver module, means ($19^d$) for despreading the observation matrix using the spreading code of the corresponding user to form a post-correlation observation vector ($\underline{Z}_n^d$), and channel identification means ($28N^d$) for deriving said channel vector estimate ($\hat{\underline{Y}}_{0,n}^d$) in dependence upon said post-correlation observation vector ($\underline{Z}_n^d$) and said signal component estimate ($\hat{s}_n^d$).

50. A CDMA communication system comprising at least one base station and a multiplicity (U) of user stations $10^1, \ldots, 10^U$) including a plurality (U') of user stations served by said at least one base station, the base station capable of transmitting unique space-time encoded signals each dedicated to a corresponding mobile user station, each user station having a transmitter and a receiver for communicating with said at least one base station via a corresponding one of a plurality of channels ($14^1, \ldots, 14^U$), the base station transmitter comprising:

a plurality of transmission antennas;

means for providing user-destined signals;

a distribution unit for grouping the user-destined signals into $N_G$ groups;

a temporal channelization-code unit for spreading each user-destined signal by a unique dedicated code belonging to a fixed set of L orthogonal codes and summing the spread signals in each group;

means for adding to the summed spread signals of each group a respective one of a plurality of pilot signals each specific to one of the groups and generated by a PN code generator;

means for scrambling the summed signal from each of the said groups using the same long scrambling code specific to the base station;

each pilot signal being assigned a fixed fraction of the total power transmitted from the base station transmitter;

means for mapping the signals from the groups ($G_1(t), \ldots, G_{N_G}(t)$) onto antenna branches ($A_1(t), \ldots, A_{M_t}(t)$) by means of a linear space coding (M) such that signals assigned to different groups are substantially orthogonal at transmission;

at least one of the user stations having a receiver for receiving the corresponding spread user signal transmitted by the base station said plurality (U') of user stations each having a unique spreading code assigned thereto for use by the user station and the corresponding one of the base station transmitter modules to spread the user signals of that user for transmission, the spread user signals transmitted from the base station transmitter modules to a particular one of the plurality (U') of user stations propagating via a plurality of channels ($14^1, \ldots, 14^{U'}$), respectively, the receiver of a particular one of said plurality (U') of user stations receiving a signal (X(tt)) comprising components corresponding to spread user signals for said particular user station and spread user signals transmitted by other transmitter modules of said plurality (NB) of base stations for other users, each of said spread user signals comprising a series of symbols spread using the spreading code associated with the corresponding one of the user stations, said user station receiver comprising:

a plurality (NB) of receiver modules ($20^{v'}$) each for deriving from successive frames of the received signal (X(t)) estimates of sets of said series of symbols from a corresponding one of the base stations, preprocessing means (18) for deriving from the received signal (X(t)) a series of observation matrices ($Y_n$) each for use by each of the receiver modules ($20^{v'}$) in a said frame to derive estimates of sets of said symbols, and means (19,44) for deriving from each observation matrix a plurality of sets of observation vectors ($\underline{Y}_n^{v',1,1}, \ldots, \underline{Y}_n^{v',NI,F_{NI}}; \underline{Z}_n^{v',1,1}, \ldots, \underline{Z}_n^{v',1,1}, \ldots, \underline{Z}_n^{v',NI,F_{NI}}$) and applying each of the sets of observation vectors to a respective one of the plurality of receiver modules ($20^{v'}$);

each receiver module comprising;

channel identification means ($28T^{v'}$) for deriving from the respective one of the sets of observation vectors a set of spread channel vector estimates ($\hat{\underline{Y}}_{0,n}^{v',1,1}, \ldots, \hat{\underline{Y}}_{0,n}^{v',NI,F_{NI}}$) based upon parameter estimates of the channel between the corresponding one of the base stations and said user station;

beamformer means ($47T^{v',1,1}, \ldots, 47T^{v',NI,F_{NI}}$) having coefficient tuning means for producing sets of weighting coefficients in dependence upon the sets of channel vector estimates, respectively, and combining means for using each of the sets of weighting coefficients to weight respective ones of the elements of a respective one of the observation vectors and combining the weighted elements to provide a corresponding set of signal component estimates ($\hat{s}_n^{v',1,1}, \ldots, \hat{s}_n^{v',NI,F_{NI}}$) and symbol estimating means ($29T^{v',1,1}, \ldots, 29T^{v',NI,F_{NI}}$) for deriving from the set of signal component estimates a set of estimates ($\hat{b}_n^{v',1,1}, \ldots, \hat{b}_n^{v',NI,F_{NI}}$) of symbols spread by the corresponding one of the transmitter modules and transmitted by the base station;

said user station receiver further comprises means (42,43) responsive to said symbol estimates ($\hat{b}_n^{vv',1,1}, \ldots, \hat{b}^{v',NI,F_{NI}}$; $g_n^1, g_n^2, g_n^3$) and channel estimates ($H_n^{v'}$) from each of said plurality (NB) of receiver modules, said channel estimates comprising at least channel vector estimates ($\hat{\underline{H}}_n^{v'}$) for channels ($14^{v'}$) between the user station receiver and said base stations, for providing at least one constraint matrix ($\hat{C}_n$) representing interference subspace of components of the received signal corresponding to said spread signals, and in each of said receiver modules ($20^{v'}$), the coefficient tuning means produces said sets of weighting coefficients in dependence upon both the constraint matrix ($\hat{C}_n$) and the channel vector estimates ($20^{v'}$) so as to tune said receiver module ($20^{v'}$) towards a substantially null response to that portion of the received signal (X(t)) corresponding to said interference subspace.

51. A CDMA system according to claim 50, the transmitter comprising:

delay means for delaying the signals from the mapping means each by a branch-specific delay, forming a corresponding signalling pulse modulating the signalling pulse with a carrier frequency signal, and supplying the modulated signal to the antenna elements for transmission thereby.

52. A CDMA system according to claim 50, wherein, in the transmitter, the grouping means is arranged to group data signals dedicated for user stations into a predetermined number $N_G$ of groups and, when the number of users is less than or equal to the processing gain, assigning all user signals to the same group; otherwise assigning user signals pseudo-randomly so as to tend to balance the number of users in each group.

53. A CDMA system according to claim 50, wherein the transmitter further comprises, for each group, a space-time coding means comprising:

a channel coding unit for spreading user signals by a group specific set of orthogonal codes;

a scrambling unit for spreading each group of user signals with the same base station specific scrambling code; and a spatial coding unit for mapping the total group signals ($G_1(t), \ldots, G_{N_G}(t)$) by a linear transformation (M).

54. A CDMA system according to claim 53, wherein, in the transmitter, the channel coding unit assigns to each user in the group indexed g a chip-code chosen from a fixed set of $L_g \leq L$ orthogonal group specific L-chip codes ($a_{i,1}(t), \ldots, a_{i,L_g}(t)$), the code-sets across groups being chosen subject to minimize the maximum cross-correlation, any code belonging to any group being orthogonal to any other code within the group while its cross-correlation with any out-group channelization code is minimized.

55. A CDMA communications system comprising at least one base station and a multiplicity (U) of user stations ($10^1, \ldots, 10^U$) including a plurality of (U') of user stations served by said at least one base station, each user station having a transmitter and a receiver for communicating with said at least one base station via a corresponding one of a plurality of channels ($14^1, \ldots, 14^U$), at least one user station being capable of transmitting a user signal comprising a plurality of unique space-time encoded signals each carrying different data from that same user, said at least one user station having a transmitter comprising:

a plurality of transmission antennas;

means for providing said user signals;

a distribution unit for grouping the space-time encoded signals into $N_G$ groups;

a temporal channelization-code unit for spreading each different data stream of the user signals by a unique dedicated code belonging to a fixed set of L orthogonal codes and summing the spread signals in each group;

means for adding to the summed spread signals of each group a respective one of a plurality of pilot signals each specific to one of the groups and generated by a PN code generator;

each pilot signal being assigned a fixed fraction of the total power transmitted from the base station transmitter;

means for scrambling the summed signals from the groups using the same long scrambling code specific to the user station;

means for mapping the signals from the groups ($G_1(t), \ldots, G_{N_C}(t)$) onto antenna branches ($A_1(t), \ldots, A_{M_t}(t)$) by means of a linear spacing coding (M) such that signals assigned to different groups are substantially orthogonal at transmission;
the base station having a receiver for receiving a signal (X(t)) comprising components corresponding to spread signals transmitted by the transmitters of the plurality of user stations, each of said spread signals comprising a series of symbols spread using a spreading code unique to the corresponding user station, said base station receiver comprising:
a plurality (U') of receiver modules ($20^1, \ldots, 20^{NI}, 20^d$) each for deriving from successive frames of the received signal (X(t)) estimates of said series of symbols of a corresponding one of the user stations,
preprocessing means (18) for deriving from the received signal (X(t)) a series of observation matrices ($Y_n$) each for use by each of the receiver modules (20) in a same frame to derive an estimate of a symbol of a respective one of said series of symbols, and
means (19,44;44/1,44/2) for deriving from each observation matrix a plurality of observation vectors ($\underline{Y}_n$; $\underline{Y}_{n-1}$; $\underline{Z}_1^{NI}$; $\underline{Z}_n^d$) and applying each of the observation vectors to a respective one of the plurality of receiver modules ($20^1, \ldots, 20^{NI}, 20^d$); each receiver module comprising:
channel identification means (28) for deriving from one of the observation vectors a channel vector estimate ($\hat{\underline{H}}_n^1$; $\hat{\underline{H}}_n^{NI}$; $\hat{\underline{H}}_n^{NI}$; $\hat{\underline{Y}}_{0,n}^d$; $\hat{\underline{Y}}_{0,n-1}^i$) based upon parameter estimates of the channel between the base station receiver and the corresponding user station transmitter;
beamformer means (27', ..., $27^{NI}$; $47^d$) having coefficient tuning means (50) for producing a set of weighting coefficients in dependence upon the channel vector estimate, and combining means (51,52) for using the weighting coefficients to weight respective ones of the elements of a respective one of the observation vectors and combining the weighted elements to provide a signal component estimate ($\hat{s}_n^1, \ldots, \hat{s}_n^U$); and
symbol estimating means ($29^1, \ldots, 29^U, 30^1, \ldots, 30^U$) for deriving from the signal component estimate an estimate ($\hat{b}_n^1, \ldots, \hat{b}_n^U$) of a symbol ($b_n^1, \ldots, b_n^U$) transmitted by a corresponding one of the user stations ($10^1, \ldots, 10^U$),
wherein said receiver further comprises means (42,43) responsive to symbol estimates ($\hat{b}_n^1, \ldots, \hat{b}_n^{NI}; g^1, g^2, g^3; g^{r+1,n}$) and to channel estimates ($\hat{H}_n^1 \ldots \hat{H}_n^{NI}; H_{n-1}^i$) comprising at least said channel vector estimates ($\hat{\underline{H}}_n^1, \ldots, \hat{\underline{H}}_n^{NI}$) for channels ($14^1, \ldots, 14^{NI}$) of a first group (I) of said plurality of user stations ($10^1, \ldots, 10^{NI}$) to provide at least one constraint matrix ($\hat{C}_n$) representing interference subspace of components of the received signal corresponding to said predetermined group, and in each of one or more receiver modules ($20A^d$) of a second group (D) of said plurality of receiver modules, the coefficient tuning means ($50A^d$) produces said set of weighting coefficients in dependence upon both the constraint matrix ($\hat{C}_n$) and the channel vector estimates ($\hat{\underline{H}}_n^d$) so as to tune said one or more ceiver modules ($20A^d$) each towards a substantially null response to that portion of the received signal (X(t)) corresponding to said interference subspace.

56. A CDMA system according to claim 55, the transmitter further comprising:
delay means for delaying the signals from the mapping means each by a branch-specific delay, forming a corresponding signalling pulse modulating the signalling pulse with a carrier frequency signal, and supplying the modulated signal to the antenna elements for transmission thereby.

57. A CDMA system according to claim 55, wherein, in the transmitter, the distribution unit means is arranged to group data signals dedicated for user stations into a predetermined number $N_G$ of groups and, when the number of users is less than or equal to the processing gain, assign all user signals to the same group, otherwise assigning user signals pseudo-randomly so as to tend to balance the number of users in each group.

58. A CDMA system according to claim 55, wherein the transmitter further comprises, for each group, space-time coding means comprising:
a channel coding unit for spreading user signals by a group specific set of orthogonal codes;
a scrambling unit for spreading each group of user signals with the same base station specific scrambling code; and
a spatial coding unit for mapping the total group signals ($G_1(t), \ldots, G_{N_G}(t)$) onto the antenna branch signals ($A_1(t), \ldots, A_{N_G}(t)$) by a linear transformation (M).

59. A CDMA system according to claim 58, wherein, in the transmitter, the channel coding unit assigns to each user in the group indexed g a chip-code chosen from a fixed set of $L_g \leq L$ orthogonal group specific L-chip codes ($A_{i,L_g}(t)$), the code-sets across groups being chosen subject to minimize the maximum cross-correlation, any code belongint to any group being orthogonal to any other code within the group while its cross-correlation with any out-group channelization code is minimized.

60. A receiver according to claim 1, for use with a transmitter transmitting pilot-symbol assisted user signals comprising pilot symbols multiplexed with data symbols, the receiver further comprising demultiplexing means ($35V^d$) for demultiplexing the signal component estimates from the ISR beamformer to extract pilot signal component estimates and data signal component estimates and supplying the data signal component estimates to the decision rule unit ($29V^d$) and the pilot signal component estimates to an ambiguity estimation means ($31V^d$), the ambiguity estimation means ($31V^d$) smoothing or averaging each pilot signal component estimate ($\hat{s}_n^{\pi,d}$) to provide an ambiguity estimate ($\hat{a}_n^d$), conjugation means ($32V^d$) for deriving from the ambiguity estimate ($\hat{a}_n^d$) its conjugate (($\hat{a}_n^d$)*) and multiplier means ($15V^d$) for multiplying the conjugate with the symbol estimate ($\hat{b}_n^d$) from the decision rule means ($29V^d$) to form an improved symbol estimate ($\hat{\underline{b}}_n^d$).

61. A receiver according to claim 1, further comprising a second ISR beamformer ($47V/2^d$) connected in parallel with the first ISR beamformer ($47V/1^d$) and responsive to the same channel coefficients and constraint matrix as the first iSR beamformer to derive from the observation vector ($\underline{Y}_n$) a pilot signal component estimate, ambiguity estimation means ($31V^d$) for smoothing or averaging the pilot signal component estimate ($\hat{s}_n^{\pi,d}$) to provide an ambiguity estimate ($\hat{a}_n^d$), conjugation means ($32V^d$) for deriving from the ambiguity estimate ($\hat{a}_n^d$) its conjugate (($\hat{a}_n^d$)*) and multiplier means ($15V^d$) for multiplying the conjugate with the symbol estimate ($\hat{b}_n^d$) from the decision rule unit ($29V^d$) to form an improved symbol estimate ($\hat{\underline{b}}_n^d$).

62. A receiver according to claim 60, wherein the ambiguity estimation means comprises a buffer for buffering bit estimates, smoothing means for smoothing or averaging the buffered estimates and a further decision rule unit ($29V/2^d$) for deriving from the smoothed or averaged estimates said corresponding ambiguity estimates ($\hat{a}_n^d$).

63. A receiver according to claim 61, wherien the ambiguity estimation means comprises a buffer for buffering bit estimates, smoothing means for smoothing or averaging the buffered estimates and a further decision rule unit ($29V/d^d$) for deriving from the smoothed or averaged estimates said corresponding ambiguity estimates ($\hat{a}_n^d$).

64. A receiver according to claim 39, for use with a transmitter transmitting pilot-symbol assisted user signals comprising pilot symbols multiplexed with data symbols, the receiver further comprising demultiplexing means ($35V^d$) for demultiplexing the signal component estimates from the ISR beamformer to extract pilot signal component estimates and data signal component estimates and supplying the data signal component estimates to the decision rule unit ($29V^d$) and the pilot signal component estimates to an ambiguity estimation means ($31V^d$), the ambiguity estimation means ($31V^d$) smoothing or averaging each pilot signal component estimate ($\hat{s}_n^{\pi;d}$) to provide an ambiguity estimate ($\hat{a}_n^d$), conjugation means ($32V^d$) for deriving from the ambiguity estimate ($\hat{a}_n^d$) its conjugate (($\hat{a}_n^d$)*) and multiplier means ($15V^d$) for multiplying the conjugate with the symbol estimate ($\hat{b}_n^d$) from the decision rule means ($29V^d$) to form an improved symbol estimate ($\underline{\hat{b}}_n^d$).

65. A receiver according to claim 39, further comprising a second ISR beamformer ($47V/2^d$) connected in parallel with the first ISR beamformer ($47V/1^d$) and responsive to the same channel coefficients and constraint matrix as the first ISR beamformer to derive from the observation vector ($\underline{Y}_n$) a pilot signal component estimate, ambiguity estimation means ($31V^d$) for smoothing or averaging the pilot signal component estimate ($\hat{s}_n^{\pi,d}$) to provide an ambiguity estimate ($\hat{a}_n^d$), conjugation means ($32V^d$) for deriving from the ambiguity estimate ($\hat{a}_n^d$) its conjugate (($\hat{a}_n^d$)*) and multiplier means ($15V^d$) for multiplying the conjugate with the symbol estimate ($\hat{b}_n^d$) from the decision rule unit ($29V^d$) to form an improved symbol estimate ($\underline{\hat{b}}_n^d$).

66. A receiver according to claim 64, wherein the ambiguity estimation means comprises a buffer for buffering bit estimates, smoothing means for smoothing or averaging the buffered estimates and a further decision rule unit ($29V/2^d$) for deriving from the smoothed or averaged estimates said corresponding ambiguity estimates ($\hat{a}_n^d$).

67. A receiver according to claim 65, wherein the ambiguity estimation means comprises a buffer for buffering bit estimates, smoothing means for smoothing or averaging the buffered estimates and a further decision rule unit ($29V/2^d$) for deriving from the smoothed or averaged estimates said corresponding ambiguity estimates ($\hat{a}_n^d$).

68. A receiver according to claim 19, further comprising buffering means ($90^i$), deinterleaving means ($91^i$), channel decoding means ($92^i$), re-encoding means ($93^i$) and re-interleaving means ($94^i$) for buffering a first frame of signal component estimates ($\hat{s}_{-1}^i(1)$), deinterleaving, channel decoding, re-encoding and re-interleaving the frame of signal component estimates to provide a frame of improved decided symbol estimates ($\hat{b}_n^i$), and supplying same to the constraint set generator (42W), the constraint matrix generator (43W) forming therefrom an improved constraint matrix, the ISR beamformer ($47W^i$) using said improved constraint matrix to provide an improved signal component estimate ($\hat{s}_{n-1}^i(2)$) for use in a next iteration, the receiver repeating the iterations a predetermined number of times.

69. A receiver according to claim 39, further comprising buffering means ($90^i$), deinterleaving means ($91^i$), channel decoding means ($92^i$), re-encoding means ($93^i$) and re-interleaving means ($94^i$) for buffering a first frame of signal component estimates ($\hat{s}_{n-1}^i(1)$), deinterleaving, channel decoding and re-interleaving the frame of signal component estimates to provide a frame of improved decided symbol estimates ($\hat{b}_n^i$), and supplying same to the constraint set generator (42W), the constraint matrix generator (43W) forming therefrom an improved constraint matrix, the ISR beamformer ($47W^i$) using said improved constraint matrix to provide an improved signal component estimate ($\hat{s}_{n-1}^i(2)$) for use in a next iteration, the receiver repeating the iterations a predetermined number of times.

70. A receiver according to claim 1, wherein coefficient tuning means ($50A^d$) produces said set of weighting coefficients in dependence upon both the constraint matrix ($\hat{C}_n$) and the channel vector estimates ($\underline{\hat{H}}_n^d$) so as to tune said one or more receiver modules ($20A^d$) each towards a response that is bound in magnitude to be close but not equal to a null.

71. A receiver according to claim 39, wherein coefficient tuning means ($50A^d$) produces said set of weighting coefficients in dependence upon both the constraint matrix ($\hat{C}_n$) and the channel vector estimates ($\underline{\hat{H}}_n^d$) so as to tune said one or more receiver modules ($20A^d$) each towards a response that is bound in magnitude to be close but not equal to a null.

* * * * *